(12) United States Patent
Hoguet

(10) Patent No.: US 9,019,266 B2
(45) Date of Patent: *Apr. 28, 2015

(54) SYSTEMS, METHODS, AND COMPUTER PROGRAM PRODUCTS FOR HOME AND LANDSCAPE DESIGN

(75) Inventor: Ramsay Hoguet, Marblehead, MA (US)

(73) Assignee: DesignIn Corporation, Marblehead, MA (US)

( * ) Notice: Subject to any disclaimer, the term of this patent is extended or adjusted under 35 U.S.C. 154(b) by 32 days.

This patent is subject to a terminal disclaimer.

(21) Appl. No.: 13/584,269

(22) Filed: Aug. 13, 2012

(65) Prior Publication Data

US 2013/0147799 A1 Jun. 13, 2013

Related U.S. Application Data

(63) Continuation of application No. 12/270,470, filed on Nov. 13, 2008, now Pat. No. 8,253,731, and a continuation-in-part of application No. 11/563,549, filed on Nov. 27, 2006, now Pat. No. 8,122,370, and a continuation-in-part of application No. 11/563,564, filed on Nov. 27, 2006, now Pat. No. 8,117,558, and a continuation-in-part of application No. 11/563,569, filed on Nov. 27, 2006, and a continuation-in-part of application No. 11/563,604, filed on Nov. 27, 2006, now Pat. No. 8,260,581, and a continuation-in-part of application No. 11/563,607, filed on Nov. 27, 2006.

(60) Provisional application No. 60/992,715, filed on Dec. 5, 2007, provisional application No. 61/019,816, filed on Jan. 8, 2008.

(51) Int. Cl.
*G06T 15/00* (2011.01)
*G06T 17/00* (2006.01)
*G06Q 10/06* (2012.01)
*G06Q 10/10* (2012.01)
*G06T 19/00* (2011.01)

(52) U.S. Cl.
CPC .............. *G06T 17/00* (2013.01); *G06Q 10/06* (2013.01); *G06Q 10/10* (2013.01); *G06T 19/00* (2013.01); *G06T 2210/04* (2013.01)

(58) Field of Classification Search
USPC .................................................. 345/419, 420
See application file for complete search history.

(56) References Cited

U.S. PATENT DOCUMENTS

| | | | |
|---|---|---|---|
| 5,715,331 A * | 2/1998 | Hollinger | 382/199 |
| 5,872,867 A | 2/1999 | Bergen | |
| 5,933,148 A | 8/1999 | Oka et al. | |
| 5,963,964 A | 10/1999 | Nielsen | |
| 6,021,416 A | 2/2000 | Dauerer et al. | |

(Continued)

FOREIGN PATENT DOCUMENTS

| WO | WO 01/27712 A2 | 4/2001 |
|---|---|---|
| WO | WO 2008/067191 A2 | 6/2008 |

OTHER PUBLICATIONS

U.S. Appl. No. 11/563,549.

(Continued)

*Primary Examiner* — Maurice L McDowell, Jr.
(74) *Attorney, Agent, or Firm* — Daly, Crowley, Mofford & Durkee, LLP

(57) ABSTRACT

This patent application relates generally to systems, methods, and computer program products for home and/or landscape design.

24 Claims, 91 Drawing Sheets

(56) References Cited

U.S. PATENT DOCUMENTS

| | | | |
|---|---|---|---|
| 6,029,141 | A | 2/2000 | Bezos et al. |
| 6,266,649 | B1 | 7/2001 | Linden et al. |
| 6,389,322 | B1* | 5/2002 | Park et al. ............... 700/98 |
| 6,446,030 | B1 | 9/2002 | Hoffman et al. |
| 6,459,435 | B1 | 10/2002 | Eichel |
| 6,664,972 | B2 | 12/2003 | Eichel et al. |
| 7,047,014 | B1 | 5/2006 | Friday et al. |
| 7,062,722 | B1 | 6/2006 | Carlin et al. |
| 7,064,767 | B2 | 6/2006 | Matsumoto et al. |
| 7,113,192 | B2 | 9/2006 | Poddar |
| 7,127,378 | B2 | 10/2006 | Hoffman et al. |
| 7,257,573 | B2 | 8/2007 | Matsumoto |
| 7,356,453 | B2 | 4/2008 | Gould |
| 7,523,411 | B2 | 4/2009 | Carlin |
| 7,584,120 | B1 | 9/2009 | Yun et al. |
| 7,647,351 | B2 | 1/2010 | Monsarrat |
| 7,703,036 | B2 | 4/2010 | Satterfield et al. |
| 2001/0042060 | A1 | 11/2001 | Rouse et al. |
| 2001/0047250 | A1* | 11/2001 | Schuller et al. ............ 703/1 |
| 2002/0013792 | A1 | 1/2002 | Imielinski et al. |
| 2002/0013950 | A1 | 1/2002 | Tomsen |
| 2002/0032546 | A1 | 3/2002 | Imamura et al. |
| 2002/0078045 | A1 | 6/2002 | Dutta |
| 2002/0169801 | A1* | 11/2002 | Barnes et al. ............ 707/513 |
| 2002/0174000 | A1 | 11/2002 | Katz et al. |
| 2002/0188526 | A1 | 12/2002 | Muneishi et al. |
| 2003/0030679 | A1 | 2/2003 | Jain |
| 2003/0097313 | A1 | 5/2003 | Saul et al. |
| 2003/0107568 | A1* | 6/2003 | Urisaka et al. ............. 345/419 |
| 2003/0120599 | A1 | 6/2003 | Agboatwalla et al. |
| 2003/0140311 | A1 | 7/2003 | Lemon et al. |
| 2004/0162840 | A1 | 8/2004 | Rappaport et al. |
| 2005/0050031 | A1 | 3/2005 | Matsumoto |
| 2005/0081161 | A1 | 4/2005 | MacInnes et al. |
| 2005/0216457 | A1 | 9/2005 | Walther et al. |
| 2006/0085732 | A1 | 4/2006 | Jiang et al. |
| 2006/0101742 | A1* | 5/2006 | Scott-Leikach et al. ........ 52/235 |
| 2006/0114252 | A1 | 6/2006 | Ramani et al. |
| 2006/0168514 | A1 | 7/2006 | Tokunaga |
| 2006/0232605 | A1* | 10/2006 | Imamura ............. 345/619 |
| 2007/0162307 | A1 | 7/2007 | Austin et al. |
| 2007/0171223 | A1 | 7/2007 | McArdle et al. |
| 2007/0208679 | A1 | 9/2007 | Tseng et al. |
| 2008/0043013 | A1 | 2/2008 | Gruttadauria et al. |
| 2008/0125892 | A1 | 5/2008 | Hoguet |
| 2008/0126020 | A1 | 5/2008 | Hoguet |
| 2008/0126021 | A1 | 5/2008 | Hoguet |
| 2008/0126022 | A1 | 5/2008 | Hoguet |
| 2008/0126023 | A1 | 5/2008 | Hoguet |
| 2009/0113349 | A1 | 4/2009 | Zohar et al. |

OTHER PUBLICATIONS

U.S. Appl. No. 11/563,569.
U.S. Appl. No. 11/563,604.
U.S. Appl. No. 11/563,607.
U.S. Appl. No. 11/563,564.
Autodesk, Inc., "AutoCAD Architectural Desktop Release 2: User's Guide" (Part 1 of 4) Jan. 1, 1999; 200 Pages.
Autodesk, Inc., "AutoCAD Architectural Desktop Release 2: User's Guide" (Part 2 of 4) Jan. 1, 1999; 200 Pages.
Autodesk, Inc., "AutoCAD Architectural Desktop Release 2: User's Guide" (Part 3 of 4) Jan. 1, 1999; 226 Pages.
Autodesk, Inc., "AutoCAD Architectural Desktop Release 2: User's Guide" (Part 4 of 4) Jan. 1, 1999; 200 Pages.
Funkhouser et al. "A Search Engine for 3D Models;" ACM Transactions on Graphics, vol. 22, No. 1; Jan. 1, 2003; pp. 83-96 (23 Pages).
Ahlers et al. "Distributed Augmented Reality for Collaborative Design Applications;" Technical Report ECRC-95-03; Jan. 1, 1995; 21 Pages.
Davulcu et al. "DataRover: A Taxonomy Based Crawler for Automated Data Extraction from Data-Intensive Websites;" Proceedings of the 5$^{th}$ ACM International Workshop on Web Information and Data Management on Nov. 7, 2003; Davulcu__TaxonomyBasedCrawler__2003.pdf; pp. 9 to 14 (6 Pages).
GreenLoungeChair__2005.pdf; Archived webpage of http://www.amazon.com/exec/obidos/tg/detail/-/BOOO04VWLP?v=glance on Apr. 28, 2005; 6 Pages.
GreenLoungeChair__html__2005.pdf; HTML source file of archived webpage http://www.amazon.com/exec/obidos/tg/detail/-/BOOO04VWLP?v=glance on Apr. 28, 2005; 39 Pages.
Kaasten et al. "Integrating Back, History and Bookmarks in Web Browsers;" Extended Abstracts from the Proceedings of the ACM Conference of Human Factors in Computing Systems in Mar. 2001; Kaasten__Integrating__Back__History__Bookmarks__2001.pdf; pp. 379 to 380 (2 Pages).
Powermarks__2005.pdf HTML source file of archived webpage http://www.kaylon.com/screen.html on Oct. 18, 2005; 20 Pages.
Wu et al. "Harvesting Social Knowledge from X Folksonomies;" Proceedings of the 17$^{th}$ Conference on Hypertext and Hypermedia in Aug. 2006; Wu__HarvestingSocialKnowledgeFromFolksonomies__2006.pdf; Aug. 1, 2006; pp. 111-114 (4 Pages).
CRS Flooring Services; crs-flooring.com.pdf archived from http://www.crs-flooring.com/plank-size.html on Aug. 10, 2006; 2 Pages.
Hardwood Flooring Species and Properties; HardwoodFloorSpecies.pdf archived from http://www.hardwoodinstaller.com/hardwoodinstaller/species.htm on Nov. 5, 2005; 1 Page.
Georgia Carpet Industries: Berber Carpet Wholesale; BerberCarpet__2005.pdf archived from http://georgiacarpet.com/berber__carpet.htm on Dec. 20, 2005; 1 Page.
Mosaic Tile Arts; mosaictilearts__com__2006.pdf archived from http://www.mosaictilearts.com on Oct. 30, 2006; 2 Pages.
Papamichael et al., "Decision Making Through Use of Interoperable Simulation Software;" Proceednigs of the Building Simulation '97 Fifth International IBPSA Conference, vol. II on Sep. 8, 1997 in Prague, Czech Republic; 10 Pages.
Murarka et al., "Using CAD Drawings for Robot Navigation;" Proceedings of the 2001 IEEE Systems, Man, and Cybernetics Conference, vol. 2 in Oct. 2001; pp. 678 to 683 (6 Pages).
Eastman, "Vector Versus Raster: A Functional Comparison of Drawing Technologies;" Proceedings from the IEEE Computer Graphics and Applications, vol. 10 in Sep. 1990; pp. 68-80 (13 Pages).
PCT International Preliminary Report on Patentability corresponding to Patent Application No. PCT/US2007/084944 dated Jun. 3, 2009; 1 Page.
PCT Written Opinion of the ISR corresponding to Patent Application No. PCT/US2007/084944 dated Jun. 3, 2009; 12 Pages.
Amazon__HomeBarFurnitureBookmark.pdf; HTML source file of archived webpage http://www.amazon.com/exec/obidos/tg/browse/-/3734101 on Jul. 12, 2004; 1 Page.
Epinions__com__2005.pdf; HTML source file of archived webpage http://www.epinions.com/Refrigerators--reviews--21__or__more__cu__ft/ . . . On Dec. 30, 2005; 2 Pages.
PCT Notification of Transmittal of the ISR and Written Opinion corresponding to Patent Application No. PCT/US2007/084944 dated Jul. 23, 2008; 2 Pages.
PCT International Search Report corresponding to Patent Application No. PCT/US2007/084944 dated Jul. 23, 2008; 7 Pages.
PCT Written Opinion of the ISR corresponding to Patent Application No. PCT/US2007/084944 dated Jul. 23, 2008; 13 Pages.
Maarek et al., "Automatically Organizing Bookmarks per Contents;" Proceedings of the Fifth International World Wide Web Conference on May 6, 1996 in Paris, France; 13 Pages.
MyDesignIn Help; Aug. 29, 2007; http://web.archive.org/web/20070829160503 HTML source file of archived webpage http://www.mydesignin.com/Help/Help/aspx retrieved on May 2, 2008; 2 Pages.
mySimon.com: Laptops; Nov. 14, 2006; http://web.archive.org/web/20061114140021 HTML source file of archived webpage www.mysimon.com/laptops/4566-3121__9-0.html retrieved on May 2, 2008; 5 Pages.
PCT Invitation to Pay Additional Fees with Partial International Search Report corresponding to Patent Application No. PCT/US2007/084944 dated May 19, 2008; 11 Pages.
Tu et al., "An Architecture and Category Knowledge for Intelligent Information Retrieval Agents;" Proceedings of the 31$^{st}$ Annual

(56) References Cited

OTHER PUBLICATIONS

Hawaii International Conference on System Sciences, IEEE, Computer Science, vol. IV on Jan. 6, 1998; pp. 405 to 414 (10 Pages).
http://del.icio.us/, 'Del.icio.us Social Bookmarking;' retrieved Nov. 28, 2006; 2 Pages.
http://stylehive.com, 'Stylehive—whats hot. right now;' retrieved Nov. 28, 2006; 26 Pages.
http://www.kaboodle.com/, 'kaboodle;' retrieved Nov. 28, 2006; 2 Pages.
http://scene7.com/, 'Scene 7;' retrieved Nov. 28, 2006; 2 Pages.
http://www.view22.com/, 'View22 Technology Inc.;' retrieved Nov. 28, 2006; 10 Pages.
http://swatchbox.com/, 'Swatchbox Technolgoies;' retrieved Nov. 28, 2006; 13 Pages.
http://www.plan3d.com/, 'Plan 3D—Home Design for Homeowners;' retrieved Nov. 28, 2006; 7 Pages.
Sketchup2 from Internet Google Sketchup; Compilation of various MOVE Tool Commands with supporting Blog History for dating the presence of these commands; Available since Jul. 8, 2006 at http://sketchupgoogle.com/support/bin/answer.py?answer=94867; 15 Pages.
Wayback Machine regarding Google's Sketchup Software package and associated with 3D Warehouse Database; Available since Jun. 15, 2006 at http://web.archive.org/web/20060615012326 and http://sketchup.google.com/supportl; 14 Pages.

* cited by examiner

FIG. 28

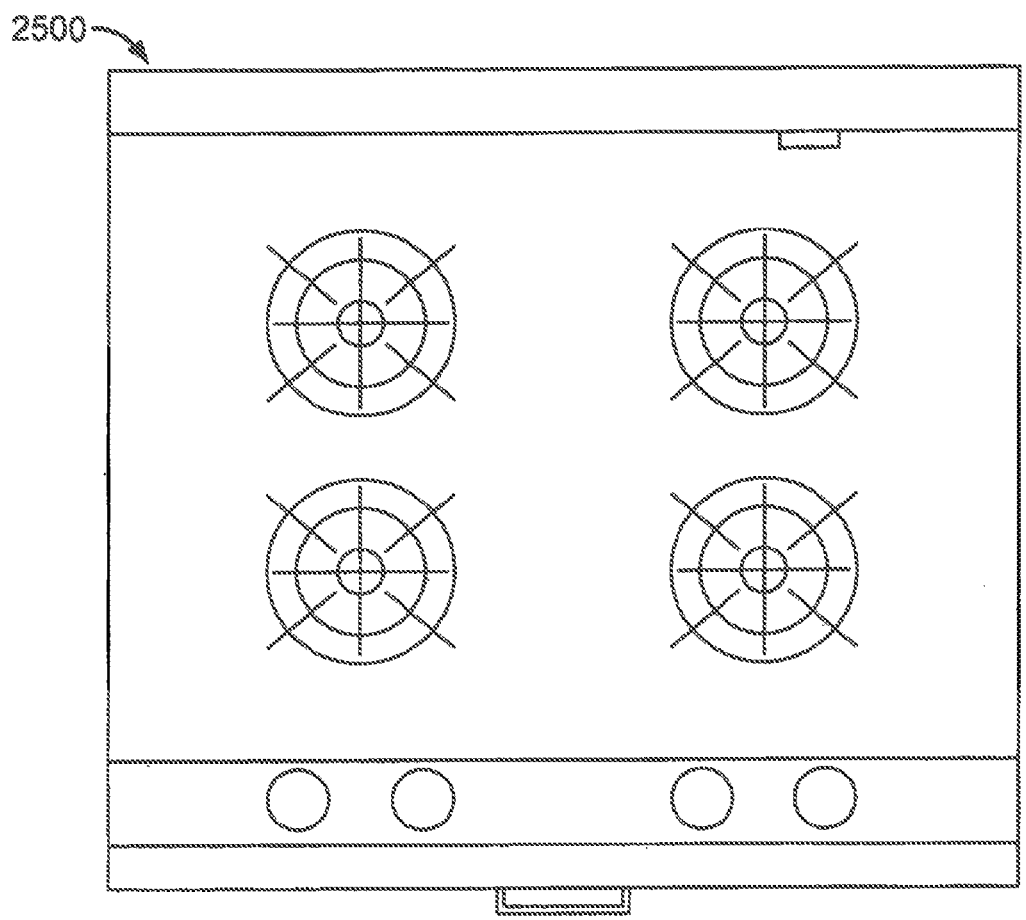
FIG. 92
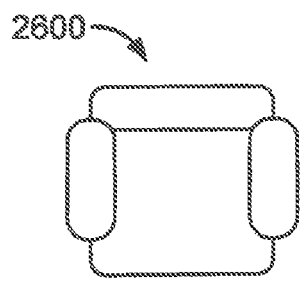 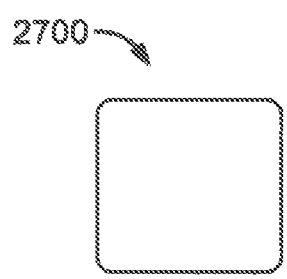 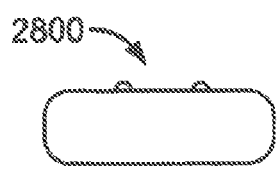
FIG. 93  FIG. 94  FIG. 95

SYSTEMS, METHODS, AND COMPUTER PROGRAM PRODUCTS FOR HOME AND LANDSCAPE DESIGN

CROSS-REFERENCE TO RELATED APPLICATIONS

This patent application claims priority to and is a continuation application of U.S. patent application Ser. No. 12/270,470, entitled "Systems, Methods, And Computer Program Products For Home And Landscape Design, filed on Nov. 13, 2008, which is a continuation-in-part of U.S. patent application Ser. No. 11/563,549, entitled "Visual Bookmarks For Home And Landscape Design", filed on Nov. 27, 2006; U.S. patent application Ser. No. 11/563,564, entitled "Converting Web Content Into Two-Dimensional CAD Drawings And Three-Dimensional CAD Models", filed on Nov. 27, 2006; U.S. patent application Ser. No. 11/563,569, entitled "Converting Web Content Into Texture Mapping Objects", filed on Nov. 27, 2006; U.S. patent application Ser. No. 11/563,604, entitled "Joining And Disjoining Individual Rooms In A Floor Plan", filed on Nov. 27, 2006; and U.S. patent application Ser. No. 11/563,607, entitled "Searching And Matching Related Objects, Drawings And Models For Home And Landscape Design", filed on Nov. 27, 2006; and which claims priority to U.S. Provisional Patent Application No. 60/992,715, entitled "Systems, Methods, And Computer Program Products For Home And Landscape Design", filed on Dec. 5, 2007; and U.S. Provisional Patent Application No. 61/019,816, entitled "Systems, Methods, And Computer Program Products For Home And Landscape Design", filed on Jan. 8, 2008. The contents of U.S. patent application Ser. Nos. 11/563,549; 11/563,564; 11/563,569; 11/563,604; 11/563,607; and 12/270,470; and of U.S. Provisional Patent Application Nos. 60/992,715 and 61/019,816, are hereby incorporated by reference into this application as if set forth herein in full.

TECHNICAL FIELD

This patent application relates generally to systems, methods, and computer program products for home and/or landscape design.

BACKGROUND

Designing the layout and products to include in a room can be a time consuming process. For example, a person designing a room can select various products to include in the room by collecting pages from magazines or from the internet. The person designing the room can later view these pages when selecting a product to purchase. The person designing the room may also use a computer-aided design (CAD) program or tool to generate a computer based layout of the room that includes the placement of various items within the room. If the person designing the room has questions about the items to include in the room or the layout of the room, he/she may ask a salesperson at a store about products or ask friends for recommendations or opinions about various aspects of his/her design.

The typical homeowner will spend months planning a home improvement project. The result can be an unorganized collection of pages torn out of magazines and catalogs, stacks of books with bookmarked pages, lengthy Internet Explorer "Favorites" lists with poor naming conventions and sketches of designs that are not to scale.

SUMMARY

This patent application relates generally to systems, methods, and computer program products for home and/or landscape design.

In some aspects, a computer-implemented method for use in building a three-dimensional representation of a home design product includes processing a graphical image of the home design product. The method also includes associating a three-dimensional base model with the graphical image. The method further includes applying a texture to the three-dimensional base model to build the three-dimensional representation of the home design product.

Implementations can include one or more of the following.

The computer-implemented method may further include generating a visual bookmark of the home design product. The computer-implemented method may further include scraping information regarding the home design product from a website. The information may include the graphical image. The information may include taxonomy and folksonomy data. The information may include dimensional information regarding the home design product.

The computer-implemented method may further include receiving the graphical image. The three-dimensional base model may be built prior to the graphical image being received. The computer-implemented method may further include applying edge detection to the graphical image to define surfaces of the graphical image. The computer-implemented method may also include cropping images from the surfaces of the graphical image, and applying the cropped images to surfaces of the three-dimensional base model using a texture mapping technique to build the three-dimensional representation. The computer-implemented method may further include selectively ignoring a feature detail of the graphical image found while applying edge detection as an extraneous detail. The computer-implemented method may further include presenting the three-dimensional representation to a user, and requesting that the user verify the three-dimensional representation.

The computer-implemented method may further include defining a product model type of the home design product. The computer-implemented method may also include retrieving the three-dimensional base model from a database according to the product model type.

In the computer-implemented method, processing the graphical image and associating the three-dimensional base model with the graphical image may include building the three-dimensional base model. In the computer-implemented method, building the three-dimensional base model may include building the three-dimensional base model using at least one of first information scraped from a website, second information from a database of product type attributes, neural networking information, interpretation of the graphical image, or third information provided by a user. Building the three-dimensional base model may also include determining an order in which to build portions of the three-dimensional base model, where the portions correspond to features of the home design product. The order may be determined based on at least one of design rules, first information scraped from a website, second information from a database of product type attributes, neural networking information, interpretation of the graphical image, third information provided by a user, or fourth information regarding methods of building the three-dimensional model for a product type of the home design product. Building the three-dimensional base model may further include applying solid modeling techniques to build the portions of the three-dimensional base model according to the order.

In the computer-implemented method, building the three-dimensional base model may include determining perspective information for the graphical image. Building the three-dimensional base model may further include applying edge detection to the graphical image. Building the three-dimensional base model may further include assigning dimensional information to the graphical image. The dimensional information may include at least one of overall dimensions for the home design product, or dimensions for a feature of the home design product. Building the three-dimensional base model may further include setting a relative scale for the three-dimensional base model using the dimensional information. Building the three-dimensional base model may further include determining main object planes based on the graphical image and forming a bounding box from the main object planes. The bounding box may include an outer boundary for the three-dimensional base model. Building the three-dimensional base model may further include applying the dimensional information to the main object planes to define one or more distances between the main object planes.

In the computer-implemented method, building the three-dimensional base model may further include applying edge detection to the graphical image. Building the three-dimensional base model may further include determining a feature level plane for a feature of the graphical image. Building the three-dimensional base model may further include determining main object planes based on the graphical image, forming a bounding box from the main object planes, and assigning the feature level plane within the bounding box. The bounding box may include an outer boundary for the three-dimensional base model.

In the computer-implemented method, building the three-dimensional base model may further include applying edge detection to the graphical image. Building the three-dimensional base model may further include determining a feature level plane for a feature of the graphical image. Building the three-dimensional base model may further include defining a profile on the feature level plane, where the profile corresponds to the feature of the graphical image. Building the three-dimensional base model may further include retrieving the profile from a profile database. The profile may be parametric. Building the three-dimensional base model may further include adjusting the profile to match a shape of the feature of the graphical image. The feature of the graphical image may intersect the feature level plane. Building the three-dimensional base model may further include drawing the profile to match a shape of the feature of the graphical image. The feature of the graphical image may intersect the feature level plane. Building the three-dimensional base model may further include applying a solid modeling technique to the profile to define the feature in the three-dimensional base model. Applying the solid modeling technique may include extruding the profile to build a three-dimensional model of the feature. Building the three-dimensional base model may further include warping a surface of the three-dimensional model of the feature. Building the three-dimensional base model may further include mirroring the profile in the feature level plane.

In the computer-implemented method, building the three-dimensional base model may further include applying edge detection to the graphical image. Building the three-dimensional base model may further include determining a feature level plane for a feature of the graphical image. Building the three-dimensional base model may further include defining a profile on the feature level plane, where the profile corresponds to the feature of the graphical image. Building the three-dimensional base model may further include determining a second feature level plane for the feature of the graphical image. Building the three-dimensional base model may further include defining a second profile on the second feature level plane. The second profile may correspond to the feature of the graphical image. Building the three-dimensional base model may further include evaluating the profile and the second profile, selecting a best profile of the profile and the second profile, and applying a solid modeling technique to the best profile to define the feature in the three-dimensional base model. The computer-implemented method may further include comparing the three-dimensional base model to the graphical image to determine whether to the three-dimensional base model is a proper characterization of the home design product, and using the three-dimensional base model to build the three-dimensional representation if the three-dimension base model is a proper characterization of the home design product. The computer-implemented method may further include presenting the three-dimensional base model to a user, and requesting that the user verify the three-dimensional representation.

In the computer-implemented method, the texture may include a stored texture. The texture may include a cropped image from the graphical image. In the computer-implemented method, applying a texture may include applying the texture using a texture mapping technique. The texture mapping technique may includes at least one of tiling the texture, warping the texture, or stretching the texture. The computer-implemented method may further include applying a textural detail to the three-dimensional base model to build the three-dimensional representation. The textural detail may include a bump map.

The computer-implemented method may further include presenting the three-dimensional representation to a user, and requesting that the user verify the three-dimensional representation. The computer-implemented method may further include providing an interface to a user to allow a user to edit at least one of the three-dimensional representation or the three-dimensional model. The computer-implemented method may further include building a two-dimensional drawing of the home design product using the three-dimensional representation.

In some aspects, a computer-implemented method for use in generating a home design layout includes modifying a structural design layout with one or more structural elements. The method also includes inserting one or more home design product elements into the modified structural design layout in conformance with the one or more structural elements to build a set of home design product layouts. The method further includes presenting the set of home design product layouts to a user. The method also includes presenting sets of home design product images to the user. The method further includes, responsive to a request, converting a home design product layout of the set of home design product layouts to a three-dimensional layout. The three-dimensional layout incorporates three-dimensional models associated with corresponding home design product images from a set of the sets of home design product images.

Implementations can include one or more of the following. The computer-implemented method can further include presenting additional home design product images to the user. The additional home design product images can be associated with corresponding additional three-dimensional models. Presenting the additional home design product images to the user can include selecting the additional home design product images for presentation based on the three-dimensional models incorporated into the three-dimensional layout. Presenting the additional home design product images can include selecting the additional home design product images for presentation based on one or more of the following: design rules, sponsorship by advertisers, input previously provided by the user, design choices previously made by the user, or neural network analysis of design choices of other users. Presenting the additional home design product images can include building the additional home design product images for presentation based on one or more of the following: design rules, sponsorship by advertisers, input previously provided by the user, design choices previously made by the user, or neural network analysis of design choices of other users. Presenting the additional home design product images can include presenting the additional home design product images in order of one or more of the following: most often used by other users, most recently used by other users, level of sponsorship by advertisers, whether used by design professionals, input previously provided by the user, or design choices previously made by the user. Presenting the additional home design product images can include incorporating one or more of the additional three-dimensional models into the three-dimensional layout. Presenting the additional home design product images can include building a new set of home design product images corresponding to the three-dimensional models and the additional three-dimensional models.

The computer-implemented method can further include, responsive to a request, adding a new three-dimensional model or removing one or more of the three-dimensional models incorporated into the three-dimensional layout to build a new set of three-dimensional models incorporated into the three-dimensional layout, and building a new set of home design product images. Each home design product image of the new set of home design product images can be associated with a corresponding three-dimensional model of the new set of three-dimensional models. The method can further include prompting the user for information regarding the new set of home design product images, and associating the information with and storing the new set of home design product images. The information can include least one of a design style; the user's occupation; or a description.

In the computer-implemented method, the one or more structural elements can include one or more two-dimensional drawings. The one or more structural elements can include at least one of a room, a window, a door, a door opening, a closet, a set of stairs, an additional floor level, or a fireplace. The structural design layout can be modified automatically. The structural design layout can be modified responsive to a first request. The one or more home design product elements can include one or more two-dimensional drawings. The one or more home design product elements can include at least one of a home design product, a closet, a set of kitchen cabinets, a table, or a bed. Each home design product image of the sets of home design product images can be associated with a corresponding two-dimensional drawing and three-dimensional model of a home design product shown in the home design product image.

The computer-implemented method can include presenting sets of structural elements to the user. The one or more structural elements can be drawn from the set of home design product elements. The computer-implemented method can further include applying exterior structural elements to the modified structural design layout. The method can also include presenting sets of home design product elements to the user. The one or more home design product elements can be drawn from the set of home design product elements.

In the computer-implemented method, inserting the one or more home design product elements into the modified structural design layout, and presenting the set of home design product layouts, can include selecting the set of home design product layouts for presentation based on one or more of the following: design rules, sponsorship by advertisers, input previously provided by the user, design choices previously made by the user, or neural network analysis of design choices of other users. Inserting the one or more home design product elements into the modified structural design layout, and presenting the set of home design product layouts, can also include presenting home design product layouts within the set of home design product layouts in order of one or more of the following: most often used by other users, most recently used by other users, level of sponsorship by advertisers, whether used by design professionals, input previously provided by the user, or design choices previously made by the user.

In the computer-implemented method, inserting the one or more home design product elements into the modified structural design layout, and presenting the set of home design product layouts, can include building the set of home design product layouts for presentation based on one or more of the following: design rules, sponsorship by advertisers, input previously provided by the user, design choices previously made by the user, or neural network analysis of design choices of other users. Inserting the one or more home design product elements into the modified structural design layout, and presenting the set of home design product layouts, can also include presenting home design product layouts within the set of home design product layouts in order of one or more of one or more of the following: most often used by other users, most recently used by other users, level of sponsorship by advertisers, whether used by design professionals, input previously provided by the user, or design choices previously made by the user.

In the computer-implemented method, inserting the one or more home design product elements into the modified structural design layout, and presenting the set of home design product layouts, can include building one or more home design product layouts of the set of home design product layouts for presentation, and can also include moving one or more redundant home design product layouts out of the set of home design product layouts before presenting the set of home design product layouts to the user.

In the computer-implemented method, presenting the sets of home design product images can include selecting the sets of home design product images for presentation based on the one or more home design product elements inserted into the modified structural design layout. Presenting the sets of home design product images can include building the sets of home design product images for presentation based on the one or more home design product elements inserted into the modified structural design layout. Presenting the sets of home design product images can include selecting the sets of home design product images for presentation based on one or more of the following: design rules, sponsorship by advertisers, input previously provided by the user, design choices previously made by the user, or neural network analysis of design choices of other users. Presenting the sets of home design product images can include building the sets of home design product images for presentation based on one or more of the following: design rules, sponsorship by advertisers, input previously provided by the user, design choices previously made by the user, or neural network analysis of design choices of other users. Presenting the sets of home design product images can include presenting the sets of home design product images in order of one or more of the following: most often used by other users, most recently used by other users, level of sponsorship by advertisers, whether used by design professionals, input previously provided by the user, or design choices previously made by the user.

In the computer-implemented method, converting the home design product layout of the set of home design product layouts can include inserting a set of the sets of home design product images into the home design product layout.

In the computer-implemented method, the sets of home design product images can include surface texture images. The three-dimensional models can include surface texture images mapped to a surface in the three-dimensional layout.

In some aspects, a computer program product is tangibly embodied in one or more information carriers and includes instructions that are executable by one or more processing devices to modify a structural design layout with one or more structural elements; insert one or more home design product elements into the modified structural design layout in conformance with the one or more structural elements to build a set of home design product layouts; present the set of home design product layouts to a user; present sets of home design product images to the user; and, responsive to a request, convert a home design product layout of the set of home design product layouts to a three-dimensional layout. The three-dimensional layout incorporates three-dimensional models associated with corresponding home design product images from a set of the sets of home design product images.

Implementations can include one or more of the following.

The computer program product can also include instructions that are executable by the one or more processing devices to present additional home design product images to the user, the additional home design product images associated with corresponding additional three-dimensional models. Presenting the additional home design product images can include selecting the additional home design product images for presentation based on the three-dimensional models incorporated into the three-dimensional layout. Presenting the additional home design product images can include selecting the additional home design product images for presentation based on one or more of the following: design rules, sponsorship by advertisers, input previously provided by the user, design choices previously made by the user, or neural network analysis of design choices of other users. Presenting the additional home design product images can include building the additional home design product images for presentation based on one or more of the following: design rules, sponsorship by advertisers, input previously provided by the user, design choices previously made by the user, or neural network analysis of design choices of other users. Presenting the additional home design product images can include presenting the additional home design product images in order of one or more of the following: most often used by other users, most recently used by other users, level of sponsorship by advertisers, whether used by design professionals, input previously provided by the user, or design choices previously made by the user. Presenting the additional home design product images can include incorporating one or more of the additional three-dimensional models into the three-dimensional layout. Presenting the additional home design product images can include building a new set of home design product images corresponding to the three-dimensional models and the additional three-dimensional models.

The computer program product can also include instructions that are executable by the one or more processing devices to, responsive to a request, add a new three-dimensional model or removing one or more of the three-dimensional models incorporated into the three-dimensional layout to build a new set of three-dimensional models incorporated into the three-dimensional layout; and build a new set of home design product images. Each home design product image of the new set of home design product images can be associated with a corresponding three-dimensional model of the new set of three-dimensional models. The computer program product can also include instructions that are executable by the one or more processing devices to prompt the user for information regarding the new set of home design product images, and associate the information with and storing the new set of home design product images. The information can include at least one of a design style; the user's occupation; or a description.

In the computer program product, the one or more structural elements can include one or more two-dimensional drawings. The one or more structural elements can include at least one of a room, a w, a window, a door, a door opening, a closet, a set of stairs, an additional floor level, or a fireplace. The structural design layout can be modified automatically. The structural design layout can be modified responsive to a first request. The one or more home design product elements can include one or more two-dimensional drawings. The one or more home design product elements comprise at least one of a home design product, a closet, a set of kitchen cabinets, a table, or a bed. Each home design product image of the sets of home design product images can be associated with a corresponding two-dimensional drawing and three-dimensional model of a home design product shown in the home design product image.

The computer program product can also include instructions that are executable by the one or more processing devices to present sets of structural elements to the user. The one or more structural elements can be drawn from the set of home design product elements. The computer program product can also include instructions that are executable by the one or more processing devices to apply exterior structural elements to the modified structural design layout. The computer program product can also include instructions that are executable by the one or more processing devices to present sets of home design product elements to the user. The one or more home design product elements can be drawn from the set of home design product elements.

In the computer program product, inserting the one or more home design product elements into the modified structural design layout, and presenting the set of home design product layouts, can include selecting the set of home design product layouts for presentation based on one or more of the following: design rules, sponsorship by advertisers, input previously provided by the user, design choices previously made by the user, or neural network analysis of design choices of other users; and presenting home design product layouts within the set of home design product layouts in order of one or more of the following: most often used by other users, most recently used by other users, level of sponsorship by advertisers, whether used by design professionals, input previously provided by the user, or design choices previously made by the user.

In the computer program product, inserting the one or more home design product elements into the modified structural design layout, and presenting the set of home design product layouts, can include building the set of home design product layouts for presentation based on one or more of the following: design rules, sponsorship by advertisers, input previously provided by the user, design choices previously made by the user, or neural network analysis of design choices of other users; and presenting home design product layouts within the set of home design product layouts in order of one or more of the following: most often used by other users, most recently used by other users, level of sponsorship by advertisers, whether used by design professionals, input previously provided by the user, or design choices previously made by the user.

In the computer program product, inserting the one or more home design product elements into the modified structural design layout, and presenting the set of home design product layouts, can include building one or more home design product layouts of the set of home design product layouts for presentation; and moving one or more redundant home design product layouts out of the set of home design product layouts before presenting the set of home design product layouts to the user.

In the computer program product, presenting the sets of home design product images can include selecting the sets of home design product images for presentation based on the one or more home design product elements inserted into the modified structural design layout. Presenting the sets of home design product images can include building the sets of home design product images for presentation based on the one or more home design product elements inserted into the modified structural design layout. Presenting the sets of home design product images can include selecting the sets of home design product images for presentation based on one or more of the following: design rules, sponsorship by advertisers, input previously provided by the user, design choices previously made by the user, or neural network analysis of design choices of other users. Presenting the sets of home design product images can include building the sets of home design product images for presentation based on one or more of the following: design rules, sponsorship by advertisers, input previously provided by the user, design choices previously made by the user, or neural network analysis of design choices of other users. Presenting the sets of home design product images can include presenting the sets of home design product images in order of one or more of the following: most often used by other users, most recently used by other users, level of sponsorship by advertisers, whether used by design professionals, input previously provided by the user, or design choices previously made by the user.

In the computer program product, converting the home design product layout of the set of home design product layouts can include inserting a set of the sets of home design product images into the home design product layout.

In the computer program product, the sets of home design product images can include surface texture images; and the three-dimensional models can include surface texture images mapped to a surface in the three-dimensional layout.

In some aspects, a system includes an apparatus configured to generate a home design layout. The apparatus includes memory configured to store instructions for execution, and one or more processing devices configured to execute the instructions. The instructions are for causing the one or more processing devices to modify a structural design layout with one or more structural elements; insert one or more home design product elements into the modified structural design layout in conformance with the one or more structural elements to build a set of home design product layouts; present the set of home design product layouts to a user; present sets of home design product images to the user; and, responsive to a request, convert a home design product layout of the set of home design product layouts to a three-dimensional layout. The three-dimensional layout incorporates three-dimensional models associated with corresponding home design product images from a set of the sets of home design product images.

Implementations can include one or more of the following.

The system can also include instructions that are executable by the one or more processing devices to present additional home design product images to the user, the additional home design product images associated with corresponding additional three-dimensional models. Presenting the additional home design product images can include selecting the additional home design product images for presentation based on the three-dimensional models incorporated into the three-dimensional layout. Presenting the additional home design product images can include selecting the additional home design product images for presentation based on one or more of the following: design rules, sponsorship by advertisers, input previously provided by the user, design choices previously made by the user, or neural network analysis of design choices of other users. Presenting the additional home design product images can include building the additional home design product images for presentation based on one or more of the following: design rules, sponsorship by advertisers, input previously provided by the user, design choices previously made by the user, or neural network analysis of design choices of other users. Presenting the additional home design product images can include presenting the additional home design product images in order of one or more of one or more of the following: most often used by other users, most recently used by other users, level of sponsorship by advertisers, whether used by design professionals, input previously provided by the user, or design choices previously made by the user. Presenting the additional home design product images can include incorporating on or more of the additional three-dimensional models into the three-dimensional layout. Presenting the additional home design product images can include building a new set of home design product images corresponding to the three-dimensional models and the additional three-dimensional models.

The system can also include instructions that are executable by the one or more processing devices to, responsive to a request, add a new three-dimensional model or removing one or more of the three-dimensional models incorporated into the three-dimensional layout to build a new set of three-dimensional models incorporated into the three-dimensional layout; and build a new set of home design product images. Each home design product image of the new set of home design product images can be associated with a corresponding three-dimensional model of the new set of three-dimensional models. The system can also include instructions that are executable by the one or more processing devices to prompt the user for information regarding the new set of home design product images, and associate the information with and storing the new set of home design product images. The information can include at least one of a design style; the user's occupation; or a description.

In the system, the one or more structural elements can include one or more two-dimensional drawings. The one or more structural elements can include at least one of a room, a window, a door, a door opening, a closet, a set of stairs, an additional floor level, or a fireplace. The structural design layout can be modified automatically. The structural design layout can be modified responsive to a first request. The one or more home design product elements can include one or more two-dimensional drawings. The one or more home design product elements comprise at least one of a home design product, a closet, a set of kitchen cabinets, a table, or a bed. Each home design product image of the sets of home design product images can be associated with a corresponding two-dimensional drawing and three-dimensional model of a home design product shown in the home design product image.

The system can also include instructions that are executable by the one or more processing devices to present sets of structural elements to the user. The one or more structural elements can be drawn from the set of home design product elements. The system can also include instructions that are executable by the one or more processing devices to apply exterior structural elements to the modified structural design layout. The system can also include instructions that are executable by the one or more processing devices to present sets of home design product elements to the user. The one or more home design product elements can be drawn from the set of home design product elements.

In the system, inserting the one or more home design product elements into the modified structural design layout, and presenting the set of home design product layouts, can include selecting the set of home design product layouts for presentation based on one or more of the following: design rules, sponsorship by advertisers, input previously provided by the user, design choices previously made by the user, or neural network analysis of design choices of other users; and presenting home design product layouts within the set of home design product layouts in order of one or more of the following: most often used by other users, most recently used by other users, level of sponsorship by advertisers, whether used by design professionals, input previously provided by the user, or design choices previously made by the user.

In the system, inserting the one or more home design product elements into the modified structural design layout, and presenting the set of home design product layouts, can include building the set of home design product layouts for presentation based on one or more of the following: design rules, sponsorship by advertisers, input previously provided by the user, design choices previously made by the user, or neural network analysis of design choices of other users; and presenting home design product layouts within the set of home design product layouts in order of one or more of the following: most often used by other users, most recently used by other users, level of sponsorship by advertisers, whether used by design professionals, input previously provided by the user, or design choices previously made by the user.

In the system, inserting the one or more home design product elements into the modified structural design layout, and presenting the set of home design product layouts, can include building one or more home design product layouts of the set of home design product layouts for presentation; and moving one or more redundant home design product layouts out of the set of home design product layouts before presenting the set of home design product layouts to the user.

In the system, presenting the sets of home design product images can include selecting the sets of home design product images for presentation based on the one or more home design product elements inserted into the modified structural design layout, Presenting the sets of home design product images can include building the sets of home design product images for presentation based on the one or more home design product elements inserted into the modified structural design layout. Presenting the sets of home design product images can include selecting the sets of home design product images for presentation based on one or more of the following: design rules, sponsorship by advertisers, input previously provided by the user, design choices previously made by the user, or neural network analysis of design choices of other users. Presenting the sets of home design product images can images can include building the sets of home design product images for presentation based on one or more of the following: design rules, sponsorship by advertisers, input previously provided by the user, design choices previously made by the user, or neural network analysis of design choices of other users. Presenting the sets of home design product images can include presenting the sets of home design product images in order of one or more of the following: most often used by other users, most recently used by other users, level of sponsorship by advertisers, whether used by design professionals, input previously provided by the user, or design choices previously made by the user.

In the system, converting the home design product layout of the set of home design product layouts can include inserting a set of the sets of home design product images into the home design product layout.

In the system, the sets of home design product images can include surface texture images; and the three-dimensional models can include surface texture images mapped to a surface in the three-dimensional layout.

In some aspects, a computer-implemented method for providing a user with a home design interface includes, in a two-dimensional structural design mode, presenting a user with one or more structural elements to modify a two-dimensional structural design layout. The method also includes, in a three-dimensional structural design mode, presenting a user with one or more exterior structural elements to modify a three-dimensional structural design layout. The three-dimensional structural design layout is based on the two-dimensional structural design layout. The method also includes, in a two-dimensional interior design mode, presenting a user with one or more product layouts; and presenting a user with one or more sets of product images to apply to a product layout of the one or more product layouts. The one or more product layouts are based on least one of the two-dimensional structural design layout or the three-dimensional structural design layout. The method also includes, in a three-dimensional interior design mode, presenting a user with one or more sets of complementary product images to apply to a three-dimensional design layout. The three-dimensional design layout is based on the product layout and incorporates three-dimensional models associated with corresponding product images from the one or more sets of product images. The method also includes allowing the user to cycle back and forth between the modes.

In some aspects, a computer program product is tangibly embodied in one or more information carriers and includes instructions that are executable by one or more processing devices to, in a two-dimensional structural design mode, present a user with one or more structural elements to modify to modify a two-dimensional structural design layout. The instructions are also executable to, in a three-dimensional structural design mode, present a user with one or more exterior structural elements to modify a three-dimensional structural design layout. The three-dimensional structural design layout are based on the two-dimensional structural design layout. The instructions are also executable to, in a two-dimensional interior design mode, present a user with one or more product layouts; and present a user with one or more sets of product images to apply to a product layout of the one or more product layouts. The one or more product layouts are based on least one of the two-dimensional structural design layout or the three-dimensional structural design layout. The instructions are also executable to, in a three-dimensional interior design mode, present a user with one or more sets of complementary product images to apply to a three-dimensional design layout. The three-dimensional design layout is based on the product layout and incorporates three-dimensional models associated with corresponding product images from the one or more sets of product images. The instructions are also executable to allow the user to cycle back and forth between the modes.

In, some aspects, a system includes an apparatus configured to provide a user with a home design interface. The apparatus includes memory configured to store instructions for execution, and one or more processing devices configured to execute the instructions. The instructions are for causing the one or more processing devices to, in a two-dimensional structural design mode, present a user with one or more structural elements to modify a two-dimensional structural design layout. The instructions are also for causing the one or more processing devices to, in a three-dimensional structural design mode, present a user with one or more exterior structural elements to modify a three-dimensional structural design layout. The three-dimensional structural design layout are based on the two-dimensional structural design layout. The instructions are also for causing the one or more processing devices to, in a two-dimensional interior design mode, present a user with one or more product layouts; and present a user with one or more sets of product images to apply to a product layout of the one or more product layouts. The one or more product layouts are based on least one of the two-dimensional structural design layout or the three-dimensional structural design layout. The instructions are also for causing the one or more processing devices to, in a three-dimensional interior design mode, present a user with one or more sets of complementary product images to apply to a three-dimensional design layout. The three-dimensional design layout is based on the product layout and incorporates three-dimensional models associated with corresponding product images from the one or more sets of product images. The instructions are also for causing the one or more processing devices to allow the user to cycle back and forth between the modes.

In some aspects, a computer-implemented method for building a product layout includes receiving a structural design layout. The structural design layout includes one or more structural elements. The method also includes building one or more product layouts from the structural design layout by inserting a first product element into the structural design layout in conformance with the one or more structural elements according to a first design rule; and inserting a second product element into the structural design layout in conformance with the one or more structural elements and the first product element and according to a second design rule.

Implementations can include one or more of the following.

In the computer-implemented method, the second product element can include kitchen cabinets.

In some aspects, a computer program product is tangibly embodied in one or more information carriers and includes instructions that are executable by one or more processing devices to receive a structural design layout. The structural design layout includes one or more structural elements. The instructions are also executable to build one or more product layouts from the structural design layout by inserting a first product element into the structural design layout in conformance with the one or more structural elements according to a first design rule; and inserting a second product element into the structural design layout in conformance with the one or more structural elements and the first product element and according to a second design rule.

Implementations can include one or more of the following.

In the computer program product, the second product element can include kitchen cabinets.

In some aspects, a system includes an apparatus configured to build a product layout. The apparatus includes memory configured to store instructions for execution, and one or more processing devices configured to execute the instructions. The instructions are for causing the one or more processing devices to receive a structural design layout. The structural design layout includes one or more structural elements. The instructions are also for causing the one or more processing devices to build one or more product layouts from the structural design layout by inserting a first product element into the structural design layout in conformance with the one or more structural elements according to a first design rule; and inserting a second product element into the structural design layout in conformance with the one or more structural elements and the first product element and according to a second design rule.

Implementations can include one or more of the following.

In the system, the second product element can include kitchen cabinets.

In some aspects, a computer-implemented method for suggesting home design products to a user includes presenting a user with one or more sets of complementary product images to apply to a three-dimensional design layout. The three-dimensional design layout is based on a product layout and incorporates three-dimensional models associated with corresponding product images from one or more sets of product images.

In some aspects, a computer-implemented method for presenting home design product sets to a user includes receiving a first product image of a first product from a user. The method also includes presenting sets of product images to a user. The sets of product images each include a second product image related to the first product image. The second product image is an image of a second product that shares one or more characteristics with the first product. Each product image of the sets of product images is associated with a corresponding two-dimensional drawing and three-dimensional model of a product shown in the product image. The method also includes generating a three-dimensional design layout using a set of the set of product images.

More particularly, in some aspects, this application relates to a system and method for generating visual bookmarks for home improvement products by scraping, extracting, and categorizing information.

In some aspects, a computer-implemented method for use in generating a home design layout includes receiving a request to generate a visual bookmark for a home design product based on a selection of the home design product from a website and extracting information about the home design product from the website. The method also includes categorizing the home design product based on the information and generating the visual bookmark for the home design product, the visual bookmark comprising an image of the home design product and information related to the home design product.

Implementations can include one or more of the following.

Extracting information about the home design product from the website can include searching the website for words used to identify a particular type of information about the home design product. The words can be one or more words in a folksonomy based system. Generating the visual bookmark can include extracting the image of the home design product from the website and resizing the image of the home design product for the visual bookmark. The information related to the product can include one or more of a style of the home design product, a color of the home design product, and dimensional information about the home design product. Categorizing the home design product can include pre-selecting a product category based on the extracted information, pre-selecting a product type based on the extracted information, presenting the pre-selected product category, presenting the pre-selected product type and receiving feedback on the pre-selected product category and product type. Categorizing the home design product can include identifying a taxonomy based category for the home design product based on information associated with the home design product and the received feedback on the pre-selected product category and product type. Receiving feedback on the pre-selected product category and product type from the user can include receiving confirmation that the pre-selected category and product type are correct. Receiving feedback can include receiving a selection of at least one of a product category and a product type that is different from the pre-selected product category and pre-selected product type and storing the received selection.

In some aspects, a computer program product is tangibly embodied in an information carrier for executing instructions on a processor. The computer program product is operable to cause a machine to receive a request to generate a visual bookmark for a home design product based on a selection of the home design product from a website, extract information about the home design product from the website, categorize the home design product based on the information, and generate the visual bookmark for the home design product. The visual bookmark includes an image of the home design product and information related to the home design product.

Implementations can include one or more of the following.

The instructions to extract information about the home design product from the website can include instructions to cause a machine to search the website for words used to identify a particular type of information about the home design product. The instructions to generate the visual bookmark can include instructions to cause a machine to extract the image of the home design product from the website and resize the image of the home design product for the visual bookmark. The instructions to categorize the home design product can include instructions to cause a machine to pre-select a product category based on the extracted information, pre-select a product type based on the extracted information, present the pre-selected product category, present the pre-selected product type, and receive feedback on the pre-selected product category and product type. The instructions to categorize the home design product can include instructions to cause a machine to identify a taxonomy based category for the home design product based on information associated with the home design product and the received feedback on the pre-selected product category and product type.

In some aspects a system for use in generating a home design layout is configured to receive a request to generate a visual bookmark for a home design product based on a selection of the home design product from a website, extract information about the home design product from the website, categorize the home design product based on the information, and generate the visual bookmark for the home design product, the visual bookmark comprising an image of the home design product and information related to the home design product.

Implementations can include one or more of the following.

The system can be further configured to search the website for words used to identify a particular type of information about the home design product. The system can be further configured to extract the image of the home design product from the website and resize the image of the home design product for the visual bookmark. The system can be further configured to pre-select a product category based on the extracted information, pre-select a product type based on the extracted information, present the pre-selected product category, present the pre-selected product type, and receive feedback on the pre-selected product category and product type. The system can be further configured to identify a taxonomy based category for the home design product based on information associated with the home design product and the received feedback on the pre-selected product category and product type.

In other aspects, this application relates to scraping and extracting information from websites and converting this information into 2D CAD (computer-aided design) drawings and 3D CAD models.

In some aspects, a computer-implemented method for use in generating a home design layout includes extracting dimensional information about a home design product from a website, extracting properties about a home design product from the website, extracting categorization information about the home design product from the website, and identifying, based on the categorization information and the dimensional information, one or more pre-existing computer-aided design (CAD) models stored in a database of CAD models.

Implementations can include one or more of the following.

The method can also include presenting the one or more CAD models to a user; receiving a selection of a particular one of the CAD models selected from the one or more identified CAD models, and associating the selected particular one of the CAD models can include determining a likelihood of a match between each of the one or more identified CAD models and the home design product based on the extracted categorization and dimensional information and historical information stored about previously selected CAD models for the home design product and presenting the one or more CAD models in an order, the order being based on the likelihood of a match between the CAD model and the home design product. The method can also include receiving a request to generate a CAD model for a particular home design product based on a user selection of the home design product from a website. The CAD model can be a two-dimensional CAD model. The CAD model can be a three-dimensional CAD model. The method can also include generating a visual bookmark associated with the home design product and associating the visual bookmark with the selected particular one of the CAD models. The method can also include inserting the particular one of the CAD models into a home design layout based on a user selection of the visual bookmark associated with the particular one of the CAD models.

In some aspects, a computer program product is tangibly embodied in an information career for executing instructions on a processor. The computer program product is operable to cause a machine to receive a request to extract dimensional information about a home design product from a website, extract properties about a home design product from the website, extract categorization information about the home design product from the website, and identify, based on the categorization information and the dimensional information, one or more pre-existing computer-aided design (CAD) models stored in a database of CAD models.

Implementations can include one or more of the following.

The computer program product can also include instructions to present the one or more CAD models to a user, receive a selection of a particular one of the CAD models selected from the one or more identified CAD models, and associate the selected particular one of the CAD models with the home design product. The instructions to cause a machine to identify the one or more identified CAD models can include instructions to cause a machine to determine a likelihood of a match between each of the one or more identified CAD models and the home design product based on the extracted categorization and dimensional information and historical information stored about previously selected CAD models for the home design product and present the one or more CAD models in an order, the order being based on the likelihood of a match between the CAD model and the home design product. The computer program product can also include instruction to receive a request to generate a CAD model for a particular home design product based on a user selection of the home design product from a website. The computer program product can also include instruction to generate a visual bookmark associated with the home design product and associate the visual bookmark with the selected particular one of the CAD models. The computer program product can also include instruction to insert the particular one of the CAD models into a home design layout based on a user selection of the visual bookmark associated with the particular one of the CAD models.

In some aspects a system for use in generating a home design layout is configured to extract dimensional information about a home design product from a website, extract properties about a home design product from the website, extract categorization information about the home design product from the website, and identify based on the categorization information and the dimensional information, one or more pre-existing computer-aided design (CAD) models stored in a database of CAD models.

Implementations can include one or more of the following.

The system can be further configured to present the one or more CAD models to a user, receive a selection of a particular one of the CAD models selected from the one or more identified CAD models, and associate the selected particular one of the CAD models with the home design product. The system can be further configured to determine a likelihood of a match between each of the one or more identified CAD models and the home design product based on the extracted categorization, and dimensional information and historical information stored about previously selected CAD models for the home design product and present the one or more CAD models in an order, the order being based on the likelihood of a match between the CAD model and the home design product. The system can be further configured to receive a request to generate a CAD model for a particular home design product based on a user selection of the home design product from a website. The system can be further configured to generate a visual bookmark associated with the home design product and associate the visual bookmark with the selected particular one of the CAD models. The system can be further configured to insert the particular one of the CAD models into a home design layout based on a user selection of the visual bookmark associated with the particular one of the CAD models.

In other aspects, a computer-implemented method for use in generating a home design layout includes extracting sizing information about a home design product, the home design product having a repeating texture that is displayed in an image on a webpage, receiving information from a user, the information comprising information about an amount of repetition of the repeating texture displayed in the image, and replicating the image on a surface in a three-dimensional model of a room based on the extracted information and the received information.

Implementations can include one or more of the following.

The home design product can be tile flooring. The method can also include extracting sizing information about the tile flooring comprises extracting a length and a width of one tile and receiving information from the user comprises receiving a number of tiles displayed in the image. The home design product can be hardwood flooring. The method can also include extracting sizing information about the hardwood flooring comprises extracting a width of one piece of hardwood flooring and receiving information from the user comprises receiving a number of pieces of hardwood flooring displayed in the image. The home design product can be carpet flooring. The method can also include receiving information from the user comprises receiving an indication of an approximate size of a piece of carpet displayed in the image. The method can also include generating a visual bookmark associated with the home design product. Extracting information about the home design product can include searching the website for words used to identify a particular type of information about the home design product.

In some aspects, a computer program product is tangibly embodied in an information carrier for executing instructions on a processor. The computer program product is operable to cause a machine to receive a request to extract sizing information about a home design product, the home design product having a repeating texture that is displayed in an image on a webpage, receive information from a user, the information comprising information about an amount of repetition of the repeating texture displayed in the image, and replicate the image on a surface in a three-dimensional model of a room based on the extracted information and the received information.

Implementations can include one or more of the following.

The computer program product can also include instruction to generate a visual bookmark associated with the home design product. The computer program product can also include instruction to search the website for words used to identify a particular type of information about the home design product.

In some aspects a system for use in generating a home design layout is configured to extract sizing information about a home design product, the home design product having a repeating texture that is displayed in an image on a webpage, receive information from a user, the information comprising information about an amount of repetition of the repeating texture displayed in the image, and replicate the image on a surface in a three-dimensional model of a room based on the extracted information and the received information.

Implementations can include one or more of the following.

The system can be further configured to generate a visual bookmark associated with the home design product. The system can be further configured to search the website for words used to identify a particular type of information about the home design product.

In other aspects, this application relates to a system and method for separating a floor plan in a database into separate rooms. In some additional aspects, this application relates to joining adjacent walls of two distinct rooms.

In some aspects, a computer-implemented method for use in generating a home design layout includes receiving a floor plan from a user that includes multiple adjoining rooms, dividing, using a computer system, the floor plan that includes the multiple adjoining rooms into individual non-adjoined rooms, and storing information about the layout of the individual non-adjoined rooms in a database.

Implementations can include one or more of the following.

Dividing the floor plan into individual non-adjoined rooms can include determining one or more walls from the floor plan to include in the information about a particular room. The method can also include determining if any home design products are associated with a particular room in the floor plan and storing information about the home design products associated with the particular room with the information about the layout of the particular room in the database. The method can also include receiving a user selection of a particular room in the floor plan and presenting, on a user interface, a computer-aided design (CAD) model of the particular room without presenting the CAD models for adjoining rooms. The method can also include searching the database for other rooms that have a similar layout to one of the individual non-adjoined rooms. The method can also include updating information about one of the individual non-adjoined rooms.

In some aspects, a computer-implemented method for use in generating a home design layout includes receiving a request, the request comprising a request to join a first room and a second room, the first room having a wall and the second room having a wall, assigning a priority to one of the first and second rooms, the priority indicating a preference for merging the walls of the first and second rooms, and merging the wall of the first room and the wall of the second room based on the assigned priority.

Implementations can include one or more of the following.

Merging the wall of the first room and the wall of the second room based on the assigned priority can include determining a placement of a door based on the location of a door in the room assigned the priority. Merging the wall of the first room and the wall of the second room based on the assigned priority can include joining first and second rooms using the wall from the room assigned the priority. Assigning the priority can include receiving a user input of a preference of one of the first and second rooms. Assigning the priority can include automatically selecting one of the first and second rooms based on one or more features of the wall of the first room and the wall of the second room.

In some aspects, a computer program product is tangibly embodied in an information carrier for executing instructions on a processor. The computer program product is operable to cause a machine to receive a request to receive a floor plan from a user that includes multiple adjoining rooms, divide the floor plan that includes the multiple adjoining rooms into individual non-adjoined rooms, and store information about the layout of the individual non-adjoined rooms in a database.

Implementations can include one or more of the following.

The instructions to divide the floor plan into individual non-adjoined rooms can include instructions to cause a machine to determine one or more walls from the floor plan to include in the information about a particular room. The computer program product can also include instruction to determine if any home design products are associated with a particular room in the floor plan and store information about the home design products associated with the particular room with the information about the layout of the particular room in the database. The computer program product can also include instruction to receive a user selection of a particular room in the floor plan and present, on a user interface, a computer-aided design (CAD) model of the particular room without presenting the CAD models for adjoining rooms. The computer program product can also include instruction to search the database for other rooms that have a similar layout to one of the individual non-adjoined rooms.

In some aspects, a computer program product is tangibly embodied in an information carrier for executing instructions on a processor. The computer program product is operable to cause a machine to receive a request, the request comprising a request to join a first room and a second room, the first room having a wall and the second room having a wall, assign a priority to one of the first and second rooms, the priority indicating a preference for merging the walls of the first and second rooms, and merge the wall of the first room and the wall of the second room based on the assigned priority.

Implementations can include one or more of the following.

The instructions to cause a machine to merge the wall of the first room and the wall of the second room based on the assigned priority can include instructions to cause a machine to determine a placement of a door based on the location of a door in the room assigned the priority. The instructions to cause a machine to merge the wall of the first room and the wall of the second room based on the assigned priority can include instructions to cause a machine to join first and second rooms using the wall from the room assigned the priority. The computer program product can also include instruction to receive a user input of a preference of one of the first and second rooms. The computer program product can also include instruction to automatically select one of the first and second rooms based on one or more features of the wall of the first room and the wall of the second room.

This application also relates to a system for searching and matching related vector based objects, drawings and models in a home improvement and design system.

In some aspects, a computer-implemented method for use in generating a home design layout includes receiving a diagram of a floor plan for a room, searching a database for other rooms having similar floor plans to the received diagram of the floor plan for the room, and presenting, via a graphical interface, the floor plans associated with the rooms having similar floor plans.

Implementations can include one or more of the following.

The method can also include receiving an input of a room type from a user. The room type can be selected from a bedroom, a bathroom, a living room, a bathroom, a living room, a kitchen, a dining room, and an office. Receiving the diagram of the floor plan for the room can include receiving a user input sketch of a shape of the room. The user input sketch can include one or more of the approximate dimensions of the room and the approximate square footage of the room. Receiving the diagram of the floor plan for the room can include receiving a computer-aided design (CAD) model of the floor plan for the room. Searching the database for other rooms having similar floor plans can include searching the database for other rooms having similar placement of walls, windows, and door openings. The diagram can be a vector based input and searching the database comprises searching for similar vector based objects. Presenting the floor plans associated with the rooms having similar floor plans as the room can include presenting the floor plans according to an order of relevance. The method can also include receiving a date range input from the user Searching the database can include searching the database for similar floor plans generated within the date range.

In some aspects, a computer program product is tangibly embodied in an information carrier for executing instructions on a processor. The computer program product is operable to cause a machine to receive a request to receive a diagram of a floor plan for a room, search a database for other rooms having similar floor plans to the received diagram of the floor plan for the room, and present, via a graphical interface, the floor plans associated with the rooms having similar floor plans.

Implementations can include one or more of the following.

The computer program product can also include instruction to receive an input of a room type from a user. The instructions to receive the diagram of the floor plan for the room can include instructions to cause a machine to receive a user input sketch of a shape of the room. The instructions to receive the diagram of the floor plan for the room can include instructions to cause a machine to receive a computer-aided design (CAD) model of the floor plan for the room.

In some aspects a, system for use in generating a home design layout is configured to receive a diagram of a floor plan for a room, search a database for other rooms having similar floor plans to the received diagram of the floor plan for the room, and present, via a graphical interface, the floor plans associated with the rooms having similar floor plans.

Implementations can include one or more of the following. The system can be further configured to receive an input of a room type from a user. The system can be further configured to receive a user input sketch of a shape of the room. The system can be further configured to receive a computer-aided design (CAD) model of the floor plan for the room.

In some aspects, this application relates to generating a home design layout. In other aspects, this application relates to scraping and extracting information from websites and converting this information into 2D CAD (computer-aided design) drawings and 3D CAD models. In other aspects, this application relates to scraping and extracting images and information from websites and converting this information into texture mapping objects for use with 3D models, computer generated graphics and photographs. In other aspects, this application relates to separating a floor plan in a database into separate rooms. In other aspects, this application relates to joining adjacent walls of two distinct rooms. In other aspects, this application also relates to searching and matching related vector based objects, drawings and models in a home improvement and design system.

The foregoing methods may be implemented as a computer program product comprised of instructions that are stored on one or more information carriers, and that are executable on one or more processing devices. The foregoing methods may be implemented as an apparatus or system that includes one or more processing devices and memory to store executable instructions to implement the method. A graphical user interface may be generated that is configured to provide a user with access to and at least some control over stored executable instructions to implement the method.

The details of one or more examples are set forth in the accompanying drawings and the description below. Further features, aspects, and advantages are apparent in the description, the drawings, and the claims.

DESCRIPTION OF THE DRAWINGS

FIG. 28 is a web interface.
FIGS. 92-95 are diagrams of CAD models.

Like reference numerals in different figures indicate like elements.

DETAILED DESCRIPTION

Figure 1:
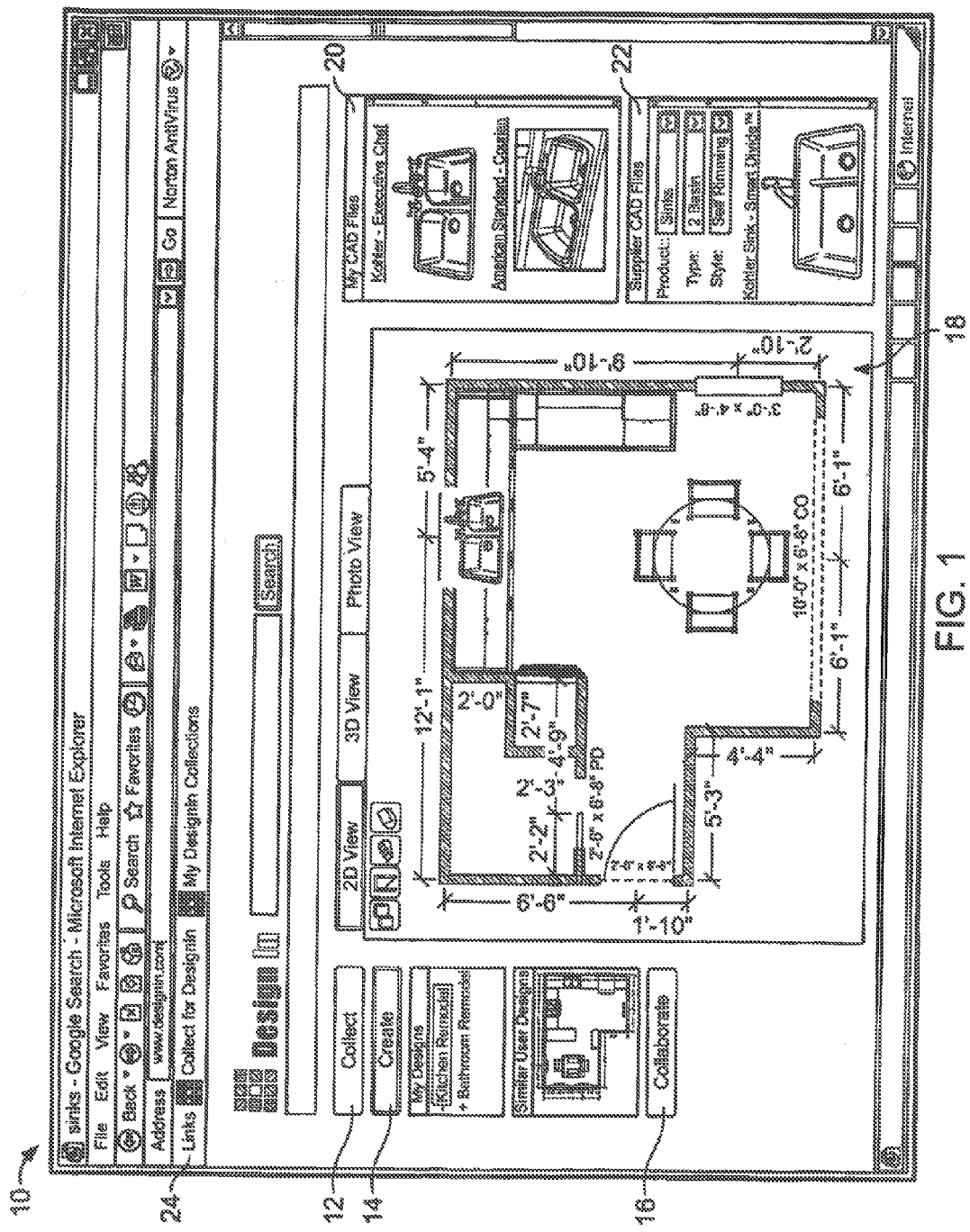
FIG. 1 is a diagram of a web interface for home design.

FIG. 1 shows a webpage 10 for a home design tool. The home and/or landscape design tool is a computer software based tool that enables a user to collect information about home and/or landscape design products from websites on the internet and use the collected information for designing a room or multiple rooms. The home and landscape design tool (referred to herein as the home design tool) includes a collect mode (indicated by collect button 12), a create mode (indicated by button 14), and a collaborate mode (indicated by button 16). In the collect mode, a user collects information and images about home and landscape design products from websites. The home design tool stores the information in the form of visual bookmarks that are saved in a database and can be viewed by the user to compare various products. In the create mode, a user generates a design for a particular room or home by drawing it from scratch, using similar user designs as a starting point or snapping together existing rooms from the system. Within create mode, the user may add home and landscape design products to their designs using the home and landscape design products from the visual bookmarks generated in the collect mode and associating them with 2D/3D models in the system. In the collaborate mode, a user can share designs he/she has generated with others and/or can view designs that have been generated by others.

Figure 2:
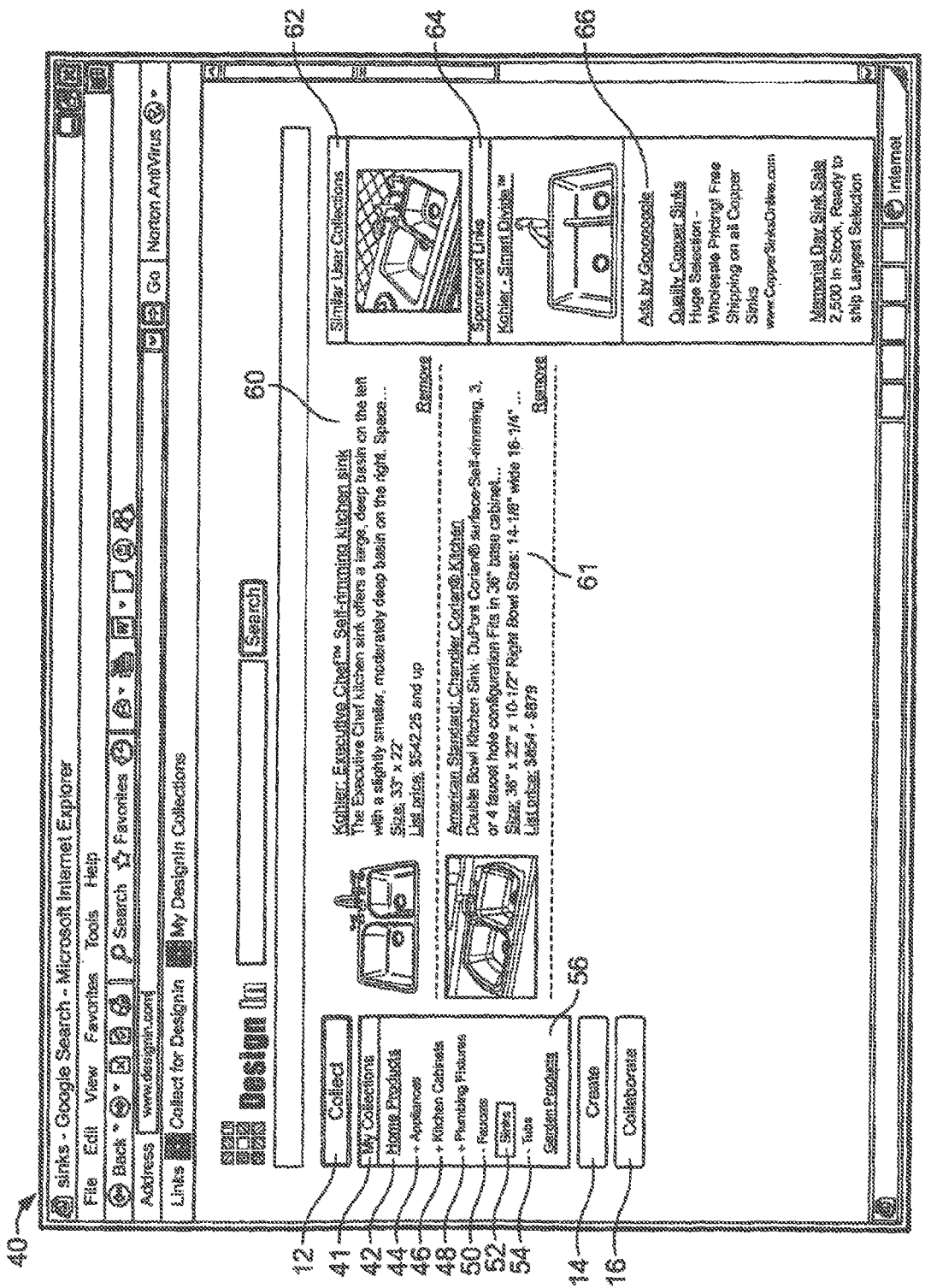
FIG. 2 is a diagram of a web interface that includes home design product bookmarks.

FIG. 2 shows a webpage 40 associated with the collect mode of the home design tool that is accessed by selecting the collect button 12. Webpage 40 is used in the collect mode of the home design tool to view, manage and edit visual bookmarks 60 based on home design product selections received from a user. Webpage 40 includes two visual bookmarks 60 and 61. The visual bookmarks provide a user with information about a particular product in an easily readable format. Visual bookmarks can include various information about the home design product that may be useful in the user when determining whether or not to use the home design product in a particular room design. Exemplary information that may be included in the visual bookmark or stored in the database related to the visual bookmark (e.g., and not included in the information displayed to the user in the visual bookmark) includes an image of the product, manufacturer name, vendor name, the name of the products, the model number, the model type, the size of the product, the finish and color of the product, the pattern, the price, the style, the construction type, the material(s), the features, mounting options, configuration options, installation type, accessories, accessory styles, application options, detail options, shape, power requirements, and control options.

Figure 3:
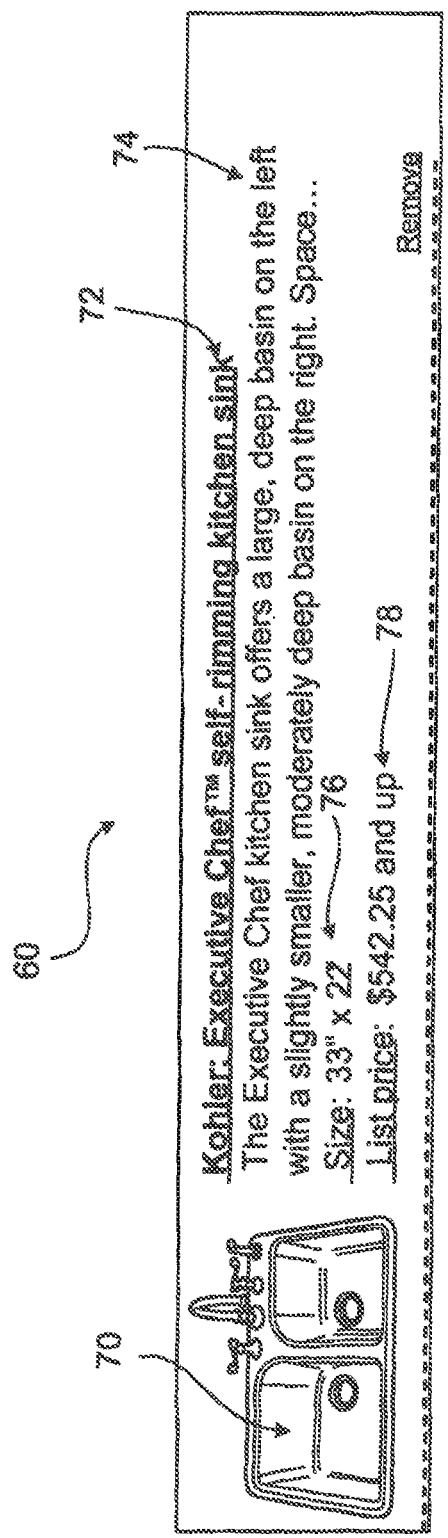
FIG. 3 is a diagram of an exemplary home design product bookmark.

FIG. 3 shows an exemplary visual bookmark 60 for a kitchen sink. Bookmark 60 includes an image of the sink 70, the name or model of the sink 72, a short summary of the features of the sink 74, the size of the sink 76, and the list price for the sink 78. The information and image included in the visual bookmark 60 is obtained by the home design tool from the product website.

Figure 4:
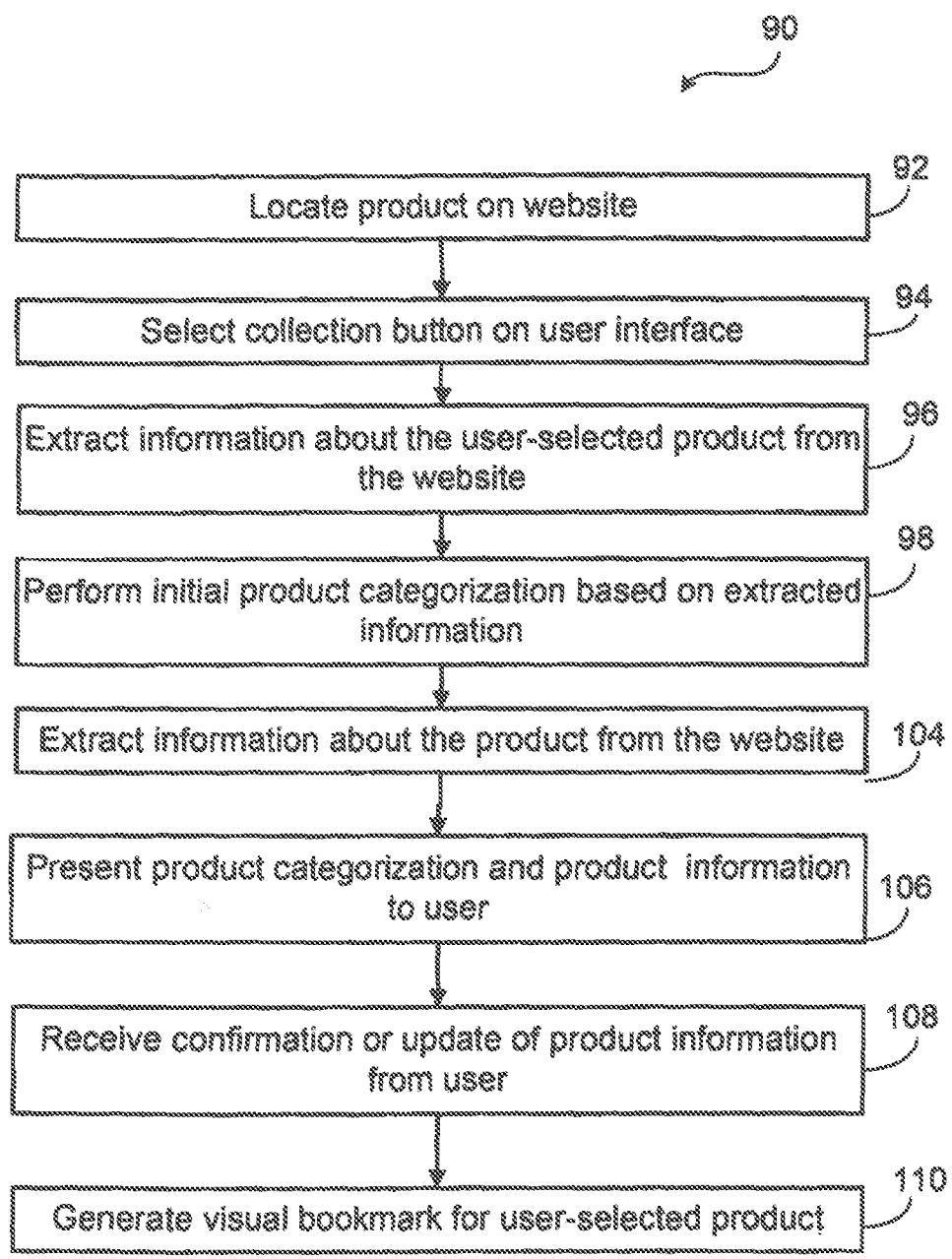
FIG. 4 is a flow chart of a process for generating home design product bookmarks.

FIG. 4 shows a process 90 for generating visual bookmarks based on home design products selected by a user from a website. To get started, the user registers to use the system and either installs the toolbar within their Web browser or right clicks on a link within a webpage that allows them to add a link to the website to their Favorites list within their Web browser. The user generates the visual bookmarks by finding products on the Internet that are of interest to the user (92). The user may use a search engine to locate products of a particular type and/or the user may browse a manufacturer's website in order to select home design products. Once the user has located a home design product of interest, the user selects a collect button from their Internet browser (or from the web page if the manufacturer has incorporated the Add to DesignIn button within their website) to initialize a collection process that gathers information about the selected product used to generate a visual bookmark (94).

After the user has selected the product for which to generate the visual bookmark, the home design tool extracts information about the user-selected home design product from the website on which the product is displayed (96). In some implementations, the home design tool extracts the information by comparing what information was previously chosen to be extracted by other users that bookmarked the same page. The home design tool performs an initial product categorization based on the extracted information (98). The home design tool uses the initial categorization to extract information product specific information from the website (104). In some implementations, the type of information extracted is based on the product categorization. For example, the information extracted for a kitchen sink may differ from the information extracted for cabinets or floor tiling. The product categorization and the product information extracted by the home design tool are presented to the user for review (106). The user reviews the categorization and other extracted information and either confirms the information is adequate or provides updated information about the home design product. The home design tool receives the confirmation or updated information about the home design product from the user (108) and generates a visual book mark for the selected home design product based on the extracted category and information (110).

Figure 5:
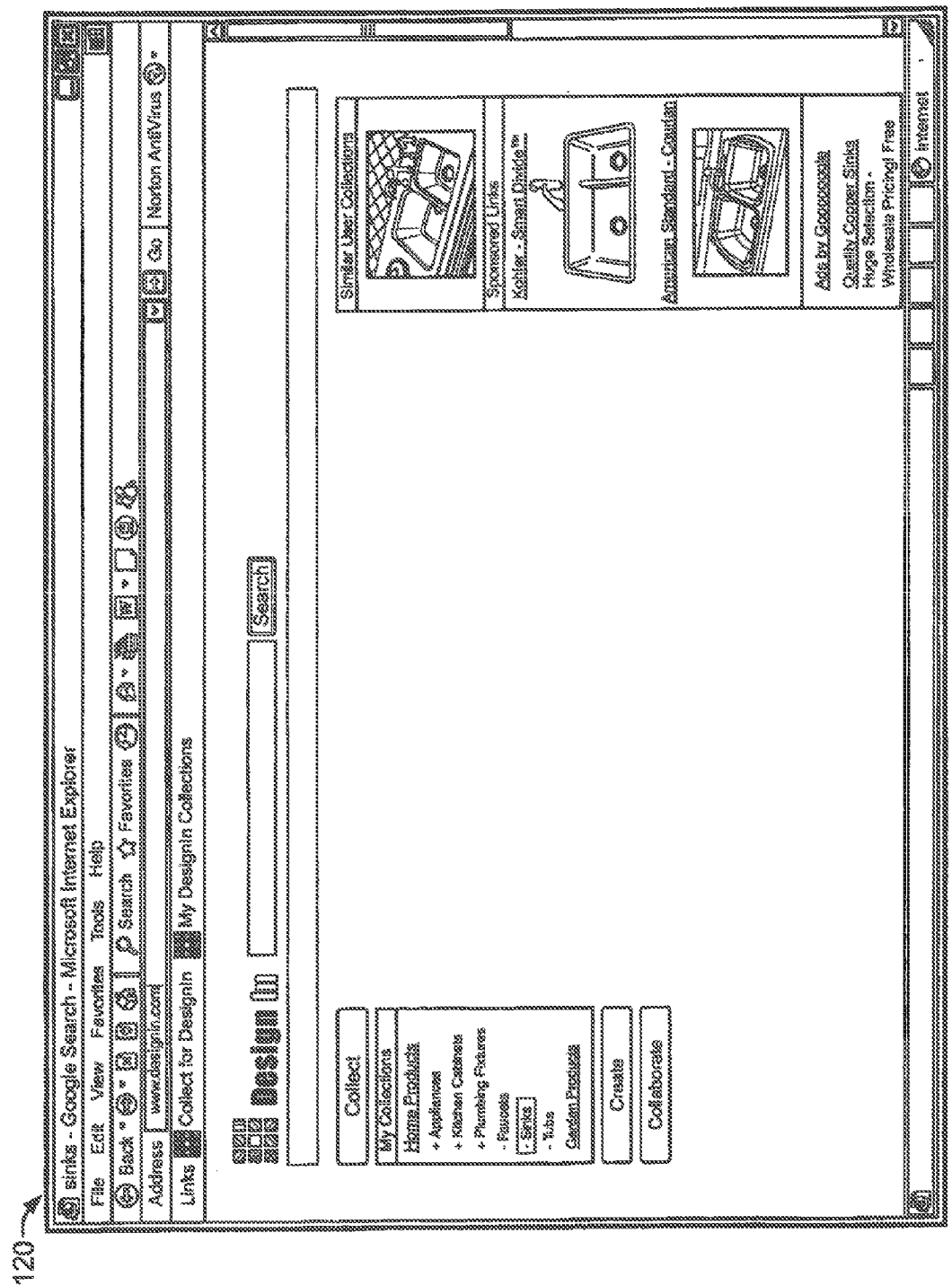
FIG. 5 is diagram of a web interface for viewing bookmarks of home design products.
Figure 6:
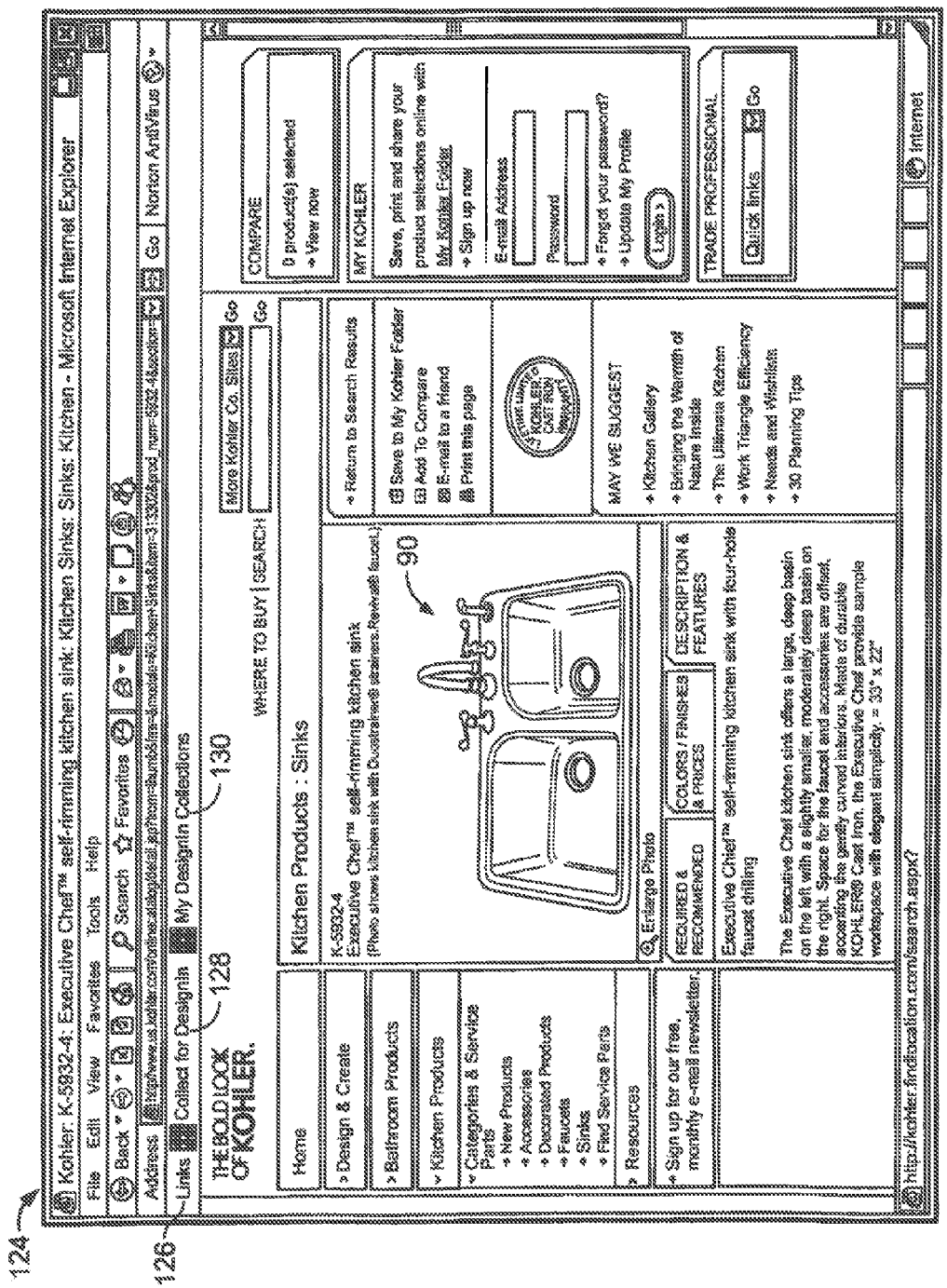
FIG. 6 is a diagram of a web interface for a home design product.
Figure 7:
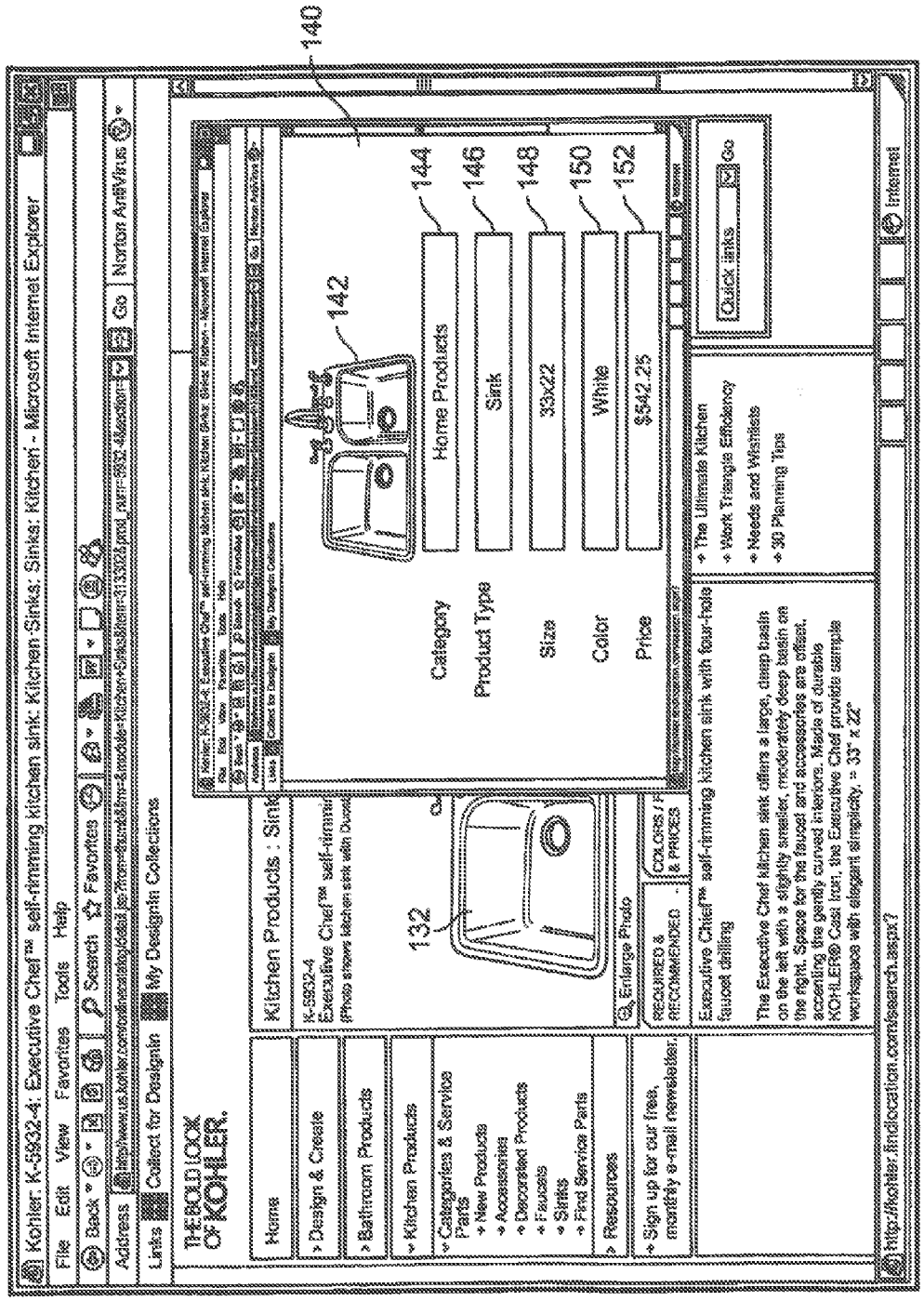
FIG. 7 is a diagram of a web interface that includes a menu for selecting product information.
Figure 8:
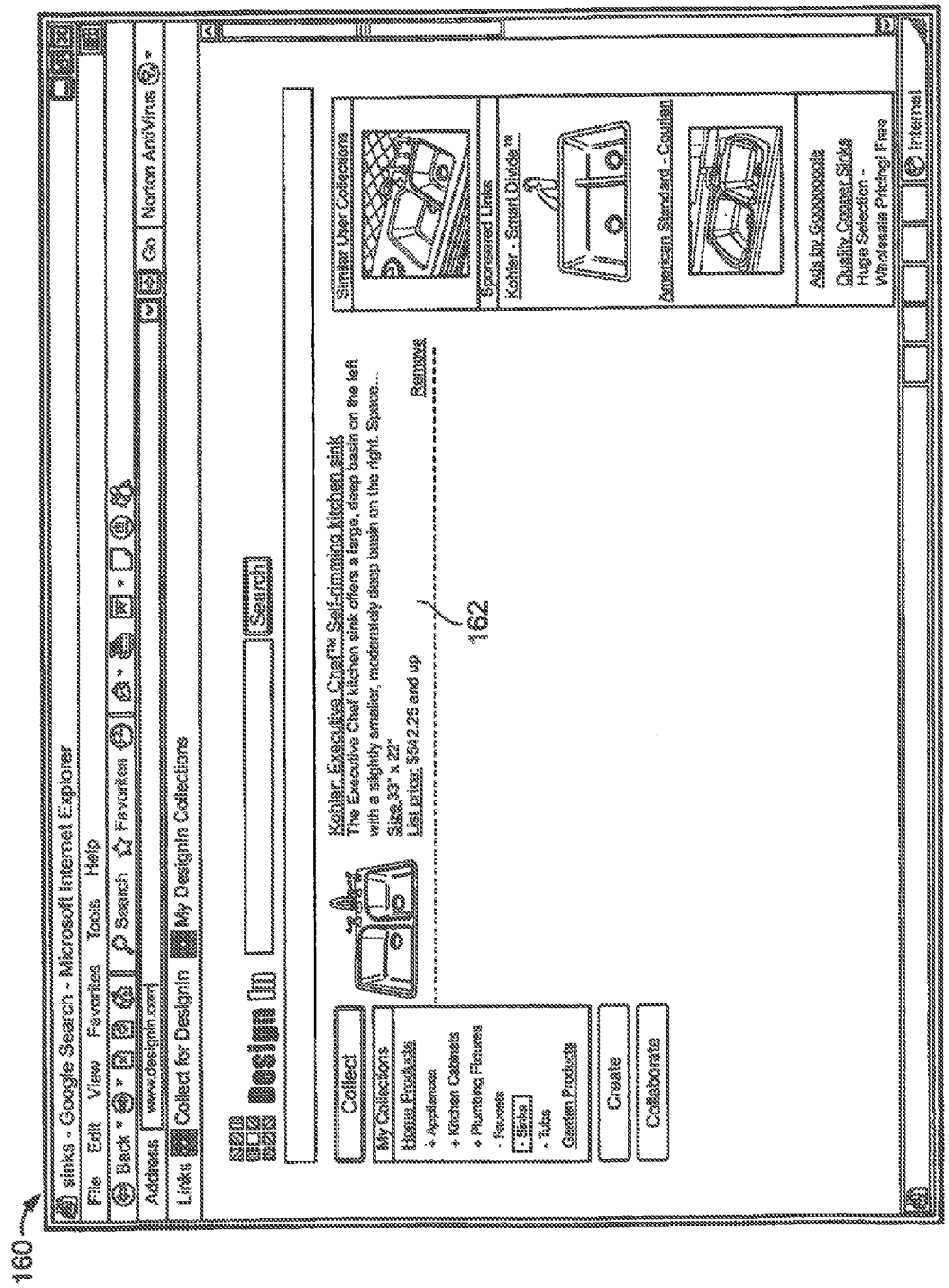
FIG. 8 is a diagram of a web interface that includes a home design product bookmark.

FIGS. 5-9 show exemplary screenshots from the process for generating a visual bookmark. As shown in FIG. 5, when the user first uses the home design tool, the user will not have any visual bookmarks. In order to generate the visual bookmarks the user navigates to websites that have products of interest. For example, as shown in FIG. 6, the user may desire to locate a kitchen sink. In this example, the user has selected a Kohler® sink 90 from the manufacturer's website 124. In order to generate a visual bookmark, the user selects the collect button 128 on toolbar 126. The home design tool extracts information related to the categorization of the sink 90 as well as other information that may be included in the visual bookmark. Since the information is automatically gathered by the home design tool, errors could potentially exist in the gathered information. In order to correct any errors, the information extracted about the sink is presented to the user for verification. For example, in some implementations, e.g., as shown in FIG. 7, the extracted information is presented in a pop-up window 140 for the user to review. In this example, the home design tool has extracted information about category, product type size, color, and price as shown in boxes 144, 146, 148, 150 and 152 respectively. If any of this information is incorrect, the user can update the information by inputting the correct information into the respective box. After the user has confirmed the information, the home design tool uses the extracted information to generate a visual bookmark. For example, as shown in FIG. 8, a visual bookmark 162 for the sink includes an image of the sink as well as the information about the size, price, and general description of the sink extracted from the website.

This visual bookmark generation process is based on the integration of web scraping and extraction technology. The home design tool that executes the bookmark generation process is a hybrid taxonomy and folksonomy based system built for bookmarking anything related to the home improvement industry including products, design ideas and articles. In general, folksonomy is an Internet-based information retrieval methodology comprised of collaboratively generated, open-ended labels that categorize content on the web. In contrast, a taxonomy based system is a hierarchical tree structure of classifications for a given set of objects. Taxonomy based system use a pre-established, controlled vocabulary.

The home design tool combines aspects of both taxonomy and folksonomy. For example, the categorization of a home design product selected by a user is categorized into pre-defied categories of product types and, thus, relies on a taxonomy based system. It is believed that using a taxonomy based system to categorize the home design product can provide various advantages such as offering a standard categorization schema that allows users to browse a directory of public visual bookmarks, simplifying product searches, simplifying and/or automating the process of associating the correct 2D drawing and 3D models with the bookmark, identifying key characteristics of the product and/or using this to refine the properties of the associated 2D drawing and 3D model. While the categorization of the product is based on a taxonomy based system, the information included in the visual bookmark for the home design product is based on a folksonomy based system. As such, the information in the visual bookmark is gathered from the information available on the website of the selected home design product. The tags for the visual bookmark are generated using a folksonomy based system to further describe the product characteristics including style, color, and dimensional information. It is believed that using a folksonomy based system to for collecting and displaying additional information about the home design product can provide various advantages such as offering a more open ended system for categorizing products based on more detailed information such as the finish and color of the product, the pattern, the style, the construction type, the material(s) and other options listed above, offering a tag based system to simply and refine searches for visual bookmarks created by other users; offering complementary system to the taxonomy based directory of public visual bookmarks allowing users to refine their product browsing with tags; and/or providing a more detailed information for associating the correct 2D CAD drawing and 3D CAD model with a visual bookmark.

The taxonomy based categorization and folksonomy based tags can be used to build intelligence for the home design tool. As users collect products, design ideas, and articles, the home design system uses a neural network to learn and identify the correct taxonomy based categories and folksonomy based tags.

Figure 9:
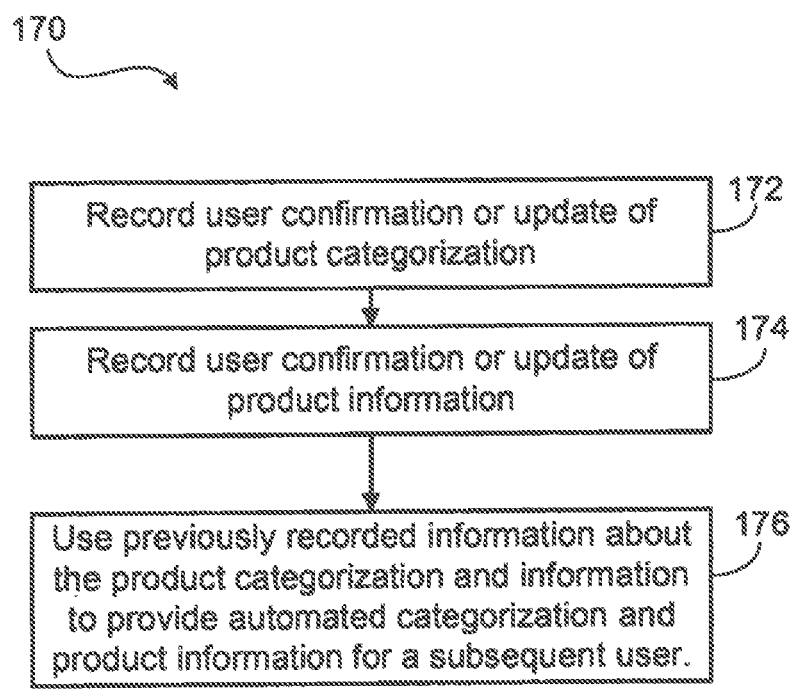
FIG. 9 is a flow chart of a process for updating information about a home design product.

FIG. 9 shows a process 170 for updating and providing more accurate product categories and tags for a product based on previous information collected by the home design tool for the product. As described above, the home design tool automatically pre-selects both the product categorization and the product information and presents the categorization and information to the user who can confirm or update the categorization and information. When the user confirms or updates the taxonomy-based categorization for a particular home design product, the home design system records the user's input (172). Similarly, when the user confirms or updates the folksonomy-based information for the particular home design product, the home design system records the user's input (174). The system uses the information recorded about the product categorization and product information to provide more accurate automated categorization and product information for subsequent users (176).

For example, in FIG. 7, the home design system automatically categorized the sink as a home product (as shown in box 144). In addition, the home design tool extracted various information about the sink such as the product type (as shown in box 146), the size (as shown in box 148), the color (as shown in box 150), and the price (as shown in box 152). If any of this information is incorrect, the user can modify the information. For example, if the price of the sink were $250 rather than $542.25 as extracted by the home design tool, the user could enter the correct price of $250 into box 152. The home design tool would record the change in the price for the home design product made by the user. The visual book marks are stored in a database and available for others to view. Subsequently, if another user selects the same sink, the home design tool could use this information to initially provide the correct price of $250 to the user.

In some examples, the user may modify information such that the correct information is changed to be incorrect. For example, in FIG. 7 the size of the sink is accurately shown as 33×22. However, the user may change the size of the sink to be 12×12 or any other incorrect dimension. This may cause the home design tool to subsequently display the information entered by the user (e.g., 12×12) rather than the correct information extracted from the website. However, when this happens, the user will correct the information. As such, over time, the responses of the users of the system will show that the correct size of the sink is 33×22 and the system will "learn" to display this information for the sink dimensions in spite of the incorrect information entered by one of the users.

In some implementations, the home design system can use neural networks as described to follow. The system scans the page for the initial taxonomy based criteria. Once identified the system uses the taxonomy based criteria to scan a database of words and phrases identified to be key characteristics of the taxonomy based product type. The system also uses the taxonomy based criteria to scan the database of tags used by previous users to identify not only a particular page/product but tags used to describe bookmarks within the same taxonomy based product category. The system uses these words to scan the page for these phrases and words and presents the user with a list of potential tags for further folksonomy based categorization of the product.

Referring back to FIG. 2, the home design tool groups the visual bookmarks according to product category and product type. For example, webpage 40 includes a menu 41 of collections of visual bookmarks generated by the user. The visual bookmarks are organized into categories based on the product categorization and into subcategories based on the type of the product. Exemplary product categories include appliances (e.g., as indicated by arrow 44), kitchen cabinets (e.g., as indicated by arrow 46), plumbing fixtures (e.g., as indicated by arrow 48), flooring, appliances; building structure; cabinets & storage; floors, walls & counters; furniture & accessories; landscape & outdoor; lighting; plumbing and other. Each of these product categories can be sub-divided into particular types of products. An exemplary subdivision of product categories into particular types of products is shown to follow:

Appliances
Cooktops
Dishwashers

Laundry
Microwave Ovens
Ovens
Ranges
Refrigerators
Other
Building Structure
Columns
Doors
Fireplaces
Railings
Stairs
Windows
Wood. Stoves
Other
Cabinets & Storage
a Closets
Kitchen Cabinet
Bathroom Cabinet
Pantry
Wine Storage
Floors, Walls & Countertops
Architectural Elements
Carpeting
Ceilings
Countertops
Floor Laminate
Hardwood Flooring
Paint
Rugs
Tile
Vinyl
Wallpaper
Window Coverings
Other
Furniture & Accessories
Bedding & Linens
Beds
Chairs
Decorative Accessories
Decorative Hardware
Desks
Fabrics
Kitchen Accessories
Ottomans
Plants—Indoor
Sofas
Tables
Tableware
Other
Lighting
Lamps
Ceiling—Attached
Wall—Attached
Landscape & Outdoors
Arbors
Columns
Fences
Hot Tubs
Outdoor Furniture
Patio Stones
Plants
Pools
Spas
Trees
Wall Stones
Other
Plumbing
Bath/Showers
Bathtubs
Faucets
Hot Tubs & Spas
Sinks—Bathroom
Sinks—Kitchen
Saunas & Steam Baths
Showers
Toilets
Other
Other
Heating & Cooling
Art For example, the category of plumbing fixtures can include products types such as faucets, sinks, and tubs (e.g., as indicated by arrows 50, 52, and 54 respectively). It is believed that arranging the visual bookmarks into product categories and product types can provide various advantages such as making the information more easily accessible for the user to search for these products or browse a product directory based on these types of categories.

Webpage 40 also includes information about products not selected as visual bookmarks by the user. For example, webpage 40 includes similar user collections 62. The similar user collections 62 include other items that are similar to the items selected by the user. The user can access the similar user collections 62 to view other products without having to sort through the large volumes of information available on the internet. The home design tool determines home design products to include in the similar user collections based on the products for which the user has generated visual bookmarks. For example, as shown in FIG. 2, the user had generated bookmarks for various dual-basin sinks. As such, the similar user collections could include dual-basin sinks available from other manufacturers and selected as visual bookmarks by other users. The system uses the taxonomy based product categorization and the folksonomy based tags to identify similar products.

Webpage 40 also includes sponsored links 64. In general, sponsored links 64 are links to products by a particular manufacturer associated with the type of products that the user has bookmarked. The manufacturer may pay a fee to have the sponsored links 64 displayed in order to advertise their brand or their particular products.

Webpage 40 also includes text based web advertisements 66. These advertisements can be sponsored by various companies or organizations. The displayed advertisements are selected by the home design tool based on the information about the type of products the user has generated visual bookmarks for. For example, in FIG. 2, the user had generated visual bookmarks for various types of sinks and the information presented in the web advertisements 66 is related to the general category of sinks. Both the text and image based advertisements may include similar products using the same taxonomy based product categorization and the folksonomy based tags to identify similar products in the advertising inventory. In some implementations, advertisers can choose product categories and products tags required for their advertisements to appear in the system.

The taxonomy based categorization, the folksonomy based tags and user activity tracking offer the foundation for the system's product search algorithms. Users may type a product name and characteristics into the search field. The system identifies and prioritizes the most popular product bookmarks for the specific terms based on what product categories and tags they assigned to the product, how many users have bookmarks these products, how many users have incorporated these products within their designs and how many users have viewed these products in other users collections and within other users designs. The algorithm relies heavily on how many users incorporate the bookmark into their designs since this shows that the user may actually purchase the product. Advertisements may also appear in search results using similar criteria as bookmarks. If the advertisers assign a specific URL to an ad, the system will include both visual bookmarks and advertisement selections for the same product as part of the prioritization calculation for the products. After typing a search term into the search field, specifying that the users is searching for products, and clicking the search button, the system presents the user with results based on the algorithm outlined above. On the left side of the screen, the user is presented with options to refine the search. For example if a users types in two basin sink within the search box, the results appear and on the left side of the system automatically assigns a product category of plumbing and a product type of sink. The system may also present the user with the product style of two basin as a taxonomy based categorization or as a folksonomy based tag. Tags extracted from and most commonly shared among the search results are presented to user. These tags are shared characteristics of the product as outlined above in the description of potential tags. The user may select these tags such as "self-rimming" (an installation type) to refine the search results to sinks that are self-rimming meaning they are installed through the top of a counter. The user may also refine the importance of search criteria such as price, size, and specific tags. Specific tags may be selected from a list to be added to a search slide bar. Users may adjust the search sliders to adjust the importance of each criteria. These importance parameters are used as coefficients in search algorithm to raise or lower the weight of different metrics in search results.

As described above, the home design tool allows a user to collect information about home design products and use the information for designing a room or multiple rooms. In the create mode, a user can generate a design for a particular room or rooms using the home design products collected in the collect mode. In order to allow users to add the products for which they generated visual bookmarks into a room design, the home design tool uses information collected in the collect mode about a home design product to associate and modify two-dimensional and three-dimensional computer aided design (CAD) models from the system's database to the specifications of the product.

Figure 10:
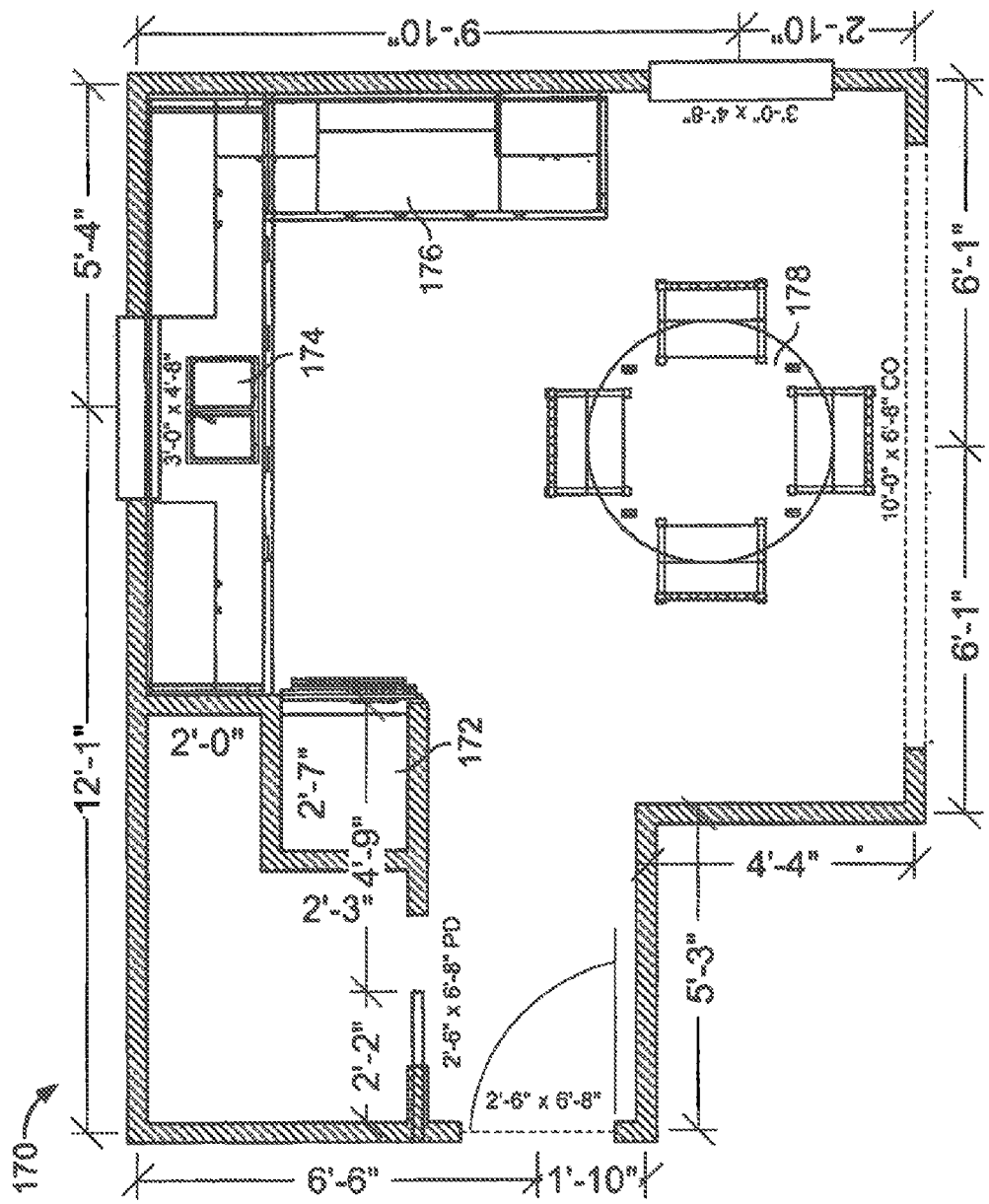
FIG. 10 is a diagram of a two dimensional room layout.

FIG. 10 shows an exemplary CAD design 170 that includes multiple CAD models for various homes design products. For example, CAD design 170 includes a CAD model 172 for a stove, a CAD model 174 for a sink, a CAD model 176 for a set of cabinets, and a CAD model 178 for a table. The home design tool generates the CAD models for home design products based on information extracted from the website.

Figure 11:
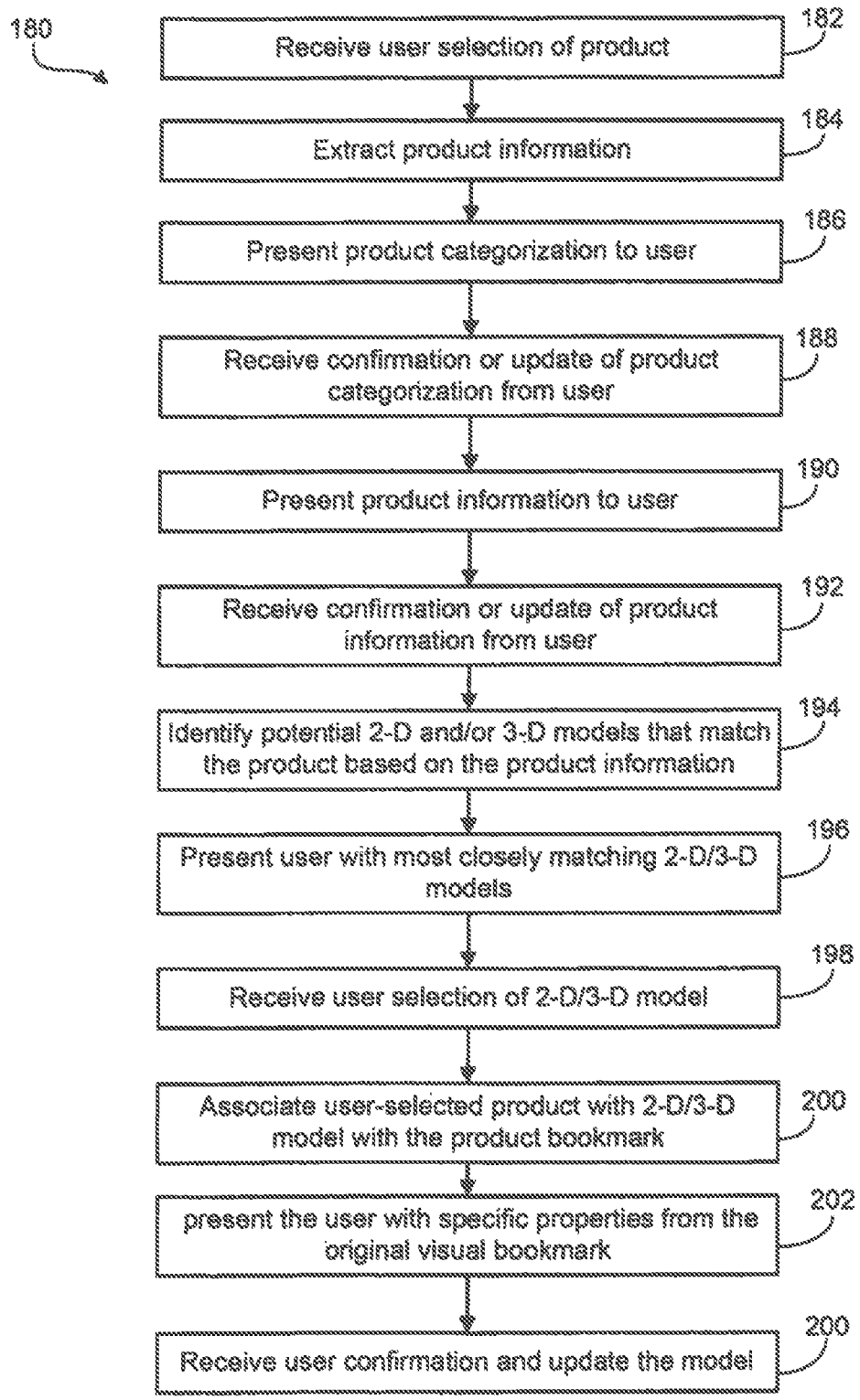
FIG. 11 is a flow chart of a computer-aided design (CAD) model selection process.
Figure 12:
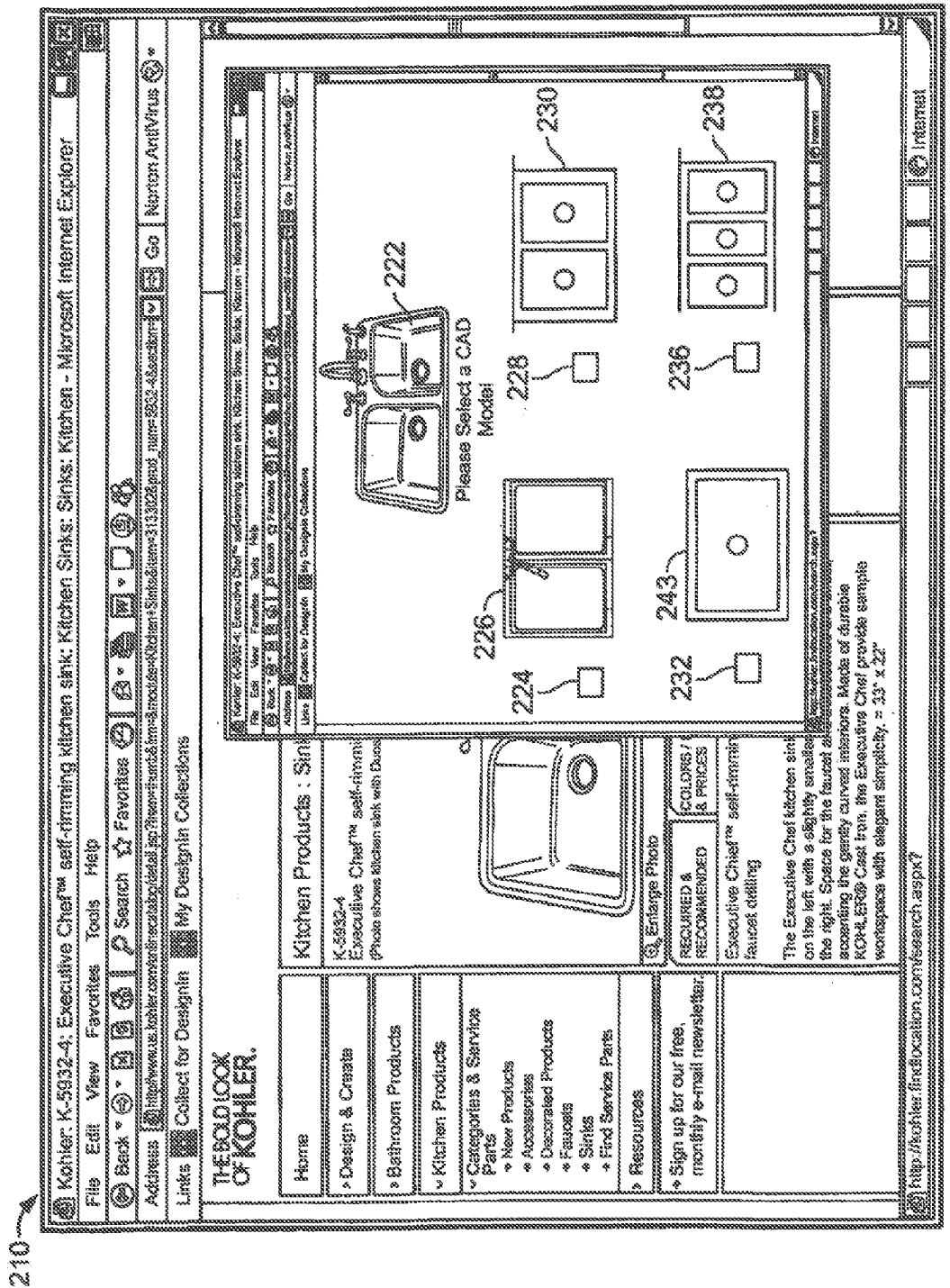
FIG. 12 is a diagram of a web interface with a CAD model selection window.

FIG. 11 shows a process 180 for generating CAD models for home design products presented on a webpage based on a user selection of the home design product. The home design tool receives a user selection of a home design product from a website (182) and extracts information about the home design product (184). The home design tool presents product categorization information to a user based on information extracted from the website (186) and the user either confirms or updates the product categorization information (188). The home design tool also presents product information to the user (190) and receives a confirmation or an update of the information from the user (192). The extraction and confirmation of information (e.g., steps 182, 184, 186, 188, 190 and 192) are similar to the process described above in relation to generation of the visual bookmark for a home design product. The home design tool identifies potential two-dimensional and/or three-dimensional model(s) that are potential matches for the home design product based on the extracted categorization and information about the home design product (194). More particularly, the home design tool includes a database that includes multiple, different standard CAD drawings for different home design products. The home design tool uses the categorization information for the product and the dimensional information to narrow the number of potentially matching CAD models for the home design product. The potentially matching CAD model(s) are presented to the user (196). The user can select the CAD model that most closely represents the product he/she selected from the website. For example, as shown in FIG. 12, the home design tool presents the user with a pop-up window 220 that includes multiple CAD model choices 226, 230, 234, and 238. The user can select a particular CAD model from the displayed CAD models 226, 230, 234, and 238 by selecting the associated button 224, 228, 232, or 236, respectively. Once the home design tool receives the user selection of a particular one of the CAD models (198), the home design tool associates the CAD model with the home design product and the visual bookmark for the home design product (200). Next the system will present the user with specific properties from the original visual bookmark for the 2D/3D model (202). For example, the color white and the sizing options of 33"×22." The user will confirm these options and the system updates the model (204). For example in this case the system applies the color white to the two basin sink and parametrically adjusts the base model to become 33"×22", Non-parametric adjustments may also be made. Instead of parametrically adjusting a model, the system may simply replace the model with a model that meets the specific criteria.

An additional implementation may include interpreting an image and transforming the image into a 3D model. This will be used for products that may not be included in the site's database of CAD models. For example if the user bookmarks a lamp and the system does not have a lamp in the database, the system will prompt the user to create a 3D model of the image. For a tall floor lamp, the system would identify the edges of the object and prompt the user to verify that the edges are correct or incorrect. The user can select nodes to move the vector based shape around the image and identify the shape of the image. The user may also draw a closed shape around objects. Once identified, the user may select how they would like the system to convert the image into 3D. The user could browse the directory of CAD model in the system, create her own design or use the image as a basis for the CAD model. For example with a tall floor lamp, the system would identify the edges of the lamp and remove other graphics from the picture. The user could then use the revolve tool to revolve the image of the lamp around a vertical axis to create a 3D version of the product. The cropped image also becomes a texture map that may be applied to the 3D model. Tools used for creating a model from scratch may include: lines, arcs circles, rectangles, polygons, 3D box, spheres, cylinder, cones, toruses, wedges, revolve tools, sweep tools, 3D poly-lines, 3D splines, and other standard CAD drawing tools.

It is believed that generating CAD models for images found on the internet can provide various advantages. For example, since the home design tool makes the entire Web a content source for two-dimensional CAD drawing and three-dimensional CAD models of products, the users of the home design tool can select and use any home design product in designing a layout and is not constrained to manufacturers that offer CAD models for their products in specific formats. The user is not constrained to manufacturers that provide CAD models because the CAD model matching and modification process identifies key characteristics of products based on information available on the home design product's website and converts this information into CAD models that represent the style, color, and dimensional information of the product.

Figure 13:
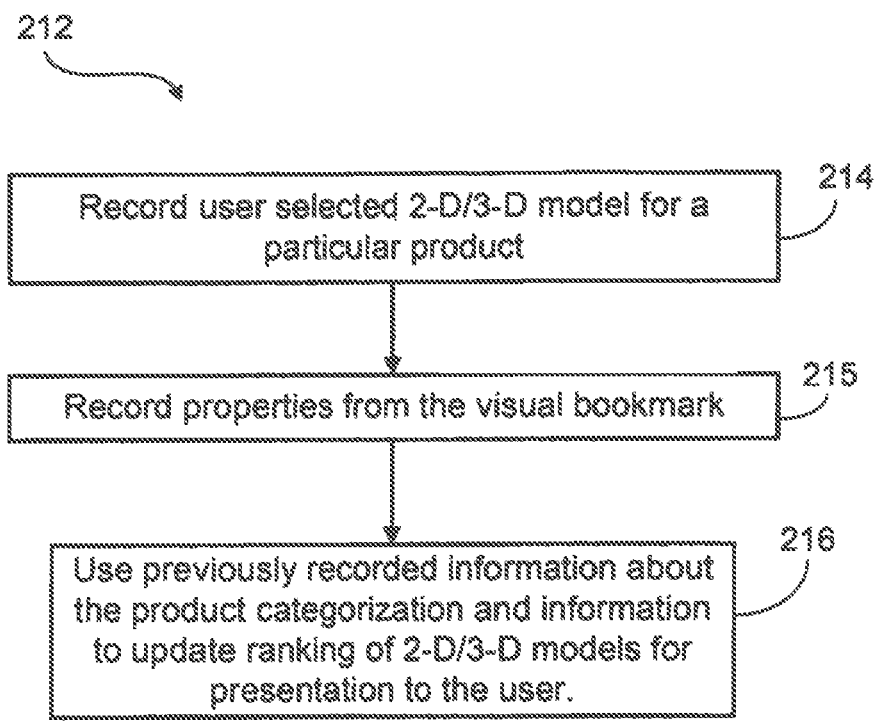
FIG. 13 is a flow chart of a model update process.

The taxonomy based categorization and folksonomy based tags used to associate the CAD models with the home design product selected by the user build the intelligence for the system, which helps the system to correctly identify which CAD drawings and models to associate with a particular home design product. As described above, when a user adds this visual bookmark to a CAD drawing, the system presents the user with a selection of the closest matching CAD files (two-dimensional and/or three-dimensional CAD models) to associate with the visual bookmark. FIG. 13 shows a process 212 for building intelligence and using the intelligence about selected CAD design choices to provide more accurate selections to a user. As users associate the various CAD models/drawings with a specific Web page and product information, the system records which CAD model is selected the most frequently (214). The system also records what properties from the visual bookmark like size and color are used to modify the model in the database (215). The home design tool uses this recorded information to update a ranking of the CAD models and prioritizes CAD model choices presented to the user for future bookmarks accordingly, as well as update the properties of the presented CAD model (216).

Figure 14:
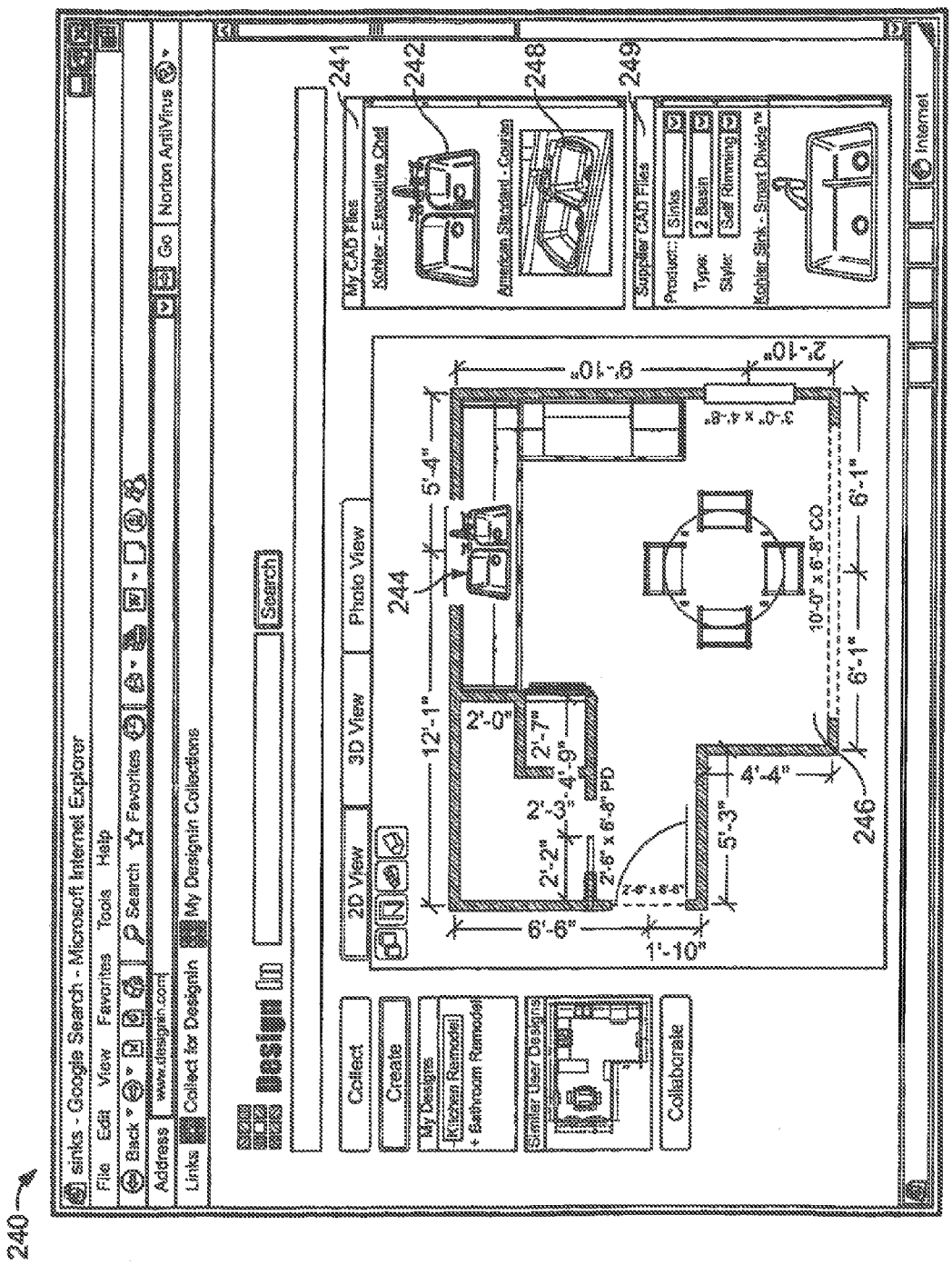
FIG. 14 is a diagram of a web interface with a two-dimensional room layout.
Figure 15:
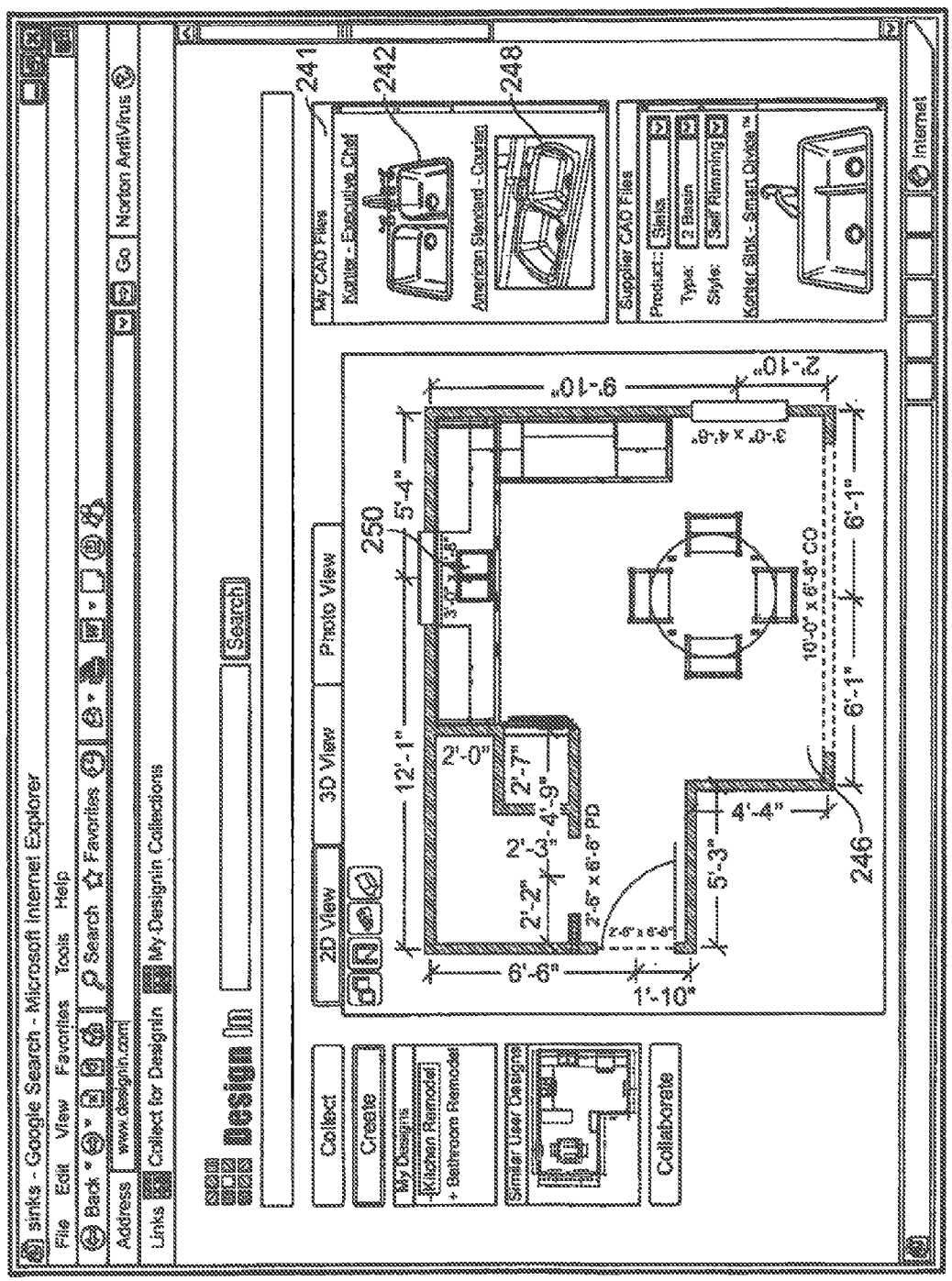
FIG. 15 is a diagram of a web interface with a two-dimensional room layout.
Figure 16:
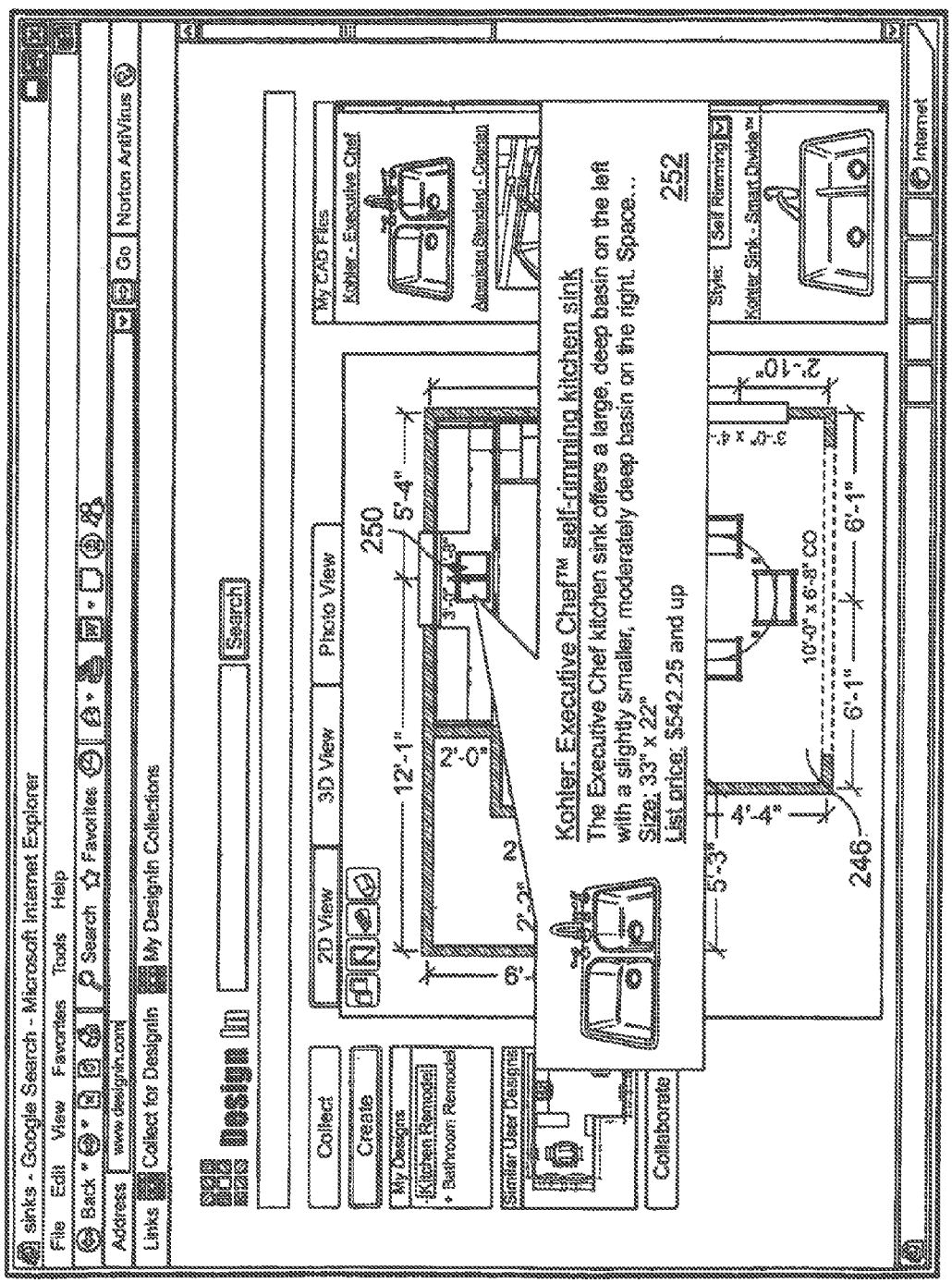
FIG. 16 is a diagram of a web interface.

FIGS. 14-16 show an exemplary use of CAD models in a home design. Once CAD models have been associated with a particular user-selected product, the home design tool displays the home design products for the user to use in designing a layout for a room. For example, FIG. 14 shows a screenshot 240 of a web interface for home design. The web interface 240 includes a portion 241 that shows pictures of the home design products for which the user has generated visual bookmarks and CAD models. It is believed that showing the image of the product (e.g., images 242 and 248) as opposed to showing the CAD model associated with the product can aid the user in easily recognizing and selecting the product. The web interface 240 also includes a portion 249 that provides a way for the user to access supplier generated CAD files. The supplier CAD files are files provided by the manufacturer. The user can sort for a supplier CAD file by entering information about the type of home design product he/she is looking for.

The home design tool allows the user to insert home design products into a home design layout (e.g., layout 246) by dragging the image of the product from section 241 into the desired location. For example, in FIG. 14, the user has selected the image of sink 242 and placed the sink into the layout 246 (as indicated by sink 244 in the layout 246). After the user has placed the home design product into the layout 246, the home design tool replaces the image of the home design product with the associated CAD drawing of the home design product (e.g., as shown by CAD model 250 in FIG. 15).

In some implementations, once placed the object remains selected, and a properties palette on the right side of the screen appears, allowing the user to confirm the size and color of the sink or change it and see the properties update. In some additional implementations, the user selects the visual bookmark to be inserted and the properties palette appears prompting the user to verify the correct options are selected such as color and size. Once the user selects the properties, a 2D/3D model is parametrically generated by automatically modifying the original model in the database to the properties specifications from the original bookmark or based on user input. The user may now drag the 2D/3D model into his/her design.

As shown in FIG. 16, after the home design tool has replaced the image of the home design product (e.g., as shown in FIG. 14) with the CAD model of the home design product (e.g., as shown in FIG. 15), the user can view information relating to the home design product by moving a cursor over the CAD model 250. For example, as shown in FIG. 16, when the user positions their mouse over the CAD model 250 a message 252 appears that includes the visual bookmark information associated with the CAD model and the selected home design product. It is believed that this can be beneficial because the user can easily view information and an image of each home design product that has been added to a room's layout.

While in the implementations described above in relation to FIG. 11, the home design tool associates the CAD model with a product selected by the user at the time the visual bookmark is generated, other implementations are possible. For example, in some implementations, the potential CAD models may be presented to the user when the user attempts to add the bookmarked home design product to a layout. Associating the CAD model with the home design product at the time the product is added to a room layout can provide the advantage of requiring the user to select a CAD model only for the products they choose to add to the layout rather than for each product for which the user generates a visual bookmark.

While in the implementation described above, the system associates a CAD model with a user-generated bookmark, other implementations are possible. In some implementations, the user specifies a generic 2D CAD drawing/3D CAD model to place in their design. The system scans the database of visual bookmarks that other users have matched to the specific CAD model and presents the user with a prioritized list of visual bookmarks. The system also scans the database of the entire database of advertisements that have CAD models associated with the advertisements. The system also presents the user with a prioritized list of image and text based products advertisements. The user then selects which visual bookmark or advertisement to associate with the CAD model.

Figure 17:
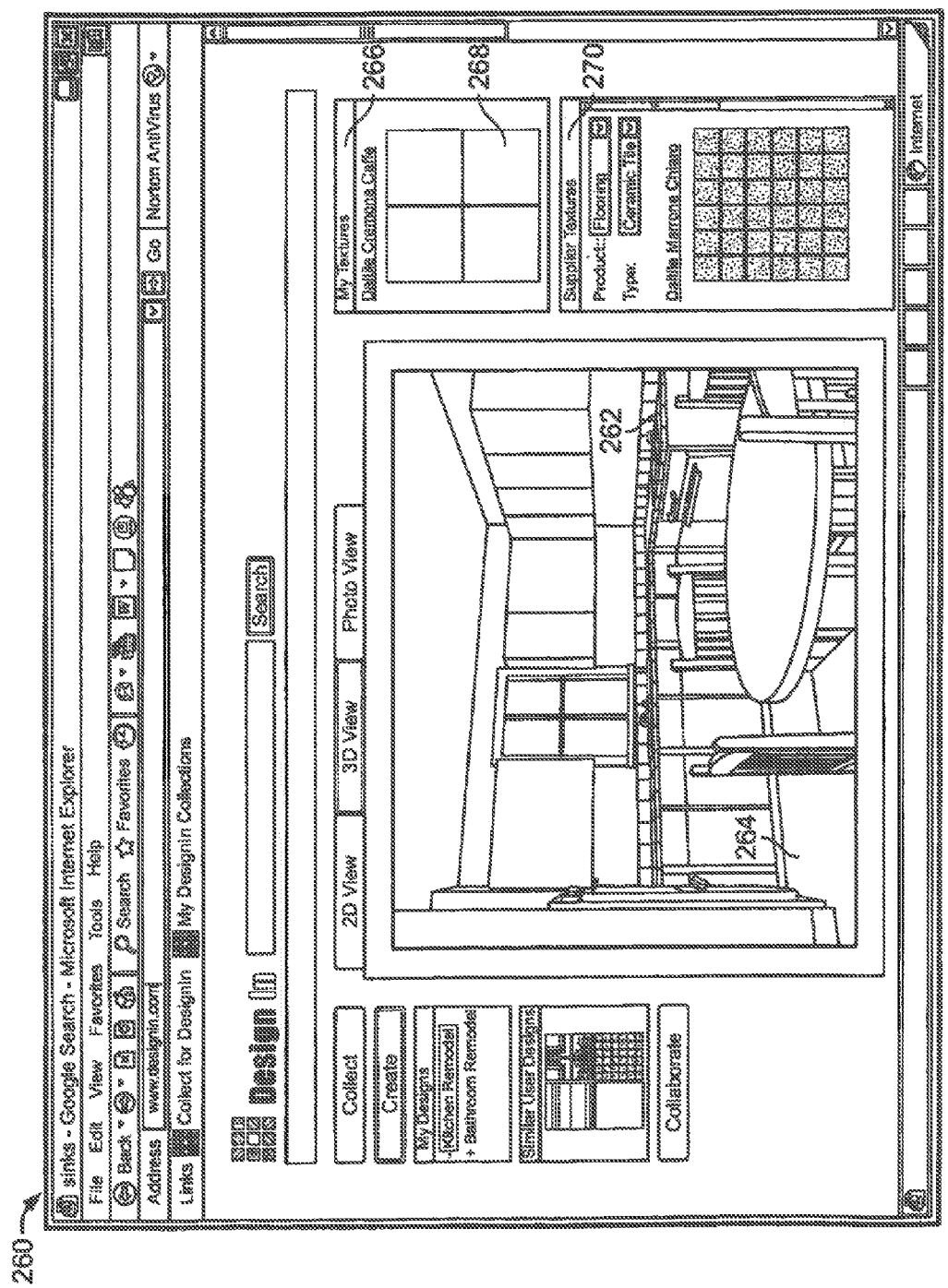
FIG. 17 is a diagram of a web interface with a three-dimensional room layout.

FIG. 17 shows a web interface 260 that includes a three-dimensional view 262 of a room based on a layout generated using two-dimensional CAD models. The three-dimensional view 262 allows a user to view the home design products and the placement of the products within the room. The home design tool includes two dimensional and three dimensional representations for most objects. In 3D, the system displays the 3D representation of objects included in a CAD drawing to generate objects having a visual appearance in 3D using auxiliary information from database and minimal user input based on objects' properties that are specified in the two dimensional CAD drawing. The constructed representation includes polygons (triangles), which are displayed in 3D mode using standard graphics pipeline with parallel projection. The set of triangles is generated for rendering without special hardware acceleration and the rendering can be implemented using graphics technology (e.g., Macromedia Flash). Some implementations may use hardware acceleration to provide more realistic and more detailed geometry model rendering.

In order to provide the user with a visual representation of the floor and other surface coverings, the home design tool performs texture mapping of a product selected from a website based on an image extracted from the website. It is believed that providing texture mapping based on an image selected from the internet can provide various advantages such as allowing a user to view any product they find displayed on the internet rather than limiting the user to manufacturers who have provided texture mapping materials or models with texture maps associated with them.

Figure 18:
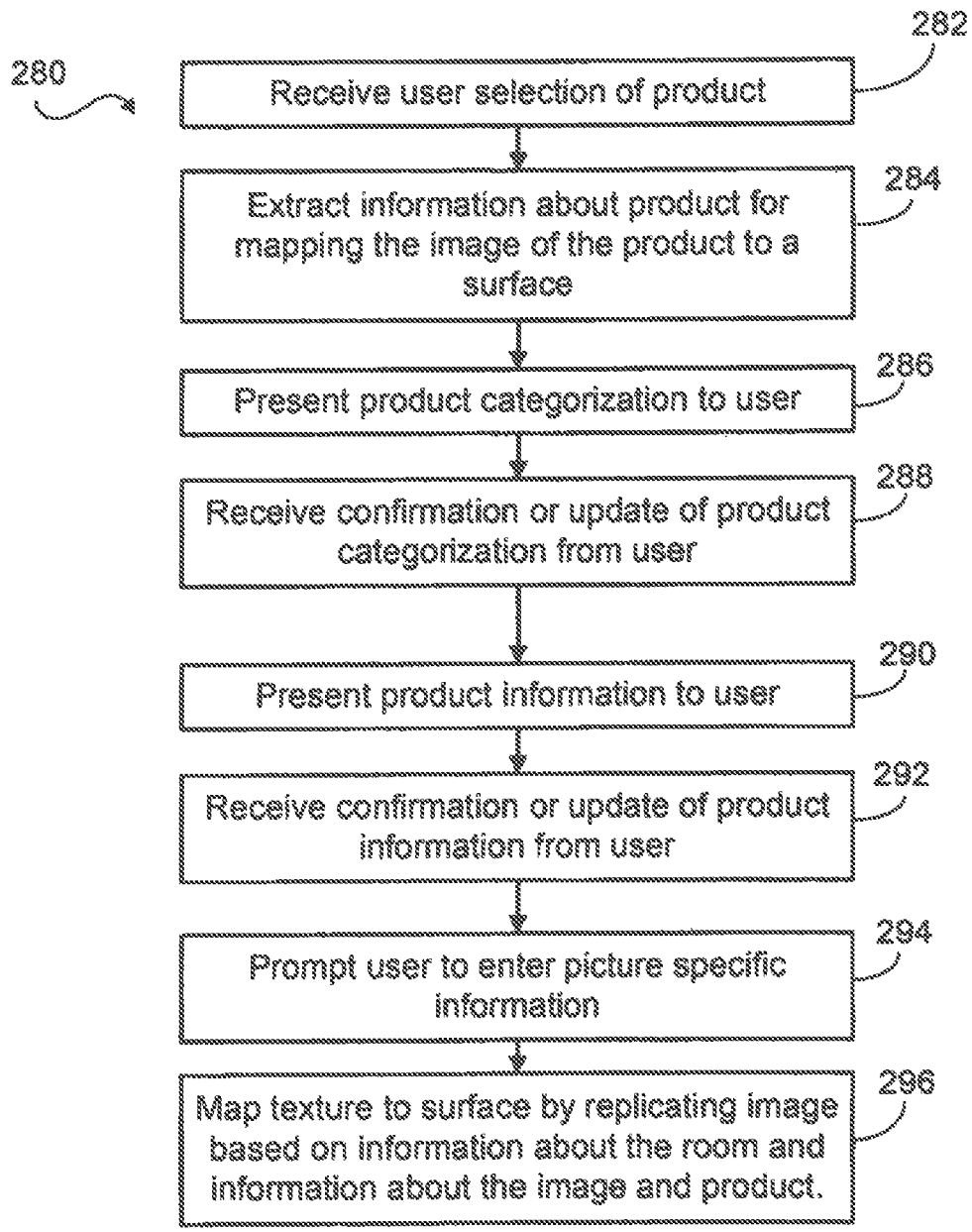
FIG. 18 is a flow chart of a texture mapping process.

FIG. 18 shows a process 280 for generating and applying texture mapping of a texture shown in an image based on a user selection of the home design product exhibiting the texture. The home design tool receives a user selection of a product (e.g., a flooring, wall covering, or other product that has a texture to be applied to a surface) from a website (282) and extracts information about the product (284). The home design tool presents product categorization information to a user based on information extracted from the website (286) and the user either confirms or updates the product categorization information (288). The home design tool also presents product information to the user (290) and receives a confirmation or an update of the information from the user (292). The extraction and confirmation of information (e.g., steps 282, 284, 286, 288, 290 and 292) are similar to the process described above in relation to generation of the visual bookmark for a home design product. In some implementations, the same extraction process can be used to extract the information for the texture mapping as for the visual book-marking and CAD model association. In order to obtain additional information about what is shown in the image that is not available as text associated with the image on the webpage, the home design tool prompts the user to enter image specific information (294). Examples of image specific information include the number of tiles shown in an image, the number of slats of hardwood shown in an image, the expected size of a non-regularly repeating texture such as carpeting or marble. The image specific information can also include information about how the texture might wrap around a sample object, what the parameters are for wrapping and projecting around an object, image clipping options, reflection properties, illumination mapping, scale, warping options and/or bump mapping options allowing the texture to not only be applied to surface(s) but allowing the texture to have detailed contours.

In some implementations, the system prompts the user with a preview of what the texture map might look like and automatically crops the image to make a consistent texture map or prompt the user to crop the image to make a consistent texture map. The system can also include hatching patterns to select firm that represent how the texture maps. For example for 12" tile, the user would select a hatch pattern named 12" that has lines spaced about 12⅛" apart vertically and horizontally. The ⅛" allows for grout. The user may overlay the hatch pattern over the image and further align the hatch to the image. This is turn defines how the image will be repeated when mapped onto a surface. Another option is to interpret the image directly from the website and use a combination of the taxonomy based categorization, folksonomy based tags and neural network based learning to identify what type of repetitive characteristics and other properties of a texture. Then the information would be used to explore whether the texture meets these properties by comparing the pixels of the image with a vector based hatch pattern such as a grid defining a tile or a pattern, in some implementations, the system can use the pixels of the image to identify the correct repetitive characteristics of the image. In order to do so the application will perform vectorization of the image using edge detection algorithms (i.e. Canny algorithm based on intensity jumps detection). If the vectors detected during this processing can be treated as texture mapping direction lines, then they are suggested to the user as an option for texture mapping.

The system may also include sample objects for defining how the texture will map around surfaces like couches and chairs. For example, a stripped fabric could map in multiple directions to a couch. The system will provide tools for toggling how the texture maps to sample objects which in turn will define how the texture maps to 2D/3D CAD models in the design. The home design tool uses the information extracted from the product website in addition to the information received in response to the user prompt to map the texture to a surface by replicating the image to cover the surface and wrapping the image around a surface if required (296).

Figure 19:
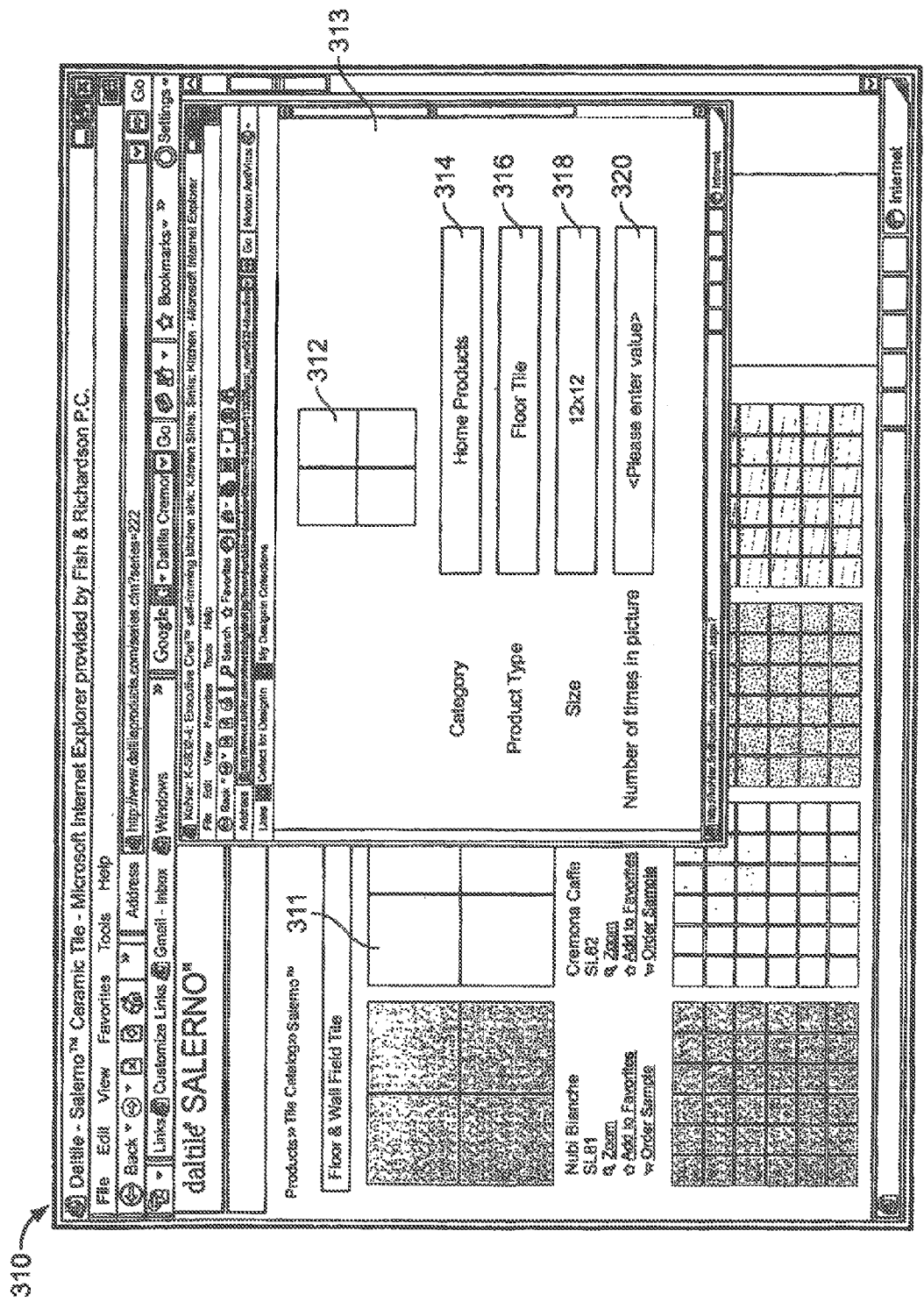
FIG. 19 is a diagram of a web interface and a menu for selecting product information related to a home design product.
Figure 20:
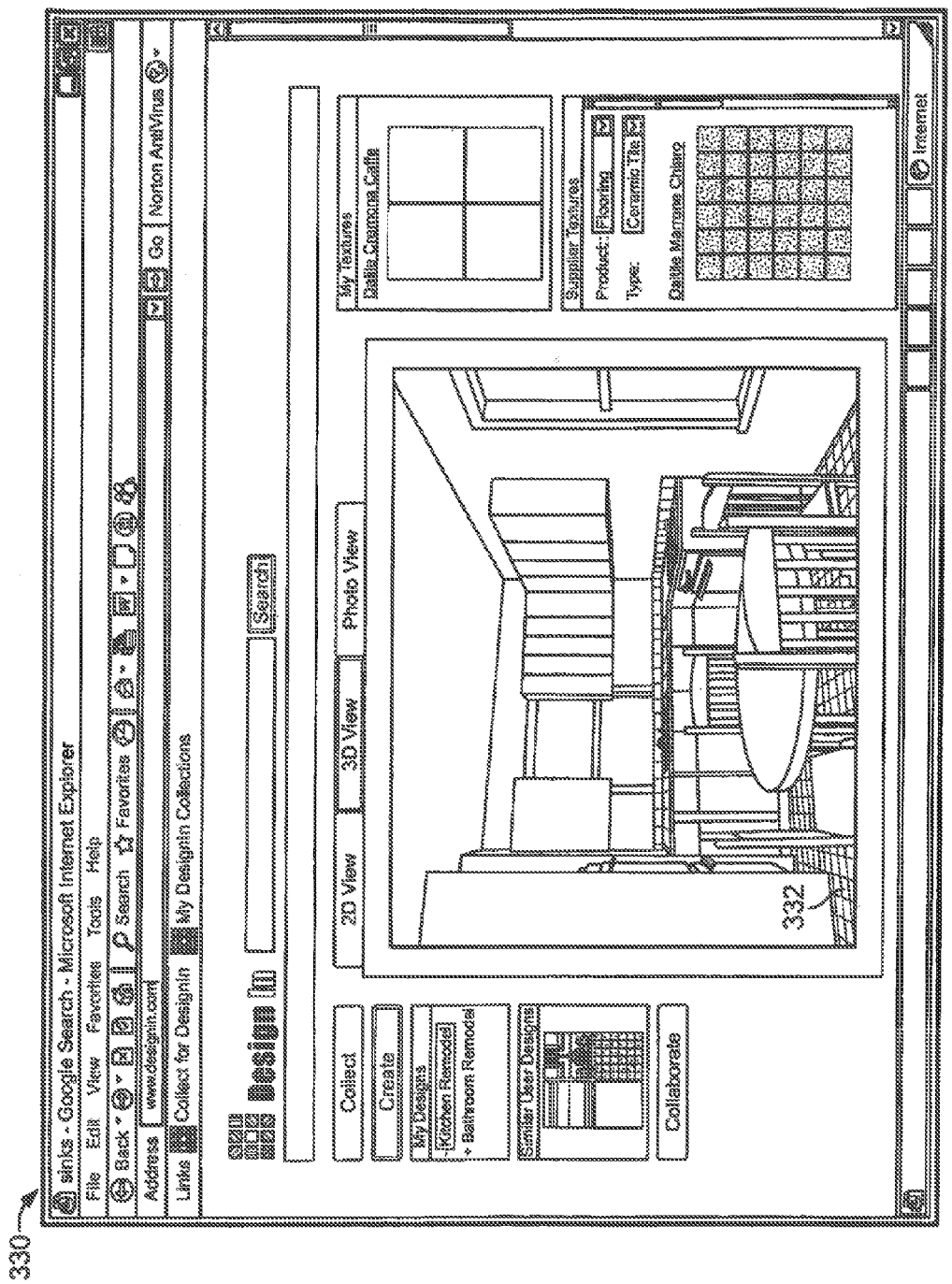
FIG. 20 is a diagram of a web interface that includes a three-dimensional room layout.

FIGS. 19 and 20 provide an exemplary texture mapping for a tile flooring based on an image of some tiles collected from a website. As described above, when the user selects a particular image of the tiles, the home design tool generates a pop-up menu 313 that prompts the user to provide feedback about the product and about the selected image of the product. Some information about the product such as the expected category (e.g., as indicated in block 314), product type (e.g., as indicated in block 316), and size (e.g., as indicated in block 318) is provided by the home design tool searching the webpage for the relevant information. The user views and confirms this information. Other information, such as image specific information, is not likely to be included in the text of the webpage. Therefore, the home design tool prompts the user to provide the information. As shown in FIG. 19, the home design tool prompts the user to enter the number of tiles shown in the image (e.g., as indicated in block 320). In this example, the user would input the number two for rows and two for columns since there are four tiles shown in the selected image. The automatic edge detection algorithm processes the image and detects the edges in the image and provides initial numbers (2 and 2) for the user to accept the input.

When the user goes into create mode, after receiving the information from the user, the home design tool maps the texture to a surface. For example, as shown in FIG. 17, the user could map the tile texture onto the floor 264 of the three-dimensional view of the room 262. For example, if the room 262 was ten foot by ten foot, the home design tool could determine that the size of the image corresponded to a two foot by two foot (e.g., each tile is 12 inches by 12 inches and there are four tiles). As such, as shown in FIG. 20, the home design tool could size the image appropriately to replicate the image 25 times (e.g., 5 rows and 5 columns) to produce the effect of the texture appropriately sized for the surface.

Figure 21:
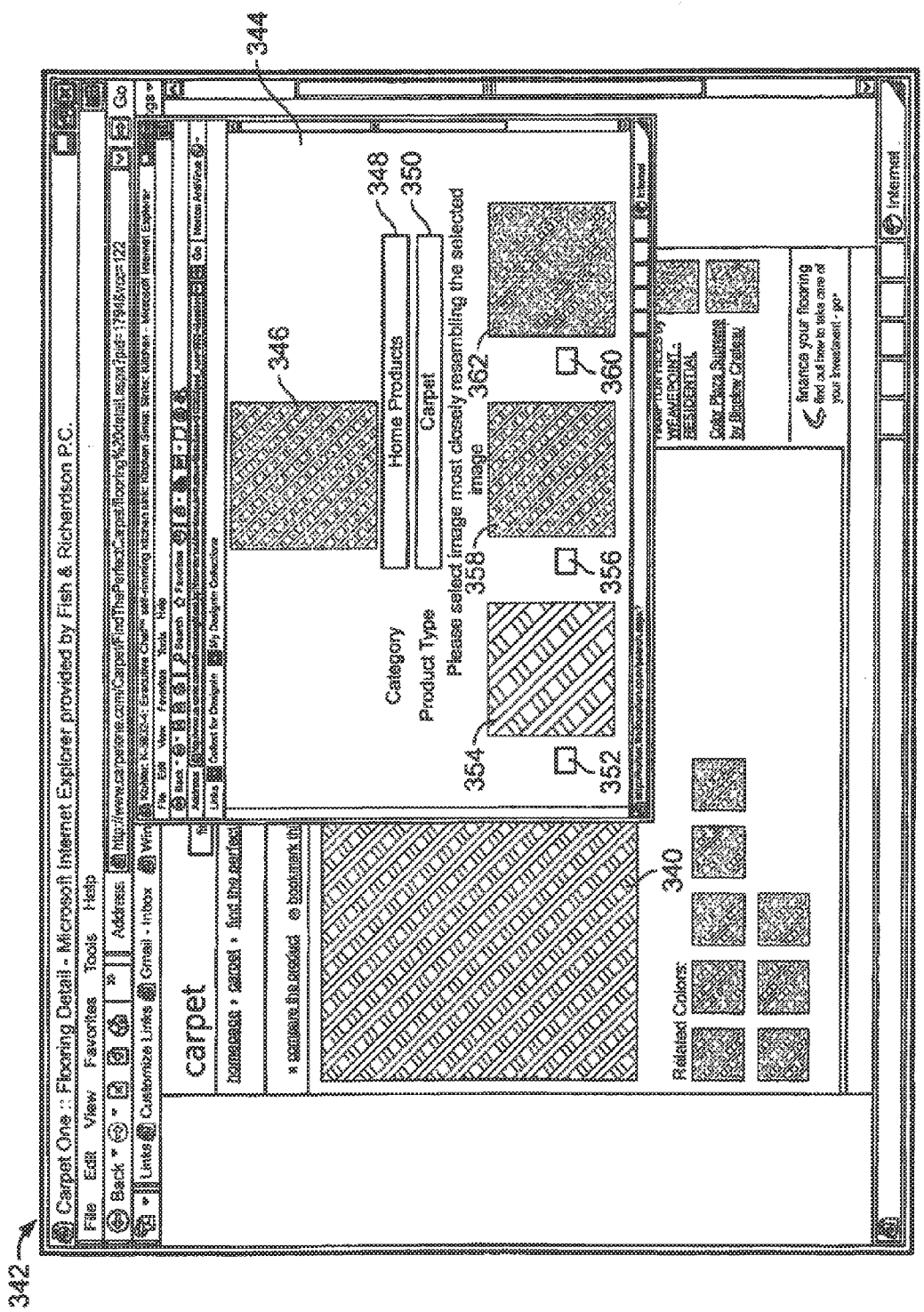
FIG. 21 is a diagram of a web interface that includes a menu for selecting product information related to a home design product.

While in the example above, the amount of area to be covered by one repetition of the image was discernable based on the size of the tile and the number of tiles shown in the image, in some examples the size is not easily determined from the image. For example, as shown in FIG. 21, a user may select a non-regularly repeating texture such as carpeting. In this example, the user has selected an image 340 of a carpet from a carpet manufacturer's website 342. The home design tool generates a pop-up window 344 requesting input from the user. The home design tool automatically populates the category and product type for confirmation by the user (e.g., as shown in boxes 348 and 350). Since it may be difficult for the user to identify the expected scale of the carpet shown in the image, the home design tool displays various representative sized images of a similar type of carpet. For example, as shown in window 344, the home design tool presents a near view image of the carpet 354, a moderately sized image of the carpet 358, and a large area image of the carpet 362. The user selects the appropriate scale of the carpet in the image 346 by comparing the image 346 to the differently sized images 354, 358, and 362 and selecting the appropriate button 352, 356, 356, or 360.

Figure 22:
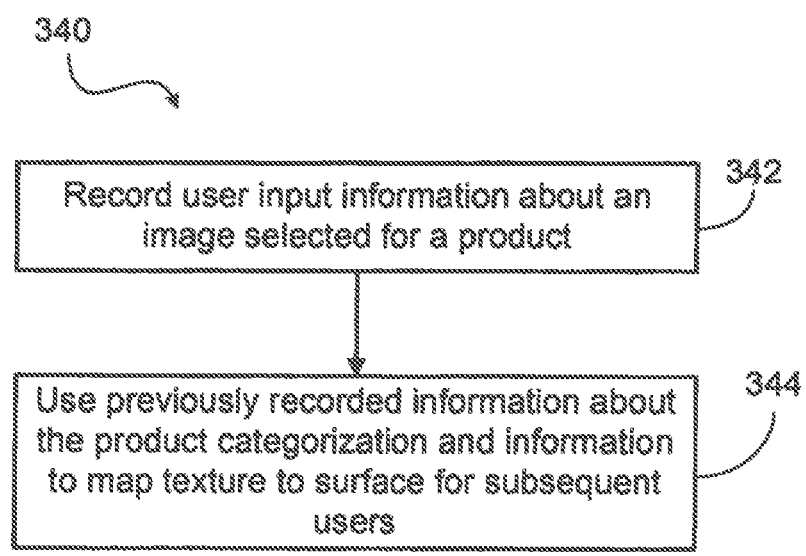
FIG. 22 is a flow chart of a texture mapping update process.

The taxonomy based categorization and folksonomy based tags build the intelligence for the system, helping it identify which tag prompts to display for specific URLs and assist in mapping textures properly. As shown in FIG. 22, as users associate the various properties with images (textures) collected from a specific Web page, the system records the information (342) and learns which properties are selected the most often and prioritizes user choices for texture mapping accordingly (344).

It is believed that generating texture models for images found on the internet can provide various advantages. For example, since the home design tool makes the entire Web a content source for the texture maps, the users of the tool can select and use any carpeting, paint, tiles, hardwood, marble, and the like in designing a layout and is not constrained to manufacturers that offer texture models for their products. In addition the system provides a search feature for textures contributed by other users. As outlined above for product searches, the taxonomy based categorization, the folksonomy based tags and user activity tracking offers a similar foundation for the system's texture search algorithms.

As described above, in addition to enabling a user to collect product information (e.g., by creating visual bookmarks) and enabling the user to create room layouts that include the selected product information, the home design tool also allows the user to collaborate with other users regarding various home design issues. For example, the user can collaborate with other users by searching of products that other users have selected or viewing room designs that other users have generated. In general, when a user creates a product collection or generates a floor plan, the user can select whether or not to make a product collection or the floor plan available for others to view.

Figure 23:
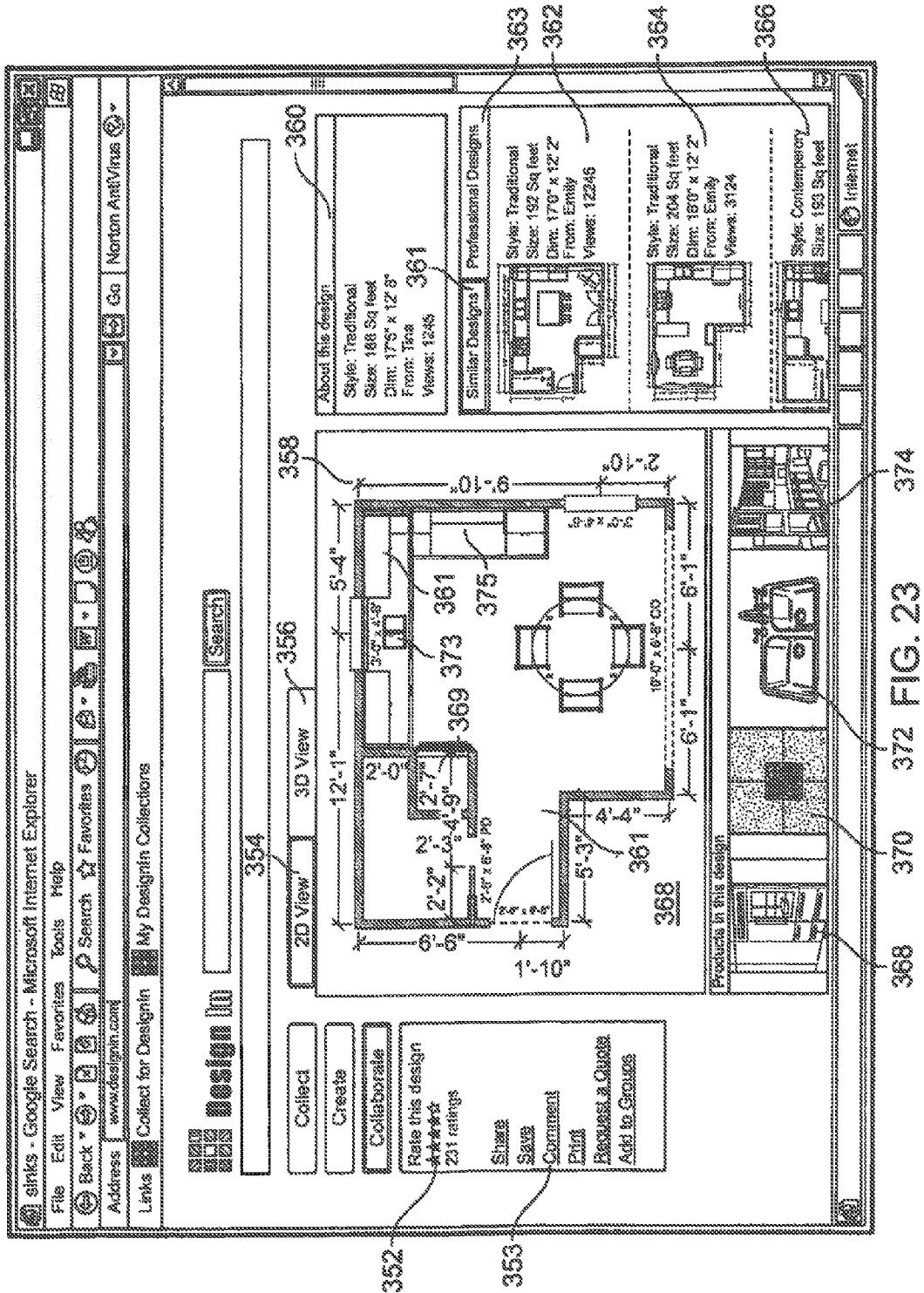
FIG. 23 is a web interface that includes a two-dimensional room layout.

FIG. 23 shows an exemplary floor plan 358 that is shared for other users of the home design tool to view. It is believed that allowing other users to view the design can provide various advantages both to the person who generated the design and to those who are viewing the design. For example, in some implementations, when others view the design they can rate the design (e.g., on a scale of 1 to 5 as shown in ratings 352) to provide feedback to the person who generated the room. Those viewing the design can also provide comments 353 about the design. For example, if another user had previous positive or negative experiences with a similar room layout or with a particular product they could provide those comments about the design such that the person who generated the design would be aware of their positive or negative experience. The person who generated the room design can then decide whether or not to modify the design based on the feedback. It is believed that this type of information sharing can be beneficial especially to non-professional users who are attempting to design a room and may otherwise not have access to such historical information.

Figure 24:
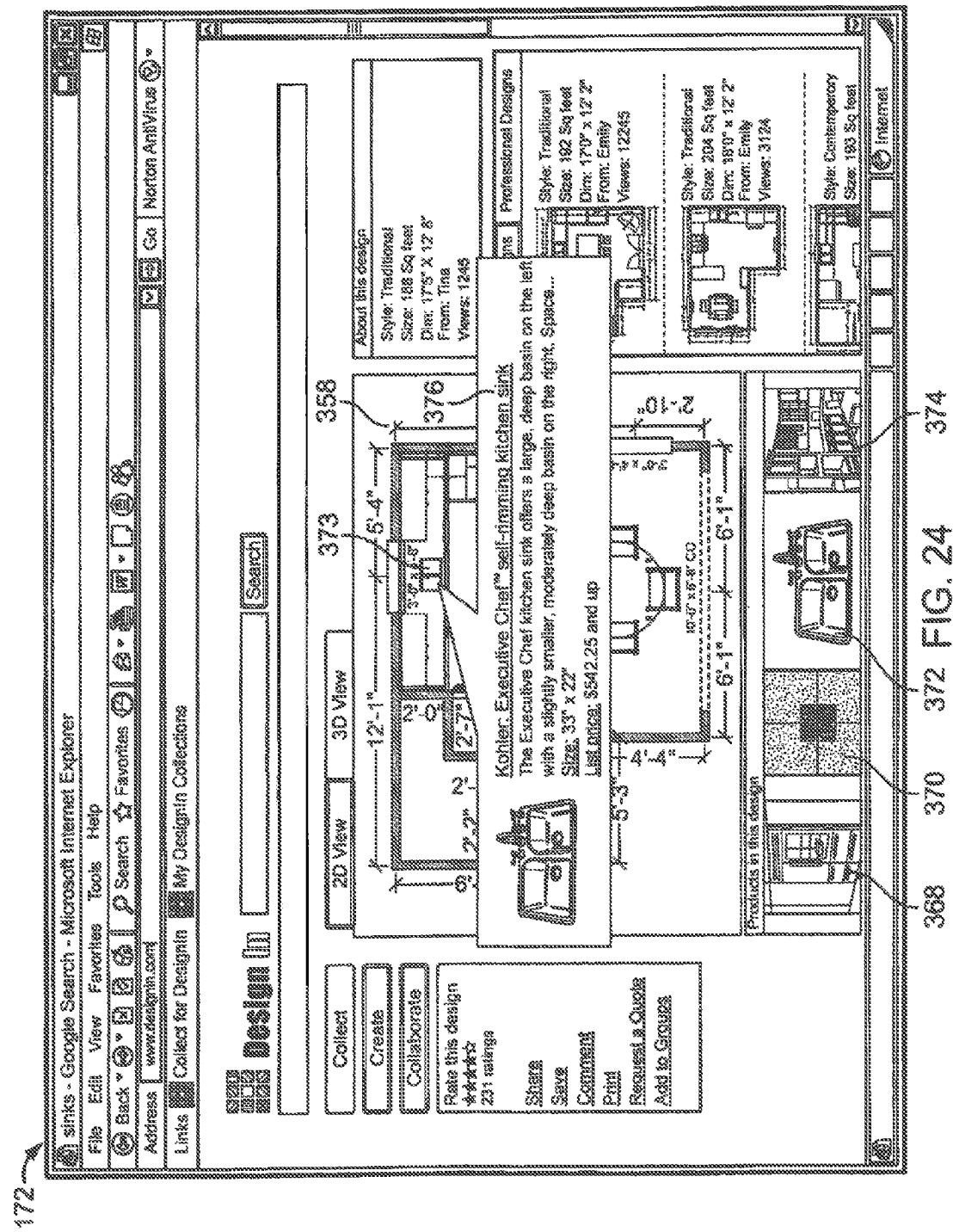
FIG. 24 is a web interface that includes a two-dimensional room layout.

When a user shares their design, other users can view not only the CAD drawing of the room but also the home design products that the user has selected to place within the design. In addition to the CAD design, the home design tool displays images of the home design products included in the design. For example, in FIG. 23 the home design tool displays an image 368 of the refrigerator 369 in the CAD drawing 358, an image 370 of the tile 361 included in the CAD drawing 358, an image 372 of the sink 373 included in the CAD drawing 358, and an image 374 of the cabinets 375 included in the CAD drawing 358. As shown in FIG. 24, in addition to providing the images 368, 370, 372, and 374 of the home design products the home design tool can allow the person viewing the design to see additional information relating to the home design product by moving a cursor over the product in the CAD model 358. For example, when the user positions their mouse over the CAD model 373 of the sink a message 376 appears that includes the visual bookmark information associated with the CAD model for the sink. It is believed that this can be beneficial because the user can easily view information about a home design product that another user has included in the room design without searching for the information themselves.

In addition to viewing room designs generated by other users, in some implementations, the home design tool allows users to search a database of room designs generated by other users to find rooms with similar floor plans. For example, as shown in FIG. 23, in collaborate mode, the home design tool provides the user with a list of similar designs 361 and the ability to search. The similar designs are designs with similar floor plans (e.g., similar room shape, room dimensions, window placement, door openings and/or door placements) that have been generated by other users of the system. Similar designs may also be found by using taxonomy based and folksonomy based tags that users have assigned to their entire floorplan, individual rooms and products in the design. For example, a user may choose, artisan, country, contemporary, hip, or traditional for a design style from the taxonomy based lists of design styles. The user may also choose add folksonomy based tags like breakfast nook, colonial, island, mud room entrance, pantry to identify some characteristics of his/her design. Lastly the system may generate searchable tags based on the characteristics of the designs. For example if the user draws a center island in his/her design, the system may tag the design with words like "island" and "center island". Similar algorithms are used to search for entire floor plans.

Figure 25:
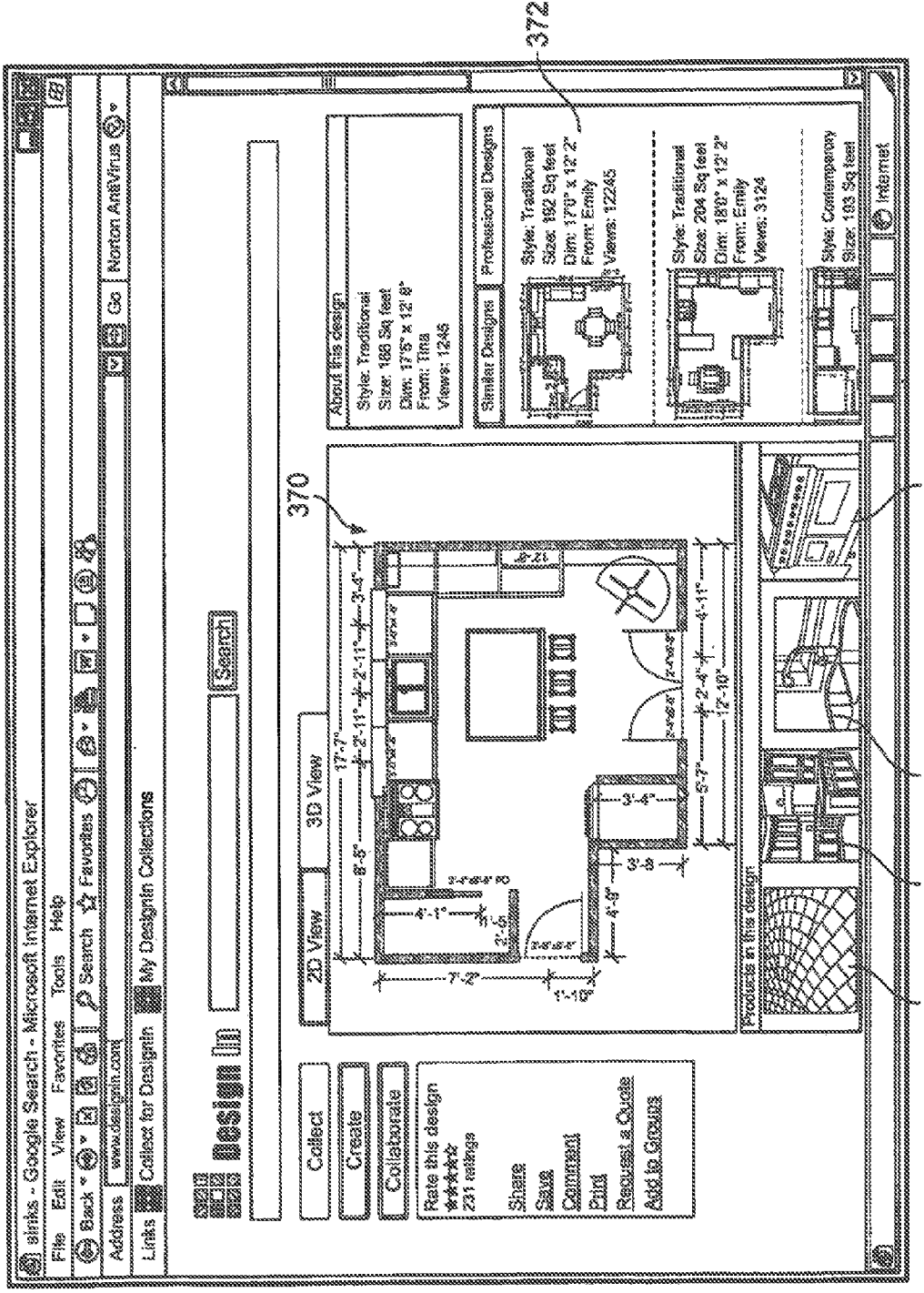
FIG. 25 is a web interface with a two-dimensional room layout.

Designs 362, 364, and 366 are exemplary designs included in a list of similar designs 361 for the room design shown in CAD model 358. While the designs included in the similar designs may not perfectly match the floor plan of the room designed by the user, they can still provide valuable information about how other users have organized the layout and design of a similar room. If a user desires to view one of the designs included in the list 361 of similar designs 361, the user selects the design from the list and the design is displayed by the home design tool. For example, as shown in FIG. 25, if the user selects design 362, the home design tool would present the CAD model 370 associated with design 362 and the products 371, 372, 373, and 374 included in the CAD model 370 for the user to view. When the user navigates to a design previously included in the list of similar designs, the home design tool adds the previously viewed design to the list of similar designs (e.g., the previously viewed CAD model 358 is included as a design 372 in the list of similar designs for the CAD model 370).

Figure 26:
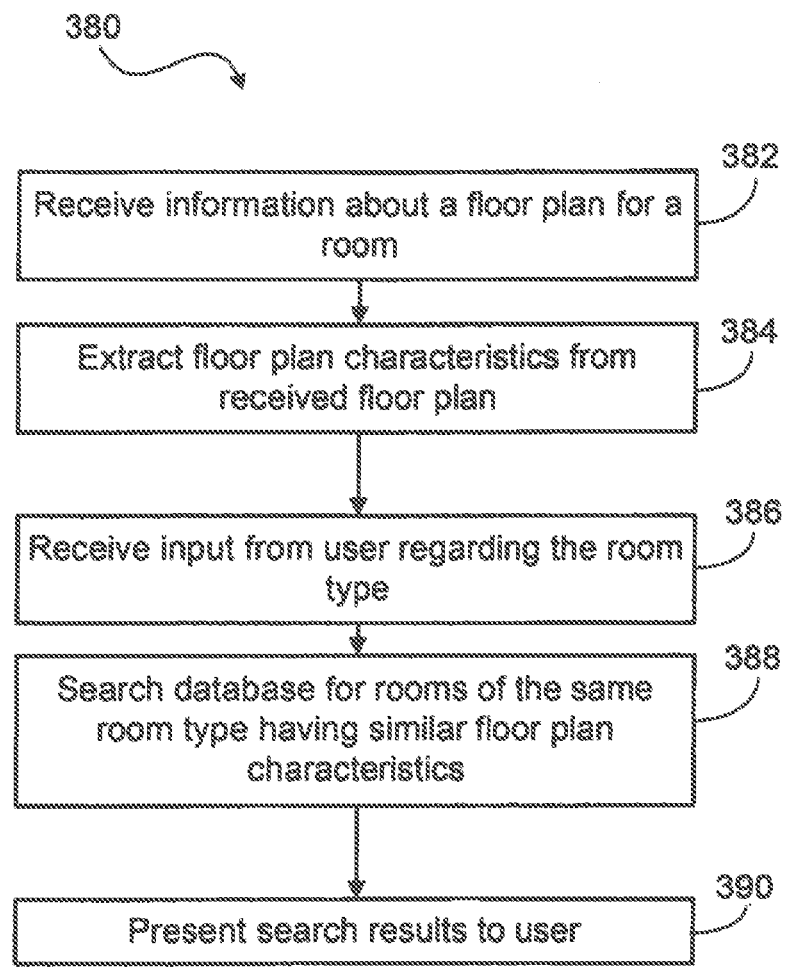
FIG. 26 is a flow chart of process for searching for related room designs.

FIG. 26 shows a flow chart of a process 380 for generating and displaying similar designs based on a vector based search. In order to search for similar designs, the home design tool received input regarding the floor plan of a room for which they would like to view similar designs. The system receives the information about of the floor plan from the user (382) and extracts floor plan characteristics from the received information (384). Exemplary floor plan characteristics include room shape, room dimensions, window placement, door openings and/or door placements. The user can provide the information about the floor plan in various forms.

Figure 27A:
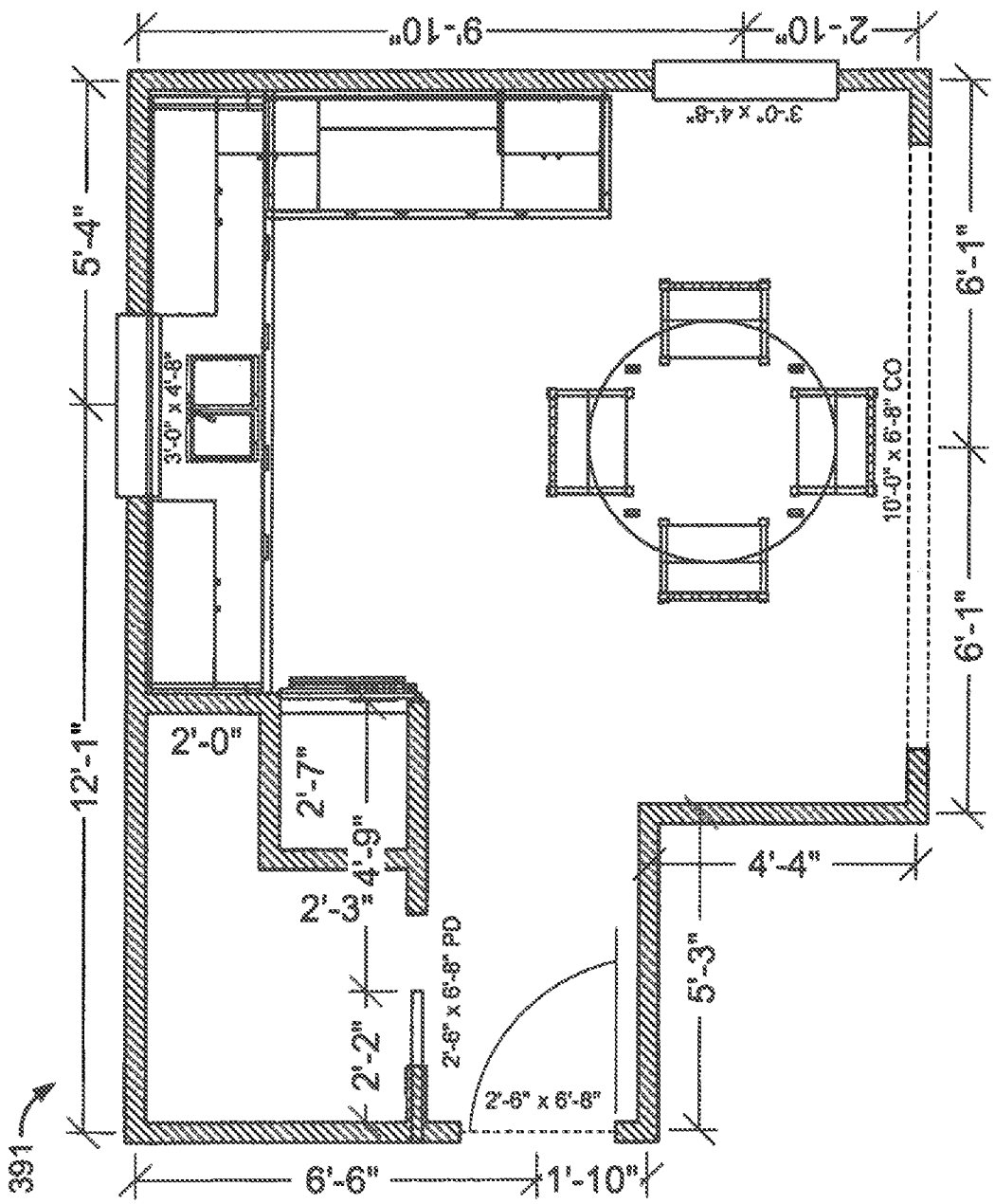
FIG. 27A is a CAD model of a room.

For example, in one implementation as shown in FIG. 27A, the user can provide a CAD model 391 of the floor plan. From the CAD design the home design tool can extract the location of doors, wall openings windows as well as the shape and dimensions of the room. In general, vector graphics (also referred to as geometric modeling or object-oriented graphics) is based on the use of geometrical primitives such as points, lines, carves, and polygons, which are all based upon mathematical equations to represent images in computer graphics. Vector graphics differs from raster graphics, which is the representation of images as a collection of pixels (dots).

Figure 27B:
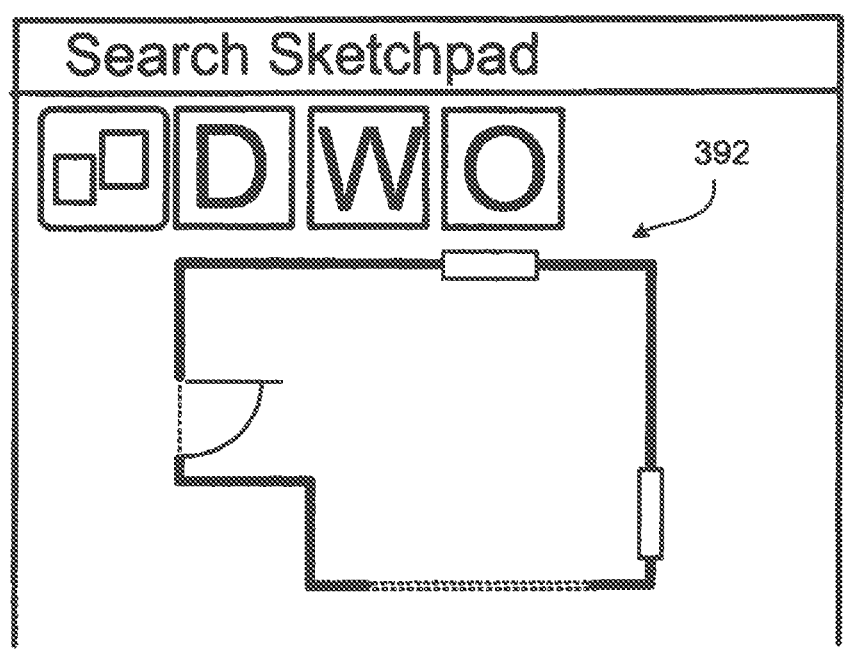
FIG. 27B is a sketch of a room.

As shown in FIG. 27B, in another implementation the user can provide information about the floor plan in the form of a sketch 392 of the room. For example, the user can sketch the room using their mouse or other computer input tool. In the search sketch pad the user can draw walls and add windows, doors and wall openings. The search algorithm first looks for rooms that have a similar shape such as L-shaped or rectangular, Next the system identifies rooms that have a similar dimensions for the room walls (closets may be ignored). Next the system identifies similar window, door and wall opening locations. In addition the system compares the users' collections with products/visual bookmarks within the search results and prioritizes them based on similarity. The results of the search are based on a set of heuristically defined metrics for the design and should not necessarily result in only exact matches. Close matches are also reported to the user.

In some implementations, the user can set importance of search criteria such as room dimensions; wall, window and wall openings; and similarity of objects in the design to the users collections to find designs with similar tastes and dimensional information. These importance parameters are used as coefficients in search algorithm to raise or lower the weight of different metrics in search results.

The taxonomy based categorization of room names, the folksonomy based tags for assigning criteria to rooms and user activity tracking offer the foundation for the system's product search algorithms. Users may type a room name and characteristics into the search field. The system identifies and prioritizes the most popular room designs for the specific terms based on what room categories and tags a user assigned to the design, how many users have bookmarks these designs, how many users have incorporated these room designs within their own designs and how many users have viewed the designs. The algorithm relies primarily on the shape, size and similar products variables as outlined above. At the second level the system relies heavily on how many users incorporate another user's design into their designs since this shows that this design is popular. Advertisements (entire room designs created by advertisers) may also appear in search results using similar criteria as to other users' designs. Advertisements that are already incorporated in other designs will also be included in the calculation even if the design was edited. After typing a search term into the search field, specifying that the user is searching for designs, and clicking the search button, the system presents the user with results based on the algorithm outlined above. On the left side of the screen, the user is presented with options to refine the search. For example if a user types in L-shaped kitchen within the search box, the results appear and on the left side of the system automatically assigns a room name of kitchen and a tag of L-shaped. The system may also present the user with the design styles like artisan, country, contemporary, hip, traditional. These styles are taxonomy based characteristics assigned to design by the users at the time of creation. Additional options for refining search results are outline below.

It is believed that allowing a user to search for designs based on a sketch can provide the advantage of allowing the user to easily search for related floor plans without having to commit the time and effort of generating an entire room design. In addition it offers a unique advertising opportunity for advertisers to offer complete room designs all with brand name products that they manufacture or sell.

Figure 29:
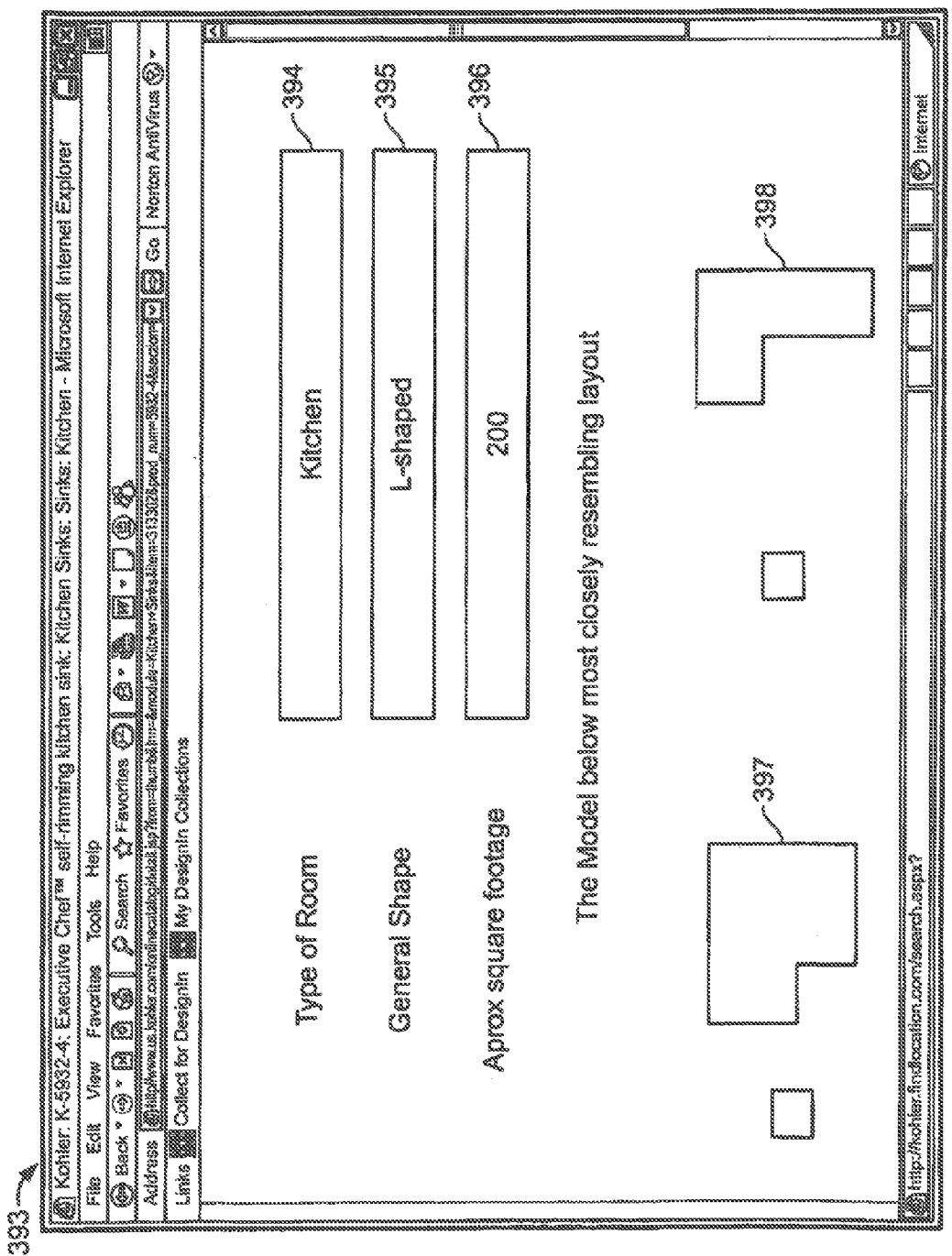
FIG. 29 is a selection menu.

As shown in FIG. 29, in another implementation the user can provide information about the floor plan by inputting information about the room plan using a text based user interface 393. For example, the user can enter information about the room type 394, shape 395, and square footage 396. In some implementations, in order to better refine the information about the room, the home design tool can present the user with exemplary room layouts (e.g., layouts 397 and 398) based on the limited information such that the user can select the room design most similar to what they are attempting to design. The exemplary room layouts presented to the user can be based on room layouts that are frequently viewed or are included in the system that match the criteria input by the user.

Figure 28:
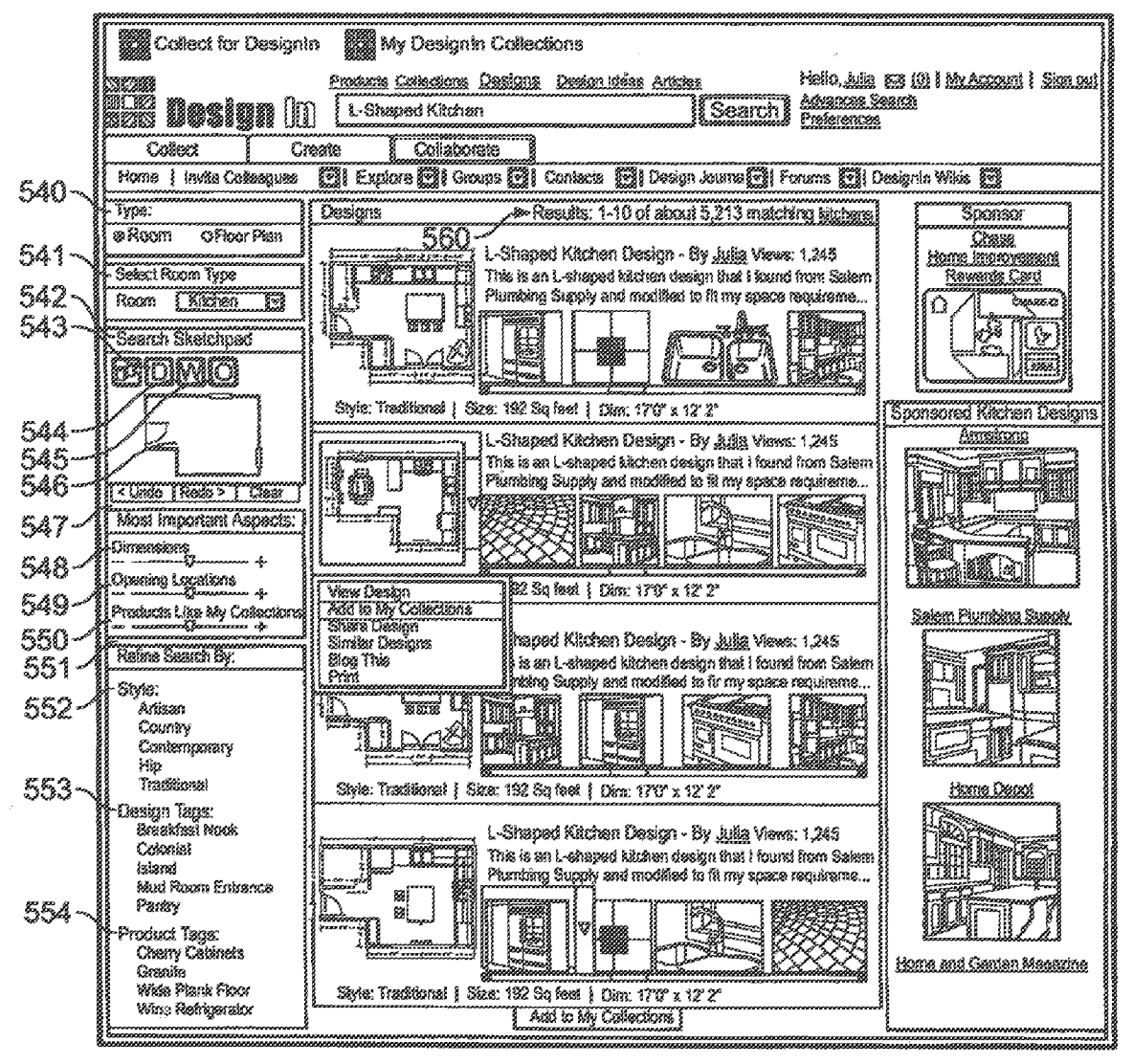

FIG. 28 shows how the user can select a room type and then draw walls, windows, doors and door openings in the search sketch pad to find room designs to use in their overall Floor-Plan. The user can set importance of search criteria such as room dimensions; wall, window and wall openings; and similarity of objects in the design to the users collections to find designs with similar tastes and dimensional information. Users can drag these rooms into their designs to become part of the overall floor plan as outlined below or simply use the room as a starting point or to gather ideas for their own designs.

For example, the home design tool can receive one or more inputs from the user that rank or select properties of room designs that can be used to sort the search results. This searching allows the user to view room designs that are most similar in shape and/or design to their room based on the received inputs.

The design tool allows the user to enter the type of floor-plan they are searching for. For example, the user can search for either a room or an entire floor plan (as indicated by arrow 540). In order to select either the room or floor plan as the type of design for which the user is searching, the user clicks on the appropriate button in the home design tool.

The user can also enter a room type that can be used to further limit the search results presented to the user (as indicated by arrow 541). By entering the room type, the user can view only rooms that will be used for the same function as their intended use of a room. For example, if a user is searching for kitchen designs, it can be beneficial to present only kitchens having similar shape and design to the room rather than present bedrooms or other types of rooms. Exemplary room types include bedroom, bathroom, living room, kitchen, study, play room, dining room, and the like.

The home design tool also allows the user to enter the basic shape of the design (e.g., as described above in relation to FIGS. 27A and 27B). In some implementations, the home design tool includes a search sketchpad 542. The search sketchpad is a tool that allows the user to enter the general shape of the room and any doors (using door button 543), windows (using window button 544), and other openings (e.g., using openings button 545).

In addition to the type of room (as indicated by arrow 541) and the general shape of the room entered in the sketchpad 542, other information can be used to further limit the search results. For example, information about the importance of various search criteria can be entered, for example, based on a slider bar for each type of information that ranks the importance of that feature. The home design tool uses the information about the importance of the various features to filter the search results. As shown in FIG. 28, the user can select the amount of relevance the home design tool places on the dimensions of the room (as indicated by slider bar 548). If the slider bar is moved to indicate a greater emphasis on the dimensions of the room (e.g., moved to the right), the home design tool will limit the displayed search results to rooms having dimensions more closely matched to the dimensions entered by the user. The user can also select the amount of relevance the home design tool places on the openings of the room such as any doors or windows (as indicated by slider bar 549). If the slider bar is moved to indicate a greater emphasis on the openings present in the room (e.g., moved to the right), the home design tool will limit the displayed search results to rooms having openings more closely matched to the openings entered by the user. The user can select the amount of relevance the home design tool places on the products in their collection of visual bookmarks (as indicated by slider bar 550). This allows the user to limit the search results to designs with similar products as those that have been gathered and selected by the user. If the slider bar is moved to indicate a greater emphasis on the matching the types of products (e.g., moved to the right), the home design tool will limit the displayed search results to rooms that include home design products more closely matched to the home design products stored in the user's collection of visual bookmarks. It is believed that allowing the user to limit the displayed search results based on the types of products they have stored in their visual bookmarks can provide the advantage of allowing the user to more easily locate designs that may be of interest to him/her. For example, if the user has generated visual bookmarks for products with a very contemporary style, they are not likely to have interest in a rustic, country themed design. As such, by filtering the results based on the visual bookmarks of the user, the user may be presented with results that have a more contemporary feel.

The room dimensions, room openings, and type of home design products can be used to filter the search results (e.g., as indicated by slider bars 548, 549, and 550 respectively). Other characteristics could be used in addition or instead of these features.

In some implementations, e.g., as shown in FIG. 28, the user can refine the search results to display rooms with particular characteristics. For example, a user might desire to have a contemporary feel to the room. In order to filter the results to show rooms having the desired contemporary feel, the home design tool presents the various style categories (as indicated by arrow 552) and the user can select to view only rooms that have a desired style. In addition, the user of the home design tool could also select to limit the search results to rooms having particular type tags (as indicated by arrow 553) or product tags (as indicated by arrow 554) included as part of the design. The type tags (as indicated by arrow 553) provide categories of designs that are sorted based on the type of room. The product tags (as indicated by arrow 554) provide categories of designs that are sorted based on particular products. For example, if the user has selected a type of cabinets they would like to use in their design, then they can search for only rooms that include that type of cabinets.

After the user has entered search specifications to search for rooms based on the entered information, the home design tool presents the search results in a list of search results 560. The list of search results can be displayed in an order of relevance. For example, the home design tool can rank each of the search results using a relevancy score that is based on the filtering characteristics entered by the user. The designs can be displayed in the search results list based on the relevancy score. For example, designs that have the highest relevancy score (e.g., the designs that most closely match the entered characteristics) can then be presented at the top of the search results list 560 so that the user can view the most relevant results first. In the exemplary search and search results shown in FI 28, search results shown in FIG. 2, the search parameters entered by the user has resulted in 5,213 potentially matching room designs. The designs have been sorted for relevance based on the preferences entered by the user and the ten designs that have the highest relevancy score have been displayed on the user interface (note only 4 of the 10 are shown in FIG. 28). The user can view additional results by selecting a button to navigate to the next set of results ranked in terms of relevance (e.g., the results ranked 11 to 20).

The search results can be displayed to include various information about the room design. For example, as shown in FIG. 28, the search results can be displayed to include information that is believed to be beneficial to the user in determining whether to view the design. For example, the search results can include a CAD model of the room, a short description of the design, and pictures of home design products used in the room. The search results can also be displayed to show the style, size and dimensions of the room.

Referring back to FIG. 26, after the home design tool receives information about the floor plan (382) and extracts the floor plan characteristics (384), the home design tool receives information about the room type from the user (386). By providing the room type, the search results can be limited to the same type of room (e.g., kitchen, living room, bedroom, study, play room, dining room, etc.). The home design tool searches for rooms having the same room type and similar floor plan characteristics (388). The user may also type words such as room names, architectural styles, room characteristics and any other term that may help refine the search into the search field to find designs of interest. The system uses taxonomy based categories and folksonomy based tags to identify matches. The system also presents the user with a list of categories and tags to further refine the search. This search can be a vector based search in which the system identifying similar designs as outlined above. The input could also be raster graphics from a user scanned and imported sketch of their design. After generating a list of related room designs based on the search algorithm, the home design tool presents the search results to the user (390).

In some implementations, a user may input a floor plan that includes multiple rooms into the home design tool and subsequently desire to make changes to a particular one of the rooms. In order to make changes to one of the rooms in the floor plan it can be beneficial to have the room be able to exist as a reference to an overall floor plan. As a referenced room that may be able to be viewed separately from the other rooms in the floor plan, the user can view, edit, and share the room using the home design tool. The user can also use the home design tool to search for other rooms having similar layouts.

Figure 30:
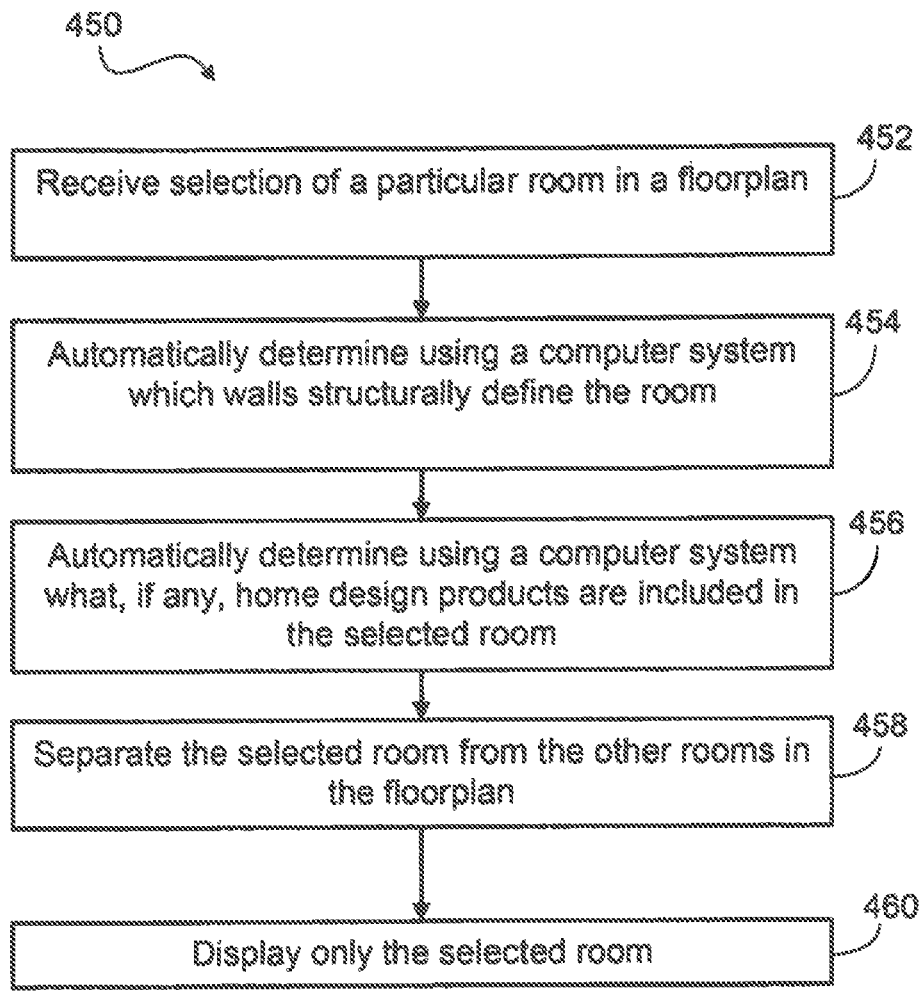
FIG. 30 is a flow chart of a process for separating adjoined rooms in a floor plan into separate, non-adjoined rooms.

FIG. 30 shows a process 450 for separating or referencing a room from adjoining rooms (e.g., rooms that share walls) in a floor plan. The user can draw an entire floor plan using walls, doors, windows and other objects. In order to view a particular room from the floor plan, the user selects a room to view. For example, the user can select the room by clicking on the room using a mouse or other selection device. When the user selects a room, the home design tool receives the selection (452) and automatically determines which walls in the floor plan that includes multiple adjoined rooms structurally define the selected room (454). The system determines which walls belong to the room by looking for walls that define the space as well as room divisions where the user has used a room divider tool designated by a dashed line that shows that even though two rooms are connected in an open floor plan, there are two distinct spaces. As the user creates rooms with wall tools and room divider tools, the system prompts the user to name rooms. The system may automatically prompt the user for a name if objects related to a specific room such as a kitchen are included in the design. The home design tool also automatically determines which, if any, home design products are included in the floor plan for the selected room (456). The system determines which home design products are to be associated with the room by the boundaries of the room and any objects such as doors, windows and wall openings are included in the boundary walls. Objects inside the room or attached to the interior of the walls are also included as part of the room. After determining which walls and home design products should be included in the room, the home design tool creates a reference of the selected room from the other rooms in the floor plan (458) and displays only the selected room to the user (460).

Figure 31:
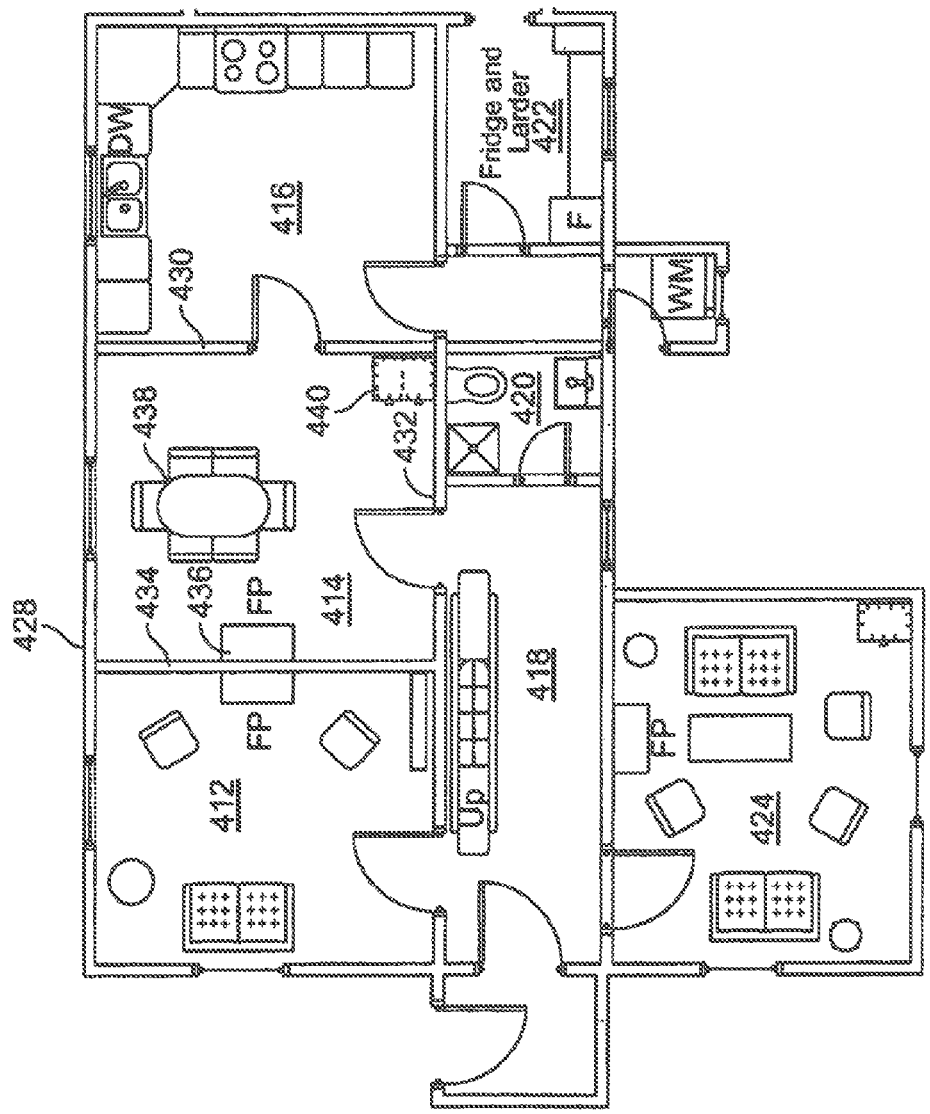
FIG. 31 is a diagram of a floor plan.
Figure 32:
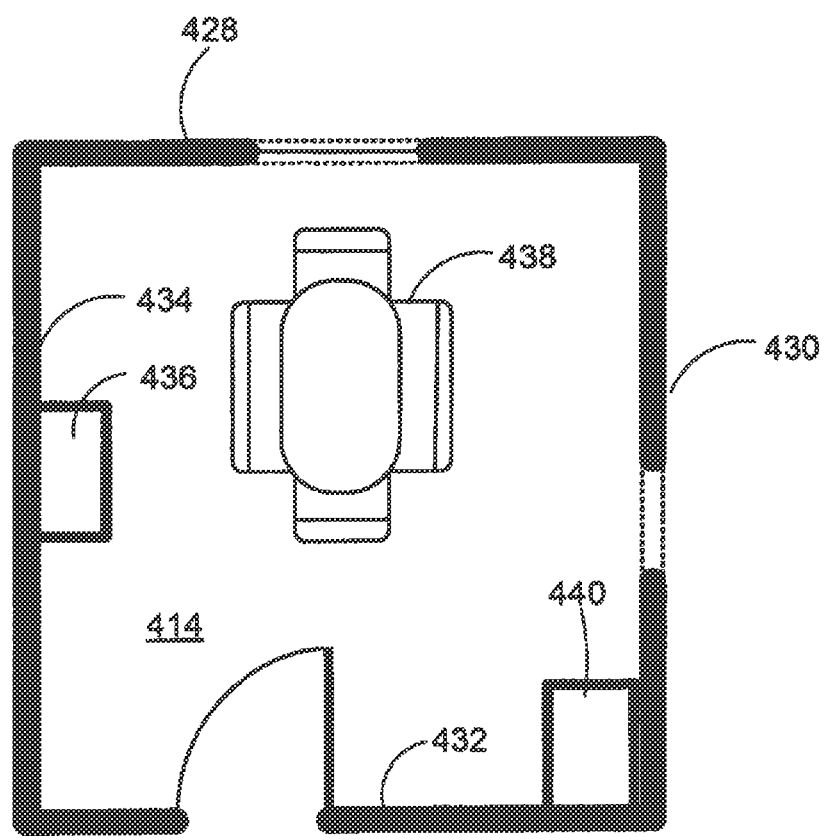
FIG. 32 is a diagram of a room from the floor plan of FIG. 31.

FIGS. 31 and 32 show an example of referencing a single room from other rooms in a floor plan. As shown in FIG. 31 a floor plan 410 includes multiple rooms 412, 414, 416, 418, 420, 422 and 424 that share common walls. A user may desire to view and/or edit a single room from the floor plan. For example, if the user desires to view and/or edit the dining room 414, the user can select the dining room 414 by clicking on the dining room 414 using a computer based selection tool such as a mouse or keyboard. Upon receiving the selection, the home design tool automatically determines that the dining room 414 is defined by walls 428, 430, 432, and 434 and that the dining room includes a table 438, a fireplace 436 and a cabinet 440. The home design tool either generates a dining room separate from the floor plan 410 based on the walls and home design products included in the dining room 414 (e.g., as shown in FIG. 32) or simply references these elements in a separate view. As can be seen in FIG. 32, the separated dining room 414 includes the same walls 428, 430, 432, and 434 and the same table 438, fireplace 436 and cabinet 440 that were included in the entire floor plan 410.

After the user has referenced or separated one room from the other adjoining rooms in a floor plan, the user can edit or change the floor plan for the newly non-adjoined room. The user may edit anything within the room while viewing the room independently except the walls that define boundary of the room and windows, doors and wall openings included in these walls. Walls, windows, doors, and door openings may be added within the room during this view mode. After completing the edits, the user may return to view the entire floor plan and the edits appear within this view as well.

It is believed that referencing and/or separating a floor plan into individual rooms can provide various advantages. For example, by dividing floor plans into rooms within the database included in the home design tool, not only the entire floor plan but now every room generated by each user can be easily explored, searched on, viewed, edited and incorporated into other designs. This allows other users to drag an entire room form another user into their floor plans as a starting point for their own designs. As soon as the user makes any edits to the room design that they incorporated into her design, the system breaks the reference to the original design. In other implementations, the system will break the reference as soon as a user drags another user's room design into his/her floor plan. However, users may be able to select a hyperlink back to the original design to view the original design.

Figure 33:
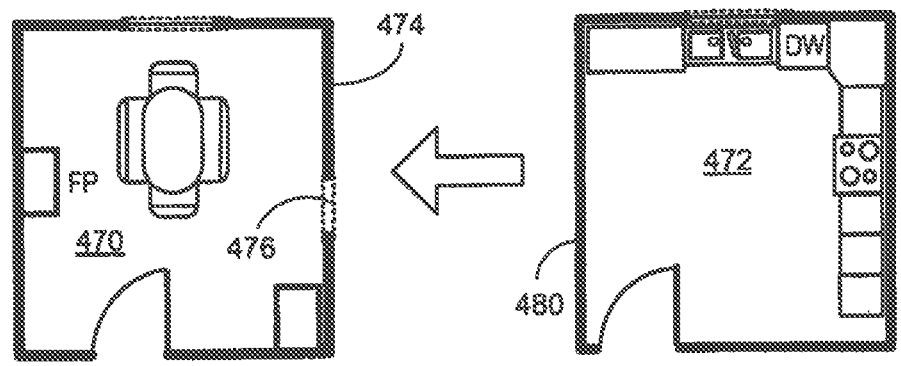
FIG. 33 is a diagram of two rooms.
Figure 34:
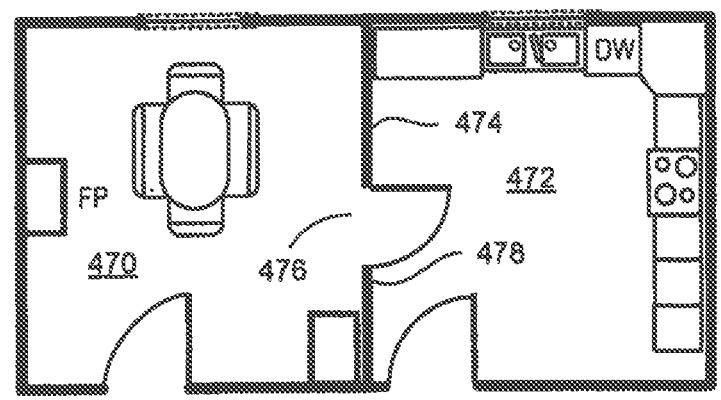
FIG. 34 is a diagram of the two rooms of FIG. 33 after being joined.

In some implementations, a user may desire to combine multiple different rooms from different users or from different floor plans to generate a floor plan that includes multiple adjoined rooms. In order to combine multiple rooms into a unified floor plan, the home design tool includes a system that allows a user to snap together rooms that were submitted from two distinct users (or from the same user) and from two distinct floor plans. A user that already has a room design in the floor plan drawing area can drag a new room into her design. The walls that are parallel to each other will merge and the system will prompt the user to choose which wall openings they wish to delete. Until two rooms are merged, the user can select and move an entire room by clicking on the floor and moving it. For example, as shown in FIGS. 33 and 34, a user might desire to combine a dining room 470 with a kitchen 472. In order to join the two rooms (e.g., the dining room 470 with kitchen 472), the home design tool must determine which walls need to be merged ad and how to merge the walls. For example, the dining room 470 includes a door 476 between the portions 474 and 478 of one of the walls but the kitchen 472 does not include a door on the wall 480 that is to be joined with the wall of the dining room 470. As such, the home design tool determines whether to keep the door 476 when merging the two walls (e.g., as shown in FIG. 34).

Figure 35:
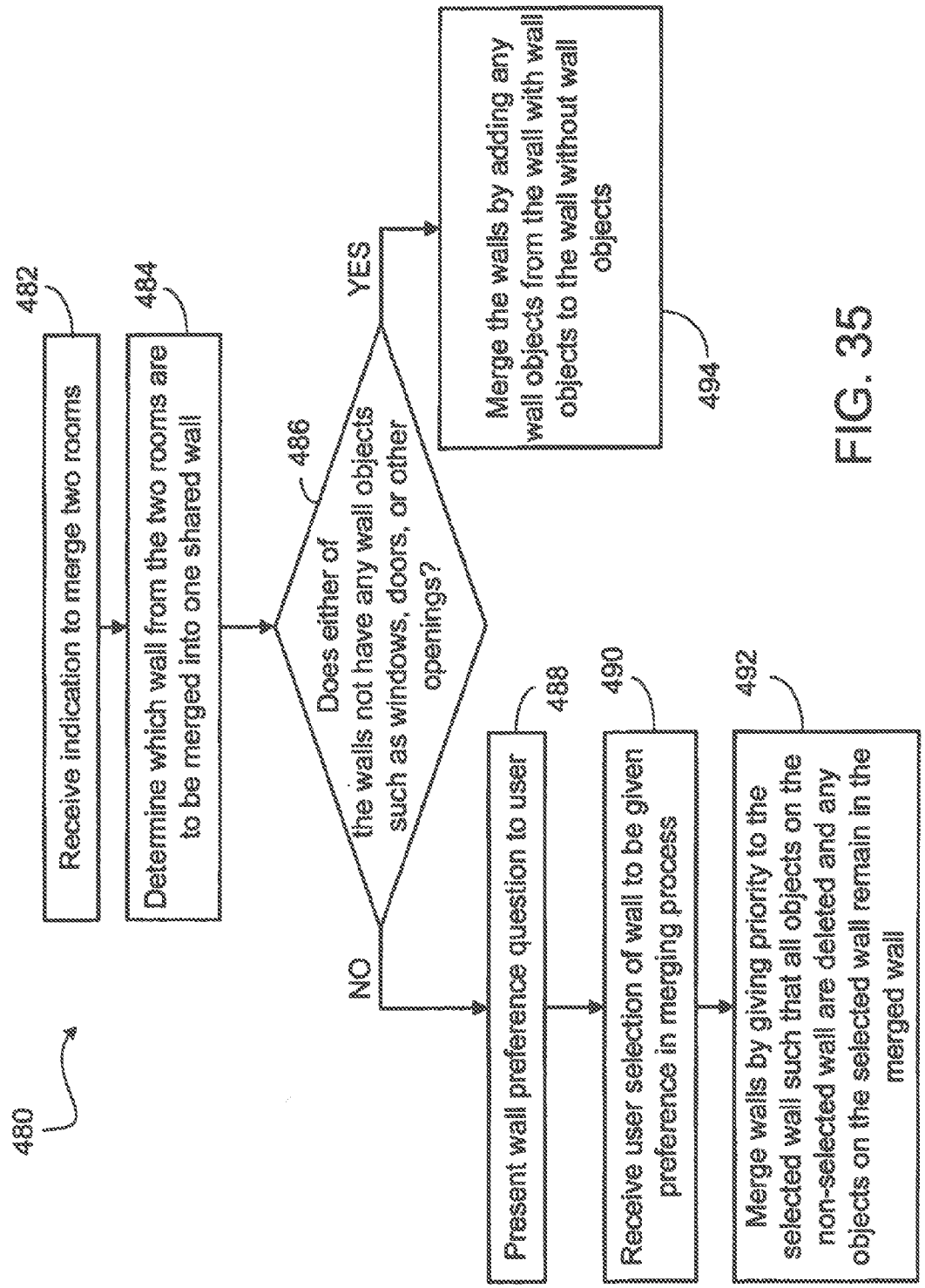
FIG. 35 is a flow chart of a process for joining two rooms.

FIG. 35 shows a process 480 implemented by the home design tool for merging two walls to join two rooms in a floor plan. The home design tool receives an indication from a user to merge two rooms (482). For example, in one implementation, a user can drag one rooms towards another room on a user interface to indicate that the two rooms should be joined in a floor plan. When the home design tool receives an indication to join two rooms, the home design tool determines which walls from the two rooms are to be combined into one shared wall (484). For example, in one implementation, the system can determine that walls that are approximately parallel in the two rooms should be merged when the rooms are joined.

The home design tool determines whether either of the walls that are to be merged when joining the rooms does not have any wall objects such as windows, doors, or other openings (486). If one of the walls does not have any wall objects, the system determines that the other wall (e.g., the wall with wall objects) should be given priority when merging the two walls. Since the wall with wall objects (if any) is given priority, the home design tool merges the walls by adding any wall objects (if any) from the wall with wall objects to the wall without wall objects (494). On the other hand, the home design tool determines that both of the walls have wall objects, the home design tool presents a wall preference question to the user (488). In response to the wall preference question, the home design tool receives a user selection of a wall to be given preference in the wall merging process when joining the two rooms (490). Once the wall merging preference is known, the home design tool merges the walls by giving priority to the selected wall such that wall objects such as doors and windows on the non-selected wall are removed and any wall objects from the selected wall become part of the merged wall in the joined rooms (492).

While in the implementation described above when both walls from two rooms to be joined include wall objects the user selects the wall to be given priority, however other selection methods are possible. For example, the home design tool could assign priority to the room that remains stationary or to the room that was inserted into the floor plan first.

If the walls of the joining walls are different lengths, the system identifies how the user drags the room next to the other room to determine the merging process. For example, if the corner (vertex) of the wall from the new room and the wall from the existing room are within two inches of each other and the walls are parallel to each other, the system will automatically assume the user intended to merge the two corners of the wall and position the new room accordingly without adjusting its size. If the vertices are not within two inches of each other, the system will simply assume that the user wishes to merge the walls and not the vertices. When the user first drags a new room towards another room, they hold the left mouse button down. If they hover a wall from the room they are moving over the wall of a room they wish merge with the system will allow the user to slide the new room along the wall of the existing room. When the left mouse button is released the room position is set. Dimensions may appear during this process to show the offset from the corner of the wall for one room to the corner of the wall for another room. The user can use these dimensions to set the room position. If the user is within two inches of the vertex of the existing room's wall, the new room will slide into place to merge the vertices. A possible feature is to automatically adjust a wall length to of one of the joining walls when the merge occurs. However, this is not one of the most common approaches.

Figure 36A:
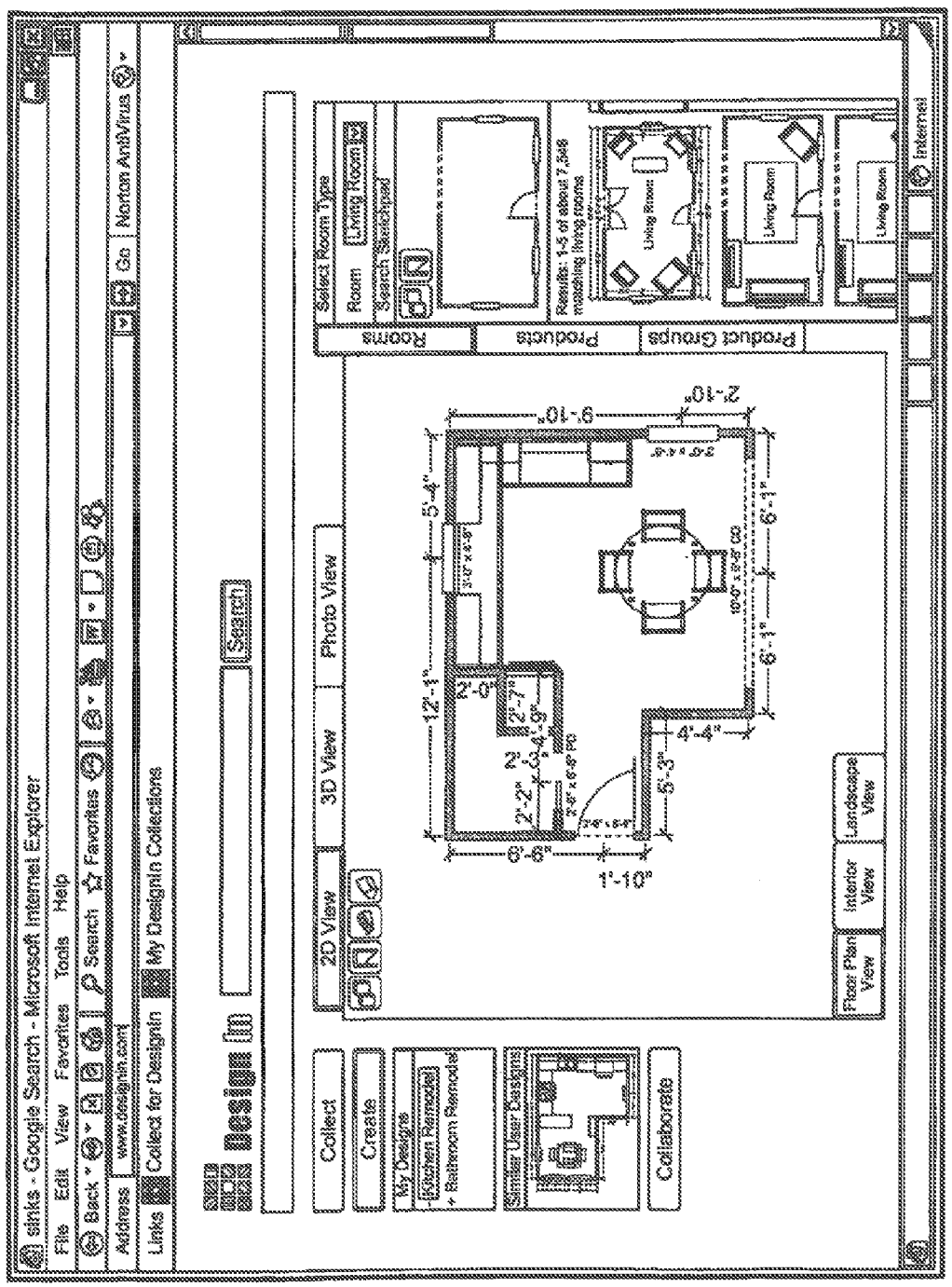
FIGS. 36A-36E show diagrams of floor plans.
Figure 36B:
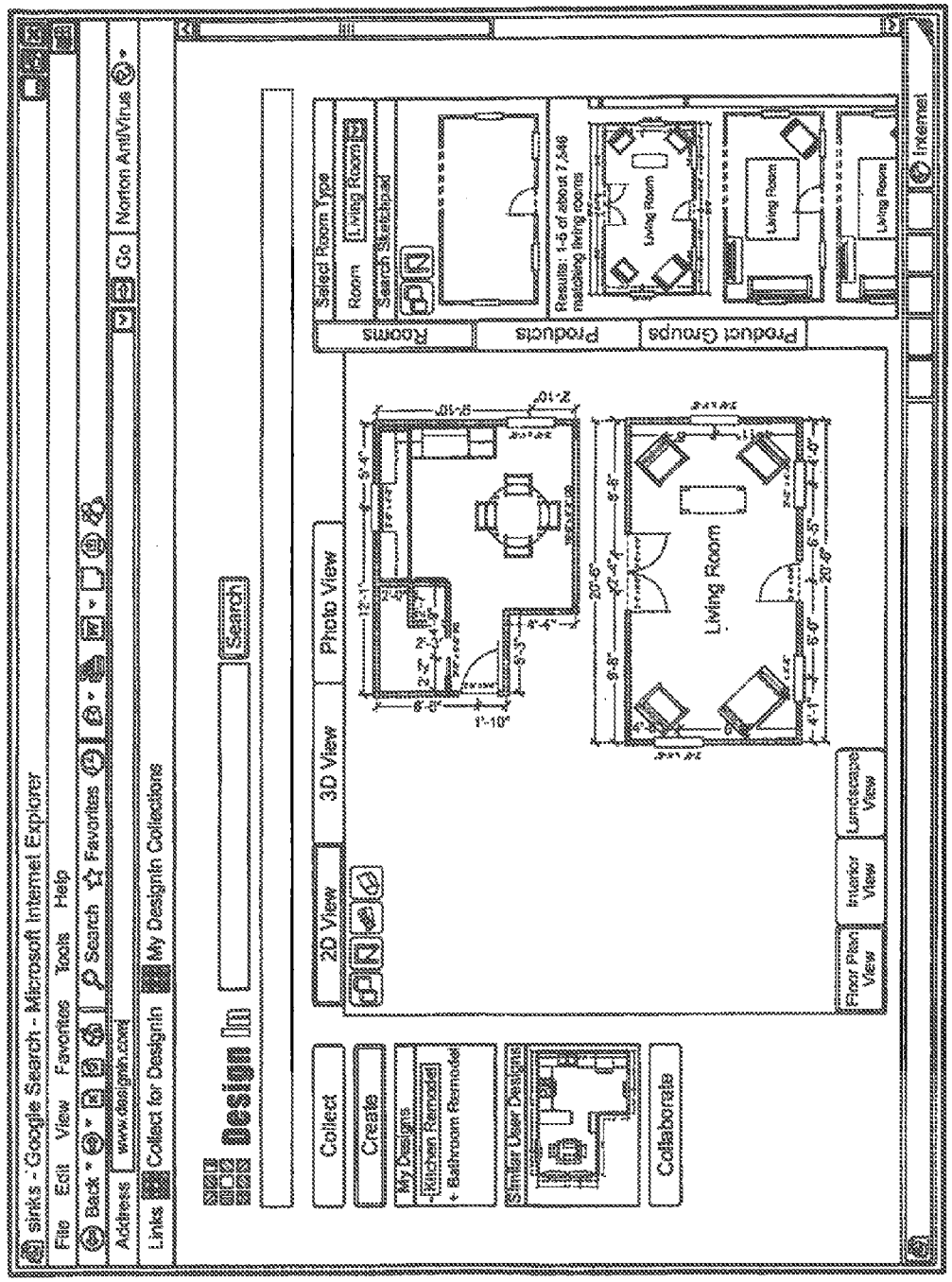
Figure 36C:
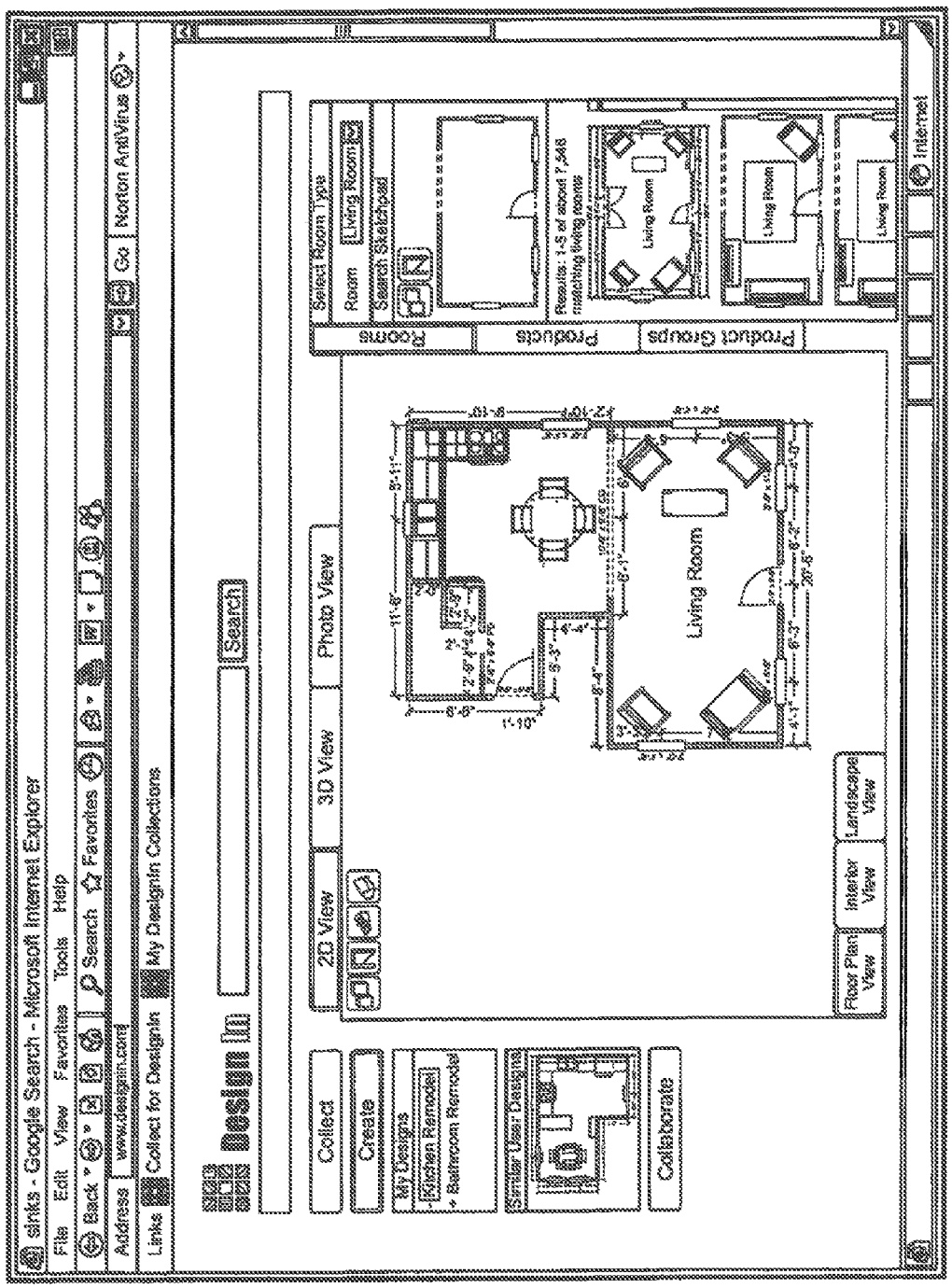
Figure 36D:
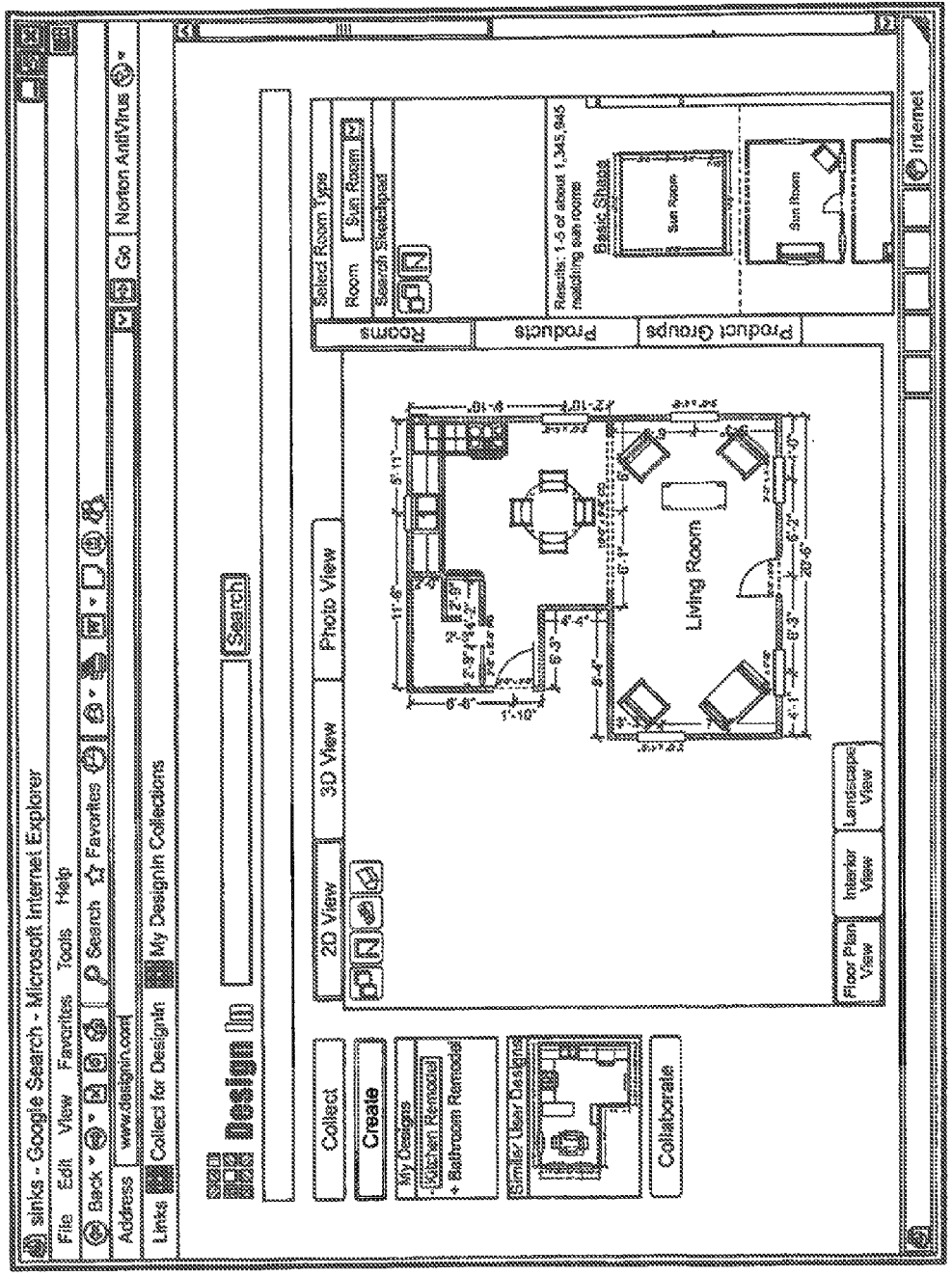
Figure 36E:
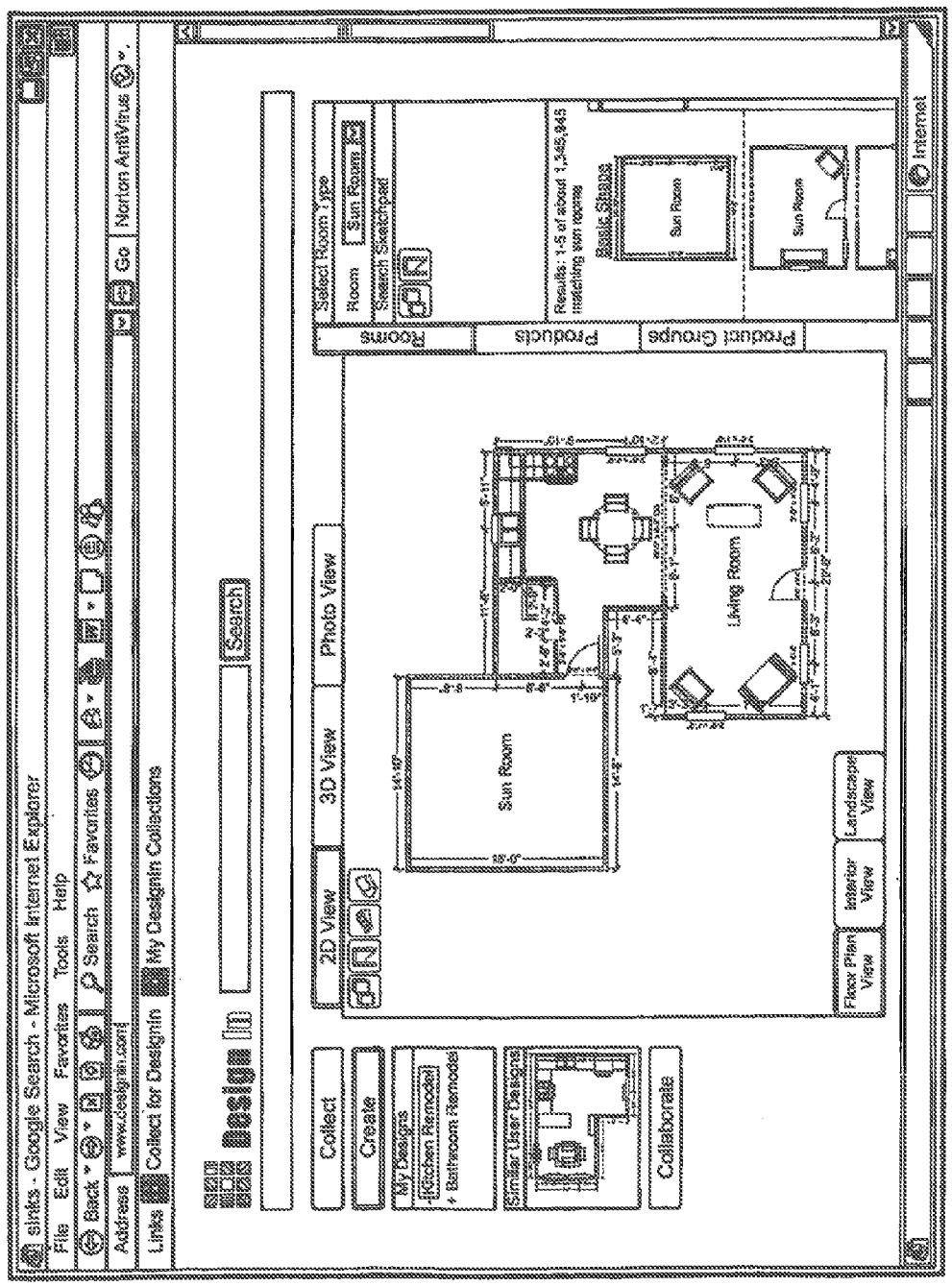

FIGS. 36A-36E show an exemplary use of the joining of distinct rooms to generate a floor plan that includes multiple adjoined rooms. As shown in FIG. 36A, a user has generated a CAD model for a kitchen. The user can select living room as the room type to search for a living room to add to the lay out by using the sketch pad to enter the general shape of the room (e.g., as described above). In response, the home design tool presents the user with various previously created rooms matching the user's criteria (e.g., as shown below the sketchpad). In order to join one of the living rooms presented in the search results, the user selects the design using a mouse or other input tool and drags the room to the desired location in the layout (e.g., as shown in FIG. 36B). When the user drags the rooms together, the home design tool determines how to merge the walls of the rooms to generate adjoined rooms (e.g., as shown in FIG. 36C). The user can then search for additional rooms (e.g., a sunroom as shown in FIG. 36D) and add additional rooms to the layout (e.g., as shown in FIG. 36E).

While in the implementations described above, one wall was given priority over another wall when two walls are merged to join rooms in a floor plan; however other merging processes are possible. For example, a user could select particular wall objects from one or both of the walls to remain in the joined wall. In another implementation, the home design tool could give preference to different types of wall objects and merge the walls according to an assigned preference. For example, the home design tool could give priority to doors over windows or existing room over a new room. Other priorities will be set by which types of objects are included in the design. For example a kitchen design may be given priority over a living room design if the kitchen has objects like wall cabinets included on the merged wall of the design and the living room design has door opening in the same location.

In an implementation, search results or suggestions may be generated and presented to a user. The results presented to a user may include, for example, various types of design layouts, design elements, product images, visual bookmarks of products, or sets or groups of these. In an implementation, a process for generating and presenting search results or suggestions to a user may include building the results, selecting the results, or presenting the results according to a particular priority or ordering scheme, or any combination of building, selecting, and presenting. Results may also be generated and presented to a user independently of a search. Particular search results or suggestions presented to a user may include built results or suggestions together with selected results or suggestions. Any numbers used with regard to, for example, building, selecting, and presenting are intended to serve as non-limiting examples, and other numbers may be used.

In an implementation, results or suggestions such as layouts, product images, or elements (or sets of these), may be built according to, or based on any of a variety of criteria or methodologies, such as design rules; adaptive learning using neural networks that analyze prior user design behavior and selections; keyword associations; input received from a user; sponsorship by an advertiser or system partner; or elements or images previously existing in, or previously selected by a user for, a layout (or set of layouts) or a set of product images (or sets of product images). Results may also be built using subsets or minisets of layouts, product images, or elements. These criteria are not exhaustive and other suitable criteria for selection may be used.

In an implementation, results or suggestions such as layouts, product images, or elements (or sets of these), may be selected from pre-existing or simultaneously built designs, including layouts, product images, or elements (or sets of these) that may have already been built by the system, used, built, or saved by a user or users, or used, built, or saved by or for sponsors of products, elements, or layouts within the designs, or as combinations of these. The results may be selected by drawing from pre-existing designs or by matching up to pre-existing designs. The selection of results or suggestions may include selection of results built simultaneously with the selection. The results may be selected based on any of a variety of criteria or methodologies, such as design rules; level of compliance with design rules; sponsorship by an advertiser or a system partner; keyword associations; input received from a user; popularity of pre-existing designs; degree of use of pre-existing designs; how recently a pre-existing design was used, built or saved; adaptive learning using neural networks that analyze prior user design behavior and selections; architecture, interior design or other design professional associations; or elements or images previously existing in, or previously selected by a user for, a layout (or set of layouts) or a set of product images (or sets of product images). Results may also selected by drawing from, or matching up to, pre-existing subsets or minisets of layouts, product images, or elements. These criteria are not exhaustive and other suitable criteria for selection may be used.

In an implementation, results or suggestions such as layouts, product images, or elements (or sets of these), may be presented according to a particular priority or ordering scheme. The results may be presented in order of any of a variety of criteria or methodologies, including popularity; degree of use; how recently used; or elements or images previously existing in, or previously selected by a user for, a layout (or set of layouts) or a set of product images (or sets of product images), for example. In an implementation, results built by the system may be presented according to any of the criteria used in building the results, and results selected by the system may be presented according to any of the criteria used in selecting the results.

In an implementation, design rules may include interior or architectural design guidelines, recommendations, standards, norms, methodologies, philosophies, or styles, individually or in combination, implemented as design rules in, for example, algorithms of the system. The design rules may be updated from time to time to reflect changes or advancements in, for example, interior and architectural styles. While algorithms may be based on design rules, in some implementations the design rules may be guidelines or considerations rather than strict rules.

Search results or suggestions may be filtered to avoid or reduce redundancy prior to or in conjunction with presentation to a user. In an implementation, redundant individual results may be moved from groups of results prior to or in conjunction with presentation to a user. For example, a first group of results may be selected for presentation to a user. In an implementation, prior to or in conjunction with presentation to a user, any redundant results from the first group may be removed from the first group and removed altogether. In another implementation, prior to or in conjunction with presentation to a user, any redundant results from the first group may be removed from the first group and placed into a second, or another, group of results. Other results may be brought into the first group to replace any removed redundant results, so that the first group ultimately presented to a user contains the same number of results before and after removal of the redundant results. Other techniques that may avoid or reduce redundancy in search results or suggestions made to a user may be used.

Although several examples are shown using a kitchen and associated layouts, elements and products, many other room type driven layouts and designs are possible, including for room types such as dining rooms, bathrooms, living rooms, family rooms, entertainment rooms, dens, and bedrooms, for example. The systems and methods described may be applied to these other room types, and associated layouts, elements, and products.

The term "set of products" or "combination of products" may be used interchangeably with the form in which the products are presented, such as "set of product images." Likewise, the term "product" may generally be used as shorthand for a home design product, or a landscape design product. Generally, a product image may be associated with a corresponding 2D drawing or a 3D model of the product showing in the image, or both. The product image may have associated tags for the product shown in the image. The tags may include certain key or core characteristics for that particular product, such as sizing information. The characteristics may have been scraped from a manufacturer's website either automatically, or in response to a request made by a user of the system. The product sets or product images shown may be integrated directly with a retailer's catalog of products, for example, so that the content and core characteristics may be provided directly from the external retailer's website.

Although search dialogue boxes or text boxes may not be illustrated on each webpage of the home design tool, in an implementation, the user is provided with the opportunity to refine the searching at any point, or at least at numerous points, of the design process.

Figure 37:
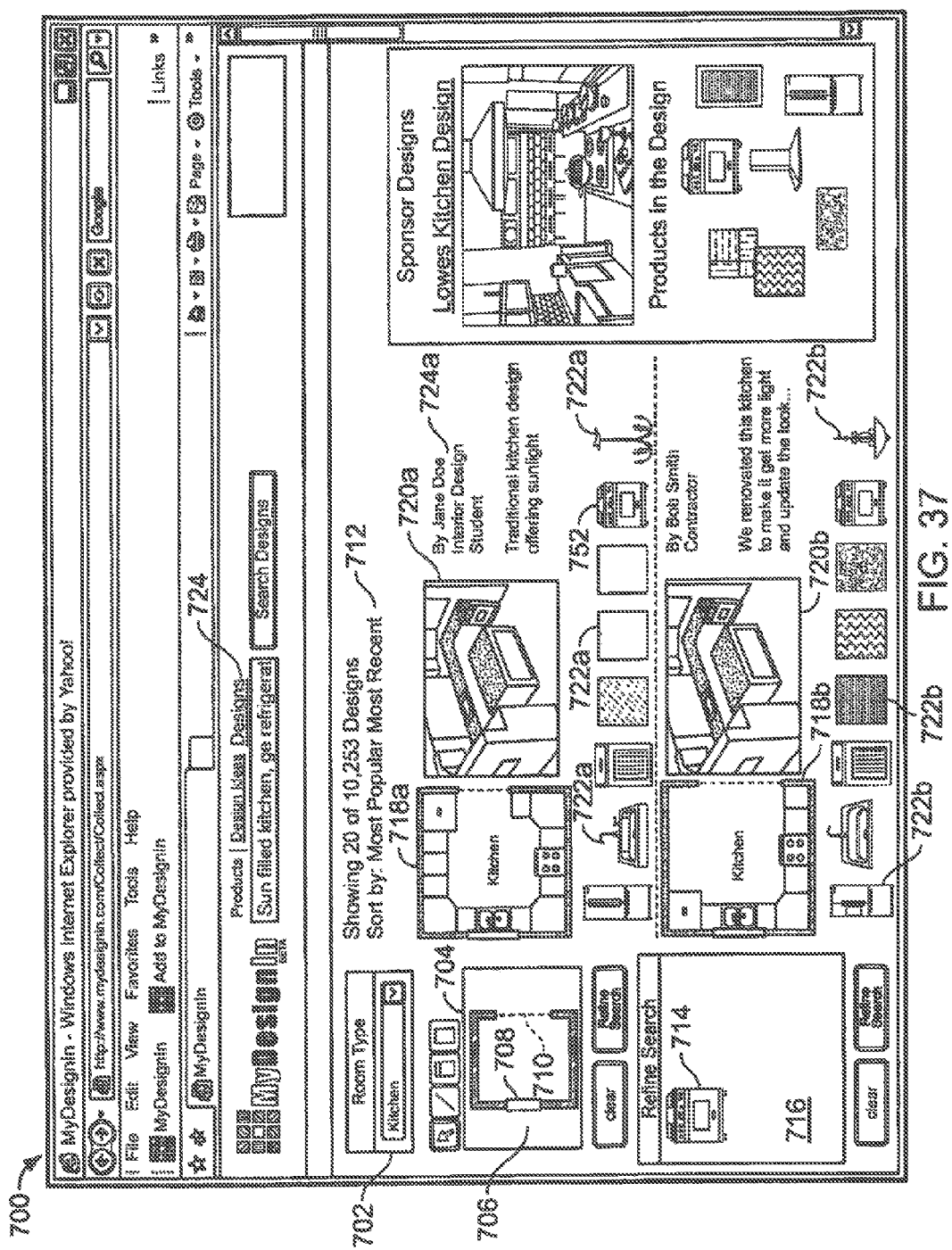
FIGS. 37-59 are diagrams of web interfaces for home design.

FIG. 37 shows a screenshot of a webpage 700 associated with an implementation of the home design tool that shows a design search interface where a user may search for, and select from, pre-existing or system-built designs.

Figure 38:
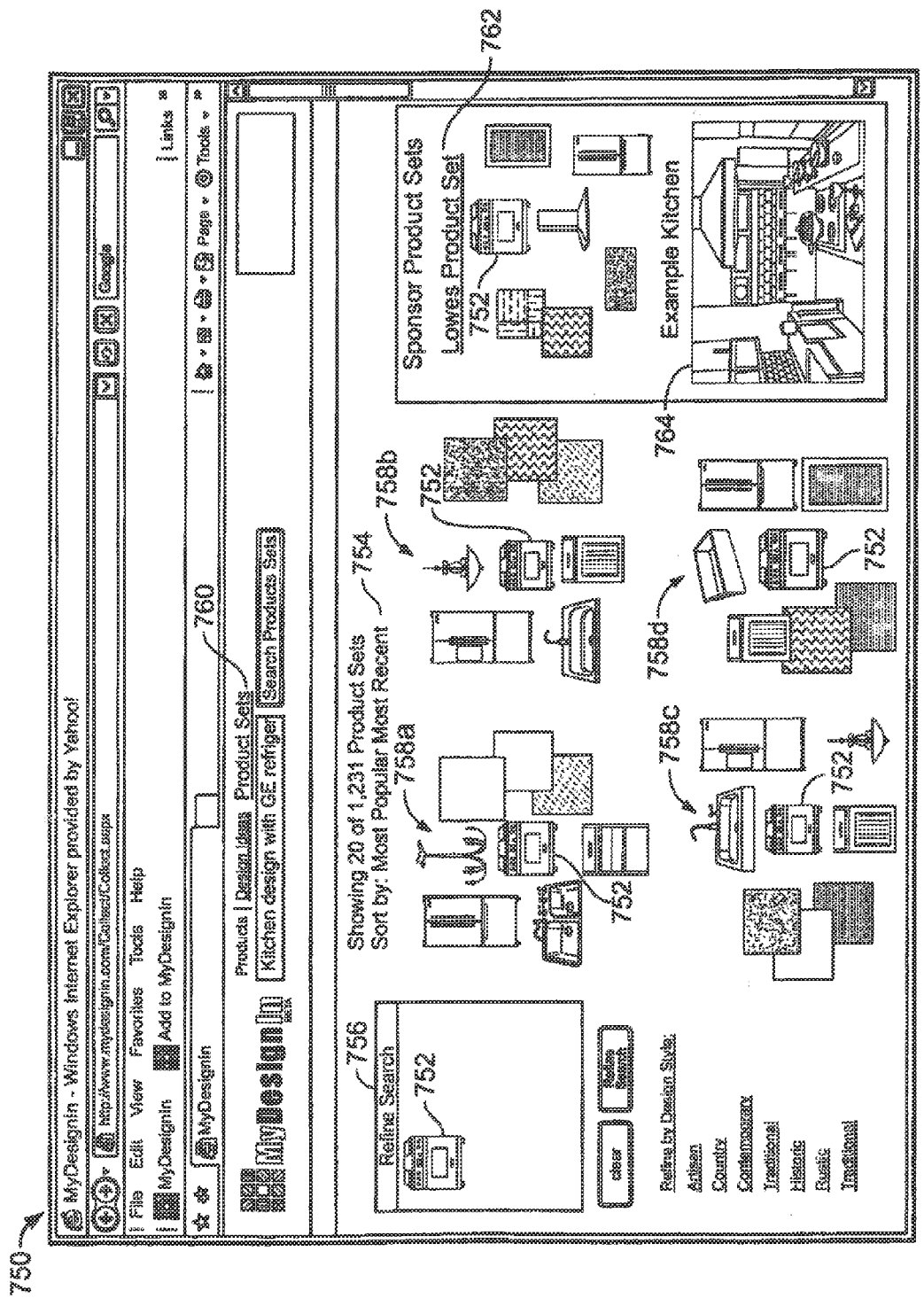

FIG. 38 shows a screenshot of a webpage 750 associated with an implementation of the home design tool that shows a product set search interface where a user may search for, and select from, an array of product sets.

In FIG. 37, a user may search for designs from other users, for example, and may refine her design search in several ways. First the user may refine the room type as, e.g., a "Kitchen" at box 702. A user may also sketch a structural design layout 704 of a room in a sketchpad 706 and define the shape and features of the room by using structural elements such as a window 708 or a door opening 710. In an implementation, a sketch drawn and entered by the user may be used to drive search results and suggestions of collected designs being presented to the user.

In FIG. 37 (and FIG. 38), a user may also drag and drop home design product images such as an image of a stove 714 (752 in FIG. 38) from search results 712 (754) into a refine search box 716 (756). Once a product or products is moved into the refine search box 716 (756), search results may be returned that include results with the product or products included. All of the products returned in various product sets may or may not be an exact match of the product or products moved into the refine search box 716 (756), although in this instance, the sets in the search results 712 (754) shown in FIG. 37 (FIG. 38) all include the stove 714 (752). Products sharing similar characteristics with the product or products may be included in the search results 712 (754), for example, an oven that is stainless steel like the stove 714 (752).

As shown in FIG. 37, a user may enter search terms into a text box 724 near the top of the webpage 700 and may select "Search Designs." In the example shown in FIG. 37, the user entered "Sun filled kitchen, ge refrigerator" and received 10,253 design matches with the first (say) twenty collected designs being shown to the user. The system may separate words or combine words and may compare the received words to a database of design keywords. The word "kitchen" may tell the system that the user wants the room type to be a kitchen. "Sun-filled" may indicate two things. First, it may cause the system to search for structural elements such as windows or doors that have glass in them, or door openings that open into another room, and thus will allow a lot of light into the room. Second, "Sun-filled" might also indicate to the system that the user wants lighter colors in the design. The system may recognize the word "ge" as indicating a brand of products and may assign those products a higher priority in returned search results. The word combination "ge refrigerator" would indicate a specific type of product and a specific brand that may likewise be assigned a higher priority in returned search results.

Generally, keywords may help the system better target search results and suggestions to the user. The system may examine entered words for keywords indicating, for example, (1) the structure of a room or the type of room (e.g., "kitchen"); (2) types of product layouts for a room (e.g., "u-shaped kitchen cabinets," or "l-shaped kitchen cabinets," or "kitchen cabinets with an island"); (3) sets or combination of products (e.g., "sun-filled" may indicate a lighter colored kitchen or brighter room); (4) individual products within the design (e.g., refrigerator); and (5) a match with descriptive text and associated tags about the actual design.

Tags associated with product images or products or with a design may include any information to help identify the product, such as dimensional, color and other information that may have been scraped from the product manufacturer's website, or provided by the manufacturer, as well as user or defined tags that describe the product or that describe a user's design. User defined tags may be assigned higher priority within the system for search results.

As shown in FIG. 37, the search results 712 returned to a user may include product layouts 718a, 718b, 3D design layouts 720a, 720b, and sets of product images 722a, 722b as part of separate collected designs 724a. The system search engine may employ redundancy avoidance or minimization techniques, as described herein, to present more unique and potentially more helpful results to the user. The search results 712 include collected designs 724a, 724b from particular users of the system; however, in other implementations, the design search interface may dynamically build design results or suggestions for presentation to a user, rather than drawing on pre-existing designs. FIG. 37 shows a first design 724*a* by an interior design student Jane Doe who has provided a description of her design "Traditional kitchen design offering sunlight" (thus returned as a result to the text search "Sun filled kitchen, ge refrigerator"). A second design 724*b* is authored by Bob Smith, a contractor who likewise provided a design description for his collected design that also clearly relates to the search terms entered by the user.

As described above, the system may rank designs according to any number of factors. In an implementation, the system takes into account the profession, or occupation, of a users when selecting from pre-existing user designs and prioritizing them for presentation to a user. In an implementation, there may be a hierarchy of professions. An architect may be ranked ahead of an interior designer for some situations, and vice versa. A contractor, may, in turn, be ranked below both an interior designer and an architect, and an interior design student may be ranked below all three for purposes of selecting and prioritization of results, for example.

In an implementation, searches from the design search interface may be ranked or ordered according to popularity ("Most Popular") or how recently used ("Most Recent"). A conflict in popularity, for example, (two potential results having the same popularity) may be resolved by resort to the criteria of the profession of the designer in the professional hierarchy that may be programmed into the system.

Users may also use the design search interface shown in FIG. 37 or the product set search interface in FIG. 38 to bypass various steps in the system. For example, a user could select a certain set of products such as set of products 722*a* in FIG. 37 or a set of products 758*b* in FIG. 38 by selecting an option to use the set of products to create a design. A design wizard may be automatically launched that may prompt the user to choose a room layout in which to create her design. In this way, a user may move more quickly to a 3D design layout that includes the selected product set 722*a* or the product set 758*b*.

A user may also, for example, use the design search interface to bypass the structural design and product layout portions of the system. A user may select the product layout 718*b* by selecting an option to use the product layout to create a design. A design wizard may be automatically launched that may prompt the user to choose from an array of sets of products to insert into the product layout 718*b* to create more quickly a 3D design layout based on the product layout 718*b*.

Referring again to FIG. 38, the product set search interface may illustrate some product set search capabilities of the home design tool. Product set searches may occur in a variety of ways. In an implementation, product set search results 754 may be returned that display product content from 3D designs that other users saved in the system. These pre-existing entire product sets may show all of the products that a user used in a particular 3D design layout. For example, for product set or set of product images 758*a* a user may have saved a 3D design layout that included a refrigerator, a light fixture, a sink, a stove, a kitchen cabinet face and various flooring or wall colors and textures, all shown in product set 758*a*.

In an implementation, the system may dynamically build product sets from individual products or minisets of products based on, for example, products either selected by a user in a previous screen or product(s) that were dragged and dropped by a user into the refine search box 756.

Minisets of products generally may be combinations of one or more products that are grouped together by the system, users of the system, or advertisers or partner external sites. The minisets will generally be smaller than an entire set of products and may be used by the system to dynamically build an entire set of products or a larger miniset of products that includes the miniset, or to influence the building of another miniset or entire set of products. An entire set of products may be generally a set of products that fully defines a 3D design layout for a particular room, or simply a larger set of products that either more fully defines a 3D design layout than the minisets used to build the set, or that is simply larger than the minisets.

In FIG. 38, product set search results or suggestions may be presented to a user in order of, for example, popularity ("Most Popular"), or how recently used ("Most Recent"). For example, six people may have used the product set 758*a* in their 3D design layouts, making that product set the most popular for this particular search. The system search engine for product set search may employ redundancy avoidance or minimization techniques, as described herein, to present more unique and potentially more helpful product set search results or suggestions to the user. The webpage 750 shows a text box 760 where a user may enter text based search terms (here, "Kitchen design with GE refrigerator") and the refine search box 756 where a user may drag and drop products or sets of products to refine search results. The user would select "Search Products Sets" for a text based search and the words entered would be analyzed in similar fashion to that described with reference to FIG. 37, in this case yielding "Kitchen" product sets with "ge refrigerators," for example.

The system, in addition to using descriptive keywords that may have been used by a user to describe her designs (and thus the product sets associated with her designs) to aid users in product set searches, may also consider how such descriptive keywords correlate with selections of the product sets by other users in the system. For example, the user may also have been prompted to assign descriptive keywords to a 3D design layout (that included the products that make up the product set), such as (for style) "Contemporary" or "Modern" or "Traditional" or Historic," and one or more of these descriptive terms may have been applied to the product set. Over time, if these product sets are selected by users who seek that type of design style, for example, the system may learn that the product set is truly "Traditional" or the like.

As described above, in FIG. 38, a user may also drag and drop home design product images such as an image of a stove 752 from search results 754 into a refine search box 756. Once a product or products (e.g., minisets of products) is moved into the refine search box 756, search results may be returned that include results with the product or products included. All of the products returned in various product sets may or may not be an exact match of the product or products moved into the refine search box 756, although in this instance, the sets in the search results 754 shown in FIG. 38 all include the stove 752. Products sharing similar characteristics with the product or products, such as similar finish options, similar look, or similar colors, may be included in the search results 754, for example, an oven that is stainless steel like the stove 752.

In an implementation, these returned product sets may include product sets saved by other users, but product sets may also be dynamically built from the products moved into the refine search box 756. If a user, for example, drags and drops a range (such as range 752), a refrigerator and possibly a dishwasher (themselves all from different product minisets) into the refine search box 756, these products may all be stainless steel and may be from certain brand name manufacturers. However the user, by this combination, has not given the system much information as to her design tastes or inclinations. If the user drag a kitchen cabinet face into the refine search box 756, then the system begins to learn more information about this user's design interests because such a selection may be more specifically correlated to, for example, what kind of style flooring, countertops, paint color for windows, for doors, that the user may want to select. Thus, minisets of products may allow the system to refine with product sets and dynamically built product sets that may be more tailored to the user's interests than pre-existing sets of products stored by the system. Because the user in the example above chose an instance of a kitchen cabinet, or chose a cabinet and a flooring option, the system may intelligently examine the designs of other users and the product combinations used by these users in minisets, to define what other products might make sense in an overall product set—product sets that the system may correlate should work well together.

The right hand side of the webpage 750 of FIG. 38 shows a product set 762 offered by a sponsor or advertiser. A picture 764 (or 3D layout (not shown)) of an example kitchen that incorporates the sponsor's product set 762 is also shown. A sponsor may want to offer an individual product (as part of an entire set of products), miniset of products, or even an entire set of products. Advertisers may bid on minisets of products. For example, an advertiser may bid on a combination of a refrigerator, a stove and a dishwasher. The advertisers may bid against one another for minisets on a cost per click basis. Advertisers may bid on items such as keywords (e.g., "ge refrigerator"), product sets or minisets, or individual product types to meet their particular sales objectives. In the product set 762, for example, the sponsor might have been the highest bidder for the stove 752.

As described above, the product images making up a set of products may have associated tags for the product shown in the image. The tags may include certain key or core characteristics for that particular product, such as sizing information. The characteristics may have been scraped from a manufacturer's website either automatically, or in response to a request made by a user of the system. In an implementation, the product sets or product images shown may be integrated directly with a retailer's catalog of products, using XML (Extensible Markup Language) for example, so that the content and core characteristics may be provided directly from the external retailer's website. In an implementation, a product set search interface similar to that shown on the webpage 760 may also be part of an external partner's website interface (possibly as part of a larger design tool) with, for example, the system's engine operating in the background so that a user may see only the external partner's interface. In an implementation, integrating the system product set search capabilities (alone or as part of an overarching design tool) with a partner's retail catalog of products may allow the system to provide the partner with data about things such as product sets, product combinations, or design layouts from users of the integrated product search system. For example, the system may gather information about how users combine products and choose to apply those products to design layouts that may be valuable to external partners.

Figure 43:
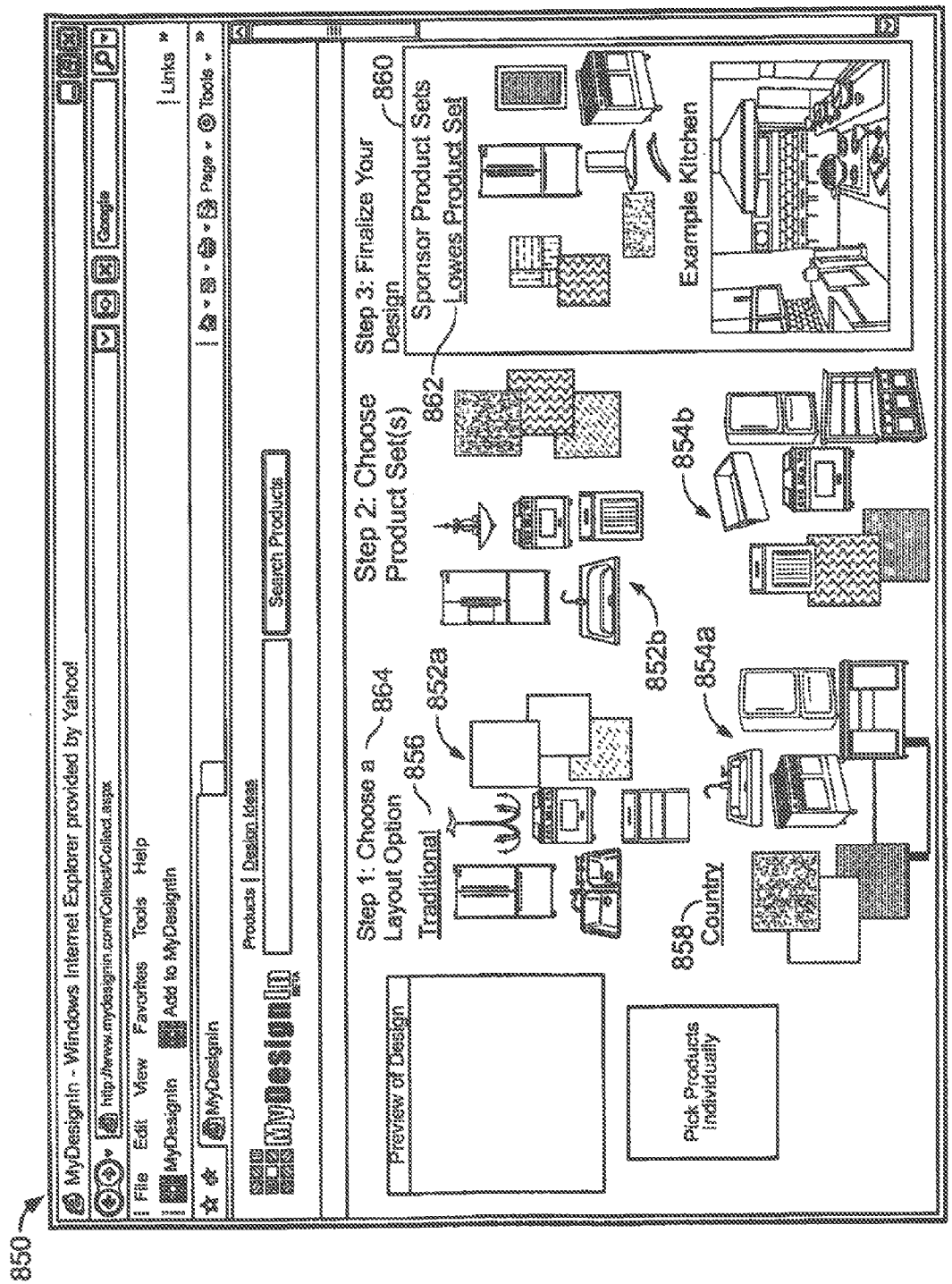
Figure 44:
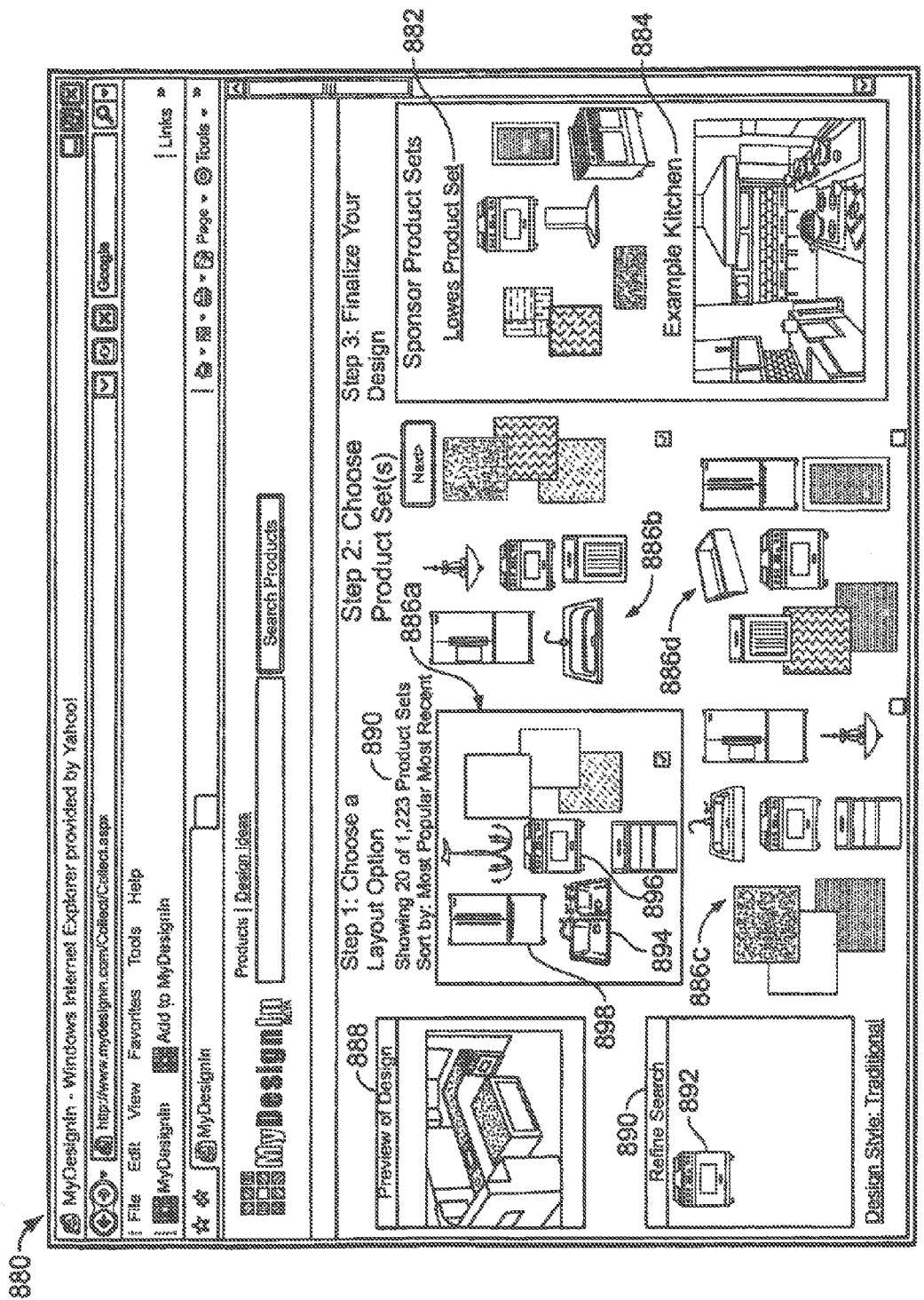
Figure 45:
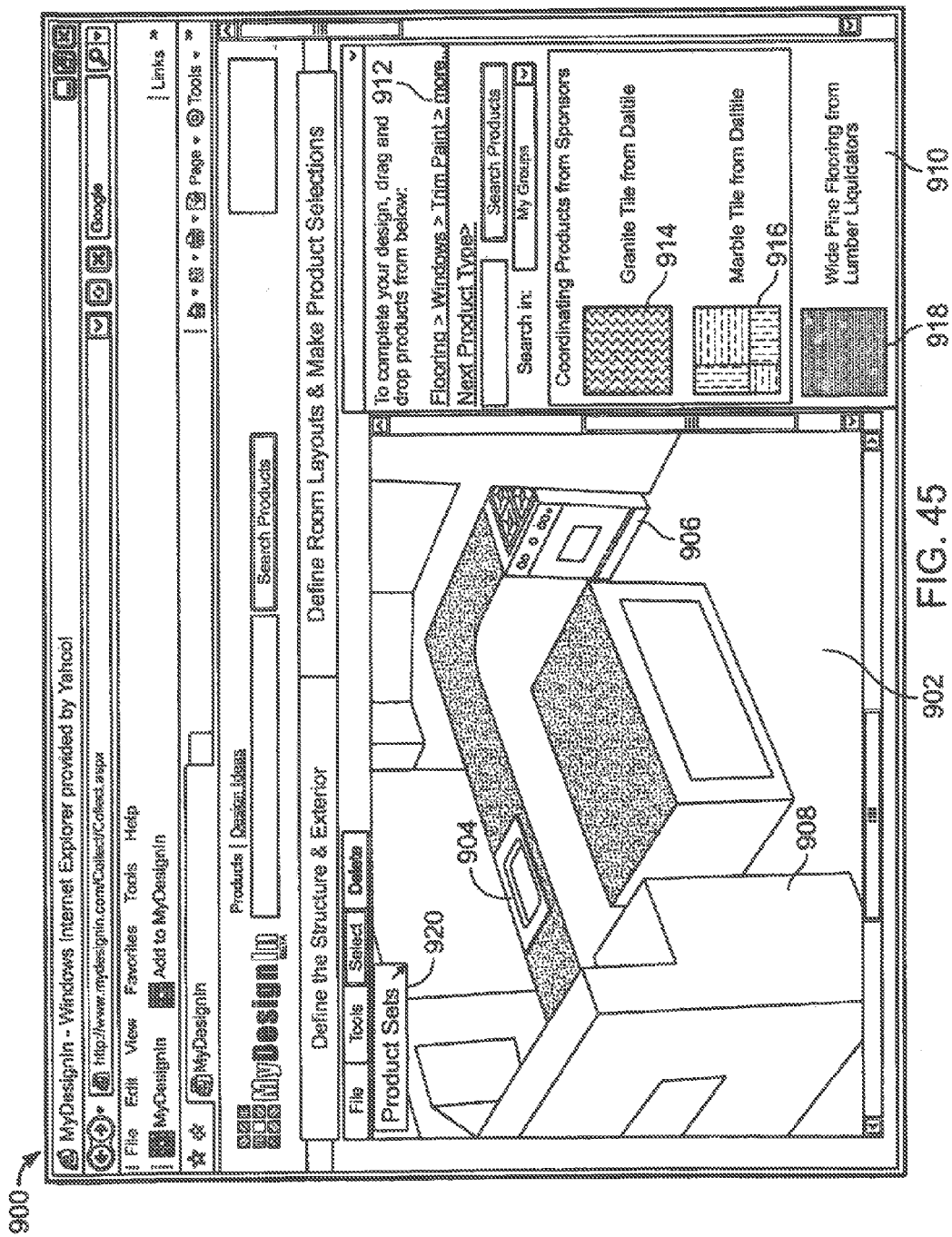
Figure 46:
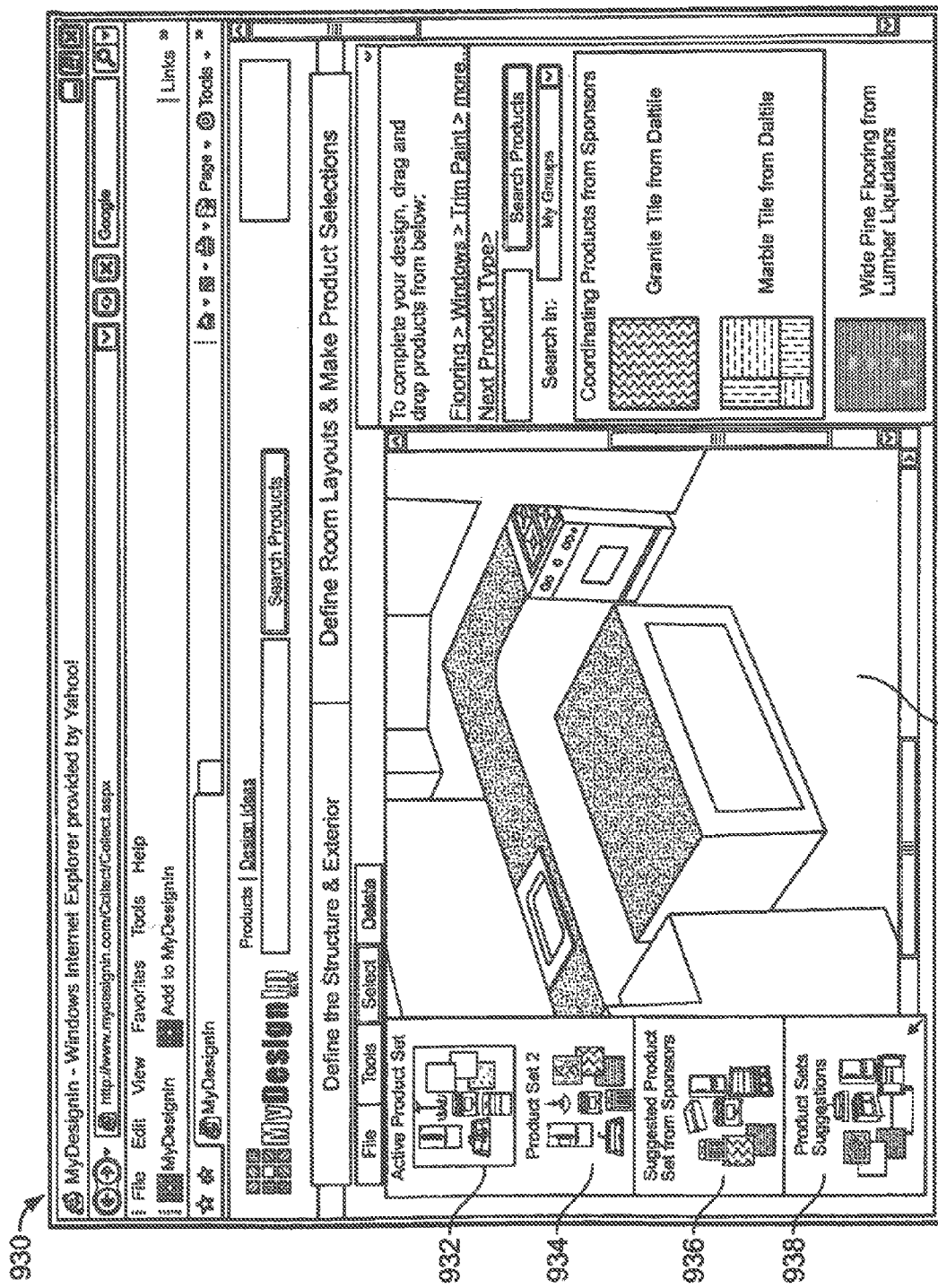
Figure 47:
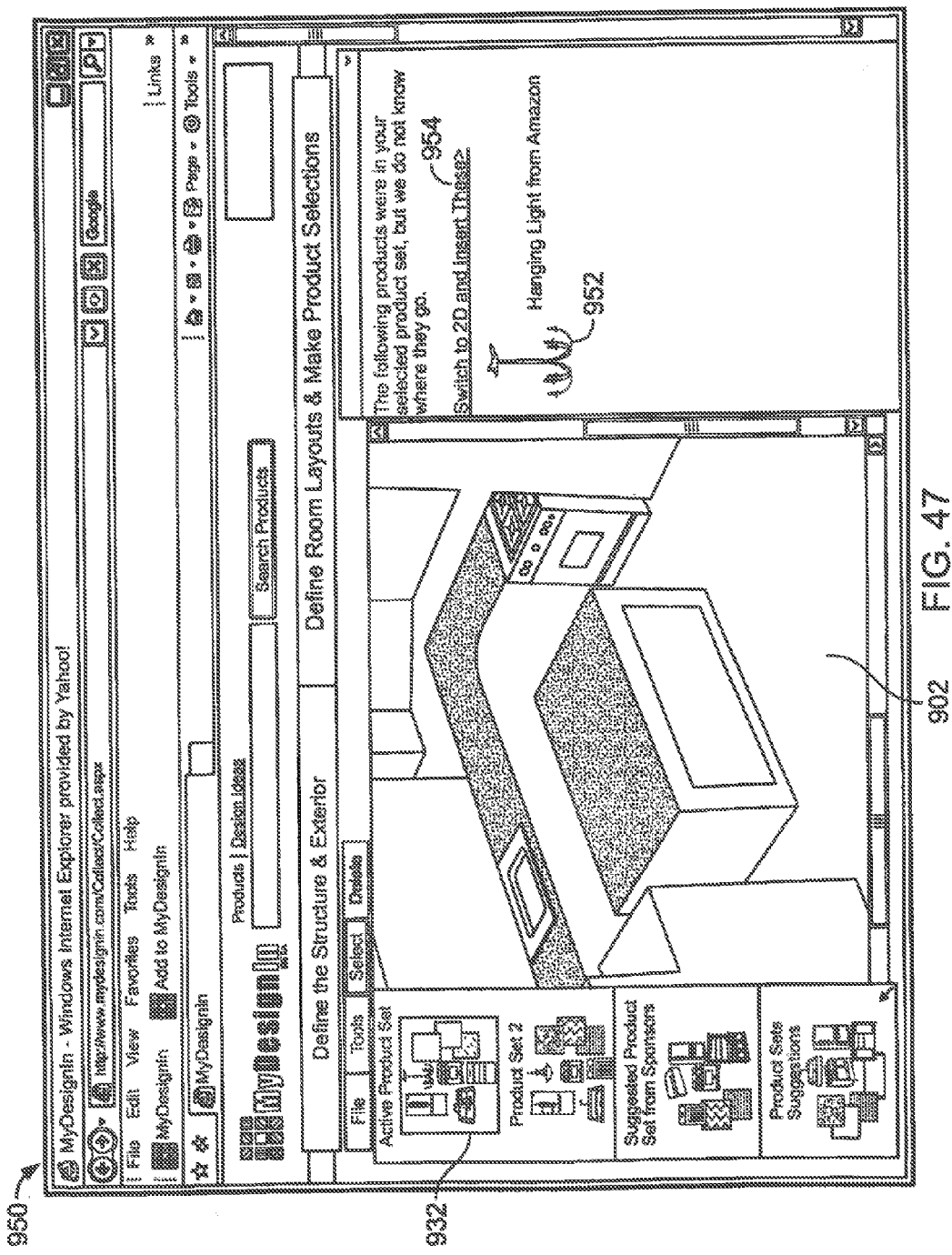

FIGS. 39-47 show screenshots of webpages following a user's progression through a design process. The design process takes the user in broad terms from expressing design goals (FIGS. 39 and 40); to being presented with product layout results or suggestions and choosing a product layout (FIGS. 41 and 42); to being presented with product set results or suggestions and choosing a product set to apply to the product layout (FIGS. 43 and 44); and to viewing a 3D design layout with the product sets included and being presented with complementary product results or suggestions to choose from to add to the 3D design layout (FIGS. 45-47).

In implementations of the design process shown in FIGS. 39-47, at various stages the system search engine may employ redundancy avoidance or minimization techniques, as described herein, to present more unique and potentially more helpful results to the user. The search results or suggestions may include layouts, elements, or products, from particular users of the system; however, in other implementations, the design search interface may dynamically build design results or suggestions (based on, for example, design rules) for presentation to a user, rather than drawing on pre-existing designs. A variety of criteria may be considered in building, selecting or presenting results or suggestions in a particular order.

Figure 39:
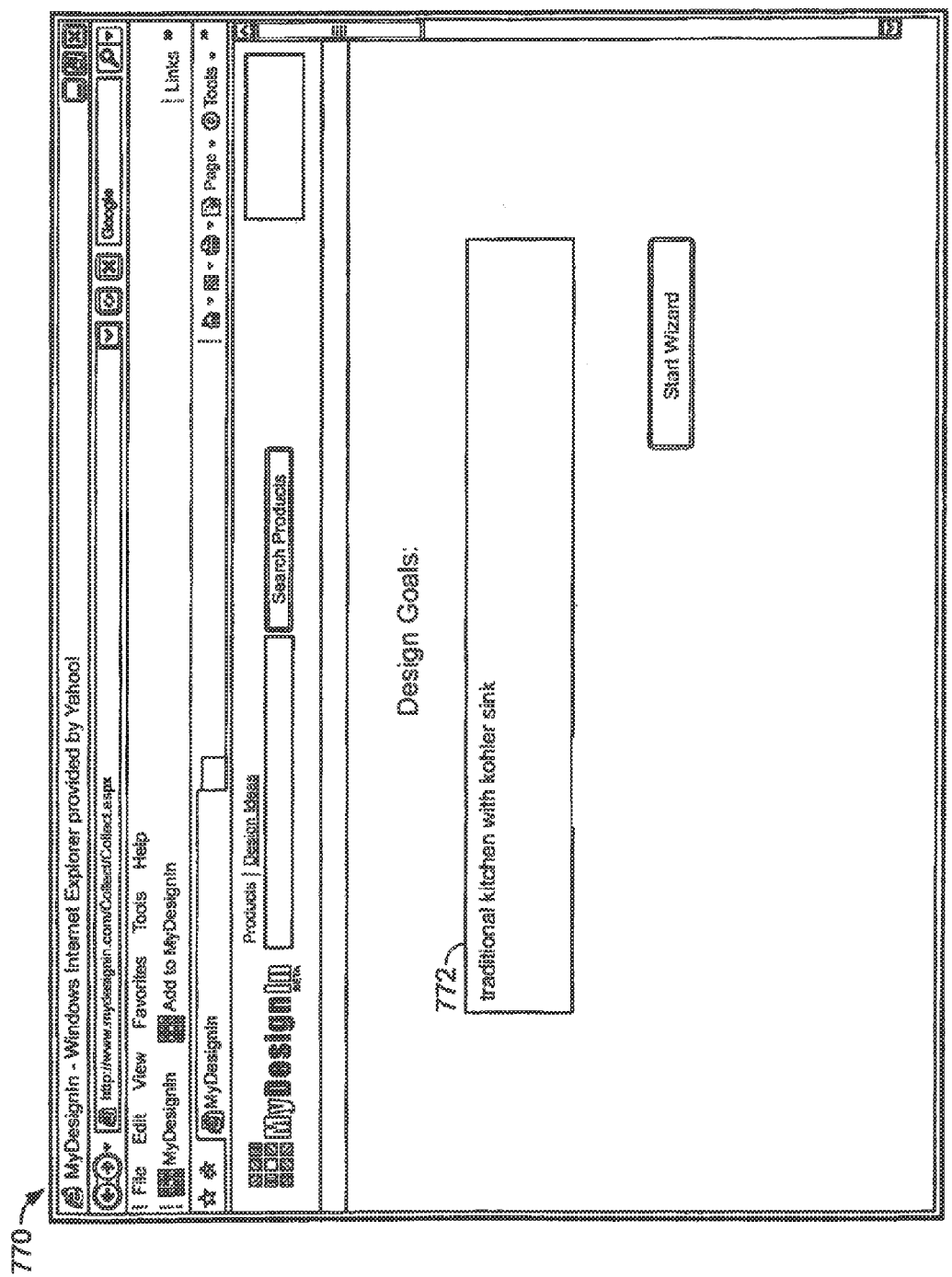
Figure 40:
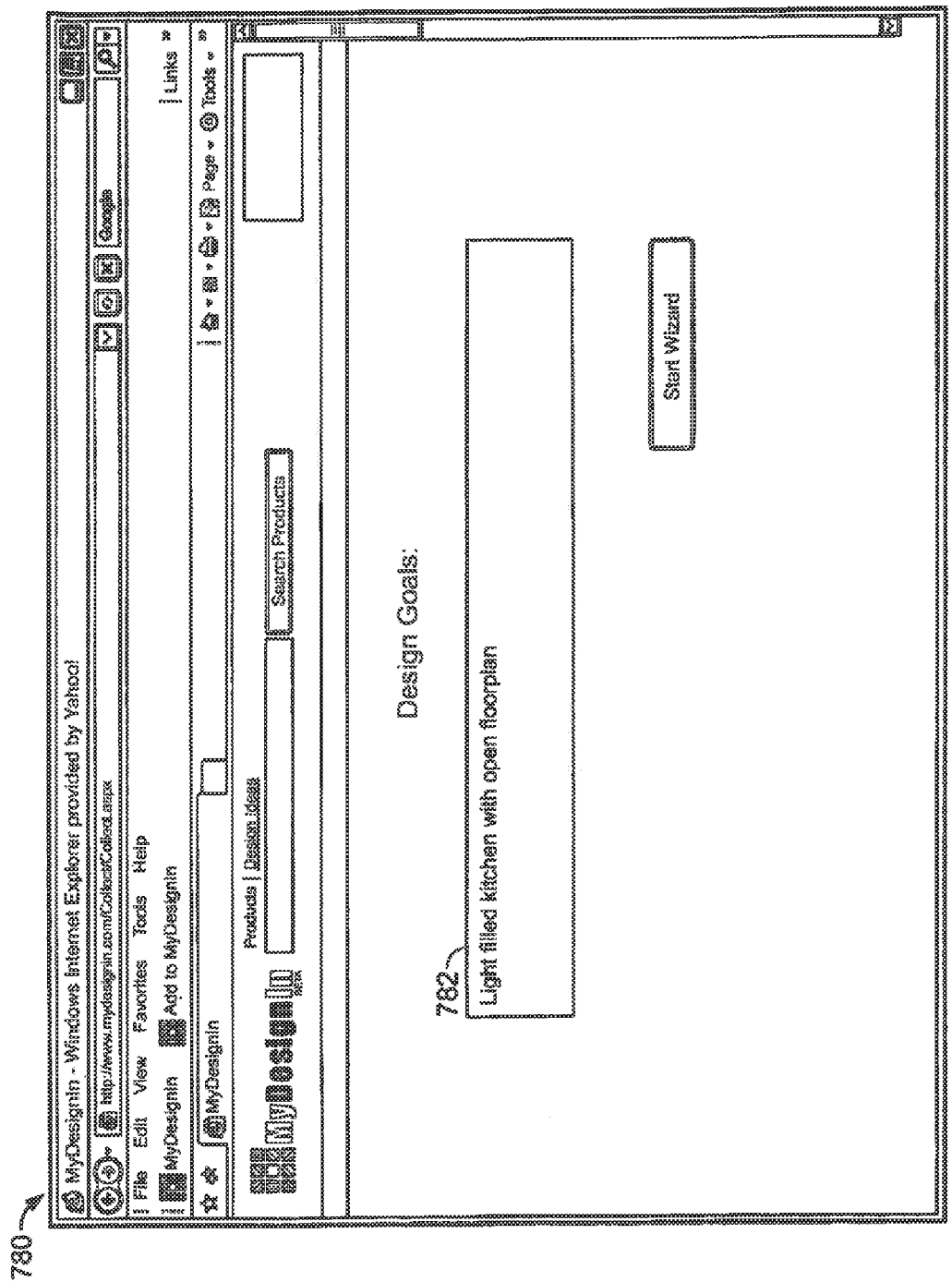

FIGS. 39 and 40 show screenshots of webpages 770, 780 that have text boxes 772, 782 where a user may enter design search terms that may be indicative of the user's goals for a particular design. A user may have selected an option to "start a new project" (not shown) to have been provided with the webpages 770, 780. The user may click on "Start Wizard" to begin the design process. As described above with reference to the system processing words from the text box 724 of the design search interface of FIG. 37, in an implementation, the system may separate words or combine words and may compare the received words to a database of design keywords. Generally, keywords may help the system better target search results and suggestions to the user. The system may examine entered words for keywords indicating, for example, (1) the structure of a room or the type of room (e.g., "kitchen," or where "open-floor plan" (see FIG. 40) may indicate wide door openings); (2) types of product layouts for a room (e.g., "u-shaped kitchen cabinets," or "l-shaped kitchen cabinets," or "kitchen cabinets with an island"); (3) sets or combination of products (e.g., "sun-filled" may indicate a lighter colored kitchen or brighter room); (4) individual products within the design (e.g., refrigerator); and (5) a match with descriptive text and associated tags about the actual design.

In an implementation, the system may employ algorithms that may be performed in response to search terms entered that may cause the system to target search results and suggestions to the user throughout several steps of a design process. That is, a user who enters very specific design search terms may be taken toward a final design in several steps, rather than be provided with a very specific set of layouts or product sets to choose from. In an implementation, the entered search terms may define what happens at various stages of the design process, not just immediately.

For example, if in the design goals, the user had used the word "beachhouse," the home design tool may not necessarily present the user with only "beachhouses." Rather, the user may still be prompted to define structures such as rooms, but if the design progressed to a stage at which the user defined a house (e.g., in an exterior model), the entered words (including "beachhouse") may guide the user and the search results and suggestions presented to the user in that direction. That is, the choices that would be suggested to a user may be guided by the words that the user initially entered several pages back in "Design Goals."

Figure 41:
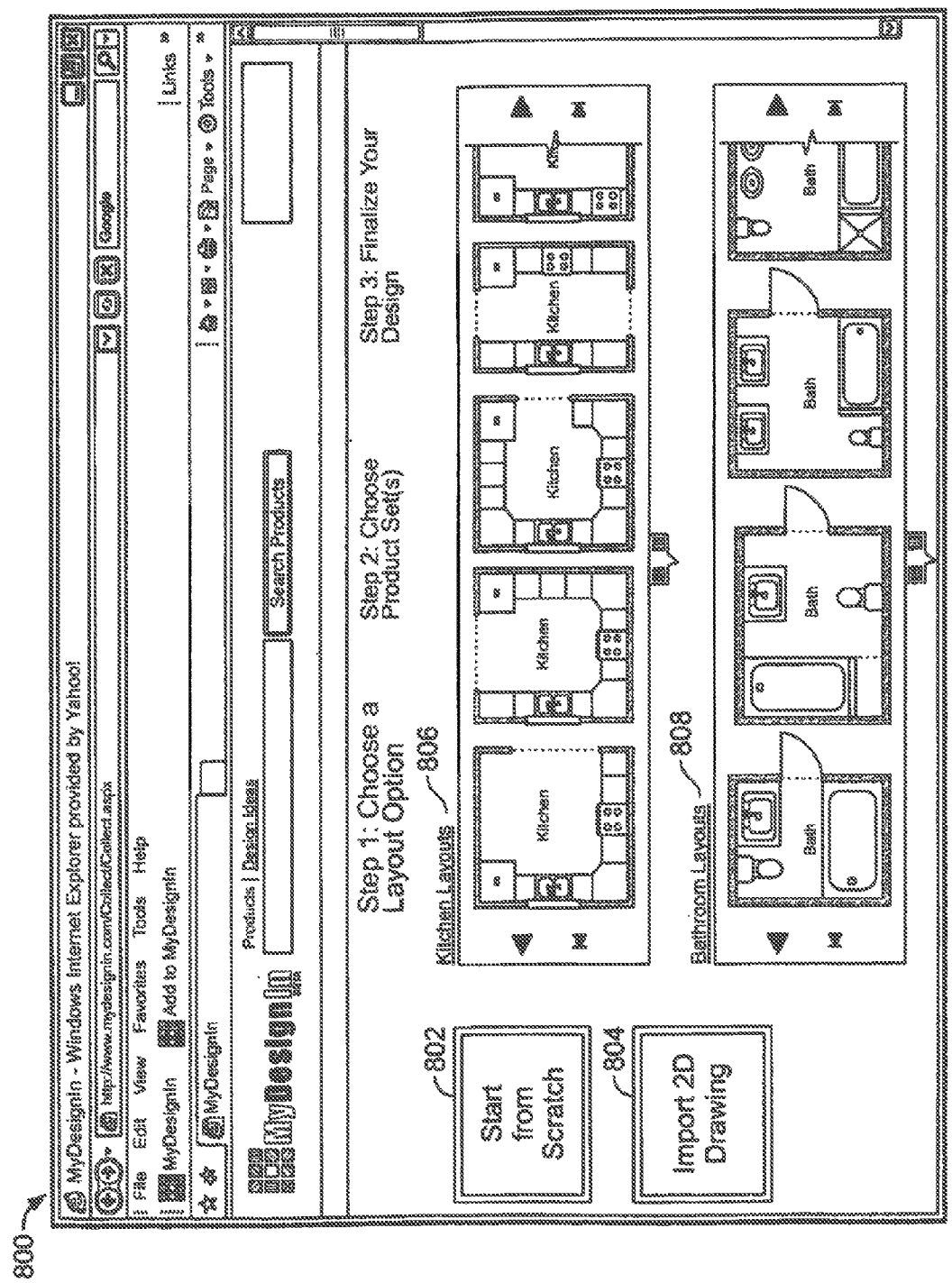

FIG. 41 shows a screenshot of a webpage 800 provided to a user following, for example, entry of the user's design goals at either, e.g., FIG. 39 or 40. In FIG. 41, results or suggestions of product layouts, that is, structural design layouts that have been populated with elements such as product elements, are presented to a user based on, and in order of, popularity, or how recently used, for example. The search results may include product layouts from particular users of the system; however, in other implementations, the design search interface may dynamically build design results or suggestions (based on, for example, design rules) for presentation to a user, rather than drawing on pre-existing designs. A variety of criteria may be considered in building, selecting or presenting results or suggestions in a particular order. For example, the product layout presented may have been built or selected based in part on input from the user in a prior screen, such as the design goals webpages 770, 780.

Figure 48:
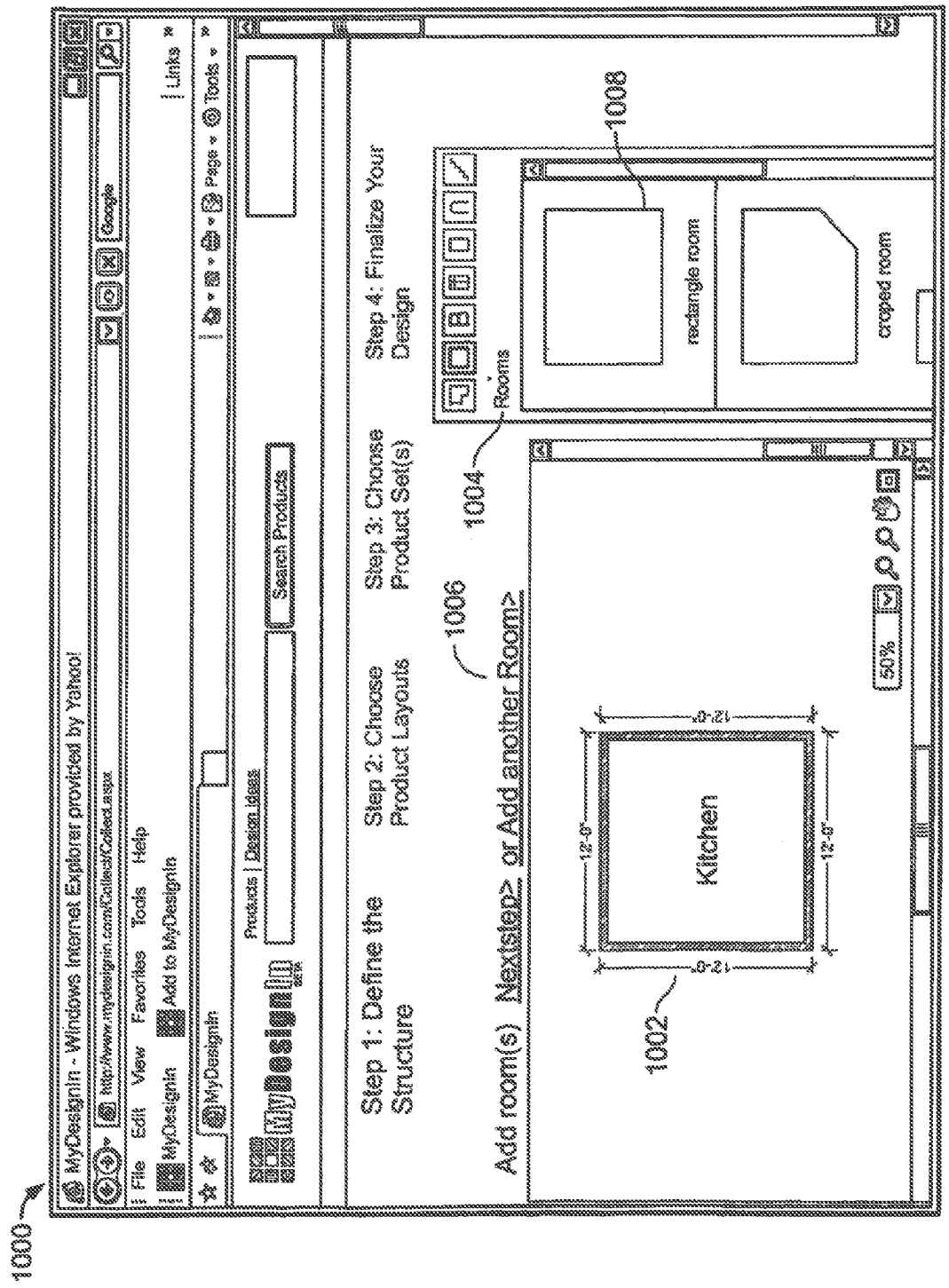
Figure 49:
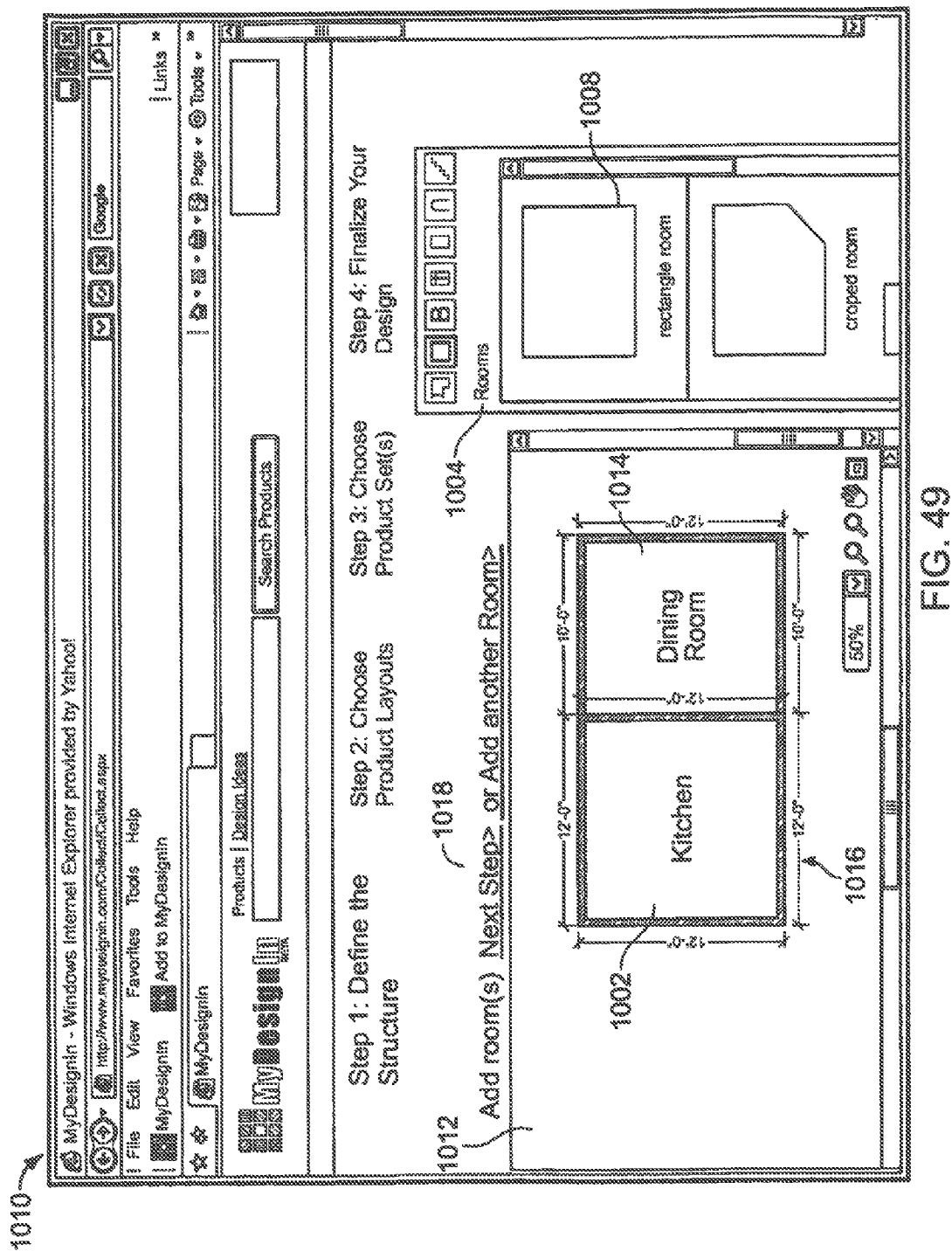

FIG. 41 provides a "Start from Scratch" option 802 to begin the design at a more basic structural level (see discussion of figures beginning at FIG. 48), as well as an "Import 2D drawing" option 804. A user may be given the option of importing a JPEG image, GIF file, or other graphic file that shows a room design or other structural layout, and the user may be allowed to draw or sketch room layout on top of the 2D drawing to begin the design process.

In FIG. 41, beginning the "Step 1: Choose a Layout Option" portion of an implementation of a design process, a set of kitchen product layouts 806 and a set of bathroom layouts 808 may be presented to the user. The user may choose which room to focus on by selecting either of these options, and here may select "Kitchen Layouts," sending the user to the webpage 810 in FIG. 42.

Figure 42:
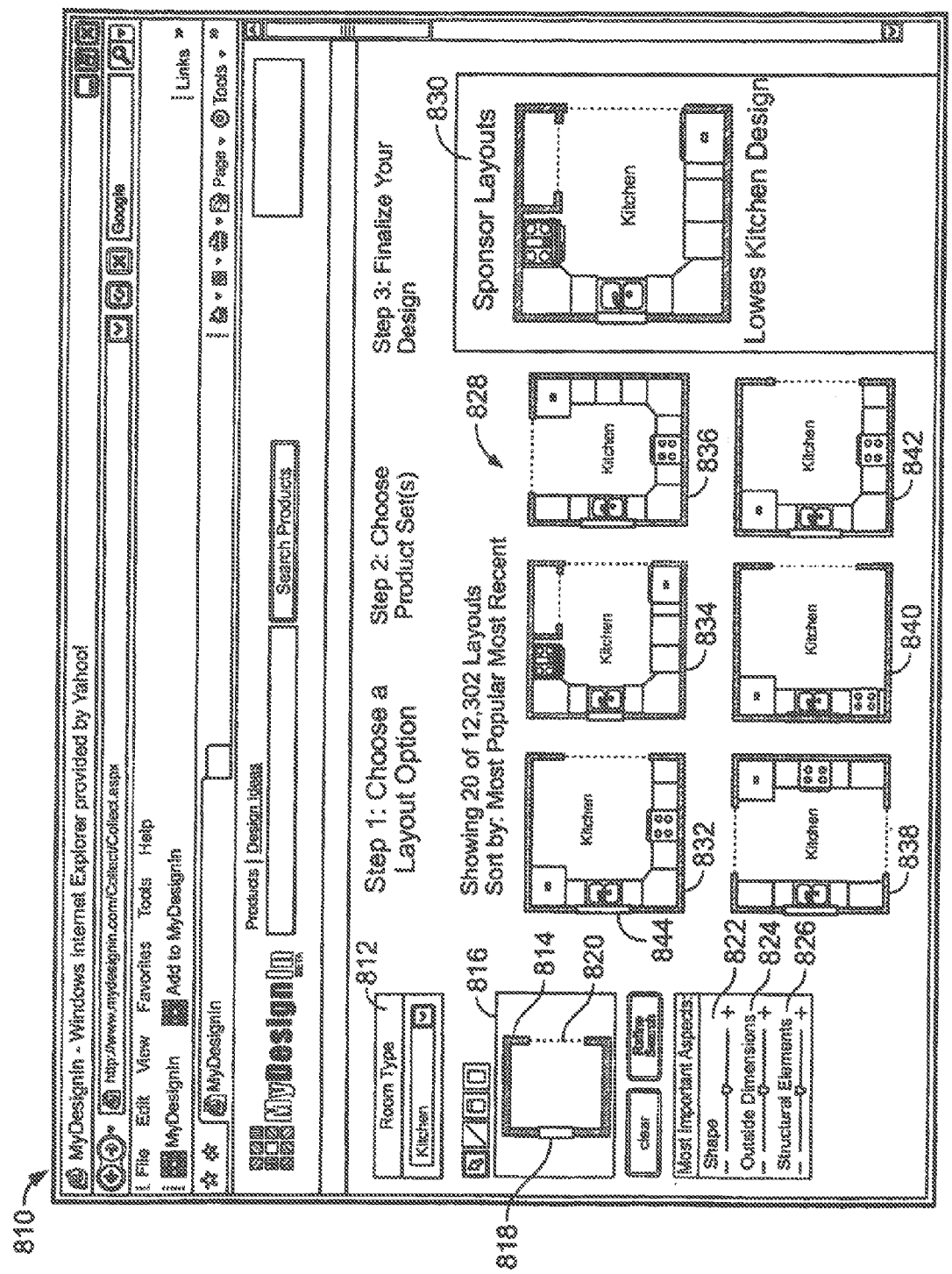

In FIG. 42, a screenshot of the webpage 810 shows a product layout search interface portion of an implementation of the design process for FIGS. 39-47, where the user may search for, and select from, sets of 2D drawings of product layouts.

From the selection made on the previous screen, the room type is "Kitchen" at box 812. The user may have several options at the webpage 810. A user may sketch a structural design layout 814 of a room in a sketchpad 816 and may define the shape and features of the room by using structural elements such as a window 818 or a door opening 820. In an implementation, a sketch drawn and entered by the user may be used to drive search results and suggestions of 2D drawings of product layouts being presented to the user. In an implementation, if a user sketches a structural design layout 814, the system will return the most popular product design layouts that have designs that match, or are very similar to, the requirements of the structural design layout 814. The system may draw on preexisting user or sponsor product layouts or may dynamically build product layouts that meet, or come close to meeting, the structural design layout requirements made by the user in the sketch 814. The user may, using the sliding scales corresponding to "Shape" 822, "Outside Dimensions" 824, and "Structural Elements" 826, affect the search results by defining the relative importance of the three criteria, shape, outside dimensions and structural elements. For example, while the search algorithm may emphasize the shape of the room above the other criteria, by moving the Structural Elements" scale 826 to "+", the user may cause the system to provide search results that match, or come close to matching, the structural elements 818, 820 within the sketch/structural design layout 814. In an implementation, by default, the system may return a group of the most popular results 828 that match or are close to matching the sketch 814, but may also present the results in order of the most recently used. The system may also present sponsored product layouts 830 that match, or come close to matching, the sketched layout. In an implementation, the system may have the capability to dynamically change product layouts (sponsored or user designs) to reflect dimensional changes made by the user to the room 814 in the sketchpad 816.

If a user does not use the sketchpad 816, the "Most Important Aspects" search criteria 822, 824, 826 may be grayed out and the user may be presented with a group of product layouts 828. In an implementation, by default, the suggestions for product layouts may be drawn from the most popular product layouts, and the returned group of product layouts may be ordered according to popularity. In other implementations, the system may select and order product layouts based on criteria such as how recently used. Other selection criteria may be used instead of or in addition to these criteria.

In an implementation product layout results or suggestions may also be dynamically built by the system to, e.g., reflect user input such as that entered in the "Design Goals" text boxes 772, 774 of FIGS. 39 and 40, or to, for example, comply with design rules implemented in the system.

To generate the search results as shown in FIG. 42, the system search engine may employ redundancy avoidance or minimization techniques, as described herein, to present more unique and potentially more helpful product layout results to the user. Specifically, search results or suggestions may be filtered to avoid or reduce redundancy prior to or in conjunction with presentation to a user. In an implementation, redundant product layouts may be moved from groups of results prior to presentation to a user. For example, a first group of (say) twenty product layouts results may be selected for presentation to a user based on popularity. In an implementation, prior to presentation to a user, any redundant product layout results (e.g., the less popular redundant results) from the first group may be removed from the first group of twenty and removed altogether. In another implementation, prior to presentation to a user, any redundant results (e.g., the less popular redundant results) from the first group of twenty may be removed from the first group and placed into a second, or another, group of results. Other results may be brought in to the first group of twenty to replace any removed redundant results so that the first group ultimately presented to a user (e.g., group of product layouts 828 in FIG. 42) contains the same number of results before and after removal of the redundant results. Other techniques that may avoid or reduce redundancy in search results or suggestions made to a user may be used.

In moving redundancies from a group of results, the emphasis on what redundancies to consider may vary depending on the particular part of the design process. For product layout suggestions, for example, the emphasis may be more on avoiding or limiting redundancies in product layout characteristics, so that a user may be presented with different design options such as differently shaped kitchen cabinet arrangements or sinks, refrigerators or ranges being placed in different parts of the kitchen, rather than the same basic group of designs (e.g., kitchen product layouts that all have "l-shaped" kitchen cabinet layouts. For product layout suggestions, structural element redundancies may be less important. An example of this may be seen in the group of suggested product layouts 828 and the sponsored product layout 830 shown in FIG. 42. Each kitchen product layout 832, 834, 836, 838, 840, 842, 830 includes a window (such as window 844 in layout 832) in the same location, while the actual product elements within the product layouts show more variation.

The user may select from product layout options such as the product layout 834 or the sponsor product layout 830, for example. Either path (choosing a product layout from results or suggestions or a sponsor product layout) may take the user to some version of a product set search webpage 850, shown in FIG. 43, thus beginning the "Step 2: Choose Product Set(s)" portion of an implementation of a design process.

In an implementation, if, for example, the user chooses the sponsor product layout 830, the user may be presented with a choice of product sets 852a, 852b, 854a, 854b all sold by the sponsor of the product layout 830. A "Sponsor Product Sets" box on the right may not be shown since all product sets shown on the webpage 850 may already be sponsored by the sponsor. The product set results or suggestions may typically be product sets that have been pre-defined by the sponsor, but in some implementations may be dynamically built product sets of the sponsor's products based on the prior selected product layout and or may include the most popular results based on product sets from pre-existing user designs that use the sponsor's product sets. The user could then select from different kitchen styles such as "Traditional" 856 or "Country" 858. The product set results or suggestions may generally be based on, or tied closely to the product layout 830 that the user chose in the prior webpage 810 (FIG. 42).

If the user chooses one of the non-sponsored product layouts such as product layout 834 in FIG. 42, the user may be likewise presented (see FIG. 43) with groups of product set results or suggestions in different types of kitchen styles ("Traditional" 856, "Country" 858). Generally, based on the product layout that the user chose in the prior screen, the returned product set results or suggestions may be heavily tied to the products in the chosen product layout.

In an implementation, a product layout may include generic product elements (e.g., "refrigerator") that may not be associated with a specific brand of product (e.g., "name brand refrigerator"), but that still may present restrictions on the product sets that may be presented to the user on the webpage 850 of FIG. 43. For example, the product set results or suggestions may each include a refrigerator or a refrigerator having dimensions that satisfy the product layout dimensions. In an implementation, a product layout may include product elements that are associated with a specific brand of product ("name brand stove") or model of a product ("name brand stove model 4540"), and may thus present additional restrictions on the product sets that may be presented to the user on the webpage 850. That is, the product set results or suggestions may each include the specific brand product or specific brand and model product.

Other products that are either not in or specified in the product layout may be more easily left out of the product set results or suggestions. Examples may include lighting fixtures, paint colors or other surface textures, or possibly a dishwasher.

Groupings of product sets presented to the user may successively be less and less tied to the prior chosen product layout and may leave out successively more products. In general, however, the product set results or suggestions may be closely tied to the prior chosen product layout.

A user may select one of the different kitchen styles such as "Traditional" 856 or "Country" 858 in FIG. 43. According to the example progression, the user may select "Traditional" 856 and be taken to the webpage 880 shown in FIG. 44 where "Traditional" kitchen product set results or suggestions may be shown to the user.

FIG. 44 includes on the right hand side a product set 882 offered by a sponsor (similar to product set 862 in FIG. 43. A picture 884 or other rendering of an example kitchen that incorporates the sponsor's product set 882 is also shown. As discussed above with reference to FIG. 38, a sponsor may want to offer individual products, minisets of products, or entire sets of products, and sponsors may bid against one another for getting these products before users of the system. The system may dynamically build the product sets 862, 882 (FIGS. 43 and 44) based on the product layout chosen by the user, although sponsor product sets may also be pre-defined. The sponsor product set 882 may match all products specified in the product layout or may include a new product that the sponsor wants to include to the set.

FIG. 44 may also permit a user to preview a 3D layout 888 by highlighting any of the traditional kitchen product set results or suggestions (here, product set 886 is highlighted). In an implementation, the 3D layout preview 888 may use grayscale or another shade to indicate products that have not been filled in on the 3D layout preview 888.

FIGS. 43 and 44 are similar to FIG. 38 discussed above. Product set search results or suggestions 864, 890 may display product content from 3D designs saved by other users in the system that match the product layout. For example, for the product set or set of product images 886*a*, a user may have saved a 3D design layout (matching the chosen product layout) that included a refrigerator, a light fixture, a sink, a stove, a kitchen cabinet face, and various flooring or wall colors and textures, all shown in product set 886*a*. In an implementation, the system may dynamically build product sets from individual products or minisets of products, here based potentially on the chosen product layout or, possibly, product(s) that were dragged and dropped by a user into the refine search box 890 such as the stove 892.

As in FIG. 38, product set search results or suggestions shown in FIGS. 43 and 44 may be presented in order of popularity, or how recently used. The system search engine for this product set search aspect of the design process may employ redundancy avoidance or minimization techniques, as described herein, to present more unique and potentially more helpful product set search results or suggestions to the user. Product set results or suggestions created by using the refine search box 890 may be drawn from existing product sets based on user designs or may cause new product sets to be dynamically generated. The product images making up a set of products may have associated, tags for products shown in the images. The tags may include key characteristics that may have been obtained through a variety of ways, as describe herein, such as automatic scraping from the product manufacturer's website, through integration with an external partner's website, as discussed with reference to FIG. 38.

FIG. 45 shows a screenshot of a webpage 900, that shows what may be a finalization of the design process. According to the example progression of the design process shown in FIGS. 39-47, the user may select a product set such as product set 886*a* in FIG. 44 and be taken to the design interface shown in FIG. 45. The product set 886*a* may be associated with corresponding 3D models such as the 3D models 904, 906, 908. The 3D model 904 may be a representation of the sink product image 896 in the product set 886*a*, while the other 3D models 906, 908 may be representations of the stove and the refrigerator product images 896, 898. The selected product layout 834 (from FIG. 42) may be converted to a 3D design layout 902, shown in FIG. 45, with the 3D design layout 902 incorporating 3D models (including models 904, 906, 908) associated with the product set 886*a* chosen by the user in the previous screen.

The design interface of FIG. 45 includes the 3D design layout 902 and, on the right-hand side of the screen, an interactive design palette area 910. In an implementation, the 3D design layout 902 may use grayscale or another shade to indicate products that have not been filled in on the 3D design layout 902. That is, for example, the product set 886*a* applied to the product layout 834 may not have included all of the products that may be needed to match all of the product elements in the product layout 834. Or, for example, products such as paint colors for the trim or the walls, or flooring options such as tile or wood, were not included as part of the product set and thus do not appear in the 3D design layout 902.

In an implementation, the system, via the interactive palette area 910, may allow the user to select things in the 3D design layout 902 that are shaded in grayscale (for example) and as such may need to be defined, or otherwise drag or drop product (such as finishes) from the interactive palette area 910 onto the objects that may need to be defined. In an implementation, the system may suggest complementary products to the user by tailoring search results or suggestions based on the context of the products already included in the 3D design layout 902.

In an implementation, the system may also allow the user to select products that have already been filled in on the 3D design layout 902, such as the sink 904, and to get suggestions for other sink products that might also be used in the room.

The system may provide an interactive shopping environment for users using the interactive palette area 901 by utilizing search algorithms that (1) may draw individual products, or minisets of products, from, for example, products already used in the pre-existing designs of other users; or that (2) may build individual product or product miniset results or suggestions based on criteria such as design rules, or adaptive learning using neural networks that analyze prior user design behavior and selections, or products or structural elements already included in the 3D design layout 902; or do both (1) and (2), for example.

In an implementation, the system search algorithms may examine the set of products included in the 3D design layouts as individual products or as minisets and, based on the product or product(s) being examined, may compare the user's design decisions to those of other users (for example) to better suggest complementary products to the user. For example, a user may have selected a certain type of countertops and a certain type of kitchen cabinets for her 3D design layout. The system may leverage these product combination choices to suggest complementary products based on the design choices of other users who may have made the same selections for countertops and kitchen cabinets. Thus, the system may present additional product images to the user in the interactive palette area 910 based on the 3D models (or the products underlying the 3D models) incorporated into the 3D design layout 902.

In the particular example shown in FIG. 45, the user may be presented with flooring options because the user may have not yet selected a flooring option or because the user has decided to view flooring options to replace an existing flooring selection. The word "Flooring" 912 is in larger type in the palette area 910 to indicate that it has been selected and coordinating flooring products such as granite tile 914, marble tile 916, and wide pine flooring 918 are presented as results or suggested options.

A user may select a "Product Sets" box on the left hand side of FIG. 45 to reveal a dropdown set of product sets as shown in the webpage 930 of FIG. 46. The "Active Product Set" 932 is the set of products presently being used in the 3D design layout 902, while the "Product Set 2" 934 is an alternative set of products that a user may highlight to have the system automatically apply to the 3D design layout 902. Two other product sets, the "Suggested Product Set from Sponsors" 936 and the "Product Sets Suggestions" 938 may also be presented to the user. In an implementations, the suggested product sets 936 may change as a user modifies the 3D design layout 902, by for example, adding, removing, or changing products in the design.

A 3D design layout will typically include a variety of products. In an implementation, users may be prompted to save individual products, minisets of products, or entire sets of products depending on the full 3D design layout, an aspect of the layout such as a particular design style. Users may explore design options by returning to a previously saved products set, modifying or editing the sets, and saving the modified sets.

In an implementation, the system may not know what to do with a particular product selected by a user as part of a product set, and may query the user about the product. On webpage 950 of FIG. 47, a user may be told that the system is unsure where a lighting fixture 952 that was included as part of the user's chosen product set (shown as product set 932) would be located in the 3D design layout 902. The user may be prompted or presented with a link 954 that the user may select to switch to a 2D product layout view mode (not shown in FIG. 47) where the user may insert the lighting fixture 952 in the 2D product layout at a location of her choice. Other situations may cause the system to ask the user to insert a product manually into the 2D layout, for example, if there is conflicting information that the system may not know how to handle.

In an implementation, a user may use the 3D design layout 902 to define a trim or a baseboard style, color or texture for the room. Such trim or baseboard definitions may typically be used throughout an entire house, so the system may be configured to retain the trim or baseboard definitions and to automatically apply them to any rooms that the user may have associated, or may subsequently associate, with the 3D design layout 902. Similarly, certain colors or textures used in one room may typically complement colors or textures used in another, typically adjoining room in a house, so that in an implementation the system may be configured to retain colors or textures used in one room and to suggest (or even automatically apply) complementary colors and textures for any rooms that the user may have associated, or may subsequently associate, with the 3D design layout 902.

Figure 63:
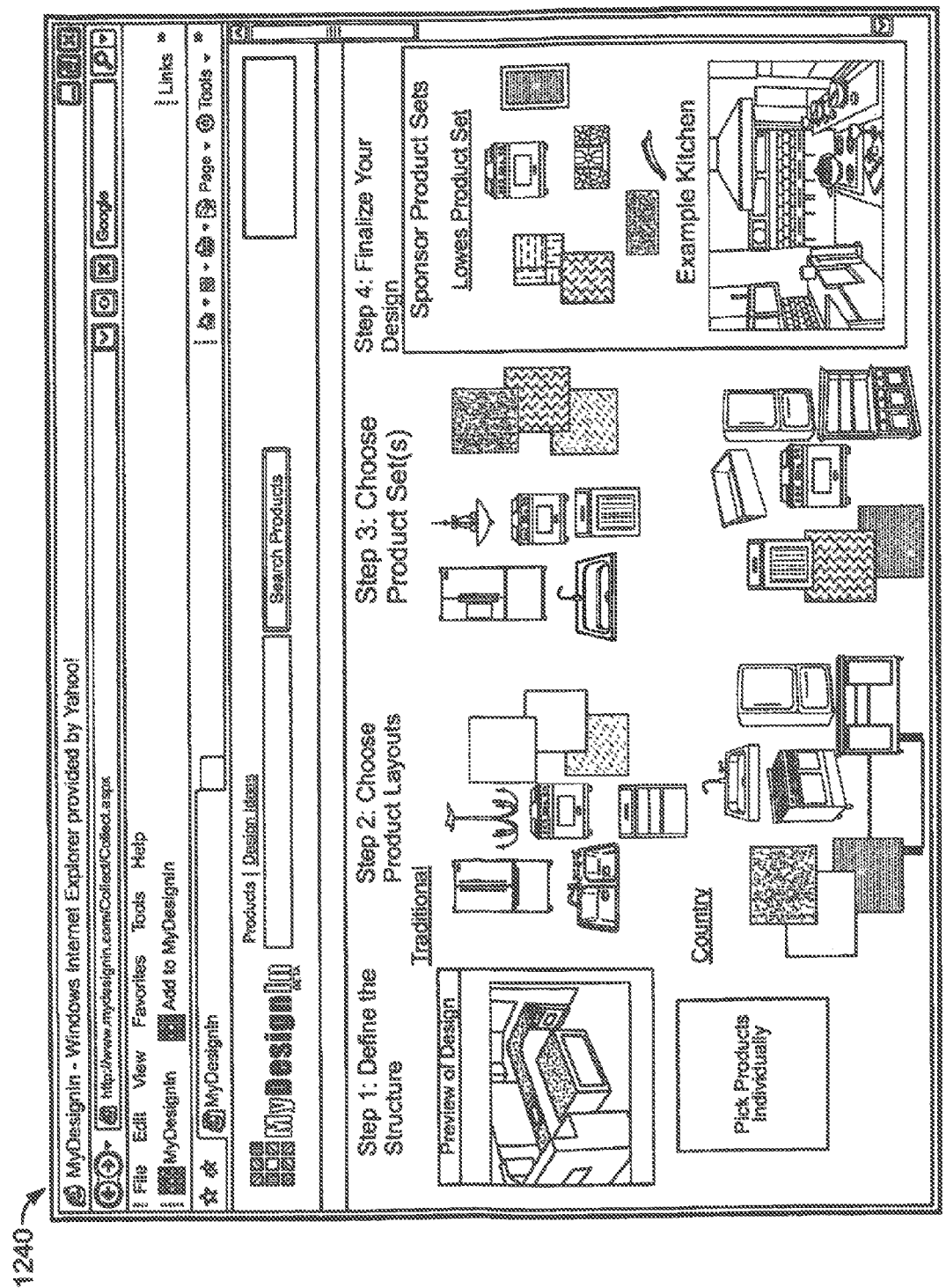
Figure 64:
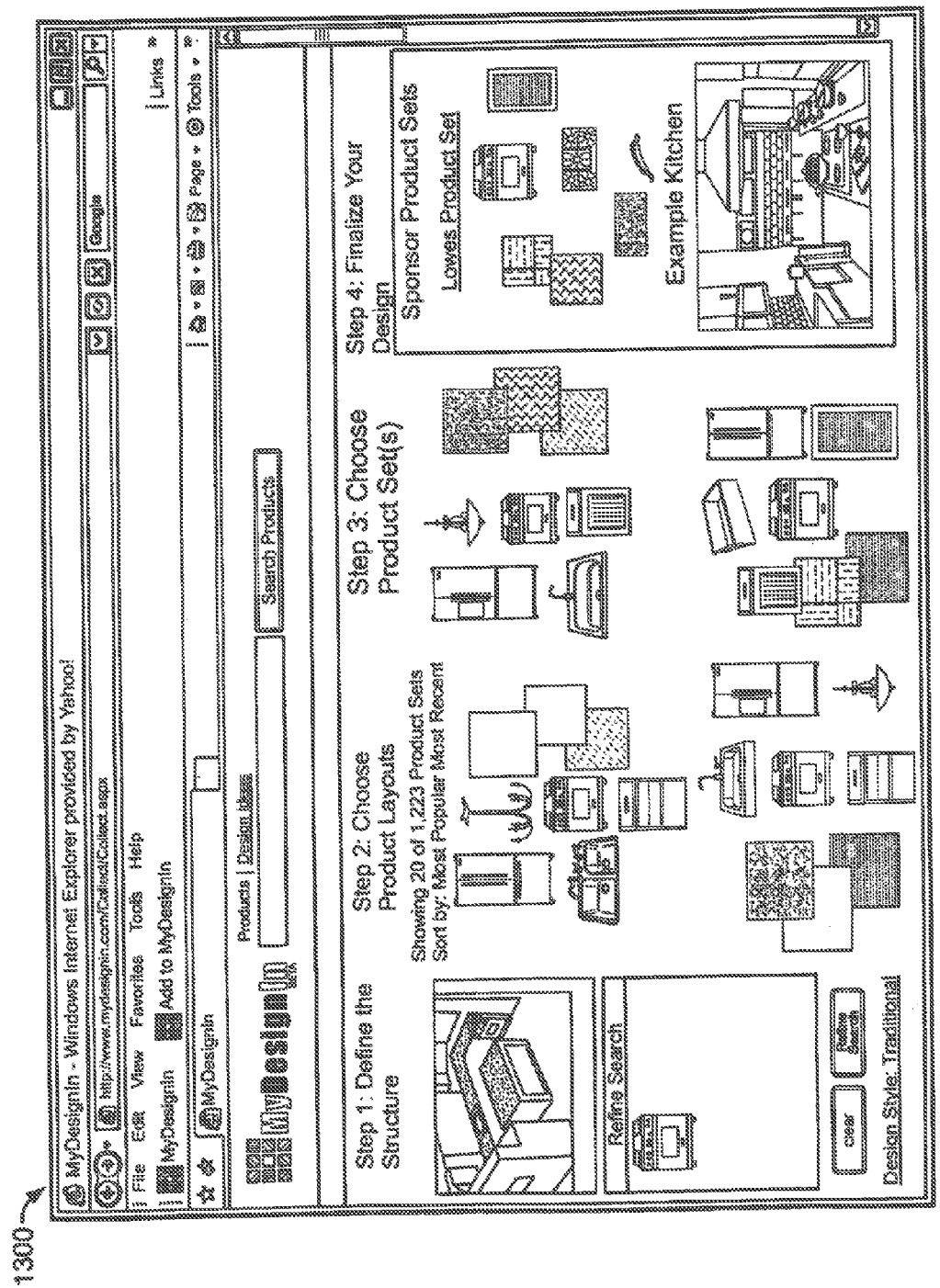
Figure 65:
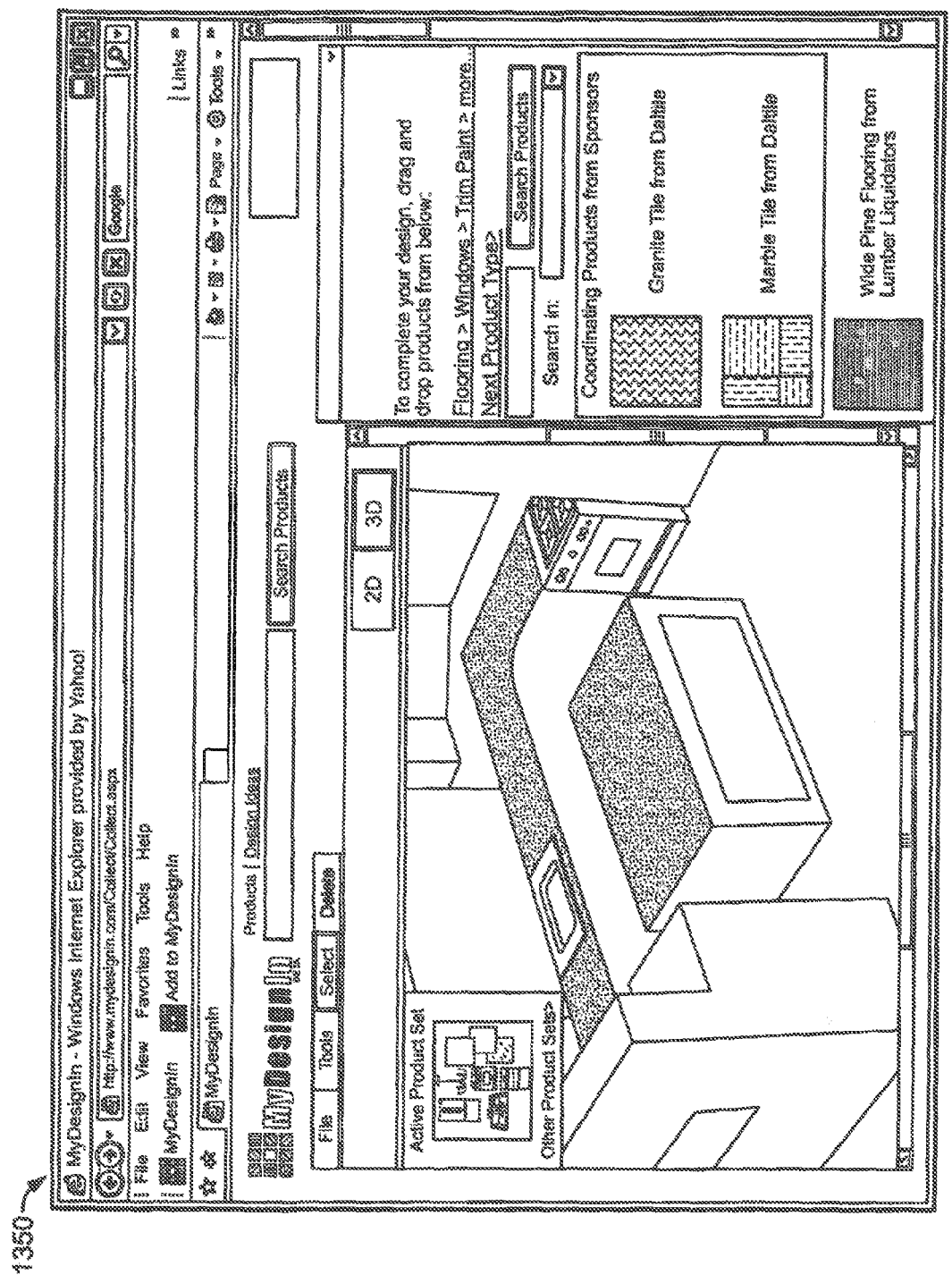

FIGS. 48-65 show screenshots of webpages following a user's progression through another design process. The design process takes the user in broad terms from being presented with structural elements with which to design and modify the structural design layouts of one or more rooms (FIGS. 48-54); to being presented with exterior structural elements to modify an exterior 3D structural design layout (FIGS. 55-57); to being presented with product layout results or suggestions and choosing a product layout (FIGS. 58-62); to being presented with product set results or suggestions and choosing a product set to apply to the product layout (FIGS. 63 and 64); and to viewing a 3D design layout with the product sets included and being presented with complementary product results or suggestions to choose from to add to the 3D design layout (FIG. 65).

In implementations of the design process shown in FIGS. 48-65, at various stages the system search engine may employ redundancy avoidance or minimization techniques, as described herein, to present more unique and potentially more helpful results to the user. The search results or suggestions may include layouts, elements, or products, from particular users of the system; however, in other implementations, the design search interface may dynamically build design results or suggestions (based on, for example, design rules) for presentation to a user, rather than drawing on pre-existing designs. A variety of criteria may be considered in building, selecting or presenting results or suggestions in a particular order.

In an implementation, the design process shown in FIGS. 48-65 may assist a user in learning about the overall system design interface and about different features, options, and capabilities of the home design tool so that a user may be better prepared to work in a 3D design layout related tool and to select from, e.g., presented suggestions of complementary products to apply to a 3D design layout.

According to the example progression of the design process shown in FIGS. 48-65, a user may begin at "Step 1: Define the Structure" on webpage 1000 of FIG. 48 by adding a room to form a structural design layout 1002 of, in this instance, a kitchen. A user may drag and drop a rectangle shaped room 1008 from a set of structural elements 1004 (here different shaped rooms). The user may be prompted to name the room and may be, for example, prompted to enter room dimensions. The user may also click in and type in dimensional values. The system may automatically resize the 2D drawing or structural design layout 1002 according to the dimension. The user may choose to "Add another Room" 1006, which moves the user to the webpage 1010 of FIG. 49 where a user may drag and drop a rectangle shaped room 1008 from the set of structural elements 1004 (here different shaped rooms) to form a structural design layout 1016 that may include both a kitchen 1002 and a dining room 1014. The system may automatically merge the 2D drawing of the new dining room 1014 with the existing 2D drawing of the kitchen. As for the kitchen, the user may be prompted to enter dimensions or click and type dimensions onto the 2D drawing. The user may add another room or proceed to the "Next Step" 1018.

Figure 53:
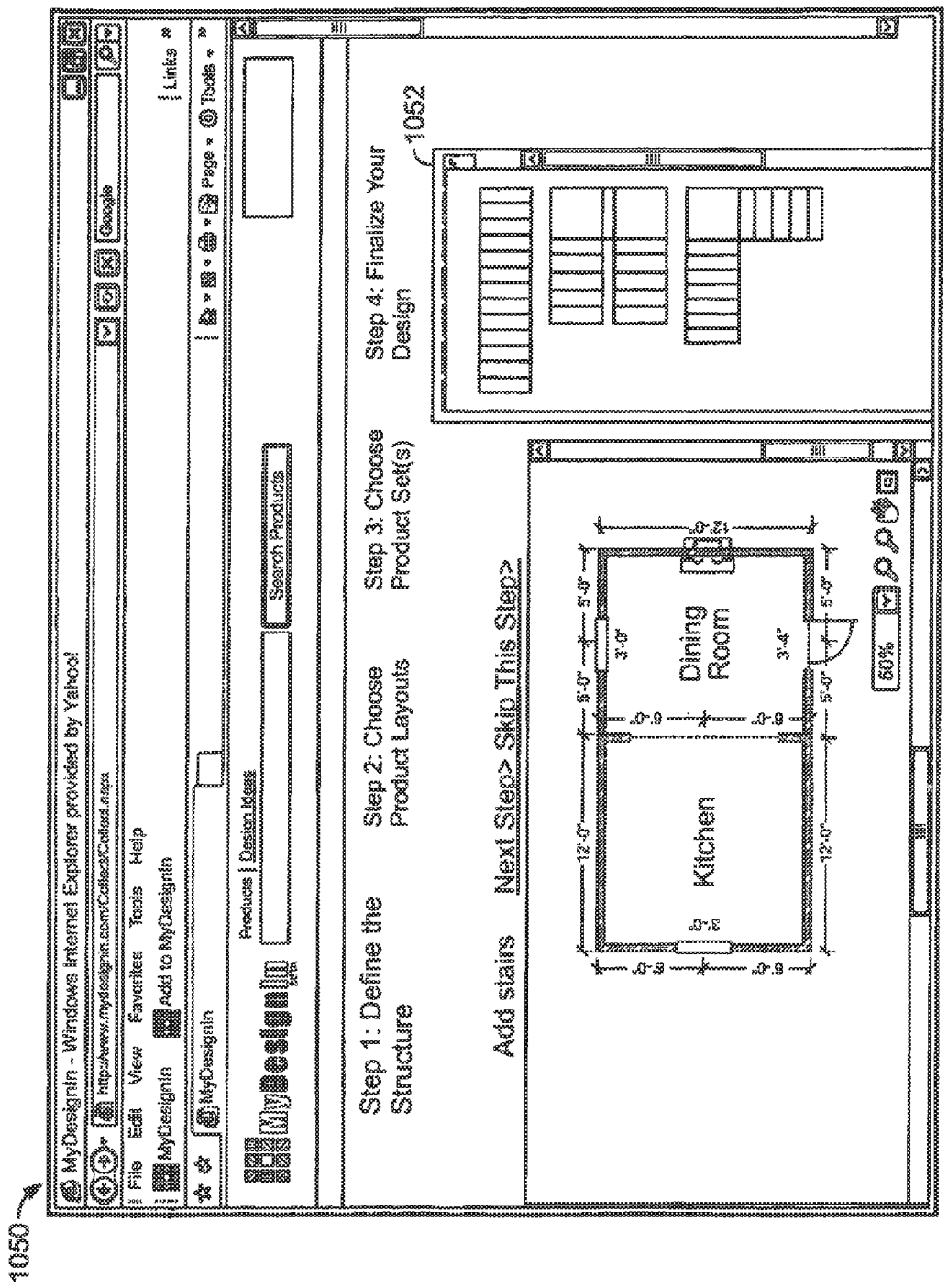
Figure 54:
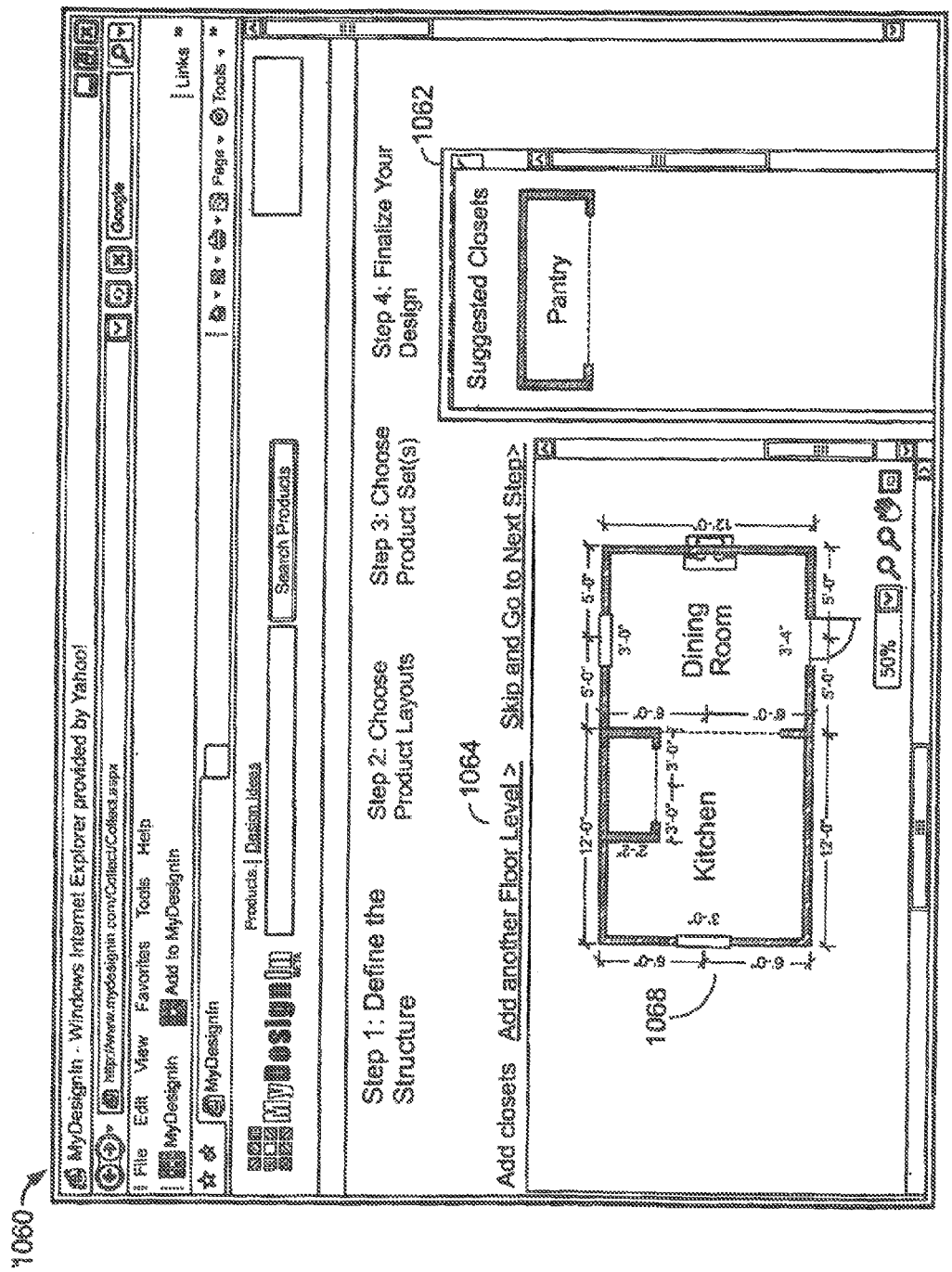

The user may draw from additional sets of structural elements such as windows 1022 (FIG. 50), doors or door openings 1032 (FIG. 51), fireplaces 1042 (FIG. 52), sets of stairs 1052 (FIG. 53), and closets or pantries 1062 (FIG. 54). The structural elements shown in these FIGS. 50-54 may be dragged and dropped onto and automatically inserted into the various structural design layouts shown in the FIGS. 50-54, and users may add, or be prompted to add, dimensions for these structural elements when these elements are dragged and dropped or thereafter. In other implementations, a variety of structural elements may be available for selection on fewer webpages or a single webpage. The sets of structural elements 1022, 1032, 1042, 1052, 1062 may be presented as results or suggestions to the user based on any of a variety of criteria, such as design rules, the design of other users, adaptive learning based on neural network analysis of the design decisions of other users and the like. The criteria may also include, for example, dimensions of the structural design layout of the rooms, such as kitchen 1002 and dining room 1014; or the structural elements already selected by the user for the design. As more structural elements are added, the results or suggestions may be dynamically refined to reflect the modified structural design layout.

Figure 50:
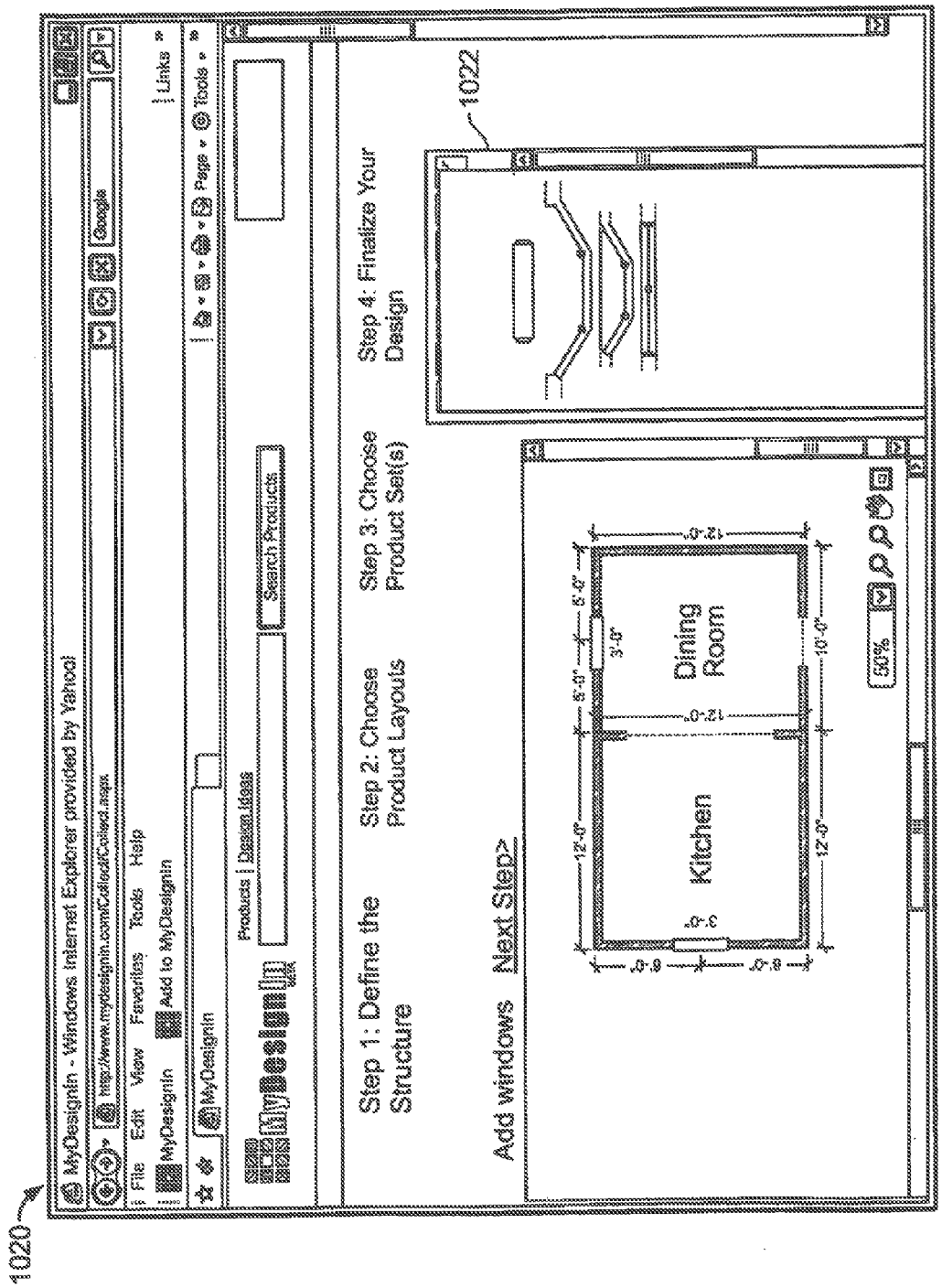
Figure 51:
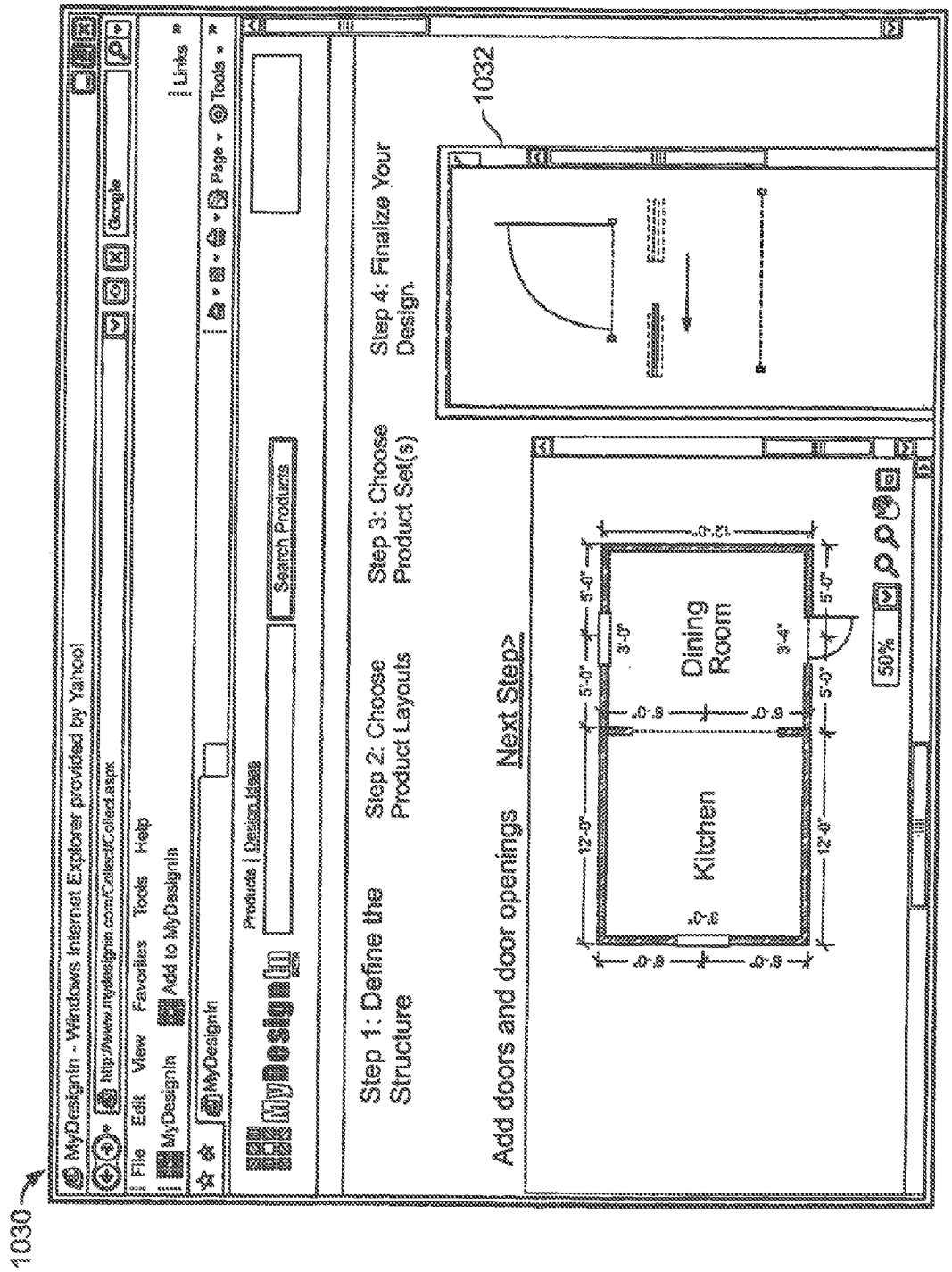
Figure 52:
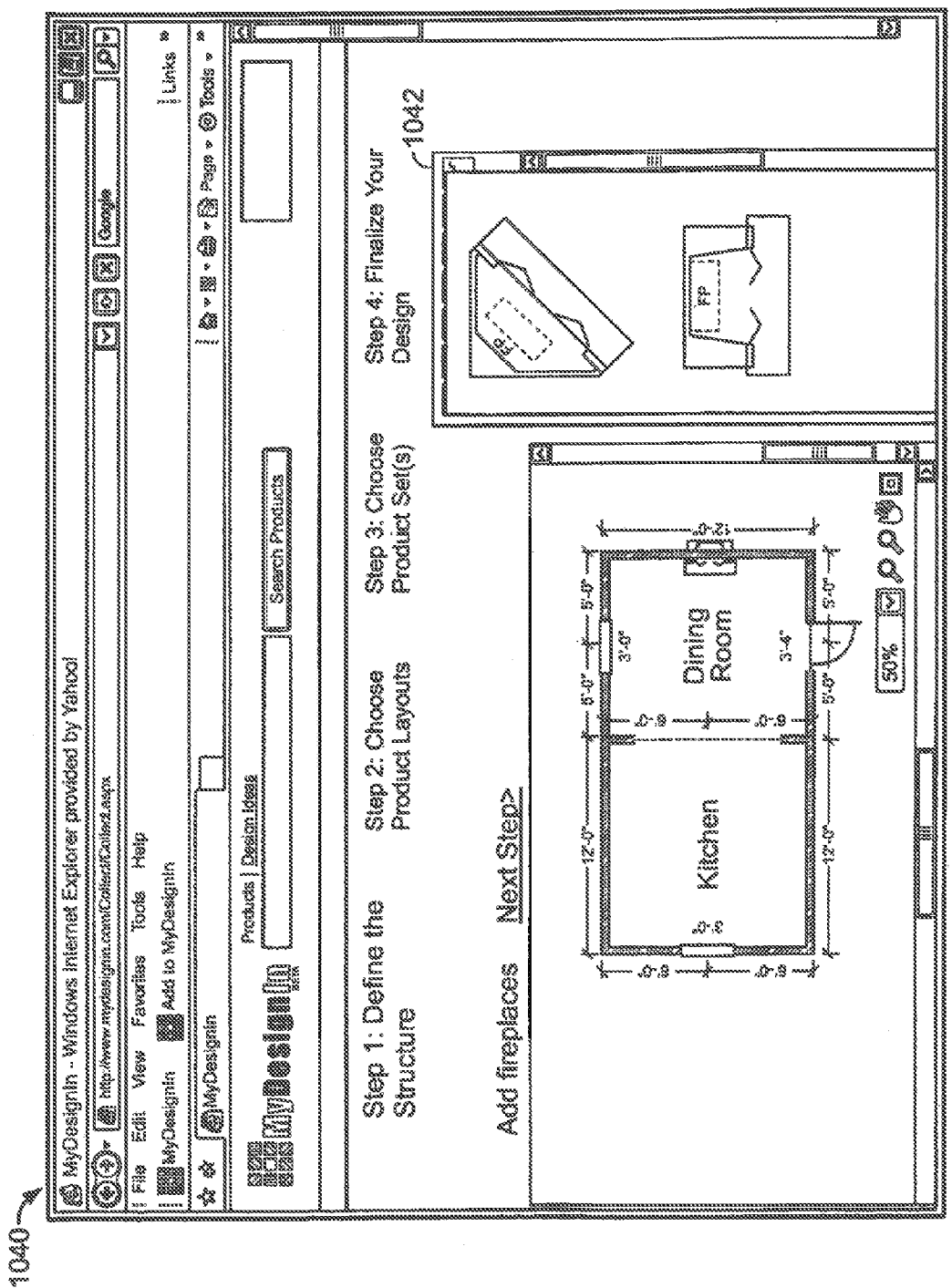

In FIGS. 50 and 51, doors or door openings may be structurally more important than windows and may be added to the structural design layouts prior to windows. The set of windows 1022 of FIG. 51 may include different styles of windows (such as casement or double-hung) as well as different types of windows (e.g., bow window, bay window, "standard" window). In FIG. 52, when a user drags and drops a fireplace from the set of fireplaces 1042 onto the structural design layout, if the back of the fireplace extends outside of the structural design layout, the user may be prompted to inform the system whether system whether she wants the exterior siding of the structure to extend around the fireplace (or chimney) or whether she wants exposed brick on the exterior of the building. In other implementations, the user may be prompted to decide what to do with fireplaces that extend outside in an exterior 3D structural design layout mode. In FIG. 53, the user may choose not to add stairs and continue to FIG. 54, where set of closets and pantries 1062 may be suggested to the user. In some implementations, closets and pantries may be considered structural elements, while in other implementations, these may be inserted automatically into product design layouts as product elements.

At FIG. 54, the user may choose to "Add another Floor Level" 1064. In an implementation, if this option is selected, the structural design sketchpad may show the user a tracing layer where the user may be permitted to fit a second level room or set of rooms to all or a portion of the outside perimeter of the initial floor. If the additional floor level is a second or higher floor, the user may still be allowed to use dimensions that extend over the perimeter of the lower floor(s), such as in, e.g., a split-level home where second story walls may extend out beyond the first floor walls. In other implementations, the system may by default provide a floorplan matching the lower (or higher) existing level(s) and permit the user to edit the structural design layout(s) for that floor.

Figure 55:
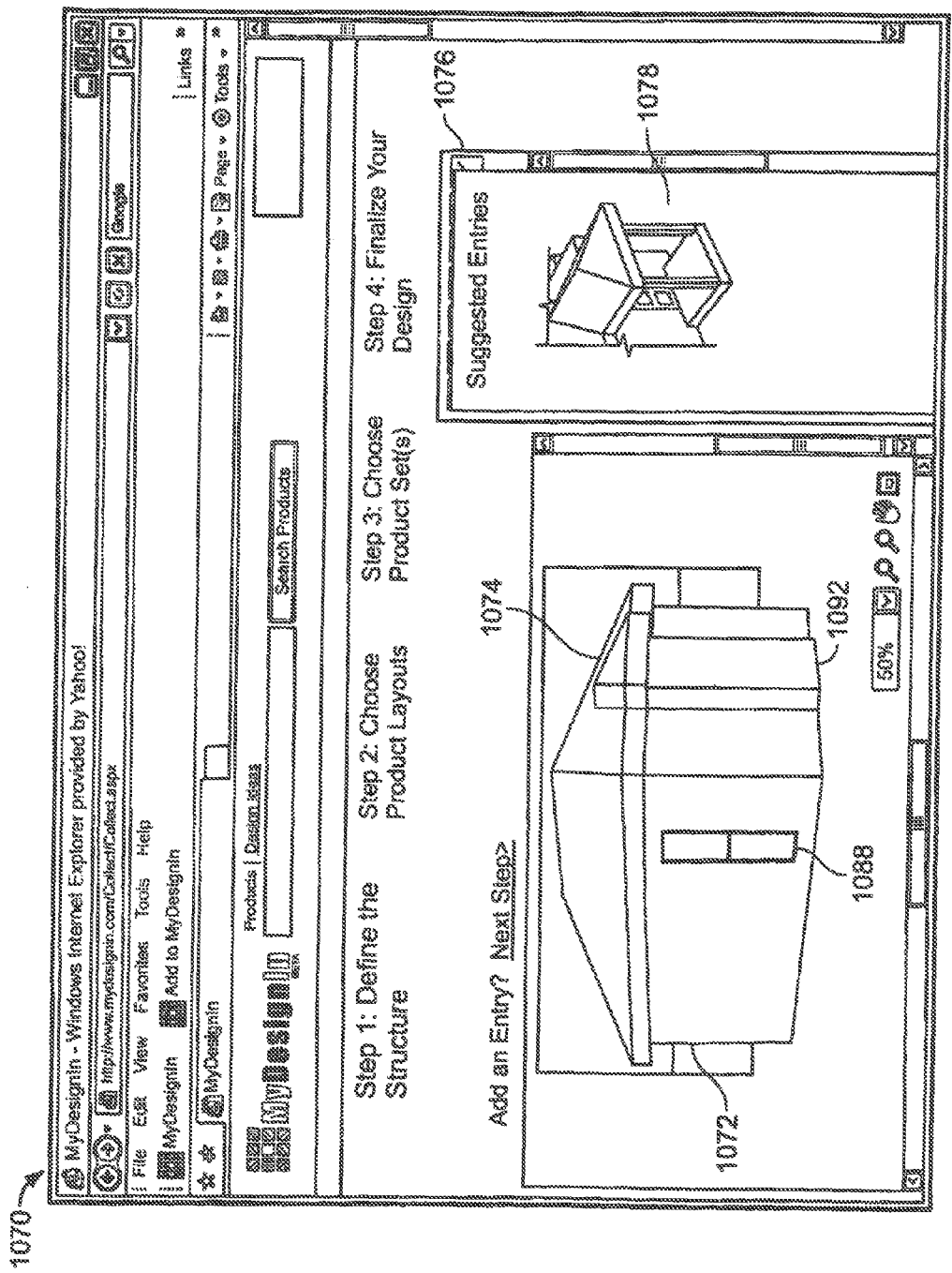
Figure 56:
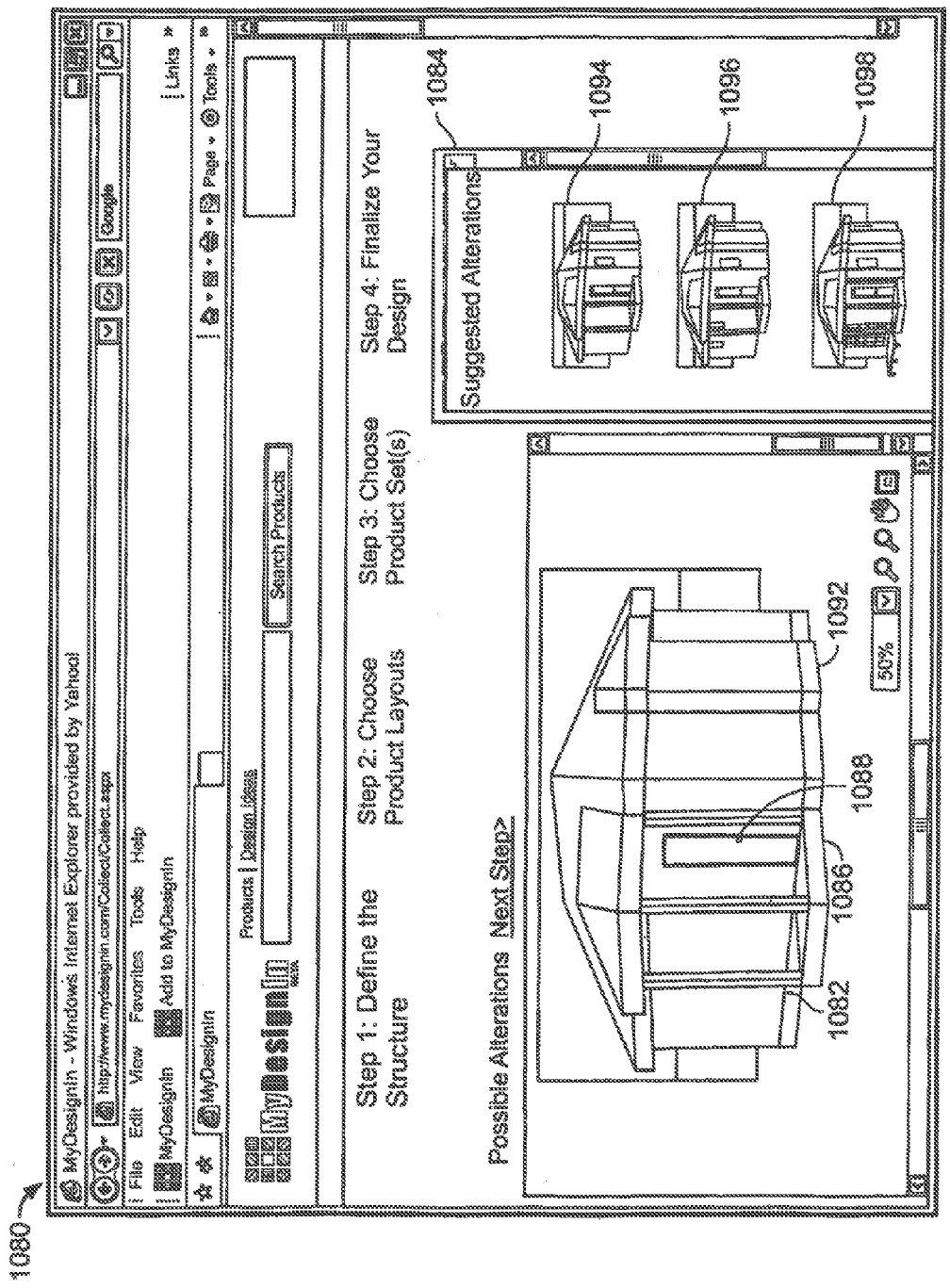

In FIG. 54, the user may choose not to add another floor level and may instead go to the next step, which is an exterior 3D structural design layout view, as shown on website 1070 of FIG. 55. In an implementation, the design process continues from defining a structure using 2D drawings and layouts, somewhat from an interior perspective, to defining the look and feel of the exterior of the structural design layout that was built and modified in 2D mode. In an implementation, the exterior 3D structural design layout view may provide a 3D modeling system that builds or selects search results and suggestions based on a criteria such as design rules, including architectural design rules; or adaptive learning based on neural network analysis of user design choices, or both. In an implementation, the system may also draw on pre-existing user designs.

As shown in FIG. 55, the system may build an exterior 3D structural design layout 1072 that is based on the 2D structural design layout 1068 (including a kitchen and a dining room) shown in FIG. 54. As shown in FIG. 55, the new exterior 3D structural design layout 1072 includes a door 1088 and a chimney 1092 in the appropriate locations (based on the prior 2D drawing 1068 from FIG. 55). In an implementation, the system may prompt the user to define a roof to apply to the structure, such as a standard "gable end" roof (not shown) or a "hip" roof 1074. In an implementation, the system may automatically apply a roof such as roof 1074 to a 3D layout of the two room structure (constructed based on the layout 1068) to build the exterior 3D structural design layout 1072. Although in FIG. 55, the structure (e.g., a home), only has two rooms and one floor, any number of rooms and floors are possible.

In an implementation, the focus of the exterior 3D structural design layout view may be not only on presenting exterior structural elements, but also may be on exterior structural elements that may not ordinarily be capable of being rendered in 2D drawings of layouts.

As described above, the system may present the user with results or suggestions (based on, for example, design rules and neural network analysis of user design choices) such as "Suggested Entries" 1076. The system may suggest various entry styles (such as entry 1078) based on, for example, the roof type previously selected by the user; on design goals or search terms (e.g., architectural or interior design information, desired styles, etc.) entered by the user on this page or previous screens.

According to the example progression of the design process, the user may choose the entry 1078 to apply the entry 1078 to apply to the exterior 3D structural design layout 1082. The entry may then appear as the entry 1086 in FIG. 56, where on webpage 1080, the user is provided with "Suggested Alterations" 1084. A first alteration 1094 to the exterior structure includes windows located on either side of the chimney 1092; a second alteration 1096 includes four windows; and third alteration 1098 includes two windows and a doorway with a deck outside of the kitchen. The suggested alterations (such as exterior design styles) may be based on, for example, design rules, neural network analysis of user design choices, or the designs of other users, and the like. For example, architectural standards or guidelines implemented as design rules might recommend a window on each side of a fireplace.

Figure 57:
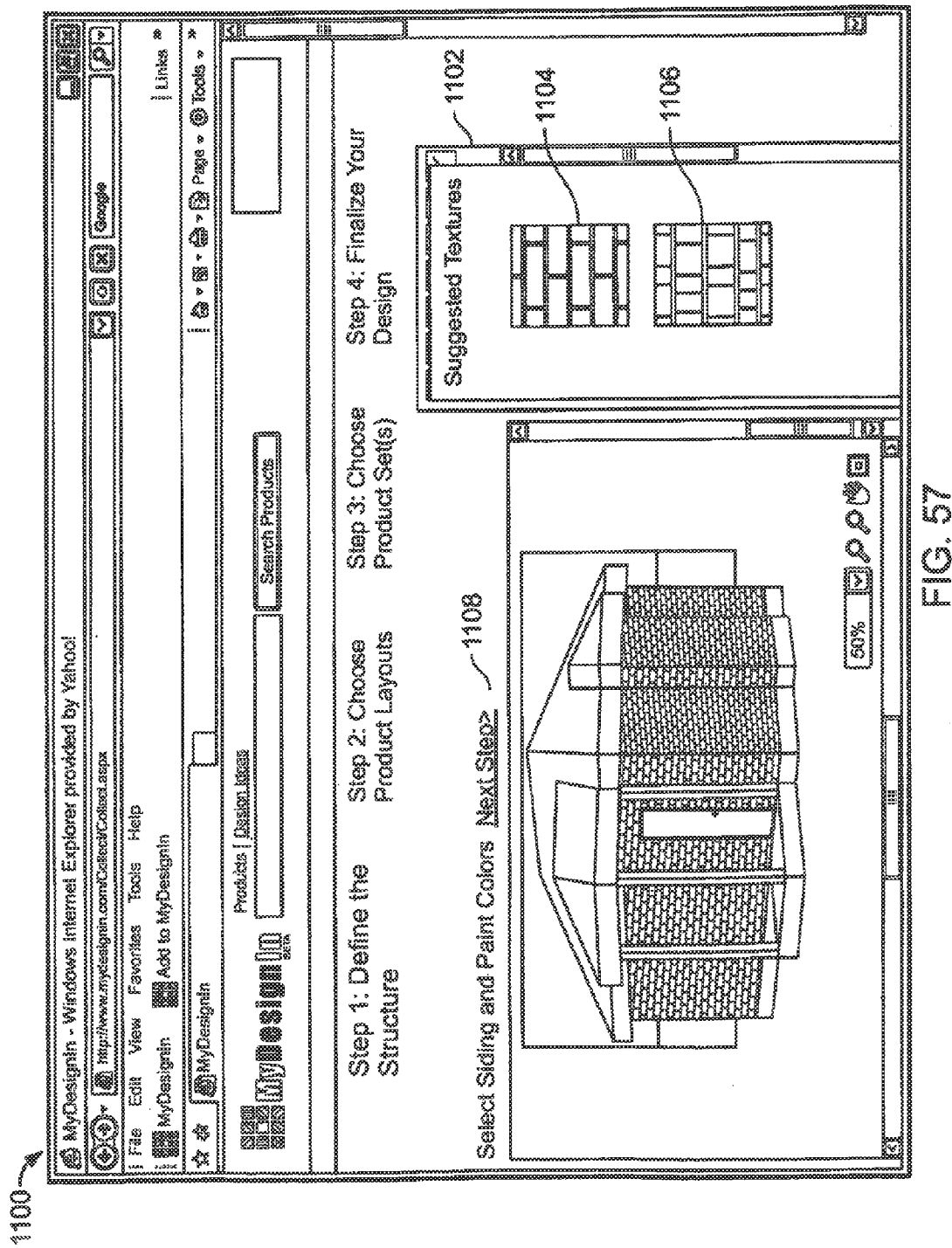

In FIG. 57, the user may choose finishes for the exterior of the structure and may be provided with "Suggested Textures" 1102, such red bricks 1104 (for, say, a traditional style home) or gray shingles 1106 (for, say, a New England style "beachhouse").

The system may suggest more complex exterior structural changes to be made to the exterior 3D structural design layout 1082, depending on, for example, choices made by the user. For example, the user might have been asked what style of home she wanted and respond responded that she wanted a "beachhouse", and thus may have received results or suggestions throughout the design process that tend subtly or more pointedly in the direction of a "beachhouse", but choices made by the user during the design process might suggest a different structure, architectural style, or exterior design altogether, such as a traditional Colonial, and the system may be configured to readjust results or suggestions that may be presented to the user according to subtle shifts in user choices.

Figure 58:
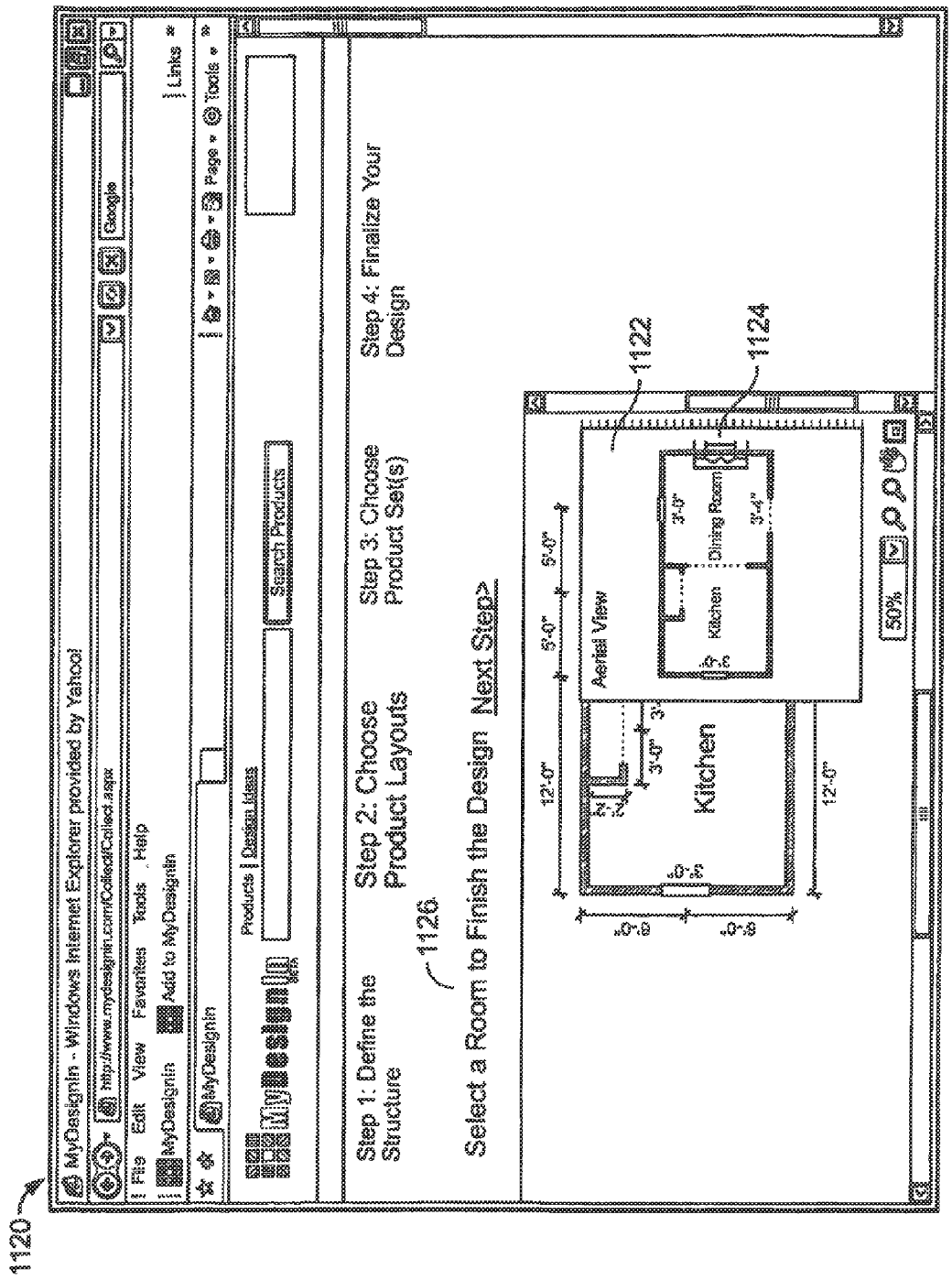

According to the example progression of the design process, the user selects "Next Step" to move to the webpage 1120 of FIG. 58, where the user may begin "Step 2: Choose Product Layouts." If the user made any changes in the exterior 3D structural design layout view that would cause the dimensions of the 2D structural design to change, then the user may be prompted, before proceeding to choose product layouts, to confirm that the changes should be applied to the 2D structural design layout (or to any previously defined product layout). The user may also be presented with an "Aerial View" 1122 of the 2D structural design layout 1124 that includes the kitchen and the dining room so that the user may "Select a Room to Finish the Design" 1126. According to the example progression of the design process, the user may select the kitchen and in FIG. 59 the aerial view disappears, showing a structural design layout 1142 of the kitchen. In an implementation, the system may direct the user to cycle through each room in the house, in this instance beginning with the kitchen, and then, when that design is complete (for example, when one or more product layouts are selected, or when a 3D design layout is completed), the user may be directed to choose another room (here, the dining room is the only other room defined in the structure).

Figure 59:
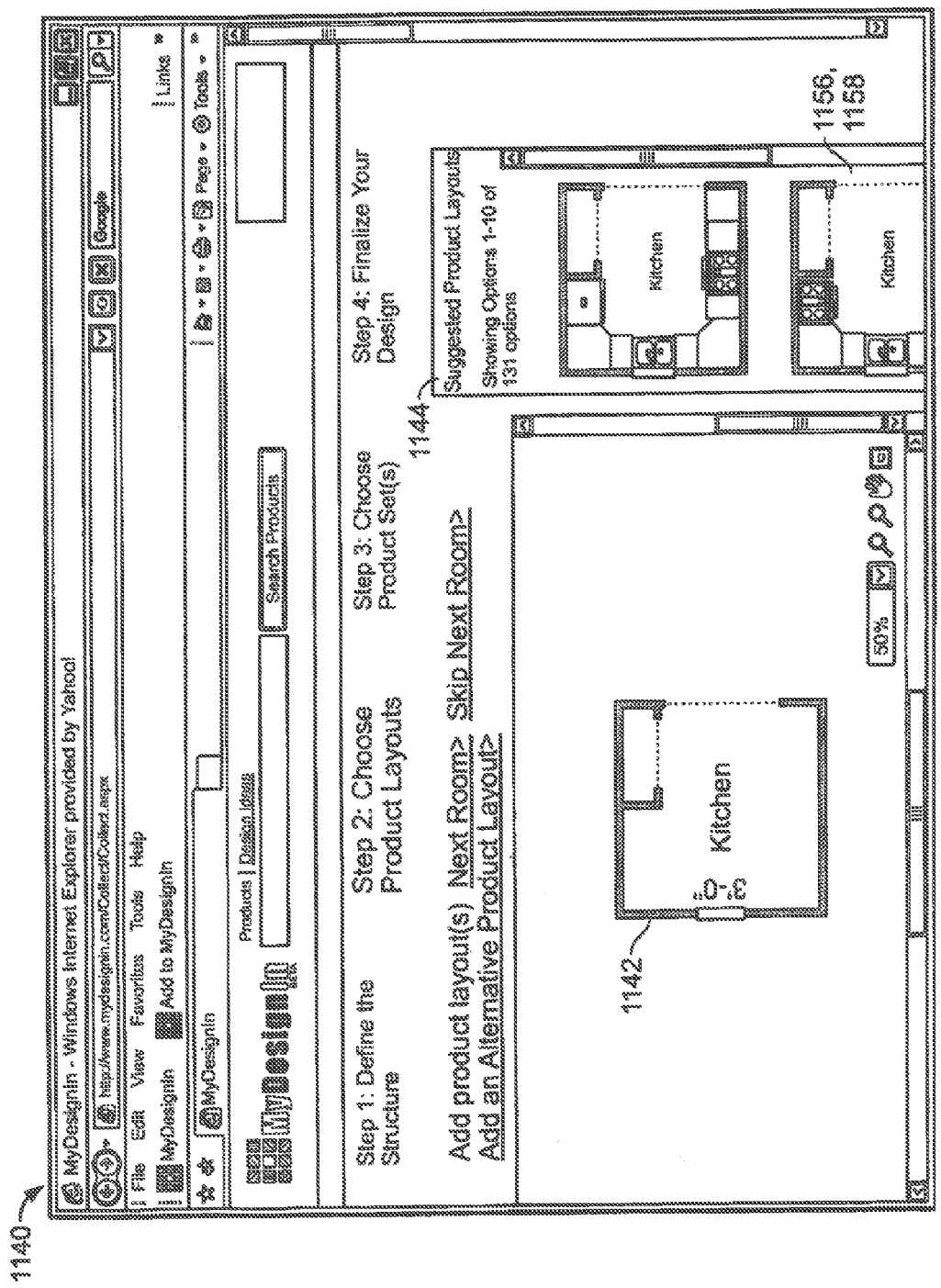

In FIG. 59, a screenshot of the webpage 1140 shows a product layout interface where the system may suggest a set of product layouts 1144 to the user to apply to the structural design layout 1142 of the kitchen. In contrast to, for example, the product layout search interface shown in FIG. 42, in FIG. 59, the dimensions of the structural room layout, coupled with the likelihood that the layout is merged with one or more other rooms (here only a dining room, see FIG. 58), may place more limitations on the type of product layout searches that may be performed. For example, searches of pre-existing user designs may prove limited since any matching product layout, may need to have matching structural elements in the same locations, as well as to have either the same dimensions (or be scalable to the same dimensions) as the structural design layout 1142. Therefore, in an implementation, the system may dynamically build a set of product layouts that match the defined structural design layout 1142, based on, for example, design rules (such as interior design guidelines or standards implemented as design rules), or neural network analysis of the design choices of other users. In an implementation, the product layouts may typically be built automatically by the system rather than manually by a user. There may be any number of scenarios under which the system may dynamically build product layouts, such as when the system provides product layout results or suggestions that match or may be scaled to match an existing structural design layout. Another example scenario may occur when a user has made changes to the exterior structure; then, the system may, in some implementations conditioned, on confirmation from the user, dynamically build a new product layout based on the changes or may provide additional matching product layout results or suggestions to the user.

Figure 60:
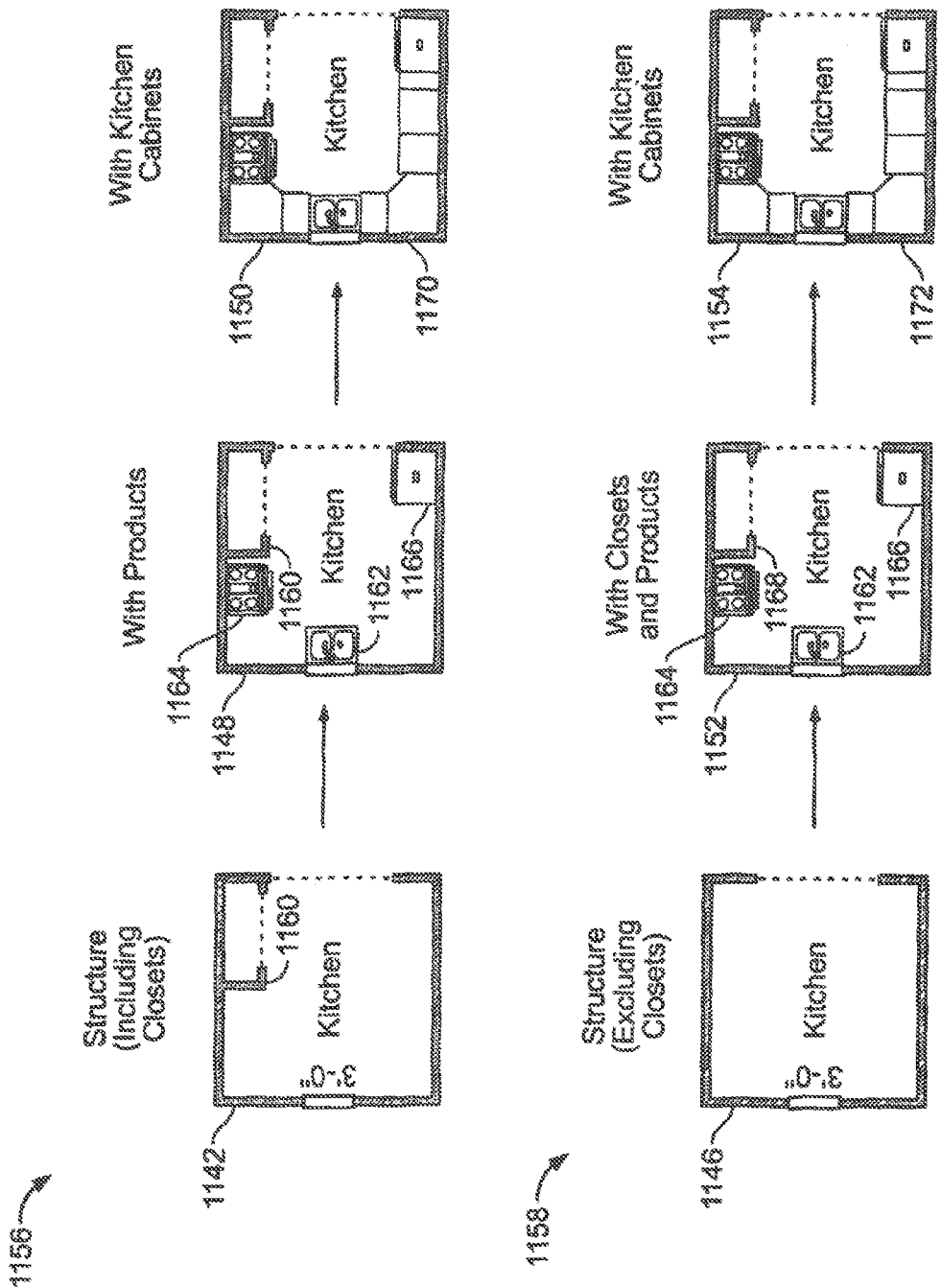
FIG. 60 is a diagram showing two-dimensional room layouts.
Figure 61:
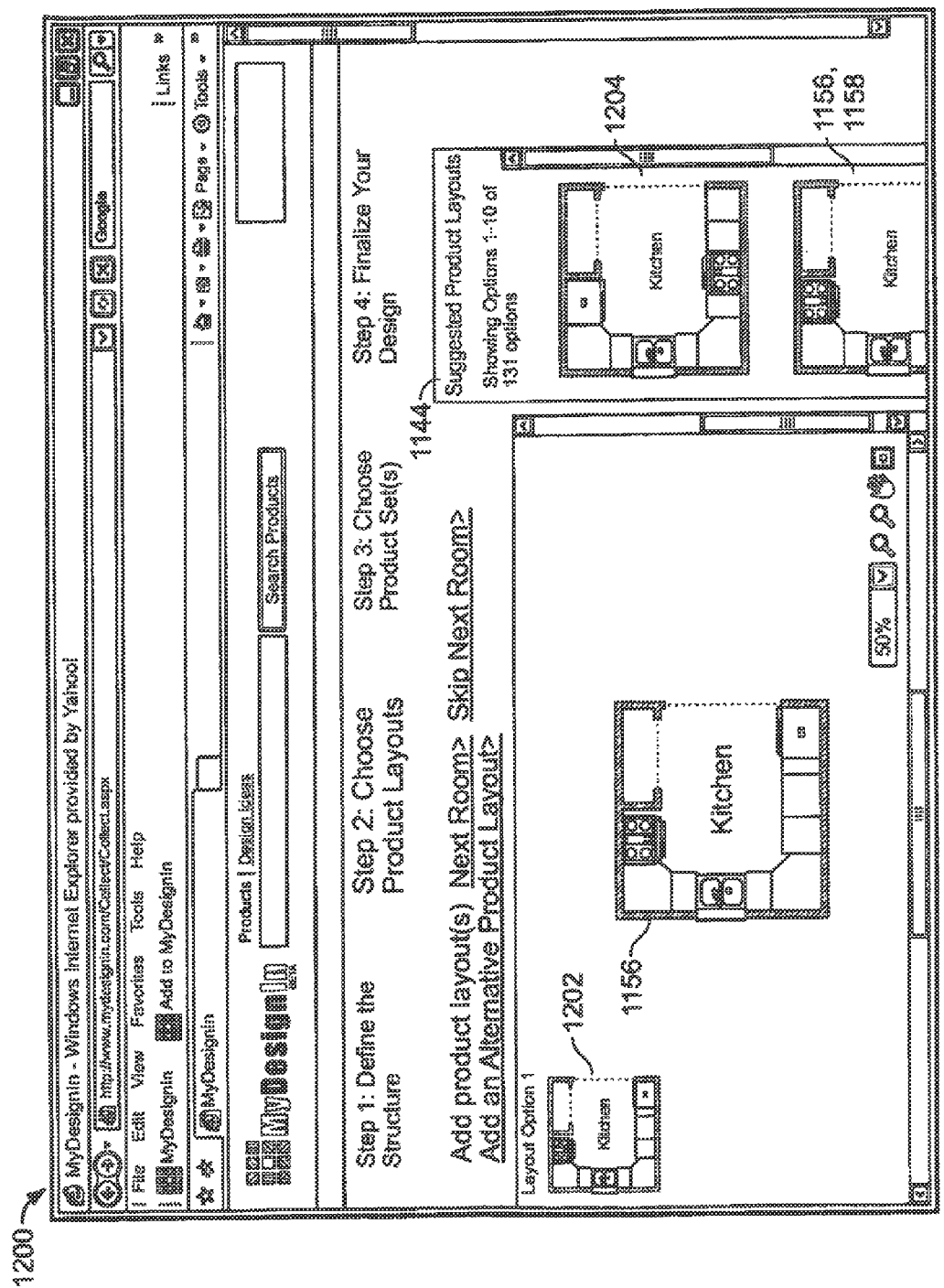
FIGS. 61-65 are diagrams of web interfaces for home design.
Figure 62:
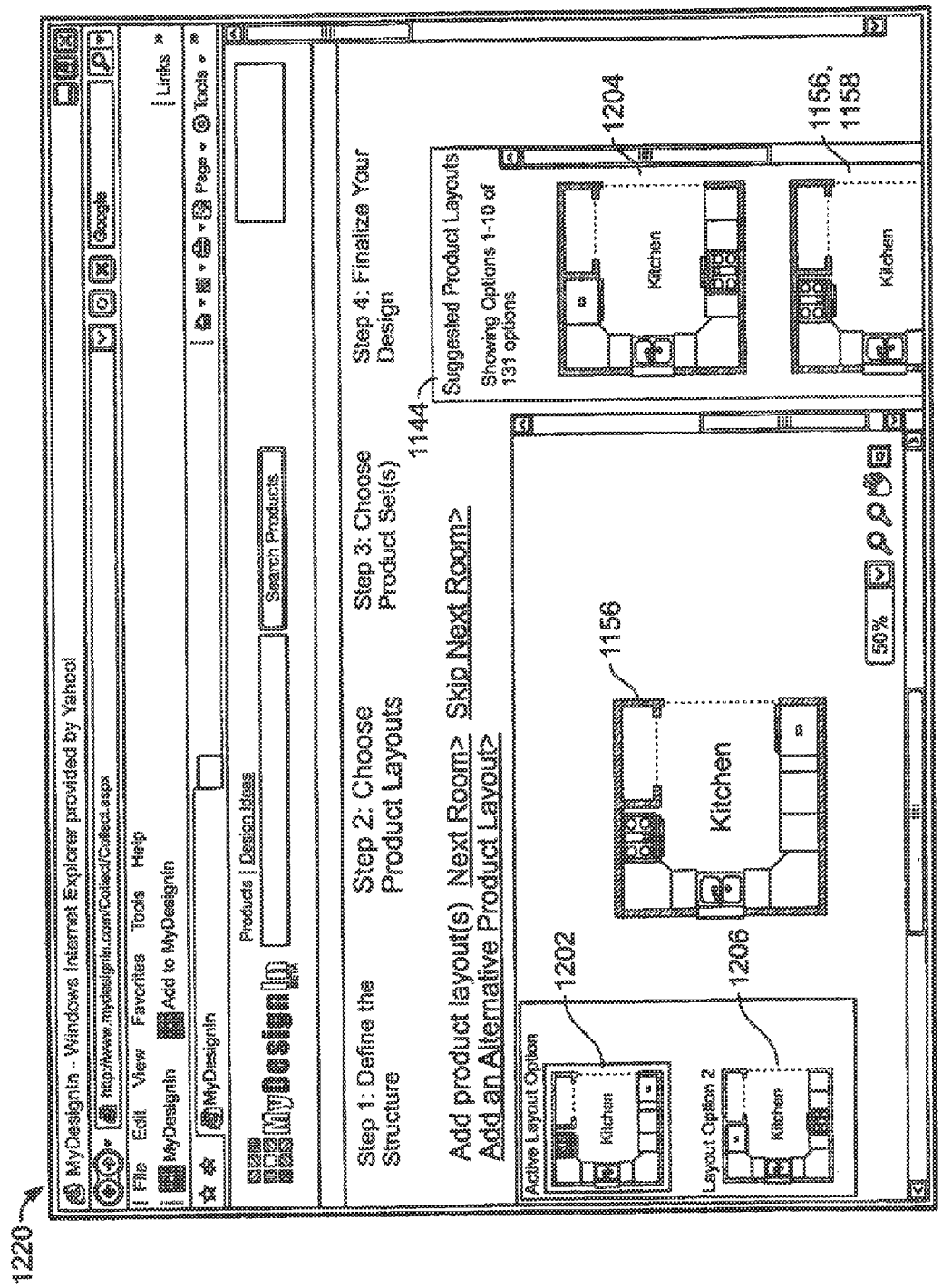

FIG. 60 is a diagram illustrating an example of how the system may dynamically build a pair of product layouts 1150, 1154 from a respective pair of structural design layouts 1142, 1146.

As shown in FIGS. 59 and 60, the structural design layout 1142 includes a closet as a structural element. A parallel structural design layout 1146 (shown in FIG. 60) might not include a closet 1160 as a structural element. In an implementation, closets may be treated as structural elements and added to structural design layouts prior to the product layout process. In an implementation, closets may be treated as product elements and may be added by the system during the product layout process, for example, before, along with, of after other product elements are inserted into the structural design layout to build a product layout. According to some design philosophies that may be implemented by the system as design rules, closets or other storage areas may be considered less structural than, for example, a window or a door because storage size may be more dependent on everything else that goes into a room. According to other design philosophies that may be implemented by the system as design rules, closets may be considered more structural, such in the case of a bedroom, or a pre-existing structure that already has built-in closets.

According to a first example procedure 1156, product elements such as a sink 1162, a stove 1164, and a refrigerator 1166 may be inserted into the structural design layout 1142 (which includes the closet 1160) in conformance with any structural elements already in the structural design layout 1142 to form an intermediate product layout 1148. Similarly, product elements such as the sink 1162, the stove 1164, and the refrigerator 1166 may be inserted into the structural design layout 1146 along with a closet 1168 that may be identical to the closet 1160.

In an implementation, architectural or interior design guidelines that may be implemented as design rules by the system may direct or guide the insertion of the product elements 1162, 1164, 1166 into the structural design layouts 1142, 1146. Some examples of design industry guidelines or standards that may be applied to a kitchen may include the following:

(1) sinks typically go below windows; and (2) core product elements such as a sink, a refrigerator and a stove may be most advantageously positioned in a kitchen to form a "work triangle" of the products, sized so that, for example, the products may be located near to one another and a person using the products may walk to all three easily.

In an implementation, once product elements such as core product elements have been inserted into a structural design layout, the system may insert additional product elements that are more flexibly sized according to product elements and structural elements already in the room. In the case of a kitchen, such additional product elements may include kitchen cabinets, or an island located in the middle of a kitchen, for example. The system may automatically populate such additional product elements around and in conformance with structural elements and other product elements already in the room based on criteria such as design rules, neural network analysis of the design choices or behavior of other users of the system, or pre-existing user designs.

For automatic insertion and population of kitchen cabinets (such as cabinets 1170, 1172) into a structural design layout (such as layout 1148 or layout 1152) around and in conformance with structural elements (such as windows and possibly a closet) and other product elements already in the structural design layout (such as a sink, a stove, or a refrigerator and possibly a closet), the following non-exhaustive examples of design industry guidelines or standards may be applied:

- kitchen cabinets generally have two levels, and may be referred to a upper level kitchen cabinets and lower level kitchen cabinets;
- upper level kitchen cabinets may not be applied across windows;
- upper level kitchen cabinets may be spaced at standard distances from windows so as to not crowd out the windows;
- The width of a particular upper level kitchen cabinet may match the width of the lower level kitchen cabinet directly below the upper level kitchen cabinet, likewise with kitchen cabinet doors;
- Silverware drawers may be placed near a dishwasher, if located in the room;
- Cabinets for pots and pans may be placed below a cook top range;
- Lower level kitchen cabinets located immediately below sink may have two doors, which may allow for a wider cabinet below the sink; and
- Industry standard widths for cabinets may apply, depending on location of the cabinets in the room.

In an implementation, the system may also automatically lay countertops across the lower level kitchen cabinets in the 2D product layout, based on knowledge of where the kitchen cabinets are located.

Of course, the example procedures shown in FIG. 60 may be applied to any variety of kitchen layouts as well as to layouts for other rooms than kitchens. The following are merely examples that are not intended in any way to exhaust the possibilities for dynamically building product layouts:

For example, for a bathroom, core product elements may include a tub/shower, a sink, and a toilet and these may be inserted around structural elements in a 2D structural design layout based on design guidelines that may be implemented as design rules, such as that a window may not be located in a shower stall.

For example, for an entertainment room, core product elements may include a television. The television product element may be inserted in an ideal location based on the structural design layout. If the room includes a fireplace (a structural element), that may serve as another focal point for the room. In an implementation, once certain product elements have been inserted into the structural design layout in conformance with any structural elements in the room, product elements such as furniture may be automatically inserted into the structural design layout of the entertainment room. A set of furniture may be applied, for example, around the television for convenient viewing of the television, or, around the television and in a quieter area of the room. A structural element such as a fireplace (typically already defined in the structural design layout) may be a competing focal point of the room, so that sets of furniture may likewise be automatically placed for convenient viewing of the fireplace. The system may determine the approximate size of furniture that may go in these locations, depending on, for example, the overall size of the room. As with other rooms, interior design styles such as a preference for contemporary or modern architecture vs. traditional architecture as shown by, for example, the type of home, may influence the choice of furniture included in the product layout. A "sectional" or "l-shaped" couch may be used for contemporary or modern style homes while a more traditional couch may be used in a product layout for a traditional home such as a Colonial style home.

For example, for a dining room, a product element such as a dining room table may be inserted into a structural design layout of a dining room and may be automatically located and sized according to the room dimensions. For example, a long dining room table may be rotated to go along with the longer length of the room, unless, for example, the room has equal sides, or the dining room is an extremely large room. In general, the system may automatically find an appropriate size for the table in the room. If the room is an extremely large room, then the system may view the room in terms of a dining area and a sitting area, and focus its attention on the dining area when positioning the dining room table.

For example, for a bedroom, the system may insert a product element such as a bed into a structural design layout of a bedroom in conformance with structural elements, including doors or windows. Positioning the bed across from doors or door openings so that entry into the room typically looks toward the bed may be considered in compliance with an interior design guideline that may be implemented as a design rule. Similarly, product elements such as nightstands may be placed underneath windows (structural elements) on each side of a bed.

As described above, in an implementation, design rules may include interior or architectural design guidelines, recommendations, standards, norms, methodologies, philosophies, or styles, individually or in combination, implemented as design rules in, for example, algorithms of the system. The design rules may be updated from time to time to reflect changes or advancements in, for example, interior and architectural styles. While algorithms may be based on design rules, in some implementations the design rules may be guidelines or considerations rather than strict rules.

Referring once again to FIG. 59, the product layouts 1156, 1158 dynamically built in FIG. 60 may be presented as a part of results or suggestions 1144 to the user. According to the example progression of the design process, the user may select the product layout 1156 so that product layout 1156 may be automatically applied to the structural design layout 1142 as shown on the screenshot of the webpage 1200 of FIG. 61. The product layout 1156 may become a first product layout option 1202 on the left-hand side of the screen. The user may choose an alternative product layout 1204, which, on the webpage 1220 of FIG. 62 may become a second product layout option 1206 for the user. In general, the system may allow the user to retain multiple product layouts for use in the design process.

In an implementation, once a user has chosen one or more product layouts for the particular room, an aerial view may be launched (not shown, similar to the aerial view 1122 in FIG. 58) to prompt the user to select a new room to choose product layouts for. According to the example progression of the design process, the user may decide to skip the dining room and proceed to choosing one or more product sets for the one or more product layouts, as shown in the screenshots of the webpages 1240, 1300 of FIGS. 63 and 64. The above discussions with respect to FIGS. 42 and 43 apply to FIGS. 63 and 64, including discussions of choosing product set styles and product sets, and relevant aspects of the discussion of the product set search interface in FIG. 38 may also apply to FIGS. 63 and 64. Once one or more product sets are chosen by the user to apply to one or more product layouts, the user may proceed to what may be a finalization of the design process shown in a screenshot of a webpage 1350 from FIG. 65. The above discussions with respect to FIGS. 45-47 apply to FIG. 65, including discussions of the 3D design layout and presenting the user with complementary product suggestions.

Figure 66:
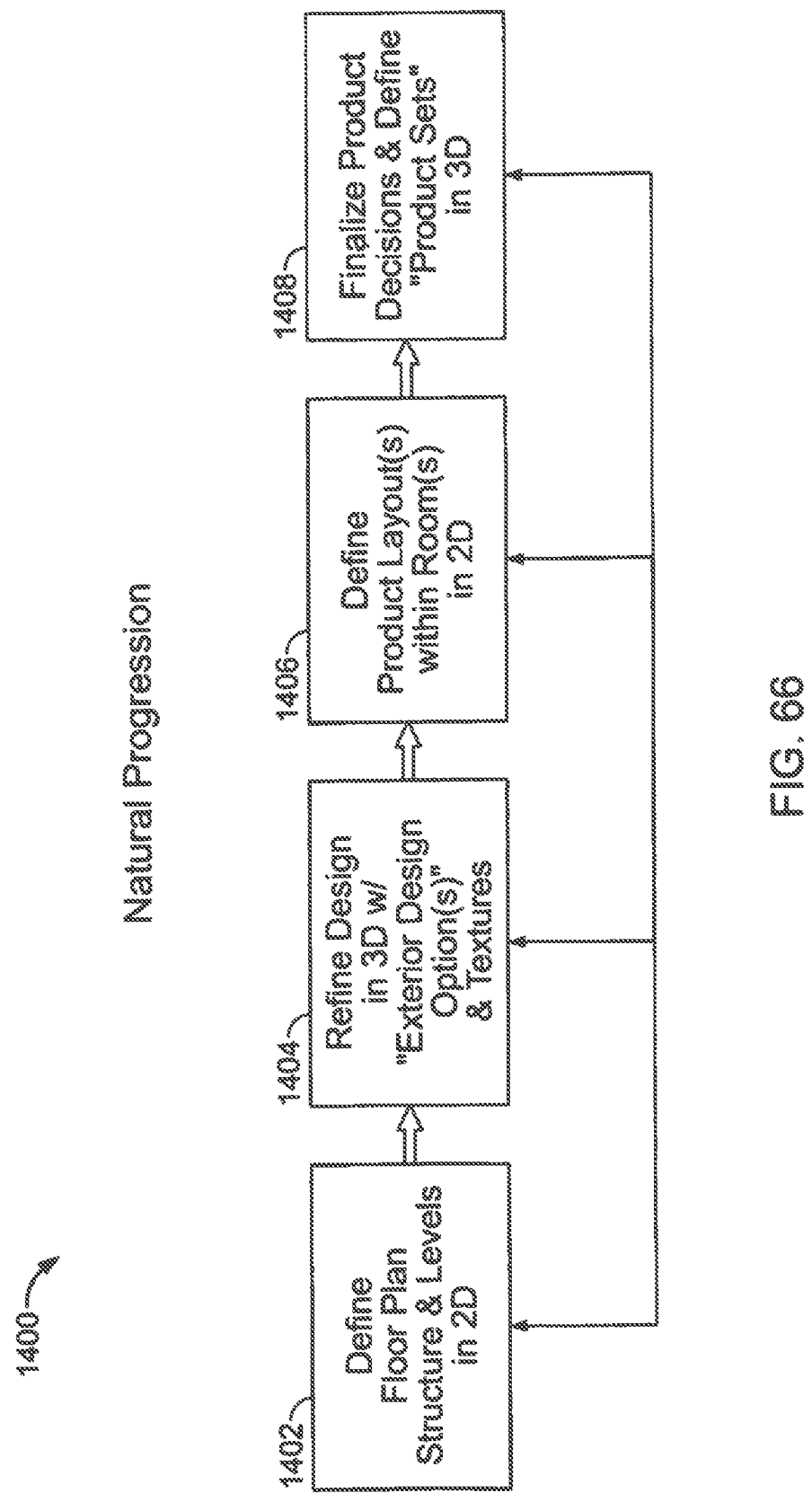
FIG. 66 is a flow chart of a home design process.

FIG. 66 shows an example of a multistage design process. At one stage 1402 of the process, in a 2D mode, a user may define a structure in 2D as structural design layouts for rooms, floor plans, or multiple levels, for example, using 2D layouts or drawings, and may modify the structural design layouts by applying structural design elements. At another stage 1404, in a 3D mode, a user may refine or modify the structure defined by the 2D structural design layouts in 3D by applying exterior structural elements (such as different appendages and textures). A user may choose product sets to be applied to 3D design layouts at this stage as well. At another stage 1406, in a 2D mode, a user may define product layouts of rooms using 2D layouts or drawings. At another stage 1408, in a 3D mode, a user may finalize product decisions and may define "product sets" using 3D design layouts.

As shown in FIG. 66, although the multistage design process may proceed from left to right in a linear fashion, a user may move from one stage to another stage as desired. For example, a user may define a product layout of a room at one stage 1406, and then may cycle back if desired to a prior stage 1404 to modify an exterior 3D structural design layout. Changes made by the user at stage 1404 to the exterior 3D structural design layout, such as moving a window, may cause changes to an already defined product layout and, in an implementation the system may prompt the user at stage 1406 to redefine a product based on the changes. In general, a user may move back and forth as desired between the stages 1402, 1404, 1406, 1408. In an implementation, changes made in the various modes and stages may be automatically implemented and applied to all designs in all modes, while in other implementations user may be prompted to respond to the effect that changes in one mode or stage may cause to designs in other modes or stages.

Figure 73:
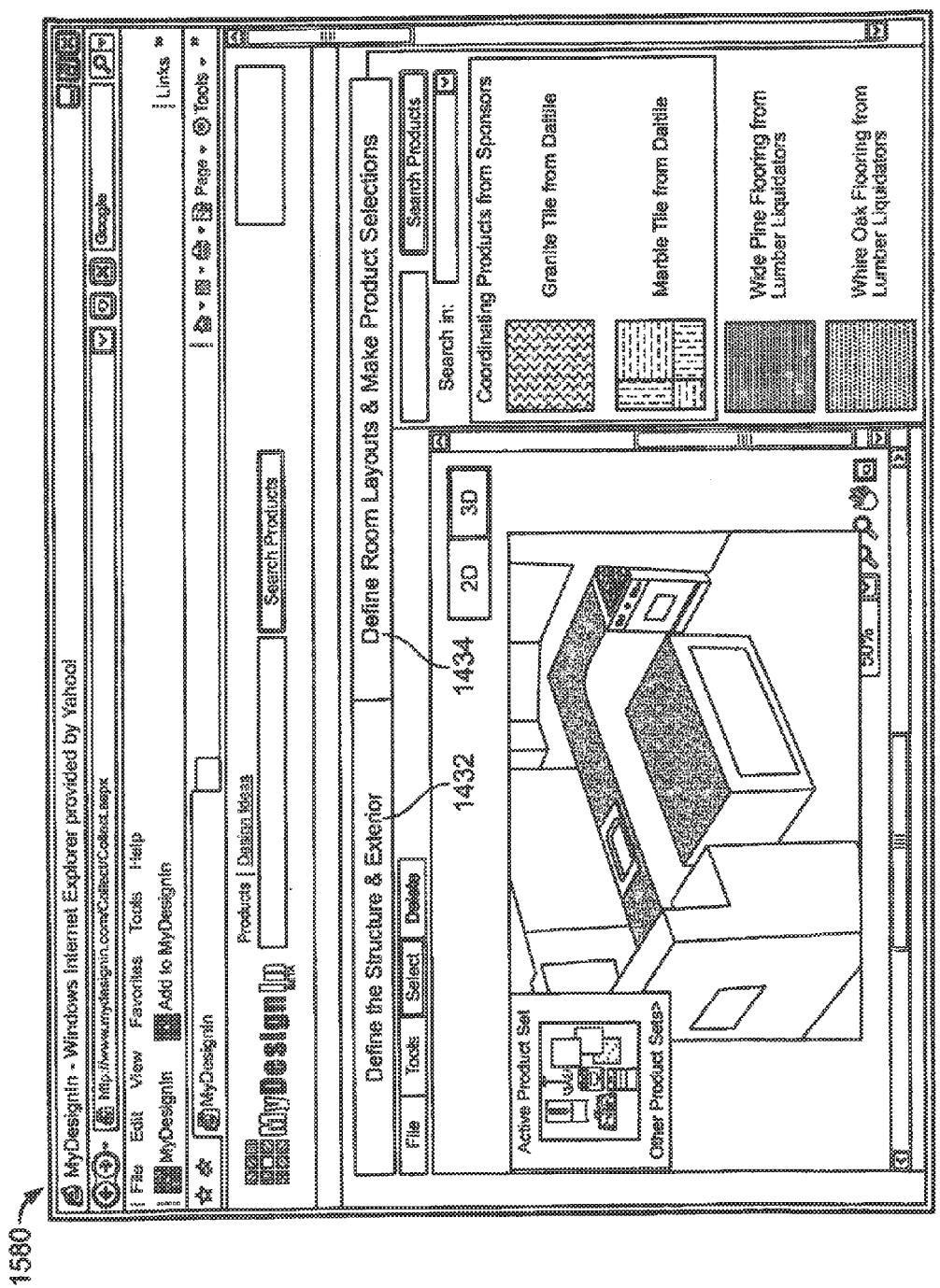

FIGS. 67-73 show screenshots of webpages following a user's example progression through a multistage design process in accordance with the stages 1402, 1404, 1406, 1408 of FIG. 66. The design process takes the user in broad terms from being presented with structural elements with which to design and modify the structural design layouts of one or more rooms (FIG. 67; stage 1402); to being presented with exterior structural elements (e.g. exterior styles) to modify an exterior 3D structural design layout (FIGS. 68-69; stage 1404); to being presented with product layout results or suggestions and choosing a product layout (FIGS. 70-72; stage 1406); to being presented with product set results or suggestions and choosing a product set to apply to the product layout (not shown, stage 1406); and to viewing a 3D design layout with the product sets included and being presented with complementary product results or suggestions to choose from to add to the 3D design layout (FIG. 73). The process may be configured so that a user may cycle at any point to an earlier or later stage in the design process.

In implementations of the design process shown in FIGS. 67-73, at various stages the system search engine may employ redundancy avoidance or minimization techniques, as described herein, to present more unique and potentially more helpful results to the user. The search results or suggestions may include layouts, elements, or products, from particular users of the system; however, in other implementations, the design search interface may dynamically build design results or suggestions (based on, for example, design rules) for presentation to a user, rather than drawing on pre-existing designs. A variety of criteria may be considered in building, selecting or presenting results or suggestions in a particular order.

In an implementation, the design process shown in FIGS. 67-73 may provide a user with single screen interface with which to move back and forth between various stages of a design (e.g., stages 1402, 1404, 1406, 1408 of FIG. 66) and back and forth between 2D and 3D design and view modes. An example of the basic interface is shown in the screenshot of the webpage 1430 shown in FIG. 33. Two large tabs 1432, 1434 appear on the screen. A user may begin to define the interior and exterior structure of a design by clicking the first tab 1432 labeled "Define the Structure & Exterior", while the user may begin to define the interior look and feel of a design by clicking second tab 1434 labeled "Define Room Layouts & Make Product Selections."

Figure 67:
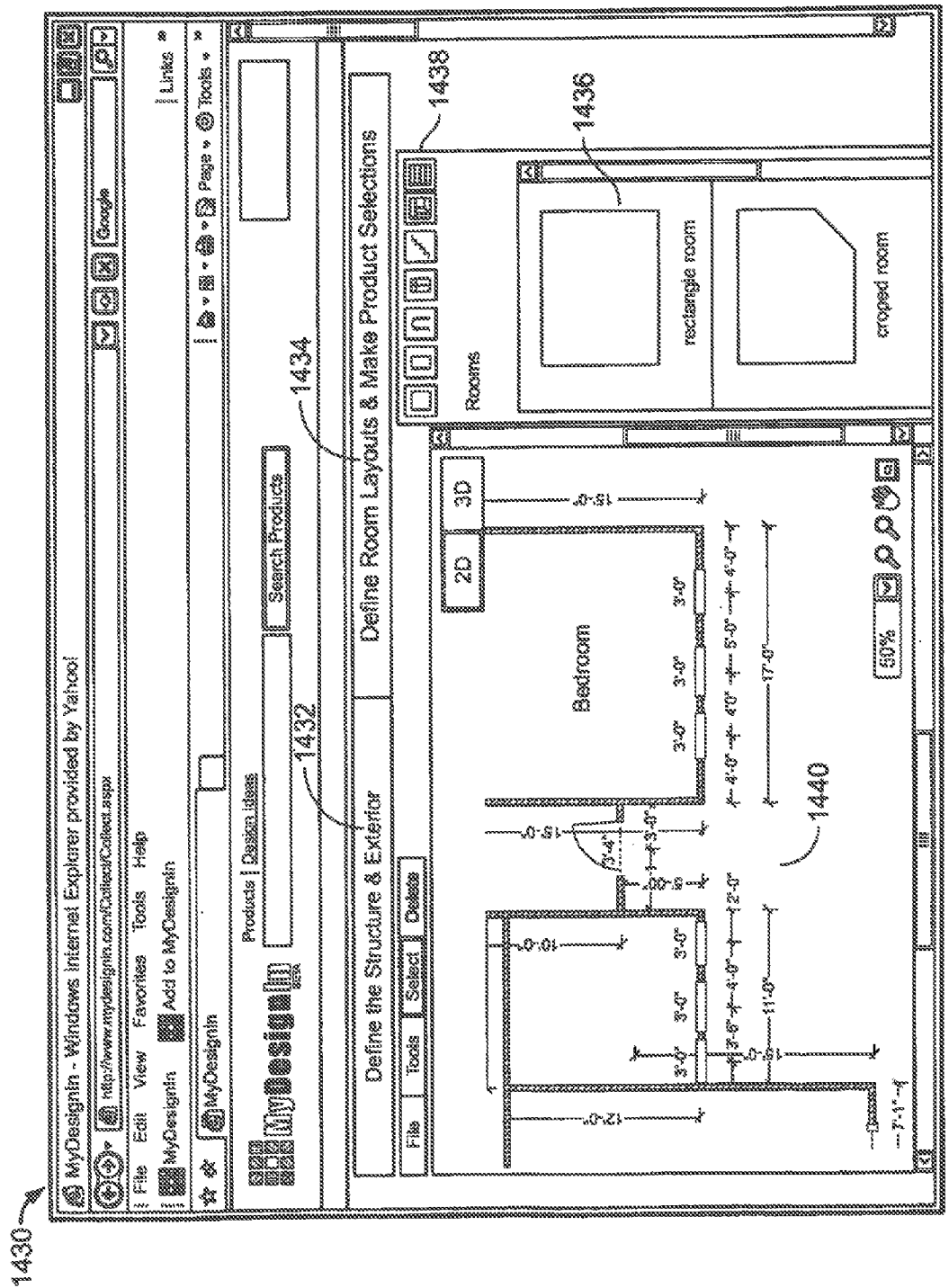
FIGS. 67-73 are diagrams of web interfaces for home design.

On the part of the interface shown in FIG. 67, the system is in 2D design mode (and stage 1402 of FIG. 66), the first tab 1432 is active and a user may drag and drop a rectangle shaped room 1436 from a set of structural elements 1438 (here different shaped rooms). The user may be prompted to name the room (here a "Bedroom" and may be, for example, prompted to enter room dimensions. The user may also click in and type in dimensional values. The system may automatically resize the 2D drawing or structural design layout 1440 according to the dimensions. The user may draw from additional sets of structural elements (not shown) such as windows, door or door openings, fireplaces, sets of stairs, and closets or pantries, for example. The sets of structural elements may be presented as results or suggestions to the user based on any of a variety of criteria, such as design rules, the designs of other users, adaptive learning based on neural network analysis of the design decisions of other users and the like. As more structural elements are added, the results or suggestions may be dynamically refined to reflect the modified structural design layout. A user may add other rooms and floor levels to the design as desired.

Figure 68:
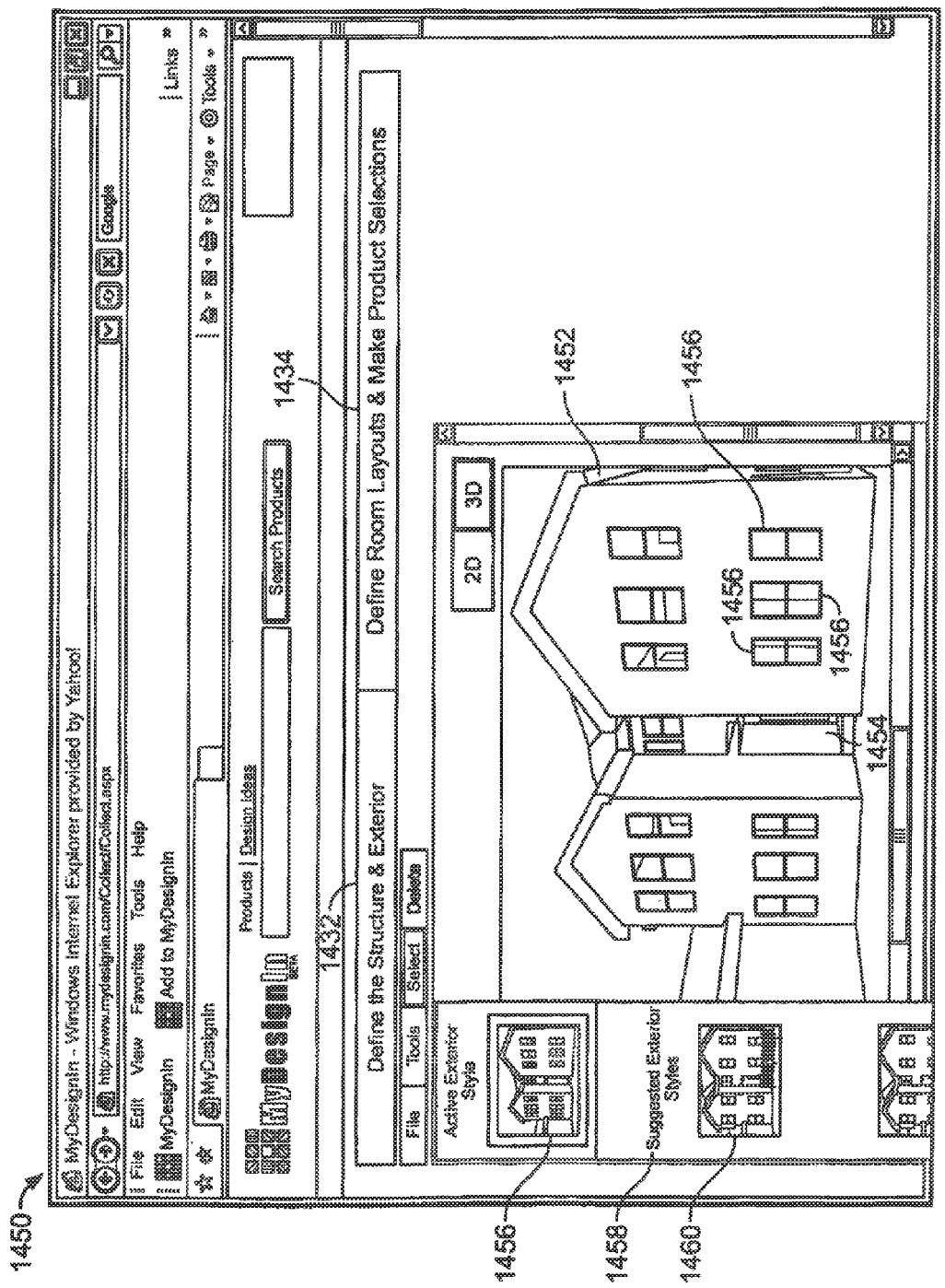
Figure 69:
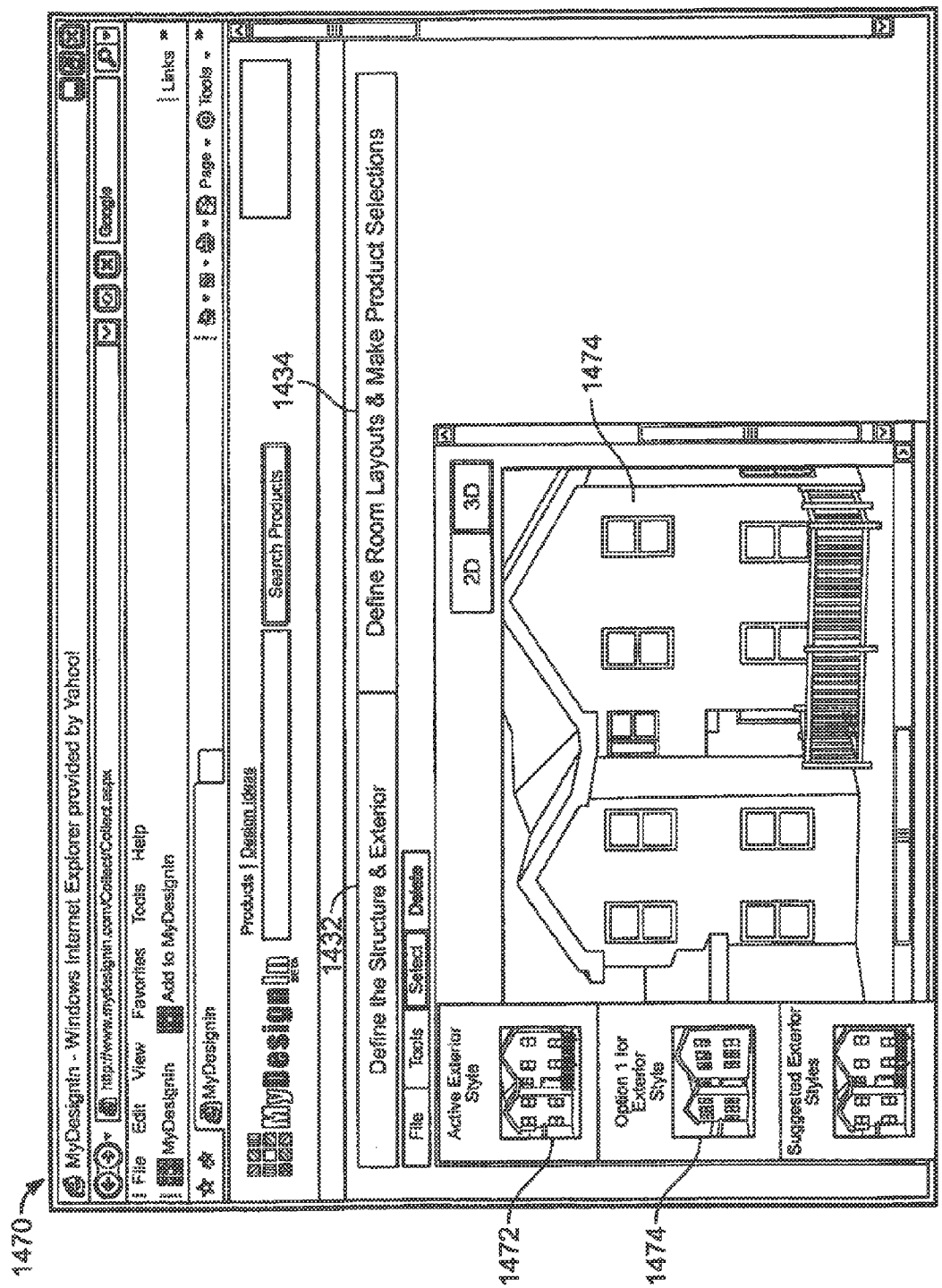

On the part of the interface shown in FIG. 68, the system is in 3D design mode (and stage 1404 of FIG. 66), and the first tab 1432 is active. In FIG. 68, the system may build an exterior 3D structural design layout 1452 that is based on the 2D structural design layout 1440 shown in FIG. 67. As shown in FIG. 68, the new exterior 3D structural design layout 1452 includes, for example, a door 1454 and windows 1456 in the appropriate locations (based on the prior 2D drawing 1440 from FIG. 67). In an implementation, the system may prompt the user to define a roof to apply to the structure, or may automatically apply a roof to a 3D layout of the multi-level, multi-room structure (constructed based on the layout 1440) to build the exterior 3D structural design layout 1452.

The structural design layout 1452 exhibits an exterior style 1456 that may include various exterior structural elements, for example, exterior structural elements that may not typically be capable of being rendered in 2D drawings of layouts. The system, as in FIG. 68, may present the user with results or suggestions (based on, for example, design rules and neural network analysis of user design choices) such as "Suggested Exterior Styles" 1458. The system may suggest various exterior styles such as exterior style 1460 (including a deck) based on, for example, the roof type previously selected by the user; on design goals or search terms (e.g. architectural or interior design information, desired styles, etc.) entered by the user on this page or previous screens of the interface.

The user may, for example, choose the suggested exterior style 1460 that includes the deck to apply to the exterior 3D structural design layout 1452. The suggested exterior style may be applied to the layout 1452 and then appear in FIG. 69, on webpage 1470, as the active exterior style 1472 on a modified layout 1474. The previously applied exterior style 1474 may be shown as a saved option for the user to return to throughout the design process.

Figure 70:
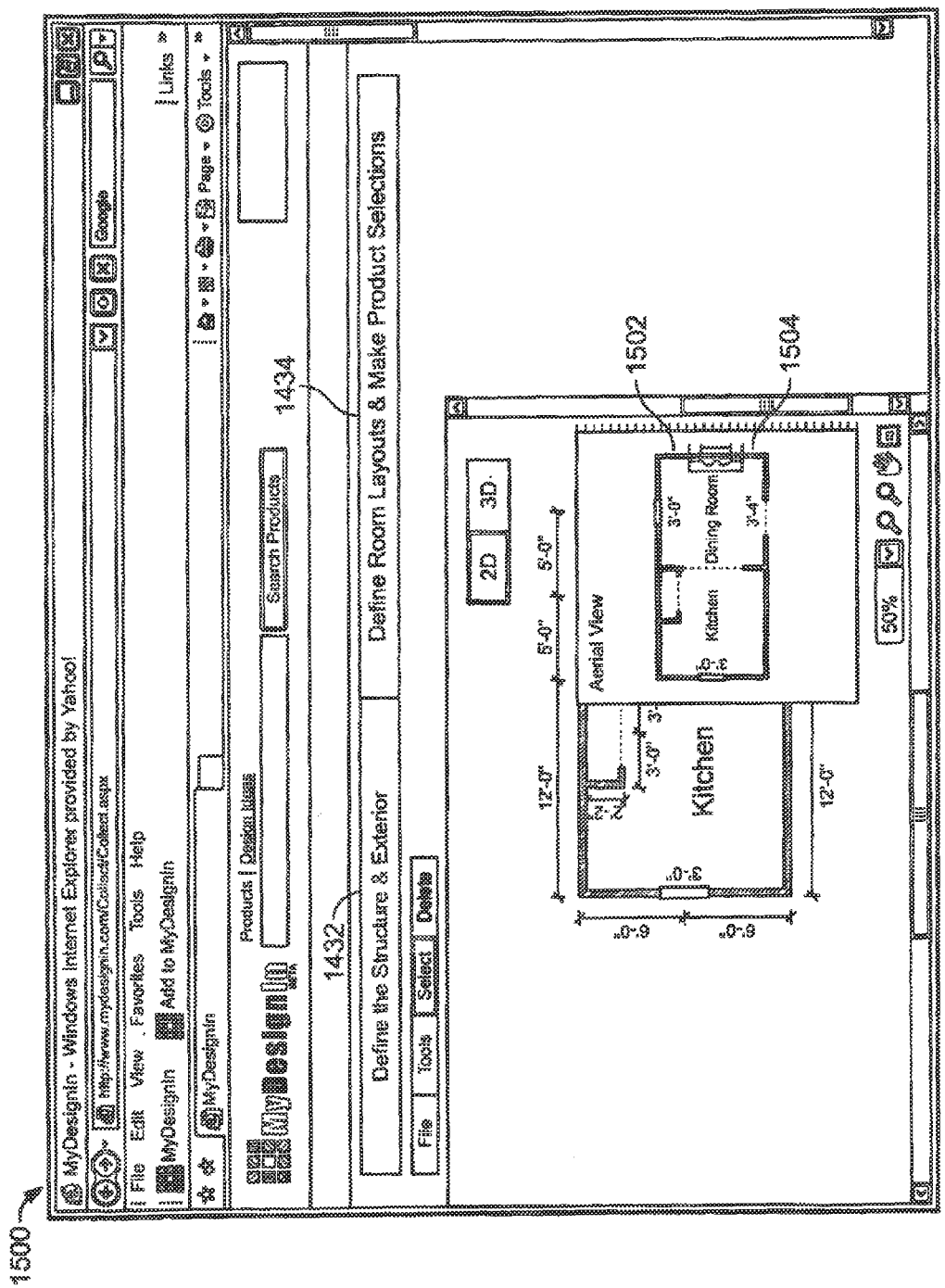
Figure 71:
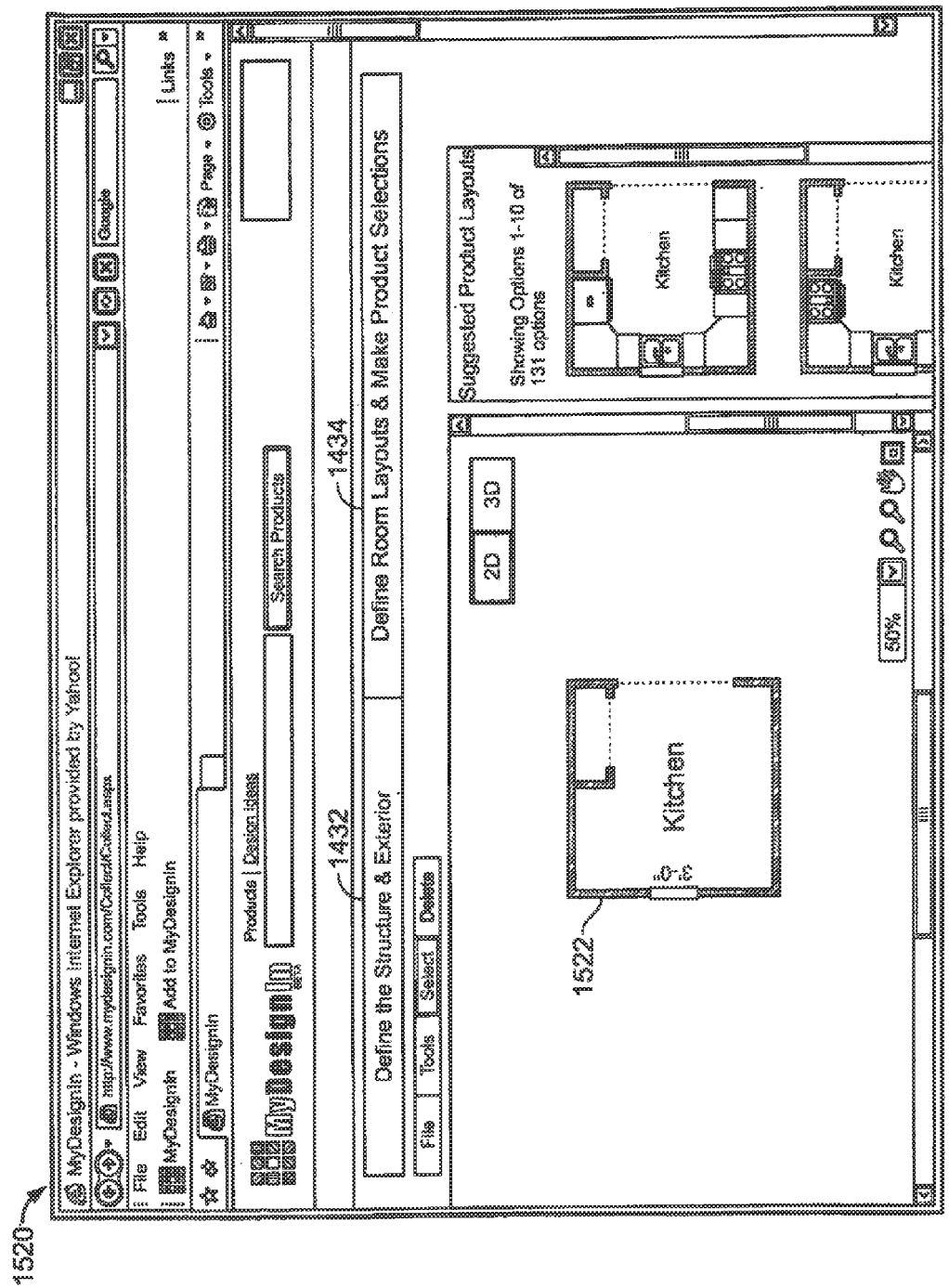
Figure 72:
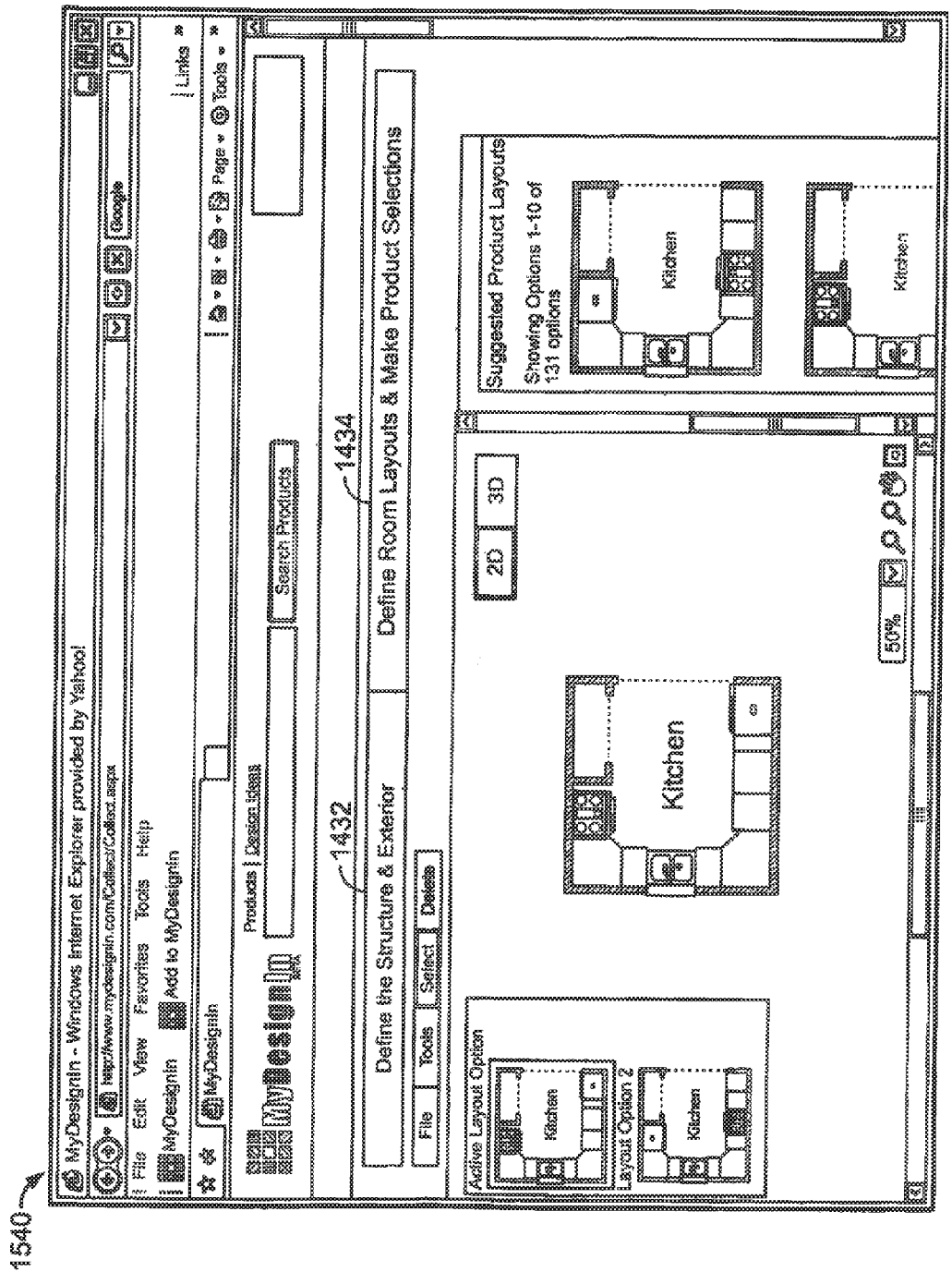

On the part of the interface shown in FIG. 70, the system is in 2D design mode (and stage 1406 of FIG. 66), the second tab 1432 is active and a user may begin to define product layouts for different rooms of the structure. If, for example, the user made any changes in the 3D design mode to the exterior 3D structural design layout that would cause the dimension of the 2D structural design to change, then the user may be prompted, before proceeding to choose product layouts, to confirm that the changes should be applied to the 2D structural design layout, or to any product layouts that the user may have already defined for the rooms in an earlier visit to this part of the interface. For example, if a product layout had already been chosen for a kitchen with a window facing out of the structure and kitchen cabinets on either side of the window, if the user deleted the window in the 3D design mode (and stage 1404 of FIG. 66, e.g. FIG. 68) then the system may, for example, automatically add more cabinets in place of the window and may ask the user to confirm the change. If the user had added a window to the wall of the kitchen in the exterior 3D design mode, then the system may, for example, automatically remove kitchen cabinets to make room for the window and may ask the user to confirm the change.

The user may also be presented with an "Aerial View" 1502 of all or a portion 1504 of the 2D structural design layout so that the user may choose a room for which the user may define product layouts. According to the example progression of the design process, the user may select the kitchen and in FIG. 71 the aerial view disappears, showing a structural design layout 1522 of the kitchen. The above discussions with respect to FIGS. 58-62 apply to FIGS. 70-72, including discussions of defining and dynamically building product layouts, and choosing product layouts to apply to a structural design layout of, e.g., a kitchen. After selecting one or more product layouts, the user may proceed (not shown) to choosing one or more product sets for the one or more product layouts. The above discussions with respect to FIGS. 42 and 43 are instructive here, including discussion of choosing product set styles and product sets, and relevant aspects of the discussion of the product set search interface in FIG. 38.

Once one or more product sets are chosen by the user to apply to one or more product layouts, the user may proceed to what may be a finalization of the design process shown in a screenshot of a webpage 1580 from FIG. 73. On the part of the interface shown in FIG. 73, the system is in 3D design mode (and stage 1408 of FIG. 66), the second tab 1432 is active and a user may finish filling in products on the 3D design layout, or cycle back to an earlier stage of the design. The above discussions with respect to FIGS. 45-47 apply to FIG. 73, including discussions of the 3D design layout and presenting the user with complementary product suggestions.

In an implementation, a graphical image of a home design product such as, e.g., a piece of furniture, an appliance, or an accessory, may be received, and 2D and 3D representations of the home design product may be created. The 2D and 3D representations may be created or built according to, or based on, any of a variety of criteria or methodologies, such as design rules; adaptive learning using neural networks that analyze prior user design behavior and selections; data, input, or feedback provided by users or partners of the system; data scraped from websites of, e.g., home design product manufacturers; data from databases of saved standard profiles, pre-built 3D base models, and known attributes of product types and images; results of evaluating the graphical image, including results from perspective determination, edge detection, plane detection, feature and profile detection and evaluation; standard solid modeling techniques; and design recipes.

2D and 3D representations of a home design product may be created or built using any of a variety of acts, depending on the implementation, and the acts may be performed in a different order and may be repeated. Processing used to create or build the 2D and 3D representations of the home design product based on a graphical image of the home design product may proceed in parallel. The processing used to create or build the 2D and 3D representations may be entirely or partially automated. All or part of the processing may also be manually performed responsively to input from a user.

In an implementation, design rules may include interior or architectural design guidelines, recommendations, standards, norms, methodologies, philosophies, or styles, individually or in combination, implemented as design rules in, for example, algorithms of the system. The design rules may be updated from time to time to reflect changes or advancements in, for example, interior and architectural styles. While algorithms may be based on design rules, in some implementations the design rules may be guidelines or considerations rather than strict rules.

A graphical image or graphical image file, such as a JPEG or a GIF file, that depicts, e.g., a home (or landscape) design product may be received by the system. The home design product may be any of a variety of products, for example, a piece of furniture, such as a chair or a couch; an appliance, such as a range, dishwasher, or refrigerator; or any other furnishings, appliances or accessories. The system may create or build 2D and 3D representations of the home design product depicted in the graphical image. The system may accommodate a vast variety of graphical images and may use one or more techniques to create or build the 2D and 3D representations of the home design product.

The graphical image may be a basic image received by the system, for example, without any content or information associated with the image. The graphical image may be a bookmarked or scraped image that is accompanied by content or information (such as taxonomy or folksonomy information, sizing information, keywords) associated with or regarding the home design product depicted in the graphical image. The graphical image may be received into the system as part of a user bookmarking a home design product from, e.g., a website of a manufacturer or a retailer of the home design product, as described in more detail above. An advertiser or a manufacturer may provide the graphical image of a home design product as part of placing content and information regarding the home design product into the system, via, e.g., a bookmarking tool, as described in more detail above. The system may use a scraping technology and a taxonomy/folksonomy based indexing and categorizing system to scrape websites of, e.g., home design product manufacturers and retailers for content and information regarding a home design product, as described in more detail above. The graphical image of the home design product may be part of content received from automatically scraping a website.

Figure 74:
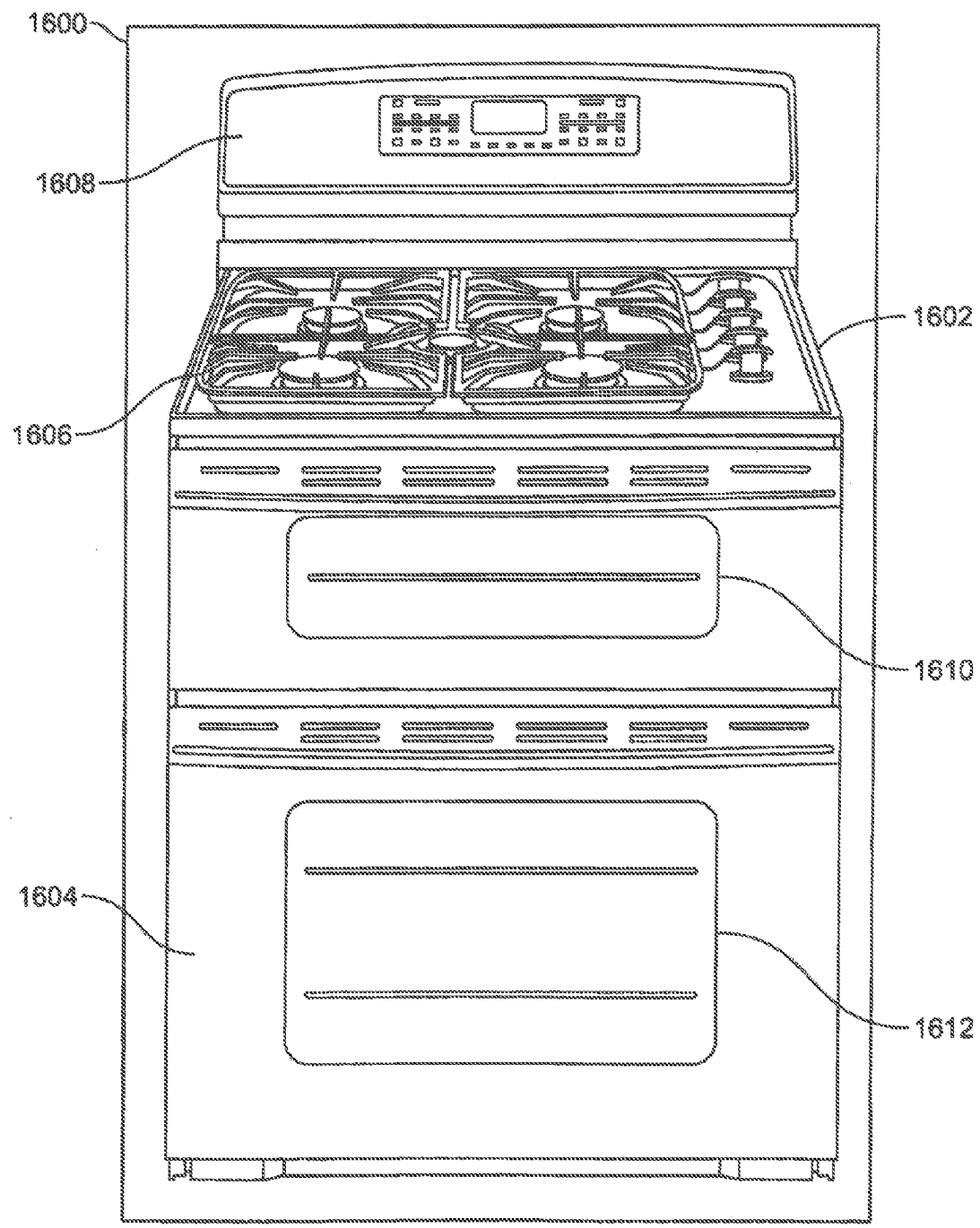
FIGS. 74-77 are diagrams of graphical images of home design products.
Figure 75:
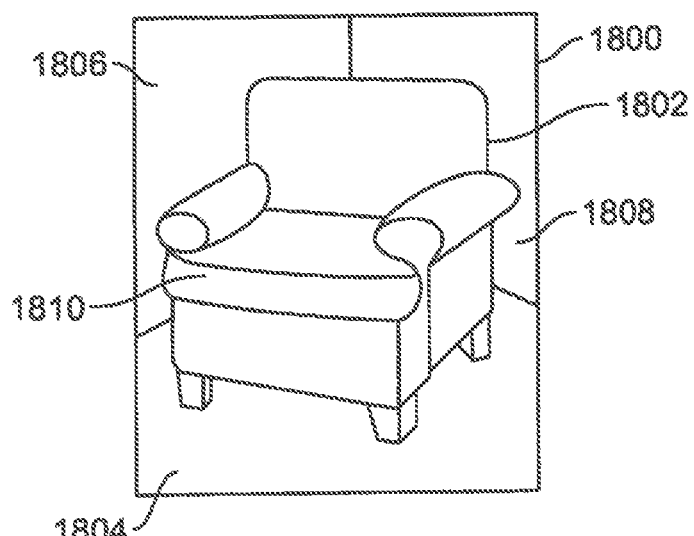
Figure 76:
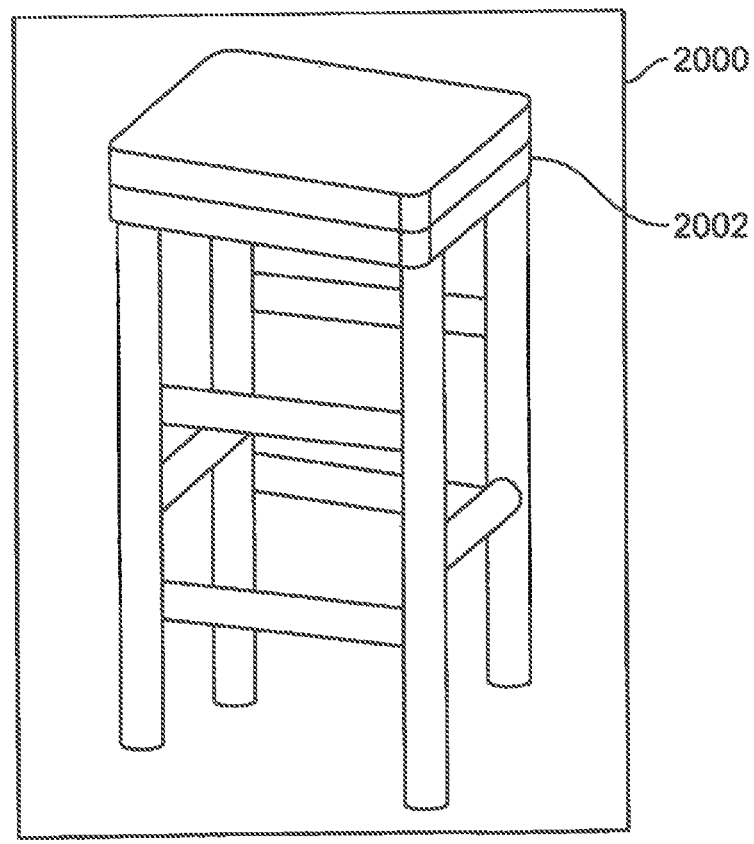
Figure 77:
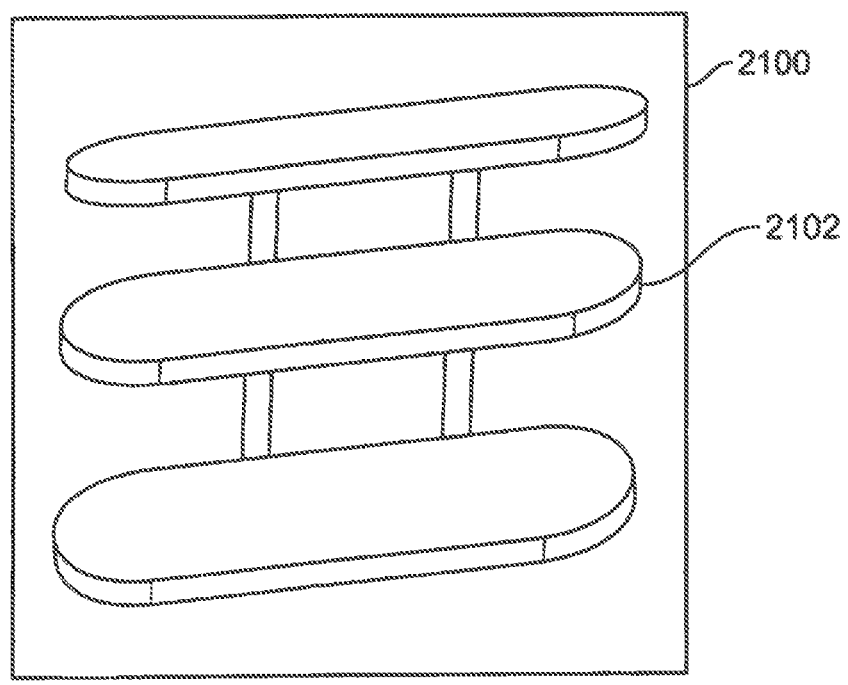

Several examples of graphical images depicting home design products are shown in FIGS. 74-77. FIG. 74 is a graphical image or picture 1600 of a range 1602, FIG. 75 is a picture 1800 of an armchair 1802, FIG. 76 is a picture 2000 of a kitchen stool 2002, and FIG. 77 is a picture 2100 of a set of shelves 2102 or a shelving unit 2102.

Once the graphical image has been received by the system, the system may attempt to identify and define the product type, or the product model type, of the home design product depicted in the graphical image. In so doing, the system may retrieve one or more pre-built 3D base models that correspond to the defined or identified product model type of the home design product depicted in the graphical image.

The product model type may be identified and defined in a variety of ways. If the graphical image received by or input to the system is associated with scraped data, from, e.g., the website of a manufacturer or retailer of the home design product. In scraping the website, the system may have obtained the type of the product, for example an armchair, and other words related to the specific features of the product, for example. The system may know, based on the scraped data, the product category and subcategory and other information, that the home design product depicted in the graphical image is a bathtub, or more particularly a five foot long bathtub that comes in standard dimensions. The system may search a database using words or other information related to the product to automatically retrieve one or more pre-built 3D base models.

The system may also prompt a user for input, by, for example, presenting one or more pre-built 3D base models to the user for the user to choose from to associate with the graphical image.

The system may also use image evaluation. The system may evaluate the image by, e.g., using edge detection techniques. As part of image evaluation, the system may examine past data that the system gathered related to image interpretation, i.e., neural networking data. For example, if the system has repeatedly found the same isometric view of an armchair the system may determine based on this neural networking data that a graphical image presently being interpreted (using edge detection and feature detection) is most likely: say, an armchair and the system may retrieve one or more pre-built 3D base models of an armchair. The system may identify edges and surfaces in the graphical image, such as the arm of an armchair, to identify the product model type as an armchair and retrieve one or more pre-built 3D base models of an armchair. The system may match edges and surfaces in the graphical image with images previously collected by the system, for example. The product model type may be determined based on a feature interpreted from the graphical image that is common to a particular product model type.

The one or more pre-built 3D base models retrieved by the system may be manipulated (e.g., parametrically adjusted, or scaled) to serve as a basic or underlying structure for the 3D representation of the home design product. A 3D base model may provide baseline data for the eventual 3D representation of the home design product. For example, the pre-built 3D base model may provide the overall shape of an armchair. The arms may not be rounded, for example, as in an example graphical image of an armchair, but the basic shapes and general planes of the armchair may be similar or the same. A pre-built 3D base model may be used to build a 3D base model from scratch or on the fly that may in turn be used as the basic or underlying structure for the 3D representation of the home design product.

For some graphical images of home design products, there may be no pre-built 3D base model that corresponds to or is associated with the image and that may, for example, serve as the basic or underlying structure of a 3D representation of the home design product. The system may, without the use of a pre-built 3D base model, build a 3D base model from scratch or on the fly in an automated process that may in turn be used as the basic or underlying structure for a 3D representation of the home design product.

Figure 78:
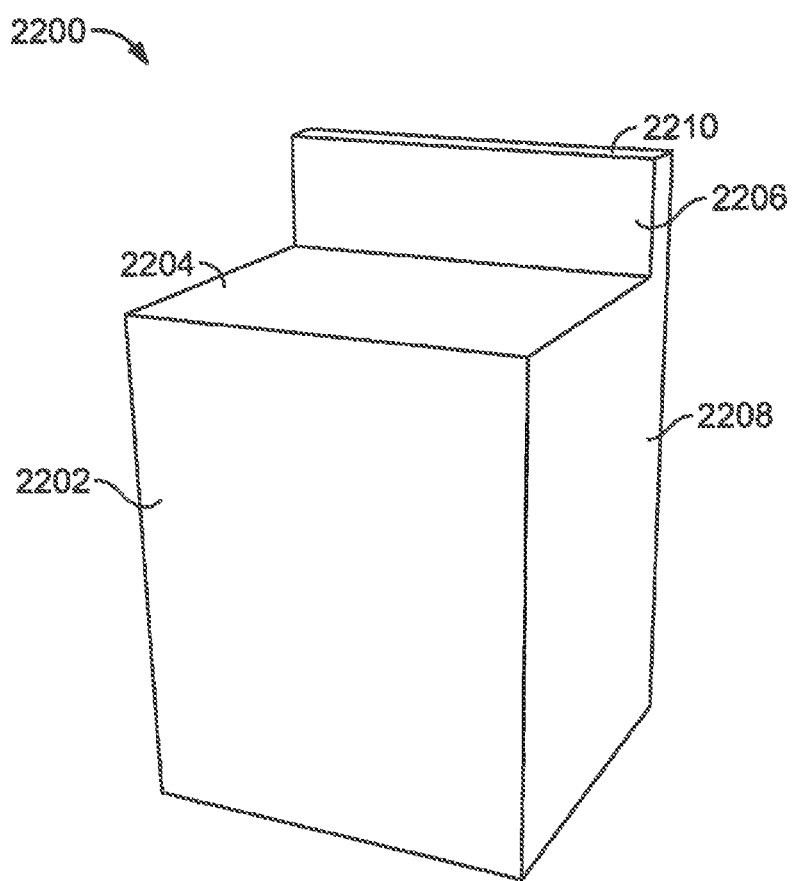
FIG. 78 is a diagram of a CAD model.

Referring to the several examples of graphical images depicting home design products shown in FIGS. 74-77, the system may more easily define the product model type of the range 1602 depicted in picture 1600 of FIG. 74 than the set of shelves 2102 depicted in picture 2100 of FIG. 77, or even the armchair 1802 or the kitchen stool 2002 of the pictures 1800, 2000 of FIGS. 75 and 76. Similarly, the system may find one or more pre-built 3D base models to associate with the range 1602, or even the armchair 1802. An example pre-built 3D base model 2200 for the range 1602 is shown in FIG. 78. The system may, for example, e.g., find no pre-built 3D base model to associate with the set of shelves 2102, or, for that matter, the armchair 1802. The system may then build 3D base models from scratch or on the fly in an a automated process to associate with the set of shelves 2102 or the armchair 1802. The complexity of the shape of the image of the product may impact whether the product model type may be defined, whether a pre-built 3D base model may be found to associate with the home design product, or whether a 3D base model may be built from scratch or on the fly in an automated process. For example, furniture may present more complexity than a more box shaped appliance, such as a range.

The 3D base model may be built according to a tile recipe. The file recipe may be adjusted based on any of a variety of criteria or methodologies, including data and input provided by a user; and adaptive learning using neural networks that analyze prior user design behavior and selections, for example.

Assuming that no pre-built 3D base model is found to associate with the graphical image, for example, the picture 1800 showing the armchair 1802 in FIG. 75, or that any pre-built 3D base models that are found are used in building a 3D base model to associate with the graphical image, the system may first determine the perspective of the graphical image of the home design product. That is, the system may determine the perspective that the picture of the home design product, here the picture 1800 showing the armchair 1802, was taken in. The system may examine things in the background of the graphical image other than the home design product to determine the perspective and to obtain perspective information. The system may obtain image background information like wall and floor intersections, wall and wall intersections, and ceiling and wall intersections. The picture 1800 also shows the intersection of the armchair 1802 with walls 1806, 1808 and the floor 1804. The system may also examine object data in the home design product itself. The system may draw lines along the home design product image to determine perspective, such as a line from the right front leg to the right back leg of the armchair 1802. Another line may be along the top of the armchair 1802, and still another may be from the left front leg to the right front leg of the armchair 1802. The different lines in the drawing may create planes for a 3D base model of the armchair 1802. The system may obtain the perspective information to determine how to match a 3D base model to the image of the armchair 1802, and to better interpret data in the image of the armchair 1802.

The system may assign main overall dimensions to the image of the armchair 1802, such as dimensions for height, width, and depth of the home design product, if the dimensions are available. The system may use the main overall dimensions to set a relative scale for a 3D base model of the armchair 1802. The main overall dimensions may available from user or advertiser input or from, e.g., data scraped from a website of a manufacturer or retailer. For example, a retailer typically may provide raw dimensions of a home design product so that people can know whether they can, e.g., fit the product into their home, or in a room or space of their home, and the system may obtain these dimensions as scraped data. If no dimensional information is available, or to complement such information, the system may infer and assign sizing or dimensional information based on information provided in the graphical image, such as the known size of other objects in the scene of the graphical image, or known dimensions of walls in the scene, for example.

The system may also assign detailed object information, including dimensional data, for features of the home design product, if the detailed object information is available. For example, in the case of a dresser, the system may have information regarding the size of the drawers, or the number of drawers, in the dresser. For a sink, the system may have information such as the distance between the two holes for the faucets, or the dimensions of the basin of the sink. On a range, detailed object information may include where the control panel is located, how many knobs on the control panel, and the like. On an armchair such as the armchair 1802, the system may have information on the distance that the front faces of the arms are set back from the front of the armchair, either absolutely or relative to the distance from the front to the back of the armchair.

The system may use edge detection techniques on the graphical image to find and assign main object planes in the CAD model that is being used to build the 3D base model. The main object planes may be top, bottom, left, right, front, and back planes that may form a box. Opposing main object planes may be parallel to one another. The main object planes may together form a bounding box for the CAD model that may define the outer boundaries of the home design product as depicted in the graphical image. As such, the main object planes may be used as the basis for building a 3D base model of the home design product. The system may utilize perspective information to find and assign the main object planes.

Figure 79:
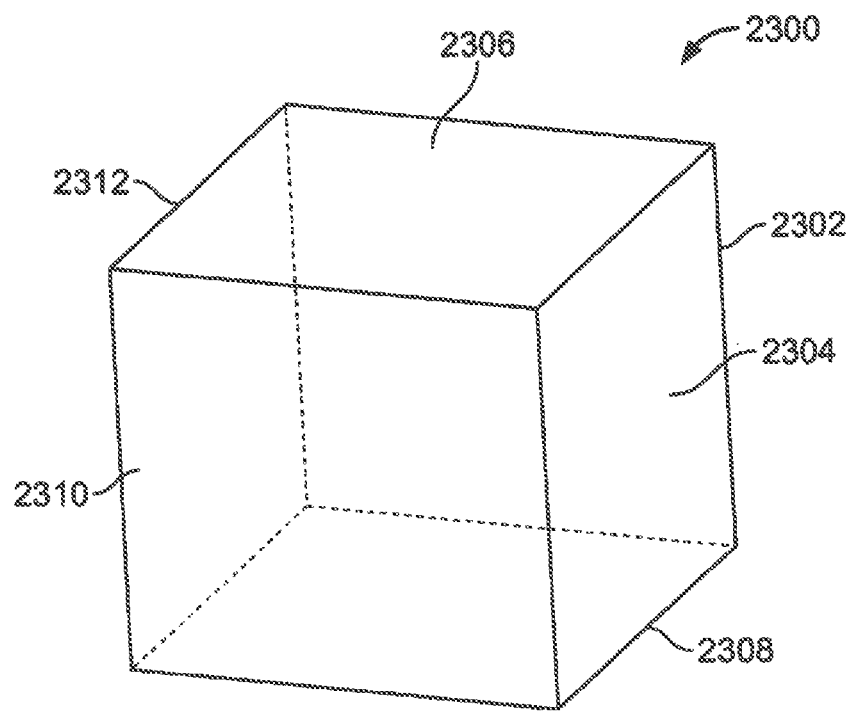
FIGS. 79 and 80 are diagrams showing example main object planes.

According to the example of the armchair 1802 in the picture 1800 of FIG. 75, the outside of the arms may determine the left and right planes; the front of the chair may determine the front plane; the top of a top cushion may determine the top planes; and the legs, in combination with the distance between the left and right planes, and front and back planes may determine the bottom plane, for example. A bounding box 2300 for the armchair 1802 is shown in FIG. 79, with top 2306, bottom 2308, left 2312, right 2304, front 2310, and back 2302 planes.

Figure 80:
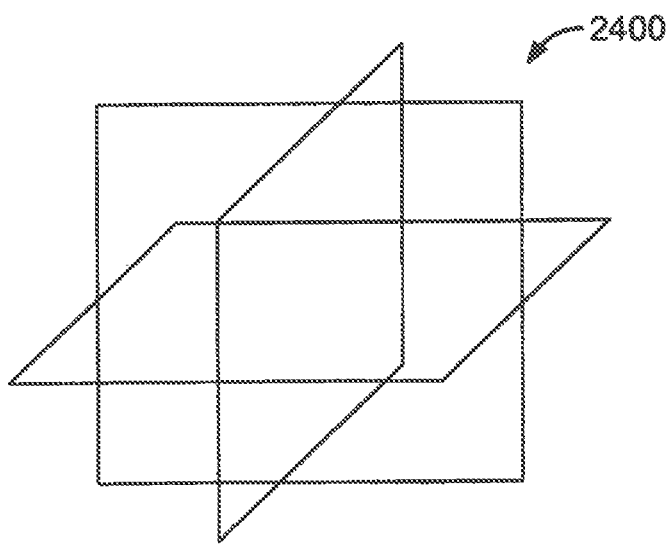

The system may also assign main object planes 2400 that intersect at the center of the home design product image and that are perpendicular to one another, as shown in FIG. 80, in the CAD model that is being used to build the 3D base model.

The system may resize the bounding box formed by the main object planes according to the main overall dimensions described above. The main overall dimensions may determine the distance between opposing main object planes. The bounding box may define the outer boundaries of the 3D base model within which the 3D base model may be built.

The system may next determine intermediary planes, or feature level planes, based on, e.g., analysis of the home design product image and on accumulated knowledge of the system and may assign these feature level planes within the bounding box in the CAD model. The accumulated knowledge of the system may include, for example, data obtained from interpretation of the image, such as edge detection data, perspective information, feature detection data and feature information; detailed object data such as dimensional data for features of the home design product; stored feature level plane information for the product model type; and neural networking information.

Figure 81:
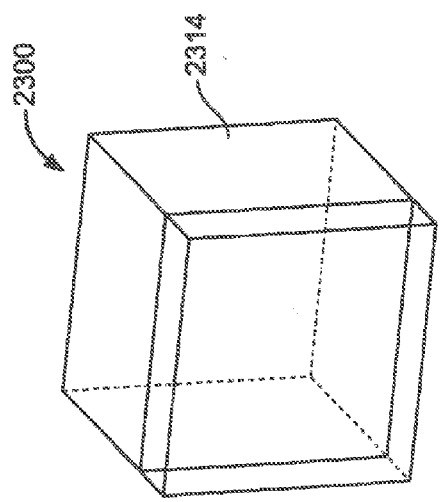
FIG. 81 is a diagram of a CAD model.

As an example of accumulated knowledge of the system, the system may know, based on, e.g., interpretation of the image, the product model type, or detailed object data such as dimensional information, on an armchair such as the armchair 1802, the distance that the front faces of the arms are set back from the front of the armchair, either absolutely or relative to the distance from the front to the back of the armchair. For example, the system may know that the front faces of the arms of the armchair 1802 are, within the bounding box of the CAD model, ⅕ of the total distance from the front of the bounding box to the back of the bounding box, so that a feature level plane may be assigned at ⅕ of the distance back from the front of the bounding box. The system may have interpreted the image using, e.g., edge detection, to determine that features such as the front faces of the arms were at this distance or relative distance. The system may have had prior knowledge that in armchairs, or in this type of armchair, a feature level plane should be placed at this distance or relative distance. FIG. 81 shows the bounding box 2300 with a feature level plane 2314 included within the box 2300, at the relative location that the front faces of the arms are located within the image of the armchair.

Figure 82:
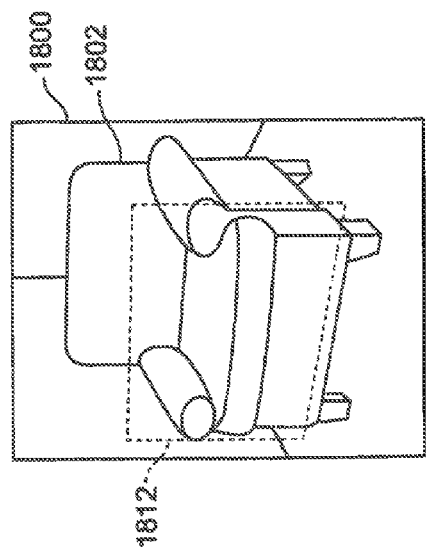
FIGS. 82-84 are diagrams of a graphical image of a home design product.
Figure 84:
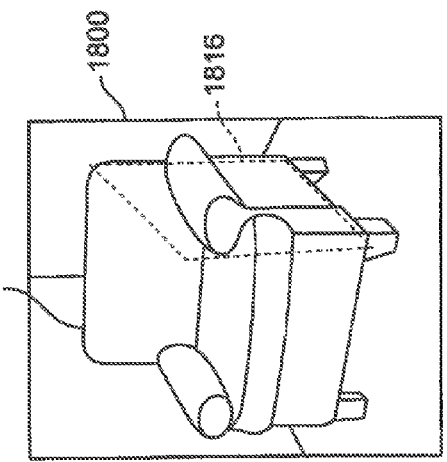
Figure 83:
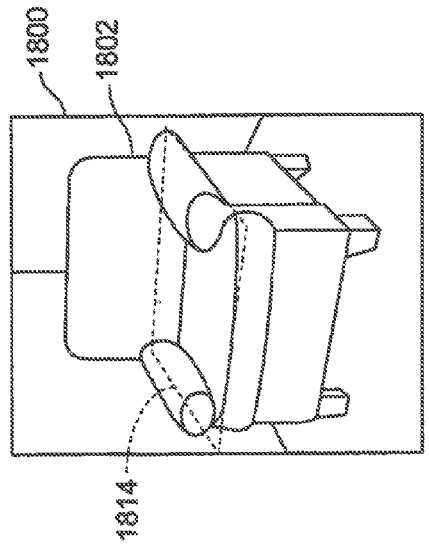

The system may place numerous intermediary planes, or feature level planes, within the bounding box in the CAD model that is being used to build the 3D base model. Each feature level plane may correspond to one or more features that, e.g., the system detected while interpreting the image, or that, e.g., the system knew to look for based on knowledge of the product model type. The system may also use a pre-built 3D base model to know which feature level planes to use. Feature level planes may correspond to stored known feature level planes for the product model type. For example, the system may know that a feature level plane exists for the front faces of the arms of an armchair (see the feature level plane 1812 in FIG. 82), that another feature level plane exists for the top of the seat cushion of the armchair (see the feature level plane 1814 in FIG. 83), and that another feature level plane exists for the right side of the base of the armchair that extends up through the right arm of the armchair (see the feature level plane 1816 in FIG. 84). The feature level plane 1812 may be assigned to capture the front faces of the arms of the armchair, the feature level plane 1814 may be assigned to capture the top of the seat cushion of the armchair, and the feature level plane 1816 may be assigned to capture the right side of the base of the armchair Another feature level plane may be assigned to capture the left side of the base of the armchair. The left side of the base is not shown in the armchair image, but a plane may be defined in part based on the left edge that can be seen of the front of the armchair. The plane may then be rotated until the plane is parallel to the left main object plane 2312 of the bounding box 2300. The feature level planes shown in FIGS. 82-84 may be parallel to different main object planes of the bounding box, but for other home design product images, the feature level planes may be, but need not be, parallel to main object planes.

The system may recognize features in the home design product image and assign a feature level plane to capture those features. The system may assign a feature level plane to an image in a location where features would be expected to be found based on accumulated knowledge of the system.

The graphical image of the home design product may in general be a raster graphic, made up of pixels. The system may examine the raster graphic, or raster graphic information from the graphical image for features in the hone design product image, such as the front faces of the arms of the armchair. The system may build a 2D vector drawing, a profile that may correspond to a feature in the home design product image. The system may build the profile in a feature level plane. The system may build or create the profile from scratch by detecting the feature in the home design product image and approximating the feature in a 2D vector drawing. The system may retrieve a profile from a database of standard profiles that correspond to features in home design product images. The stored profiles may be parametrically adjustable by the system so that a stored profile may be automatically resized, based on, e.g. sizing information for the home design product image, to match a detected feature on the home design product image.

The system may thus apply existing profiles for features of the home product image from the database of standard profiles to the feature level planes. The system may parametrically adjust the existing profiles to align with features detected in the home design product image. The system may build profiles for features of the home product image to the feature level planes, using 2D vector drawing techniques, such as drawing lines, arcs, curves, and the like.

The system may use edge detection to find edges of features in the feature level planes that the system has assigned. Candidates for features are parts of the home design product image that intersect the feature level planes, or that lie within the feature level planes.

In performing feature detection, the system may choose to ignore certain edges detected in the home design product image as extraneous details and not include representations of the details in the 3D base model.

The system may create numerous profiles on numerous feature level planes. The profiles that the system may create may be identified as candidates for application of common solid modeling techniques to the profiles. Common solid modeling techniques may include extruding an object or a shape (here a profile), extruding a shape along a path (such as a curved path), revolving a shape, revolving a shape along a path, and other solid modeling techniques well known in the art, such as warping, chamfers, fillets, drafting, angles, and cuts.

Figure 86:
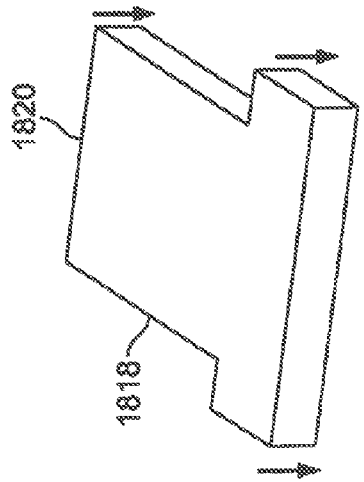
FIG. 86 is a diagram of a CAD model.
Figure 88:
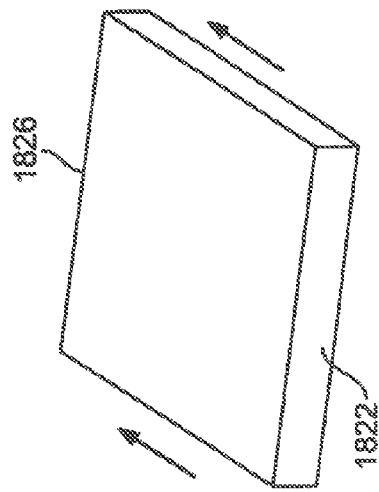
FIGS. 88-90 are diagrams of CAD models.
Figure 85:
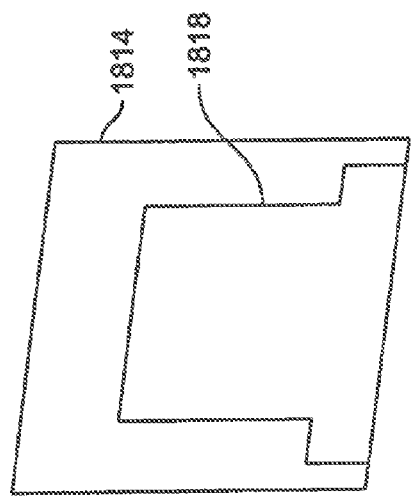
FIG. 85 is a diagram of a feature level plane.
Figure 87:
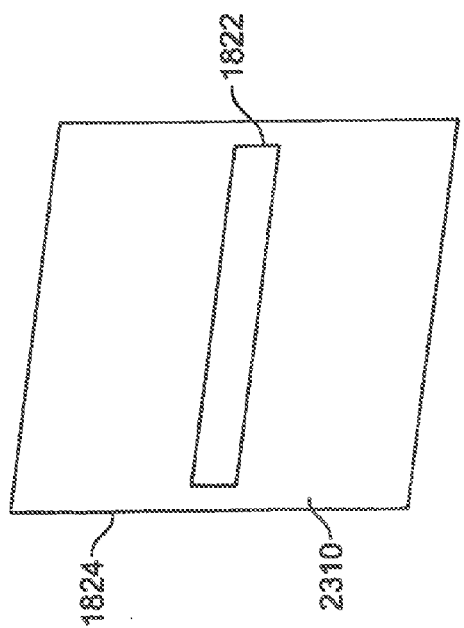
FIG. 87 is a diagram of a feature level plane.
Figure 90:
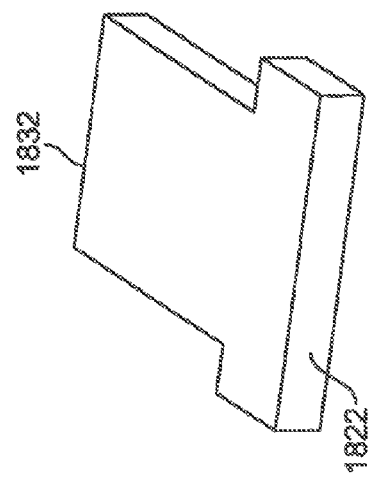
Figure 89:
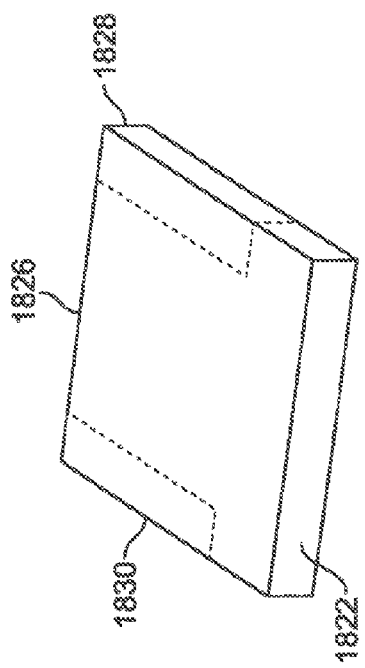

The system may apply common or standard solid modeling techniques to a profile, i.e., 2D vector drawing, to complete a feature of the home design product image. For example, the seat cushion of the armchair may be modeled in a 3D CAD model by identifying a profile 1818 in the feature level plane 1814 of FIG. 83 and FIG. 85 that corresponds to the shape (a "T-shape") of the top of the seat cushion. The T-shaped profile 1818 may be extruded downward to form a 3D model 1820 of the seat cushion of the armchair as indicated by the arrows in FIG. 86 (the bounding box and the feature level plane are not shown in FIG. 86). Referring to FIG. 87, a 3D model of the seat cushion may also be built by identifying a rectangular profile 1822 in a feature level plane 1824 that shares the same plane as the front plane 2310 of the bounding box 2300 (of, e.g., FIG. 79). The rectangular profile 1822 may be extruded toward the back of the armchair (as indicated by the arrows in FIG. 88) to form a box 1826 that serves as a bounding box 1826 for a 3D model of the seat cushion. As shown by the dashed lines in FIG. 89, the system may then identify the portions 1828, 1830 of the box that overlap parts of the right and left arms of the armchair 1802 and may remove those portions 1828, 1830 to form a 3D model 1832 of the seat cushion of the armchair (as shown in FIG. 90).

Use of either profile 1818 (FIG. 85) or 1822 (FIG. 87) by the system may result in an acceptable 3D model of the seat cushion, but the profile 1818 may be seen as a "best" profile since the system may have performed fewer acts in less time to build the 3D model 1832 of the seat cushion than to build the 3D model 1820 of the seat cushion.

As described, the profiles that the system may create may be identified as candidates for application of common solid modeling techniques to the profiles. The system may evaluate the "best" profile for application of solid modeling techniques, such as extrusion or revolving. The "best" profile or "best" profiles may be selected according to any of a variety of criteria, including which profile results in the least execution time by the system; which profile results in the most complete feature, which profile results in the most efficient use of solid modeling techniques; and the like. The system may store "best" profile information as part of the database of standard profiles described above. The system may use "best" profiles, or "best" profile information, from the database to select which of the candidate profiles are the "best" profiles for application of common solid modeling techniques. For example, "best" profile information may cause the system to select the profile 1822 for building a 3D model of the seat cushion of the armchair. The system may lack "best" profile information on one or more profiles and so may apply solid modeling techniques absent "best" profile information. "Best" may include the best way, or may include a preferred or better way according to any of a variety of criteria.

The system may also determine portions of the images on the feature level planes that may be cropped for subsequent application to the 3D base model to form the 3D representation of the home design product.

Figure 91B:
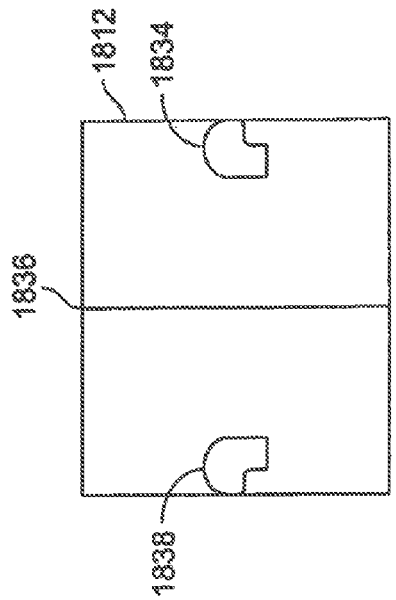
FIGS. 91A and 91B are diagrams of a feature level plane.
Figure 91A:
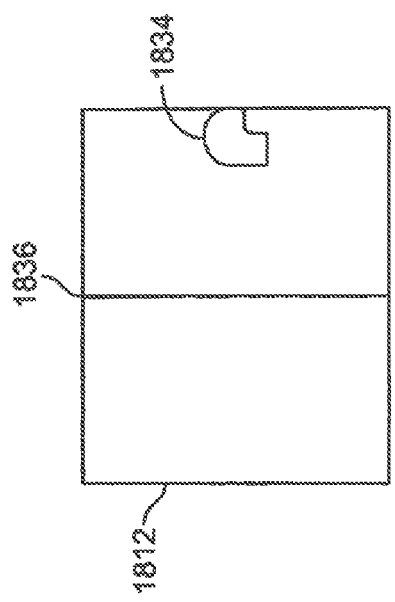

If the home design product depicted in the graphical image is thought to be symmetrical, or to have symmetrical features, the system may mirror profiles or profile information on the feature level planes to parts of the plane where a symmetrical features intersects, or is expected to intersect, the feature level plane. F, or example, the system may recognize the armchair 1802 as having the same arms, one on the left, and one on the right. A profile 1834 that may define the front face of the right arm of the armchair (including the portion of the front face covered by the seat cushion) in the feature level plane 1812 (see FIG. 91A) may be mirrored around an axis 1836 in the center of the plane 1812 to form a profile 1838 that may define the front face of the left arm of the armchair in the plane 182. The system may use a mirroring technique to provide profiles for symmetrical features that may not be shown, or that may be partially obstructed due to the perspective in which the home design product image is set. The system may mirror profiles prior to application of solid modeling techniques to the profiles, such as extrusion of a profile. The system may mirror, e.g., an extruded profile to form a copy of an extruded profile, with the mirroring occurring equidistant from one side of a plane to another side of the plane, rather than within a plane.

The system may apply the common solid modeling techniques, such as extrusion and revolving, to profiles that have been evaluated and identified. The system may apply the techniques to "best" profiles and may use techniques that have been evaluated for those profiles. For example, the system may extrude a profile such as the profile 1818 of FIG. 85 to build the 3D model 1820 of the seat cushion of FIG. 86. In the case of an image of a lamp, for example, a profile of the lamp may be revolved around as part of building a 3D base model for the lamp. The system may apply mirroring techniques to profiles before or after applying common solid modeling techniques such as extrusion and revolving. The system may prompt a user for input regarding whether the system has interpreted the home design image correctly or acceptably to the user. For example, the system may request a user to specify whether one or more profiles are appropriate for application of solid modeling techniques. The system may be fully or partially automated in building a 3D base model. The system may perform acts toward building a 3D base model to associate with the home design product image without requesting or receiving input from a user.

The system may apply other common solid modeling procedures to objects upon which some common solid modeling procedures have been performed. For example, a profile may have been extruded to form a 3D model of a particular feature. The system may apply solid modeling procedures such as applying chamfers, fillets, drafting angles, and cuts to 3D models of features of the home design products, such as, say, the base, a seat cushion, or the arms of the armchair. Feature details detected via, e.g., edge detection of the home design product image or accumulated knowledge of the system may inform the application of procedures such applying chamfers, fillets, drafting angles, and cuts to and into 3D models. For example, the front edge of the seat cushion may be rounded, so that system may apply fillets to the front edges of the 3D model 1820 of the seat cushion to round the edges of the seat cushion. A chamfer may include a flat edge cut out of a corner, a drafting angle may include an angle of a surface, and a cut may include a portion cut out of the 3D model. The system may prompt a user to apply the solid modeling techniques, or the process may be automated, or a combination of both.

The system may apply warping techniques to warp 3D model surfaces as part of building the 3D base model. The system may warp extrusions of profiles based on feature edge detection and accumulated knowledge regarding properties of the home design product. For example, the arms of a stuffed armchair may be puffy due to stuffing under the fabric, making the surfaces of the arms along the length of the arms curved rather than flat. Likewise, the cushions of an armchair may be stuffed and thus the surfaces of the cushions are curved or warped rather than perfectly flat. The system may warp the extrusions of profiles that formed the 3D models of the arms and the cushions of the armchair. The base of the chair may have flat surfaces and may not need warping, for example.

The system may also determine an order in which to apply solid modeling techniques to profiles (or, e.g., extrusions of profiles) and otherwise build the 3D base model to associate with the home design product image. The order of building the 3D base model may be based on, for example, standard industry design techniques or design rules; and previous knowledge accumulated regarding efficient or useful methods of building the 3D base model for the product model type. For example, the accumulated knowledge of the system may indicate that an efficient way to build the 3D base model of an armchair may be to draw or model the base of the chair, then to draw the arms of the chair, then to draw the back of the chair, then to draw the cushions (seat and back) of the chair, with the legs of the armchair being drawn at any point after the base is drawn. The system may also apply known solid modeling techniques such as warping surface at various points in the building of the 3D base model, for example, the system may warp the surfaces of the arms before the cushions. The system may prioritize features, such as base of the chair before the arms of the chair, and arms of the chair before cushions of the chair, for example. In general, the system may build the 3D base model using any order of solid modeling techniques as applied to any order of profiles, features, or 3D model objects.

The system may compare the resultant built 3D base model with any of a variety of things to determine whether the resultant built 3D base model properly characterizes the home design product image and may thus be associated with the home design product image and used as the basic or underlying structure for the 3D representation of the home design product. The system may compare the built 3D base model with the home design product image using, e.g., edge detection techniques; to data, scraped from a website of a manufacturer or retailer of the home design product; to one or more pre-built 3D base models for, e.g., the product model type, such as an armchair; to past data that the system gathered related to image interpretation, i.e., neural networking data relating to, e.g., the product model type. The system may present one or more built 3D built 3D base models to a user for the user to verify, or to choose from to associate with the graphical image. A user may be prompted to choose a model that most closely approximates the home design product image, and may given the option to ask the system to go back and build a new 3D base model. The system may have built several 3D base models serially or in parallel for presentation to a user or for comparison with the home design product image.

If the system determines, for whatever reason, that the built 3D base model does not properly characterize the home design product image, the system may return to previous acts of the process for building the 3D base model and, for example, repeat actions until the system validates a 3D base model, i.e., obtains a built 3D base model that is a closer match to the home design product image. The system may, for example, return to the edge or feature detection process, or main object or feature level plane assignment or profile identification, to find a point at which the process for building the 3D base model may have gone awry. The 3D base model comparison and validation process may be fully automated, or may be partially automated interspersed with prompts to a user, for example.

The system may build 3D base models of non-symmetrical home design product images as well, or of partially non-symmetrical home design product images. The system may employ iterative best guess techniques that may leverage any of, e.g., parallel processing, image interpretation, accumulated knowledge of the system regarding the home design product or detected features of the home design product, and user input, or a combination of these.

When the system compares and attempts to validate a 3D base model, the system may present to a user for verification alternative 3D base models that are based on non-symmetrical interpretations of the home design product image.

Once the system has built a 3D base model, the system may examine the surfaces of the 3D base model and evaluate potential groupings of surfaces, or subsets of surfaces, for textures to be applied to. The system may evaluate the potential groupings based on any of a variety of factors, such as, data from pre-built 3D base models; image interpretation data including edge detection data from the home design product image; commonly used surface groupings for the product model type; scraped data; user input or prior user feedback; neural networking data; or any combination of these. Depending on the particular 3D base model associated with the home design product image, the 3D base model may be quite complex, with numerous surfaces for textures to be applied to. For example, for the armchair 1802 shown in the graphical image 1800 of FIG. 74, the built 3D base model may have numerous surfaces, with flat edges, and the like. Several of the surfaces may share the same material, and, depending on the home design product in question, the material may need to match up at the edges of surfaces. This may be seen more clearly in the case of a striped armchair, where the built 3D base model may have numerous surfaces, but several surfaces may be grouped together to form surface groups so that textures applied to the surfaces will match at the edges, for example. For example, stripes on a back cushion may be designed to match up with stripes on a seat cushion and the two surfaces may in some situations be treated as a single surface group for purposes of applying textures. A slipcover on a couch may be modeled as different surfaces in a 3D base model, but the surfaces making up the slipcover may in some situations be treated as a single surface group for purposes of applying textures. The system may leverage edge detection data used to form surfaces of the 3D base model to define where textures may be applied. The surface groupings (or surface subset groupings) may vary considerably depending on the particular home design product being modeled, or on the portion of the product being modeled. For example, for the (typically) pre-built 3D base model 2200 (see FIG. 78) of the range 1602 of the picture 1600 (see FIG. 74), the surfaces may less complex, being, for example, the front, top, panel, and side surfaces. Surface groupings in a 3D base model may depend on whether the surfaces in question appear in the home design product image, or are not shown or are partially obscured in the image.

The system may evaluate techniques to map textures onto the 3D base model. The textures may include, for example, cropped images from the home design product image or stored textures, such as procedural textures, that may not be part of the home design product image. A procedural texture may include a form of texture that is typically a square and is designed so that when the squares are placed together, e.g., the top of one texture may match the bottom of another texture, so that the squares may map properly. In the case of the armchair 1802 shown in the picture 1800, if the armchair is made of a solid white cloth material, the procedural texture corresponding to the material may be white cloth. Certain cropped images from the home design product image may also be used as approximate procedural textures and mapped together to apply to a surface or surfaces.

Texture mapping techniques to be evaluated by the system may include techniques such as tiling, warping and stretching. Tiling a texture may include repeating the same texture pattern, usually a square texture, although other shapes may be used over and over again to fill in a surface. The texture pattern may map properly like a procedural texture, although other textures may be used. Stretching a texture may include stretching a cropped image or texture to meet the confines of a particular surface or surfaces. Warping a texture may include applying a texture to fill in and smooth out rough internal edges of the 3D base model. For example, in a 3D base model of a sink or a tub, the portion of the model that includes the basin of the sink or the inside of the tub may include rough edges at the bottom of the sink or the inside of the tub. The system may use tessellation techniques of varying complexity in 3D modeling to approximate rounded looking shapes so that a 3D base model does not include rough internal edges, but the system may also, or instead, use texture warping effects to remove hard angles of the 3D base model.

The system may evaluate the potential texture mapping techniques based on any of a variety of factors, such as, data from pre-built 3D base models; image interpretation data including edge detection data from the home design product image; commonly used surface groupings for the product model type; scraped data; user input or prior user feedback; neural networking data; or any combination of these.

The system may extract texture data from the home design product image in the form of cropped images. The cropped images may be shapes that may be tiled, stretched or warped on to the surfaces of the 3D base model. The system may assemble the cropped images from the home design product image onto profiles on the main object planes and the feature level planes. The system may retrieve stored textures, such as procedural textures, that may not be part of the home design product image. The stored textures may be tiled or warped on to the surfaces of the 3D base model. Textures may be extracted and retrieved automatically or may be, e.g., selected by a user.

The system may group the surfaces based on the evaluated surface groupings. The system may apply the extracted textures and retrieved stored textures to the surface groupings and individual surfaces using the evaluated texture mapping techniques, such as warping, tiling and stretching. The system may apply material properties such as reflectance to the surfaces. For example, a 3D based model of a dresser with a mirror attached may have reflectance applied to a surface corresponding to the mirror.

Less complex 3D base models may include a combination of stretched cropped images on surfaces along with applied procedural textures. More complex 3D base models with a multiplicity of surfaces may have more procedural textures applied using tiling and warping to the surfaces in the 3D base model, although on some surfaces stretched cropped images may be used. The system may use a recipe for applying textures to the 3D base model. In general, any combination of textures, including cropped images from the home design product image and stored textures, may be used with any combination of texture mapping techniques, including tiling, stretching, and warping, to apply to any combination of surfaces, subsets of surfaces, and groups of surfaces in 3D base models.

The system may evaluate the 3D base model with the textures applied and may determine whether to apply textural details to surfaces of the image. Textural details may include bump maps or transparent textures, which may include grayscale images typically having light and dark parts of varying transparency so that any underlying texture appears through the bump map or transparent texture to varying degrees. Depending on the particular bump map applied to a surface, the surface may appear to be, e.g., fluffy, furry, shagged, and the like. That is, the bump map or transparent texture applied to a surface may give the visual illusion that the surface has detailed features. Other standard textural details and textural detail techniques may be applied.

Figure 96:
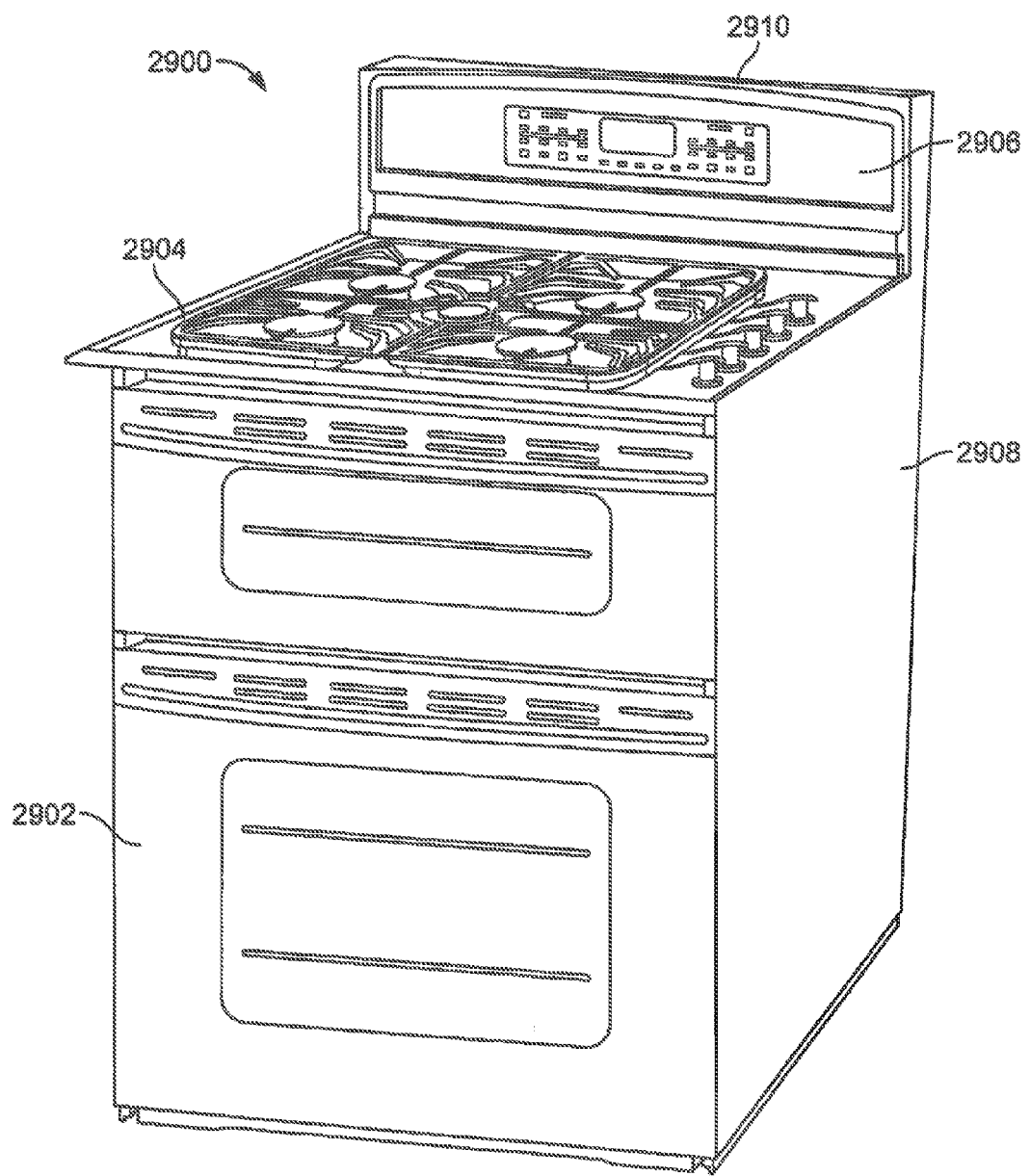
FIG. 96 is a CAD model of a range.

With any textural details and textures applied to the 3D base model, the system may use the resulting 3D representation of the home design product shown in the graphical image to create a 2D drawing, or 2D representation of the home design product. The system may use a top to down view of the 3D representation to create the 2D drawing. Example 2D drawings for the home design product images shown in FIGS. 74-77 are shown in respective FIGS. 92-95. A 2D drawing 2500 of the range 1602 (see FIG. 74) is shown in FIG. 92. A 2D drawing 2600 of the armchair 1802 (see FIG. 75) is shown in FIG. 93. A 2D drawing 2700 of the kitchen stool 2002 (see FIG. 76) is shown in FIG. 94. A 2D drawing 2800 of the set of shelves 2102 (see FIG. 77) is shown in FIG. 95. In an implementation of the home design tool, a 2D drawing or 2D representation may be used, for example, in a 2D layout of the home design tool, and may be converted to the 3D representation when, for example, a user switches from a 2D mode to a 3D mode in the home design tool. An example 3D representation 2900 of the range 1602 (see FIG. 74) (with textures applied to the 3D base model 2200 of FIG. 78) is shown in FIG. 96.

In an implementation, the system may use a graphical image of a home design product itself as a 3D representation of the image, without resort to a 3D base model. For example, sizing information (such as height and width in a 2D plane) for a home design product depicted in a graphical image of a home design product may be obtained from sources such as scraped data from a website of a manufacturer or retailer of the home design product, user input, perspective information determined from the graphical image, edge detection, feature detection, and surface information, and the like. The kitchen stool 2002 depicted in the graphical image 2000 shown in FIG. 76 may be used to illustrate an example of this technique. The height and width, and scaled dimensions, of the kitchen stool may be determined from one or more of the above sources, such as scraped data. The white areas within the kitchen stool may be made transparent using edge detection of the image, resulting in a "billboard" like 3D representation of the kitchen stool that may be placed in a 3D layout. The system may draw on other dimensional information about the top of the kitchen stool to build a 2D drawing or 2D representation of the kitchen stool, such as the 2D drawing 2700 of FIG. 94. In an implementation of the home design tool, a 2D drawings or 2D representation may be used, for example, in a 2D layout of the home design tool, and may be converted to the 3D representation when, for example, a user switches from a 2D mode to a 3D mode in the home design tool. The "billboard" like 3D representation of the kitchen stool may be located in a 3D layout based on the location of the 2D drawing in a 2D layout. The 3D representation may be sized using relative scale depending on where the 3D representation is located in a 3D layout such as a room layout. If the 3D representation is located further back in, e.g., a room, the 3D representation may appear smaller due to perspective. The system may apply a technique to stretch the 3D representation dynamically as perspective shifts, for example as a 3D layout is rotated. The system may stretch the 3D representation dynamically in such a way that the 3D representation appears to be viewed from the side rather than, from a corner (the kitchen tool 2002 is shown from a corner perspective as shown in FIG. 76).

In an implementation, upon receiving a graphical image of a home design product such as a kitchen cabinet, a door, a window, and the like, the system may build, or otherwise associate with the home design product image, a box-shaped 3D base model of limited complexity. The system may then apply textural details and textures (such as a paint color) to the 3D base model to form a 3D representation of the home design product. As described above, textural details may include bump maps or transparent textures, which may include grayscale images typically having light and dark parts of varying transparency so that any underlying texture (such as a paint color) appears through it to varying degrees. Depending on the particular bump map applied to a surface, the surface may appear to be, e.g., fluffy, furry; shagged, and the like. That is, the bump map or transparent texture applied to a surface may give the visual illusion that the surface has detailed features. In the case of a kitchen cabinet or a door, the bump map or transparent texture may give the visual illusion of a wood surface, for example. Other standard textural details and textural detail techniques may be applied.

Once a graphical image of a home design product has been received by the system, the system may attempt to identify and define the product type, or the product model type of the home design product depicted in the graphical image. In so doing, the system may retrieve one or more pre-built 3D base models that correspond to the defined or identified product model type of the home design product depicted in the graphical image. Referring once again to the several examples of graphical images depicting home design products shown in FIGS. 74-77, the system may more easily define the product model type of the range 1602 depicted in picture 1600 of FIG. 74 than the set of shelves 2102 depicted in picture 2100 of FIG. 77, or even the armchair 1802 or the kitchen stool 2002 of the pictures 1800, 2000 of FIGS. 75 and 76. Similarly, the system may find one or more pre-built 3D base models to associate with the range 1602, or even the armchair 1802. An example pre-built 3D base model 2200 for the range 1602 is shown in FIG. 78. The system may, for example, e.g., find no pre-built 3D base model to associate with the set of shelves 2102, or, for that matter, the armchair 1802. The system may then build 3D base models from scratch or on the fly in an automated process to associate with the set of shelves 2102 or the armchair 1802. The complexity of the shape of the image of the product may impact whether the product model type may be defined, whether a pre-built 3D base model may be found to associate with the home design product, or whether a 3D base model may be built from scratch or on the fly in an automated process. For example, furniture may present more complexity than a more box shaped appliance, such as a range.

As described above, the system may receive the graphical image 1600 of the range 1602 of FIG. 74 and may define the product model type of the range 1602 depicted in the picture 1600. Upon identifying the product model type of the range 1602, the system may retrieve one or more pre-built 3D base models that correspond to the defined or identified product model type of the range 1602. For example, the system may retrieve a pre-built 3D base model such as the example pre-built 3D base model 2200 for the range 1602 (shown in FIG. 78). The system may also build a non-complex 3D base model such as the 3D base model 2200 from scratch or on the fly, depending on, e.g., the complexity of the graphical image of the home design product, and the product model type of the home design product.

In an implementation, the system may utilize the pre-built 3D base model such as the model 2200 to build the 3D representation of the home design product, rather than building a 3D base model from scratch or on the fly.

For surfaces shown in the graphical image of the home design product, the system may perform automated image interpretation. The system may evaluate the graphical image to define individual surfaces to extract out of the home design product image, based, for example, on the pre-built 3D base model. The system may use edge detection techniques to define the individual surfaces to extract. The system may draw on a variety of information sources to define individual surfaces for extraction, including sources such as data from databases of known attributes of product types and images, and adaptive learning using neural networks that analyze prior user design behavior and selections, for example. The individual surfaces may include, top, front, side, and the like. For example, for the graphical image 1600 of the range 1602, the system may detect edges to define surfaces for cropping images that may be applied as textures (here, cropped images) to portions of the pre-built 3D base model 2200 using texture mapping techniques such as stretching. The system may detect the surface 1604 as the front of the range 1602 of FIG. 74 that may correspond to a surface 2202 of the 3D base model 2200 of FIG. 78. Based on the product model type, the system may detect and identify "grill" and "panel" surfaces 1606, 1608 that may correspond to surfaces 2204, 2206 of the 3D base model 2200.

In applying edge detection to find, e.g., clipping areas for cropping images in the graphical image, the system may detect edge detection details that may be extraneous and that need not be captured as a separate surface in a 3D base model.

The system may ignore the edge detection details when defining individual surfaces from the graphical image of the home design product to apply to the 3D base model. For example, on the range 1602 of the picture 1600, the system may detect via edge detection the windows 1610, 1612 of the front of the range. The system may ignore the windows as 1610, 1612 extraneous details rather than core features of the home design product and may instead define the front surface 1604 as a entire surface for cropping. The system may crop the entire front surface 1604 as one image that includes the windows as part of the image. What is an extraneous detail may in general depend on the product type of the home design product. For example, for the range, knobs and other instrumentation on the panel may be extraneous details. For a refrigerator, the door handles may be extraneous details, for example.

The system may also draw on a variety of information sources to incorporate edge detection details for certain home design products, including sources such as data from databases of known attributes of product types and images, and adaptive learning using neural networks that analyze prior user design behavior and selections, for example. For example, for a sink, the system may detect the edges of the basin of the sink. In a 3D base model of a sink or a tub, the portion of the model that includes the basin of the sink or the inside of the tub may include rough edges at the bottom of the sink or the inside of the tub. As discussed above, while the system may use tessellation techniques of varying complexity in 3D modeling to approximate rounded looking shapes so that a 3D base model does not include rough internal edges, the system may also, or instead use the texture mapping technique of warping and may use texture warping effects to remove hard angles of the 3D base model, such as the edges of the basin of a sink. Warping a texture may include applying a texture to fill in and smooth out rough internal edges of the 3D base model. In this way, for example warping techniques may create the effect of a basin.

For surfaces shown in the graphical image of the home design product, the system may crop images from the graphical image of the home design product and then may apply the cropped images to corresponding surfaces of a pre-built 3D base model. The texture mapping technique of stretching may be used by the system to apply the textures (here, cropped images) to the 3D base model. For the graphical image 1600 of the range 1602 (FIG. 74), the system may apply cropped images from the surfaces 1604, 1606, 1608 to corresponding surfaces 2202, 2204, 2206 of the 3D base model 2200 (FIG. 78) to form the 3D representation 2900 of the range 1602 in FIG. 96. The 3D representation 2900 includes a "front" surface 2902, a "grill" surface 2904, a "panel" surface 2906," a right side surface 2908, and a "top" surface 2910. The back and right side surfaces are not shown in the particular view of the 3D representation 2900. The sides, the back and the top of the range 1602 are not shown in the graphical image 1600 of the range 1602.

For surfaces not shown in the graphical image of the home design product, the system may perform automated image interpretation. The system may automatically apply stored textures, such as procedural textures (described above), that may not be part of the home design product image to portions of the 3D base model for which the system may not have found a corresponding surface in the graphical image of the home design product. The system may retrieve the stored textures based on scraped data from a website of a manufacturer of a retailer of the home design product, such as folksonomy and taxonomy based data. For example, there may be scraped data for the range 1602 that indicates that the range 1602 has surfaces made of stainless steel. The system may retrieve the stored textures based on other criteria such as data from databases of known attributes of product types and images, and adaptive learning using neural networks that analyze prior user design behavior and selections, for example. For example, the system or a user of the system may have previously applied a stored texture to the same product or a product with the same or a similar product model type (e.g., a product model type sharing certain characteristics as defined by, e.g., a taxonomy/folksonomy information), and the system may leverage this knowledge to automatically apply a stored texture to the 3D base model. The system may automatically apply a stored texture using a texture mapping technique such as tiling, as described above, although other techniques such as warping and stretching may be used.

The system may automatically extract textures directly from the home design product image as cropped images and may automatically apply the textures to a 3D base model, Certain cropped images from the home design product image may also be used as approximate procedural textures and mapped together to apply to a surface or surfaces of a 3D base model. More generally, the cropped images may be shapes that may be tiled, stretched or warped on to the surfaces of a 3D base model. For tiling, the cropped image may typically be square. For the example of the range 1602, the system may automatically extract a cropped image of the range such as an image that shows stainless steel and may automatically tile the cropped image onto the left side (not shown), right side 2208, back (not shown), and top 2210 surfaces of the 3D base model 2200.

The system may select a texture for extraction as a cropped image from the graphical image of the home design product based on image interpretation. The system may automatically select a texture for extraction as a cropped image based on scraped data from a website of a manufacturer of a retailer of the home design product, such as folksonomy and taxonomy based data. For example, there may be scraped data for the range 1602 that indicates that the range 1602 has surfaces made of stainless steel.

The system may select a texture for extraction as a cropped image from the graphical image of the home design product based on other criteria such as data from databases of known attributes of product types and images, and adaptive learning using neural networks that analyze prior user design behavior and selections, for example. For example, the system or a user of the system, may have previously extracted a texture as a cropped image for the same product or a product with the same or a similar product model type (model type sharing certain characteristics as defined by, e.g., a taxonomy/folksonomy information). The system may know the size of, and location on a product of, cropped images previously extracted and may leverage this knowledge. The system may automatically apply an extracted texture using a texture mapping technique such as tiling, as described above, although other techniques such as warping and stretching may be used.

With any textural details and textures applied to the 3D base model 2200 of FIG. 78, the system may use the resulting example 3D representation 2900 (see FIG. 96) of the range 1602 shown in the graphical image 1600 (see FIG. 74) to create a 2D drawing, or 2D representation of the range 1602. The system may use a top to down view of the 3D representation 2900 to create the 2D drawing. The 2D drawing 2500 of the range 1602 is shown in FIG. 92. In an implementation of the home design tool, the 2D drawing 2500 may be used, for example, in a 2D layout of the home design tool, and may be converted to the 3D representation 2900 when, for example, a user switches from a 2D mode to a 3D mode in the home design tool.

The system may provide a user with an opportunity to verify whether a 3D representation of a home design product is satisfactory and may provide the user with an opportunity to edit the 3D representation, or to build a new 3D representation. The system may, in some circumstances, ask a user to verify, edit, or build a new 3D representation of a home design product, or any combination of these. User verification may occur when the system scrapes a graphical image of a home design product from a website. A user may switch from a 2D mode to a 3D mode in an implementation of the home design tool and a 3D representation for a 3D layout may be presented to the user for verification and possible editing. A user may be asked to verify a 3D representation, or may be given an opportunity to verify a 3D representation, when the user bookmarks a home design product, as shown, e.g., in FIGS. 97-98. In any number of such situations, e.g., scraping, 3D mode, bookmarking, a user may be provided with an interface that may allow the user to confirm or edit a 3D representation, a 3D base model, or textures and texture mapping, for example.

Figure 97:
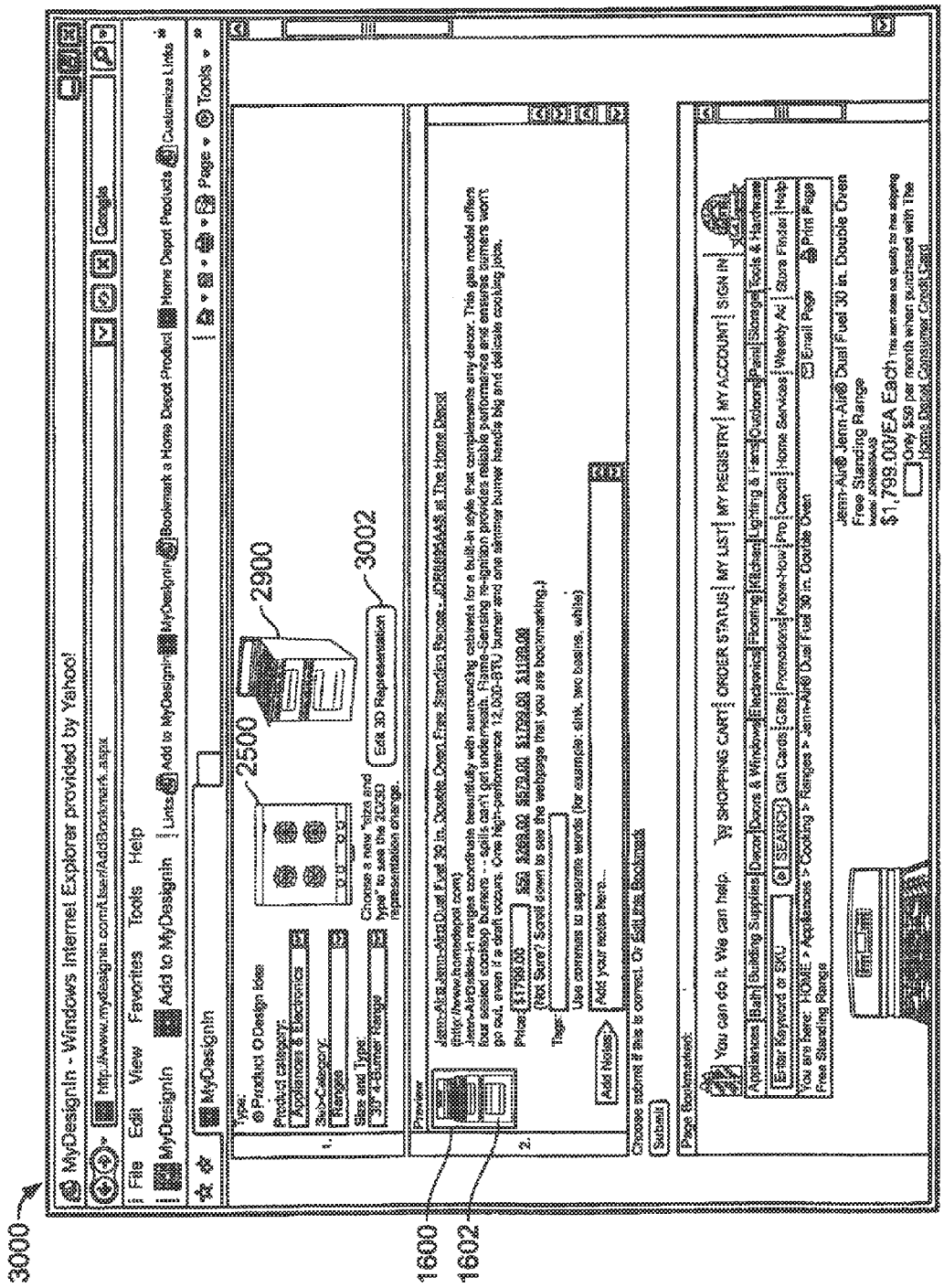
FIG. 97 is a diagram of a web interface.

In FIG. 97, a screenshot of a webpage 3000 shows a bookmarking interface where a user may be presented with, for example, 2D and 3D representations of the range 1602. The graphical image 1600 of the range 1602 of FIG. 74 is displayed on the webpage 3000 of FIG. 97. As described above, the system may receive a graphical image of a home design product, when, for example, a user bookmarks a home design product, and the system may automatically build 2D and 3D representations of the home design product. The 2D representation or 2D drawing 2500 and the 3D representation 2900 of the range 1602 are displayed on the webpage 3000 of FIG. 97. Clicking on an "Edit 3D Representation" button may bring up an editing interface 3102 as shown on the webpage 3100 of FIG. 97. The editing interface 3102 may allows a user to select a particular surface, "Front", "Grill", "Panel", "Sides/Back" of the 3D base model 2200 for editing on the left hand side of the editing interface 3102. The user may select "Front" which may place the focus on the front surface 3110 of the 3D base model 2200 and may allow the user to work on and edit images to be applied to the front surface 3110, or may allow the user to verify that the front of the image of the range 1602 was cropped properly.

Figure 98:
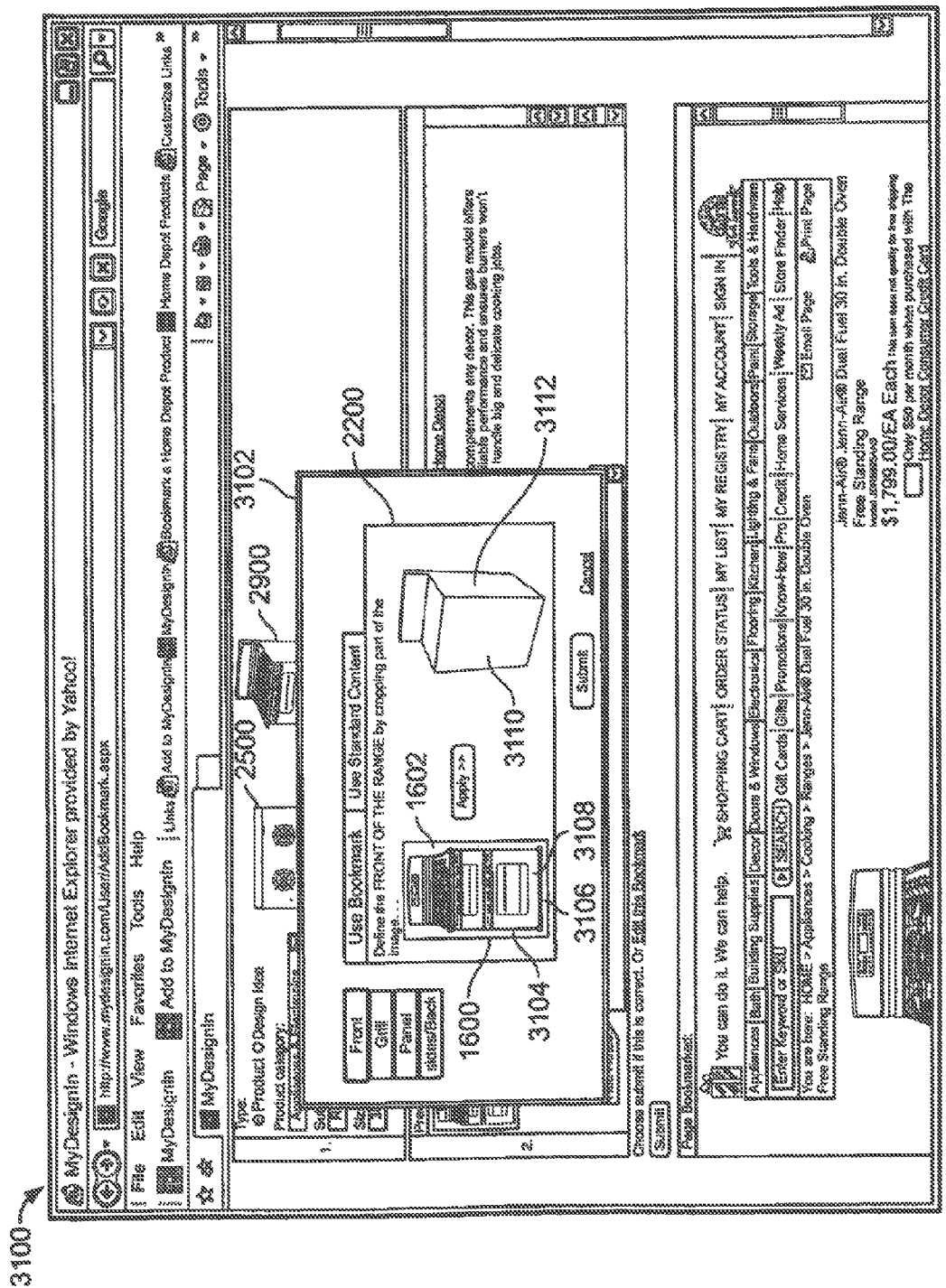
FIG. 98 is a diagram of a web interface with a CAD model editing window.

The system may provide a user with numerous editing options. For example, for a graphical image of a home design product such as the range 1602, as shown in FIG. 98, the system may present a user with a user with a home design product image such as image 1600 and may allow a user to move boundaries of shapes, such as the boundaries 3104, 3106 of the rectangular shape defining the front of the range 1602 on the image 1600. The shapes, or defined surfaces may be used to crop images for application onto surfaces of a 3D base model such as the 3D base model 2200 shown in FIG. 98. For example, the system may have cropped the image 3108 of the front of the range 1602 and applied the cropped image using a stretching texture mapping technique to the front surface 3110 of the 3D base model 2200. A user may move the boundaries defining the surface to better define the edges of the surface for selection as a cropped image to be applied to the front surface 3110 of the 3D base model 2200.

In an implementation, the system may allow a user to define new surfaces on a home design product image or a 3D base model. The system may allow a user to design or edit her own 3D base model using, for example, basic drawing tools such as rectangles. The system may allow a user to apply textures to an existing 3D base model or to her own designed or edited 3D base model.

The system may allow a user to edit surfaces not shown in a graphical image of a home design product. The system may allow a user to draw a boundary around a portion of the home design product image and may allow the user to apply the cropped image as a texture using texture mapping techniques such as tiling, warping, or stretching, to surfaces of a 3D base model not shown in the graphical image. The system may allow a user to confirm, select, or edit a stored texture, such as a procedural texture for the system to apply to surfaces of the 3D base model not shown in the graphical image.

For example, referring to the editing interface 3102, the user may select "Sides/Back", which may place the focus of the interface 3102 on the surfaces of the 3D base model 2200 (e.g., sides and back surfaces such as the right surface 3112) that are not shown in the graphical image 1600 of the range 1602. The system may permit the user to choose a texture from the existing image, or a stored texture such as a procedural texture, to apply to the sides and back surfaces of the 3D base model 2200. The system may not have applied a texture to surfaces of the 3D base model not shown in the graphical image, so that when a user selects "Sides/Back" in the editing interface 3102, the system may present the user with different options for textures to apply to the 3D base model 2200 surfaces. The system may suggest a stainless steel stored texture that the system retrieved by, e.g., learning from scraped data that the range 1602 has stainless steel surfaces. The system may evaluate the graphical image to find a texture on the image that most closely approximates, e.g., the color of stainless steel, and present the texture to the user, for example.

Figure 99:
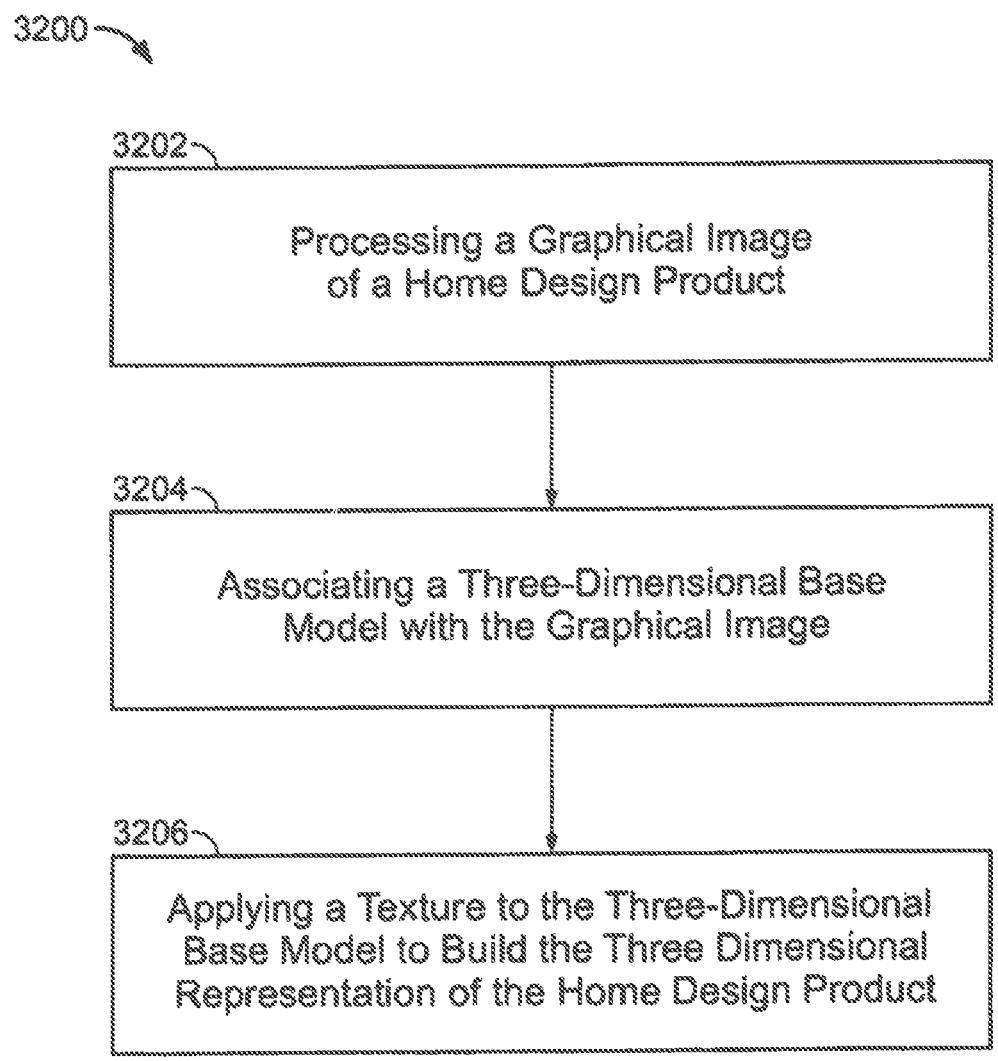
FIG. 99 is a flow chart of a process for use in building a three-dimensional representation of a home design product.

FIG. 99 is a flow chart of an example process 3200 for use in building a three-dimensional representation of a home design product. A graphical image of a home design product is processed (3202). A three-dimensional (3D) base model is associated with the graphical image (3204). A texture is applied to the 3D base model to build the three-dimensional representation of the home design product (3206).

While the systems, methods, and computer program products described above have been directed to an implementation of the home design tool for design and layout of rooms for a house, the tool is not limited to home designs, as such, other implementations are possible. For example, the home design tool could be used to generate a layout of an office building or other commercial space. In addition, the home design tool could be used to generate layouts of garden or other landscaping features.

In using the terms "2D," "two-dimensional," "3D," and "three-dimensional," these terms are understood to the virtual world, i.e., virtual 3D, virtual 2D, etc., rather than the physical world.

In using the term "may," it is understood to mean "could, but not necessarily must."

In using the "set" as in "a set of elements," it is understood that a set may include one or more elements.

The processes described herein are not limited to use with any particular hardware, software, or programming language; they may find applicability in any computing or processing environment and with any type of machine that is capable of running machine-readable instructions. All or part of the processes can be implemented in digital electronic circuitry, or in computer hardware, firmware, software, or in combinations thereof.

All or part of the processes can be implemented as a computer program product, e.g., a computer program tangibly embodied in one or more information carriers, e.g., in one or more machine-readable storage media or in a propagated signal, for execution by, or to control the operation of, data processing apparatus, e.g., a programmable processor; a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Actions associated with the processes can be performed by one or more programmable processors executing one or more computer programs to perform the functions of the processes. The actions can also be performed by, and the processes can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, one or more processors will receive instructions and data from a read-only memory or a random access memory or both. The essential elements of a computer are one or more processors for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

Figure 100:
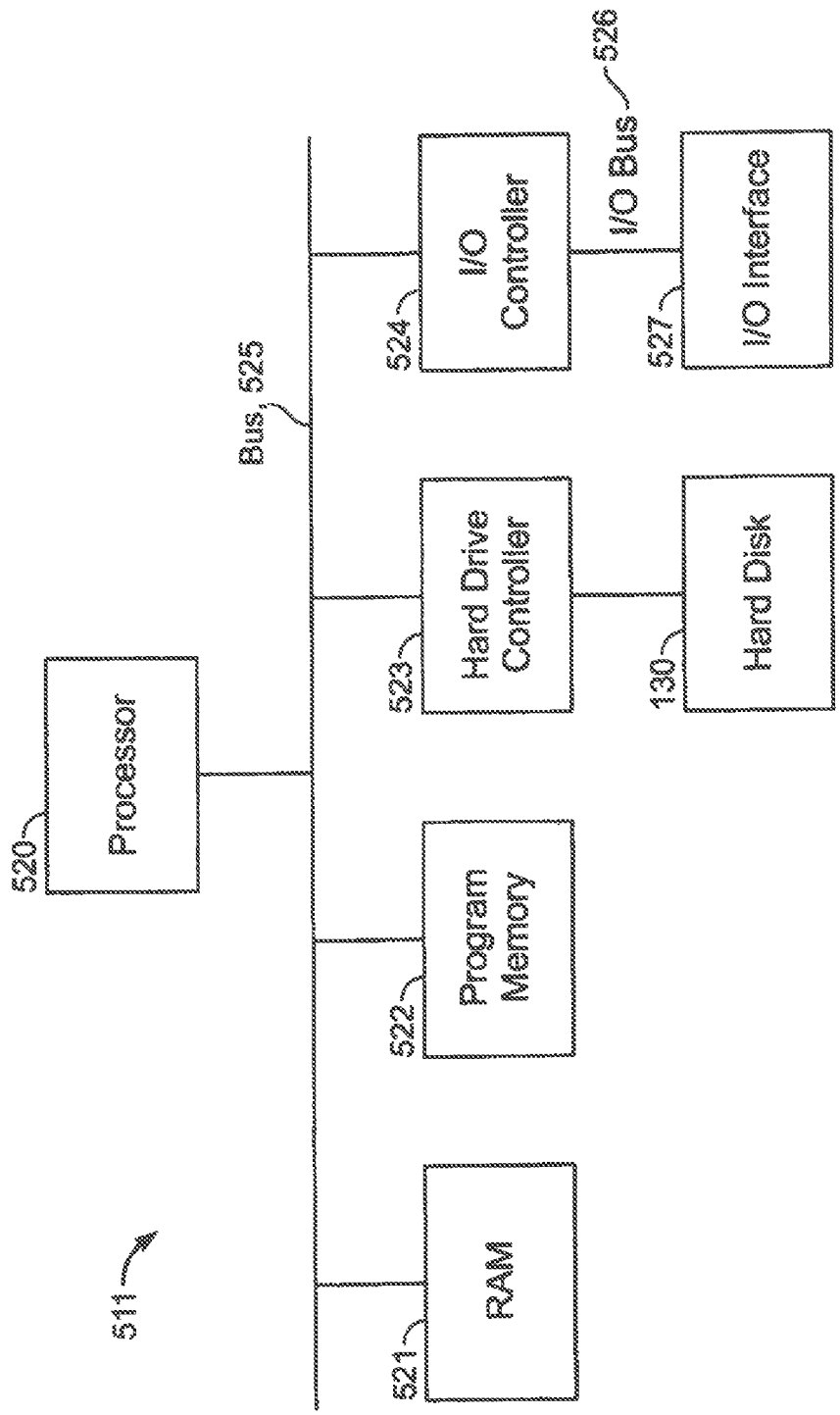
FIG. 100 is a block diagram of a computer system.

An example of one such type of computer is shown in FIG. 100, which shows a block diagram of a programmable processing system (system) 511 suitable for implementing or performing the apparatus or methods described herein. The system 511 includes one or more processors 520, a random access memory (RAM) 521, a program memory 522 (for example, a writeable read-only memory memo (ROM) such as a flash ROM), a hard drive controller 523, and an input/output (I/O) controller 524 coupled by a processor (CPU) bus 525. The system 511 can be preprogrammed, in ROM, for example, or it can be programmed (and reprogrammed) by loading a program from another source (for example, from a floppy disk, a CD-ROM, or another computer).

The hard drive controller 523 is coupled to a hard disk 130 suitable for storing executable computer programs, including programs embodying the present methods, and data including storage. The I/O controller 524 is coupled by an I/O bus 526 to an I/O interface 527. The I/O interface 527 receives and transmits data in analog or digital form over communication links such as a serial link, local area network, wireless link, and parallel link.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

Actions associated with the processes can be rearranged and/or one or more such action can be omitted to achieve the same, or similar, results to those described herein.

Elements of different implementations may be combined to form implementations not specifically described herein.

Numerous uses of and departures from the specific system and processes disclosed herein may be made without departing from the inventive concepts. Consequently, the invention is to be construed as embracing each and every novel feature and novel combination of features disclosed herein and limited only by the spirit and scope of the appended claims.

What is claimed is:

1. A computer-implemented method for use in building a three-dimensional representation of a home design product, the method comprising:
   processing a graphical image of the home design product;
   associating a three-dimensional base model with the graphical image; and
   applying a texture to the three-dimensional base model to build the three-dimensional representation of the home design product,
   wherein processing the graphical image and associating the three-dimensional base model with the graphical image comprises building the three-dimensional base model,
   wherein building the three-dimensional base model further comprises:
     applying edge detection to the graphical image;
     determining main object planes based on the graphical image;
     forming a bounding box from the main object planes, wherein the bounding box comprises an outer boundary for the three-dimensional base model; and
     assigning a feature level plane within the bounding box.

2. The computer-implemented method of claim 1, further comprising generating a visual bookmark of the home design product.

3. The computer-implemented method of claim 1, further comprising:

scraping information regarding the home design product from a website;
wherein the information comprises the graphical image.

4. The computer-implemented method of claim 1, further comprising:
receiving the graphical image;
wherein the three-dimensional base model is built prior to the graphical image being received.

5. The computer-implemented method of claim 1, further comprising selectively ignoring a feature detail of the graphical image found while applying edge detection as an extraneous detail.

6. The computer-implemented method of claim 1, further comprising:
presenting the three-dimensional representation to a user; and
requesting that the user verify the three-dimensional representation.

7. The computer-implemented method of claim 1, wherein building the three-dimensional base model comprises determining perspective information for the graphical image.

8. The computer-implemented method of claim 1, wherein building the three-dimensional base model further comprises:
assigning dimensional information to the graphical image;
wherein the dimensional information comprises at least one of overall dimensions for the home design product, or dimensions for a feature of the home design product.

9. The computer-implemented method of claim 8, wherein building the three-dimensional base model further comprises setting a relative scale for the three-dimensional base model using the dimensional information.

10. The computer-implemented method of claim 1, wherein building the three-dimensional base model further comprises applying dimensional information to the main object planes to define one or more distances between the main object planes.

11. The computer-implemented method of claim 1, wherein the texture comprises a stored texture.

12. The computer-implemented method of claim 1, further comprising:
applying a textural detail to the three-dimensional base model to build the three-dimensional representation;
wherein the textural detail comprises a bump map.

13. The computer-implemented method of claim 1, further comprising:
presenting the three-dimensional base model to a user; and
requesting that the user verify the three-dimensional base model.

14. The computer-implemented method of claim 1, further comprising:
providing an interface to a user to allow a user to edit at least one of the three-dimensional representation or the three-dimensional model.

15. The computer-implemented method of claim 1, further comprising:
building a two-dimensional drawing of the home design product using the three-dimensional representation.

16. A computer-implemented method for use in building a three-dimensional representation of a home design product, the method comprising:
processing a graphical image of the home design product;
associating a three-dimensional base model with the graphical image; and
applying a texture to the three-dimensional base model to build the three-dimensional representation of the home design product,
wherein processing the graphical image and associating the three-dimensional base model with the graphical image comprises building the three-dimensional base model, wherein building the three-dimensional base model further comprises:
applying edge detection to the graphical image;
defining a profile on a feature level plane;
wherein the profile corresponds to a feature of the graphical image.

17. The computer-implemented method of claim 16, wherein building the three-dimensional base model further comprises:
retrieving the profile from a profile database;
wherein the profile is parametric; and
adjusting the profile to match a shape of the feature of the graphical image;
wherein the feature of the graphical image intersects the feature level plane.

18. The computer-implemented method of claim 16, wherein building the three-dimensional base model further comprises:
drawing the profile to match a shape of the feature of the graphical image;
wherein the feature of the graphical image intersects the feature level plane.

19. The computer-implemented method of claim 16, wherein building the three-dimensional base model further comprises:
applying a solid modeling technique to the profile to define a feature in the three-dimensional base model.

20. The computer-implemented method of claim 19, wherein applying the solid modeling technique comprises:
extruding the profile to build a three-dimensional model of the feature.

21. The computer-implemented method of claim 20, wherein building the three-dimensional base model further comprises:
warping a surface of the three-dimensional model of the feature.

22. The computer-implemented method of claim 16, wherein building the three-dimensional base model further comprises:
mirroring the profile in the feature level plane.

23. The computer-implemented method of claim 16, wherein building the three-dimensional base model further comprises:
determining a second feature level plane for the feature of the graphical image;
defining a second profile on the second feature level plane;
wherein the second profile corresponds to the feature of the graphical image;
evaluating the profile and the second profile;
selecting a best profile of the profile and the second profile; and
applying a solid modeling technique to the best profile to define the feature in the three-dimensional base model.

24. A system comprising:
an apparatus, the apparatus comprising:
memory configured to store instructions for execution; and
one or more processing devices configured to execute the instructions, the instructions for causing the one or more processing devices to:
process a graphical image of the home design product;
associate a three-dimensional base model with the graphical image; and apply a texture to the three-dimensional base model to build a three-dimensional representation of the home design product,
wherein processing the graphical image and associating the three-dimensional base model with the graphical image comprises building the three-dimensional base model,
wherein building the three-dimensional base model further comprises:
applying edge detection to the graphical image;
determining main object planes based on the graphical image;
forming a bounding box from the main object planes, wherein the bounding box comprises an outer boundary for the three-dimensional base model; and
assigning a feature level plane within the bounding box.

* * * * *